(12) United States Patent
Milletari et al.

(10) Patent No.: US 11,804,050 B1
(45) Date of Patent: Oct. 31, 2023

(54) PROCESSOR AND SYSTEM TO TRAIN MACHINE LEARNING MODELS BASED ON COMPARING ACCURACY OF MODEL PARAMETERS

(71) Applicant: NVIDIA Corporation, San Jose, CA (US)

(72) Inventors: Fausto Milletari, Munich (DE); Maximilian Baust, Munich (DE); Nicola Rieke, Munich (DE); Wenqi Li, London (GB); Daguang Xu, Potomac, MD (US); Andrew Feng, Cupertino, CA (US); Rong Ou, Palo Alto, CA (US); Yan Cheng, Great Falls, VA (US)

(73) Assignee: NVIDIA Corporation, Santa Clara, CA (US)

( * ) Notice: Subject to any disclaimer, the term of this patent is extended or adjusted under 35 U.S.C. 154(b) by 173 days.

(21) Appl. No.: 16/671,001

(22) Filed: Oct. 31, 2019

(51) Int. Cl.
| | |
|---|---|
| *G06V 20/64* | (2022.01) |
| *G06N 3/063* | (2023.01) |
| *G06N 3/08* | (2023.01) |
| *G06N 3/045* | (2023.01) |

(52) U.S. Cl.
CPC .............. *G06V 20/64* (2022.01); *G06N 3/045* (2023.01); *G06N 3/063* (2013.01); *G06N 3/08* (2013.01)

(58) Field of Classification Search
CPC ...... G06K 9/00201; G06N 3/08; G06N 3/063; G06N 3/0454
See application file for complete search history.

(56) References Cited

U.S. PATENT DOCUMENTS

| | | | |
|---|---|---|---|
| 2017/0206405 A1* | 7/2017 | Molchanov | G06N 3/044 |
| 2018/0018990 A1* | 1/2018 | Kim | G10L 19/0017 |
| 2018/0025271 A1* | 1/2018 | Sawada | G06F 17/16 |
| | | | 706/25 |
| 2018/0144214 A1* | 5/2018 | Hsieh | G06T 7/0002 |
| 2018/0144465 A1* | 5/2018 | Hsieh | G06N 3/08 |
| 2019/0042949 A1* | 2/2019 | Young | G06N 3/10 |
| 2019/0114537 A1* | 4/2019 | Wesolowski | G06N 3/084 |
| 2019/0114804 A1* | 4/2019 | Sundaresan | G06T 7/74 |
| 2019/0130229 A1* | 5/2019 | Lu | G06V 10/17 |
| 2019/0205747 A1 | 7/2019 | Srivastava | |

(Continued)

FOREIGN PATENT DOCUMENTS

| | | |
|---|---|---|
| CN | 108805283 A | 11/2018 |
| CN | 108805795 A | 11/2018 |

(Continued)

OTHER PUBLICATIONS

Pichao Wang, "Action Recognition From Depth Maps Using Deep Convolutional Neural Networks," Dec. 17, 2015, IEEE Transactions on Human-Machine Systems, vol. 46, No. 4, Aug. 2016, pp. 498-502.*

(Continued)

*Primary Examiner* — Omar S Ismail
(74) *Attorney, Agent, or Firm* — Davis Wright Tremaine LLP

(57) ABSTRACT

Apparatuses, systems, and techniques to collaboratively train one or more machine learning models. Parameter reviewers may be configured to compare sets of machine learning model parameter information in order to generate one or more machine learning models, such as neural networks.

16 Claims, 53 Drawing Sheets

(56) References Cited

U.S. PATENT DOCUMENTS

| | | | | |
|---|---|---|---|---|
| 2019/0347467 A1* | 11/2019 | Ohsaka | ................ | G06V 10/449 |
| 2020/0082198 A1* | 3/2020 | Yao | ........................ | G06N 3/084 |
| 2020/0084427 A1* | 3/2020 | Sun | ........................ | G06N 3/045 |

FOREIGN PATENT DOCUMENTS

| | | |
|---|---|---|
| CN | 110176054 A | 8/2019 |
| CN | 110363294 A | 10/2019 |
| CN | 110383292 A | 10/2019 |

OTHER PUBLICATIONS

Shiqiang Wang,"Adaptive Federated Learning in Resource Constrained Edge Computing Systems,"Mar. 11, 2019, IEEE Journal on Selected Areas in Communications, vol. 37, No. 6, Jun. 2019,pp. 1205-1210.*

Vijay Maurya,"Comparative Analysis of Processors Performance Using ANN," Oct. 8, 2015, 2015 5th International Conference on IT Convergence and Security (ICITCS),pp. 1-3.*

Guanbin Li,"Deep Contrast Learning for Salient Object Detection," Jun. 2016, Proceedings of the IEEE Conference on Computer Vision and Pattern Recognition (CVPR), 2016,pp. 478-480.*

Chaoyue Niu,"Secure Federated Submodel Learning,"Nov. 11, 2019,Computer Science-Machine Learning,arXiv: 1911.022541, pp. 1-9.*

Belagiannis, V., Rupprecht, C., Carneiro, G., Navab, N.: Robust optimization for deep regression. In: Proceedings of the IEEE international conference on computer vision. pp. 2830{2838 (2015).

Geyer, R.C., Klein, T., Nabi, M.: Differentially private federated learning: A client level perspective. arXiv preprint arXiv:1712. 07557 (2017).

Goodfellow, I.J., Pouget-Abadie, J., Mirza, M., Xu, B., Warde-Farley, D., Ozair, S., Courville, A., Bengio, Y.: Generative Adversarial Networks. arXiv:1406.2661 [cs, stat] (Jun. 2014), http://arxiv.org/abs/1406.2661, arXiv: 1406.2661.

Hitaj, B., Ateniese, G., Perez-Cruz, F.: Deep Models Under the GAN: Information Leakage from Collaborative Deep Learning. arXiv:1702.07464 [cs, stat] (Feb. 2017), http://arxiv.org/abs/1702. 07464, arXiv: 1702.07464.

McMahan, H.B., Moore, E., Ramage, D., Hampson, S., Areas, B.A.y.: Communication-Efficient Learning of Deep Networks from Decentralized Data. arXiv:1602.05629 [cs] (Feb. 2016), http://arxiv.org/abs/1602.05629, arXiv: 1602.05629.

Menze, B.H., Jakab, A., Bauer, S., Kalpathy-Cramer, J., Farahani, K., Kirby, J., Burren, Y., Porz, N., Slotboom, J., Wiest, R., et al.: The multimodal brain tumor image segmentation benchmark (brats). IEEE transactions on medical imaging 34(10), 1993{2024 (2014).

Myronenko, A.: 3d mri brain tumor segmentation using autoencoder regularization. In: International MICCAI Brainlesion Workshop. pp. 311{320. Springer (2018).

Rousseeuw, Peter J., and Mia Hubert. "Robust statistics for outlier detection." Wiley Interdisciplinary Reviews: Data Mining and Knowledge Discovery 1, No. 1 (2011): 73-79.

Roy, A.G., Siddiqui, S., Pölsteri, S., Navab, N., Wachinger, C.: Braintorrent: A peer-to-peer environment for decentralized federated learning. arXiv preprint arXiv:1905.06731 (2019).

Sheller, M.J., Reina, G.A., Edwards, B., Martin, J., Bakas, S.: Multi-institutional deep learning modeling without sharing patient data: A feasibility study on brain tumor segmentation. In: International MICCAI Brainlesion Workshop. pp. 92-104. Springer (2018).

Sun, C., Shrivastava, A., Singh, S., Gupta, A.: Revisiting Unreasonable Effectiveness of Data in Deep Learning Era. arXiv:1707. 02968 [cs] (Jul. 2017), http://arxiv.org/abs/1707.02968, arXiv: 1707. 02968.

Vepakomma, Praneeth, Otkrist Gupta, Tristan Swedish, and Ramesh Raskar. "Split learning for health: Distributed deep learning without sharing raw patient data." arXiv preprint arXiv:1812.00564 (2018).

Lu, Yongxi, Abhishek Kumar, Shuangfei Zhai, Yu Cheng, Tara Javidi, and Rogerio Feris. "Fully-adaptive feature sharing in multi-task networks with applications in person attribute classification." In Proceedings of the IEEE Conference on Computer Vision and Pattern Recognition, pp. 5334-5343. 2017.

Baruch et al., "A Little Is Enough: Circumventing Defenses for Distributed Learning," Feb. 16, 2019, 10 pages.

Extended European Search Report dated May 3, 2021, for Application No. 20203083.9, 8 pages.

IEEE, "IEEE Standard 754-2008 (Revision of IEEE Standard 754-1985): IEEE Standard for Floating-Point Arithmetic," Aug. 29, 2008, 70 pages.

Society of Automotive Engineers On-Road Automated Vehicle Standards Committee, "Taxonomy and Definitions for Terms Related to Driving Automation Systems for On-Road Motor Vehicles," Standard No. J3016-201609, Sep. 30, 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

Verma et al., "An Algorithm for Model Fusion for Distributed Learning," Proceedings of SPIE, vol. 10635, May 4, 2018, 8 pages.

Zhao et al., "Shielding Collaborative Learning: Mitigating Poisoning Attacks through Client-Side Detection," Oct. 29, 2019, 11 pages.

Huber, P.J. "Robust Statistics," Springer, 2011, 317 pages.

Office Action for Chinese Application No. 202011205589.0, dated Aug. 31, 2023, 21 pages.

* cited by examiner

PROCESSOR AND SYSTEM TO TRAIN MACHINE LEARNING MODELS BASED ON COMPARING ACCURACY OF MODEL PARAMETERS

BACKGROUND

In federated learning, parameters of machine learning models that are trained by different participating entities, or nodes, may be aggregated to collectively train a machine learning model. Mistakes in data pre-processing, bugs, wrong hyper-parameter choices, deliberate adversarial actions, or other characteristics associated with a node may negatively influence the quality of the collectively trained model. To account for this, rather than simply averaging values of/from the nodes that correspond to the same parameter, a server may perform aggregation using norm-clipped averaging to cap parameter values at a threshold value. In another approach, each node locally computes an update using stochastic gradient descent and a server combines the updates. These approaches may be appropriate when a node exhibits particular types of characteristics which may adversely affect the training of a federated machine learning model.

DETAILED DESCRIPTION

Figure 1A:
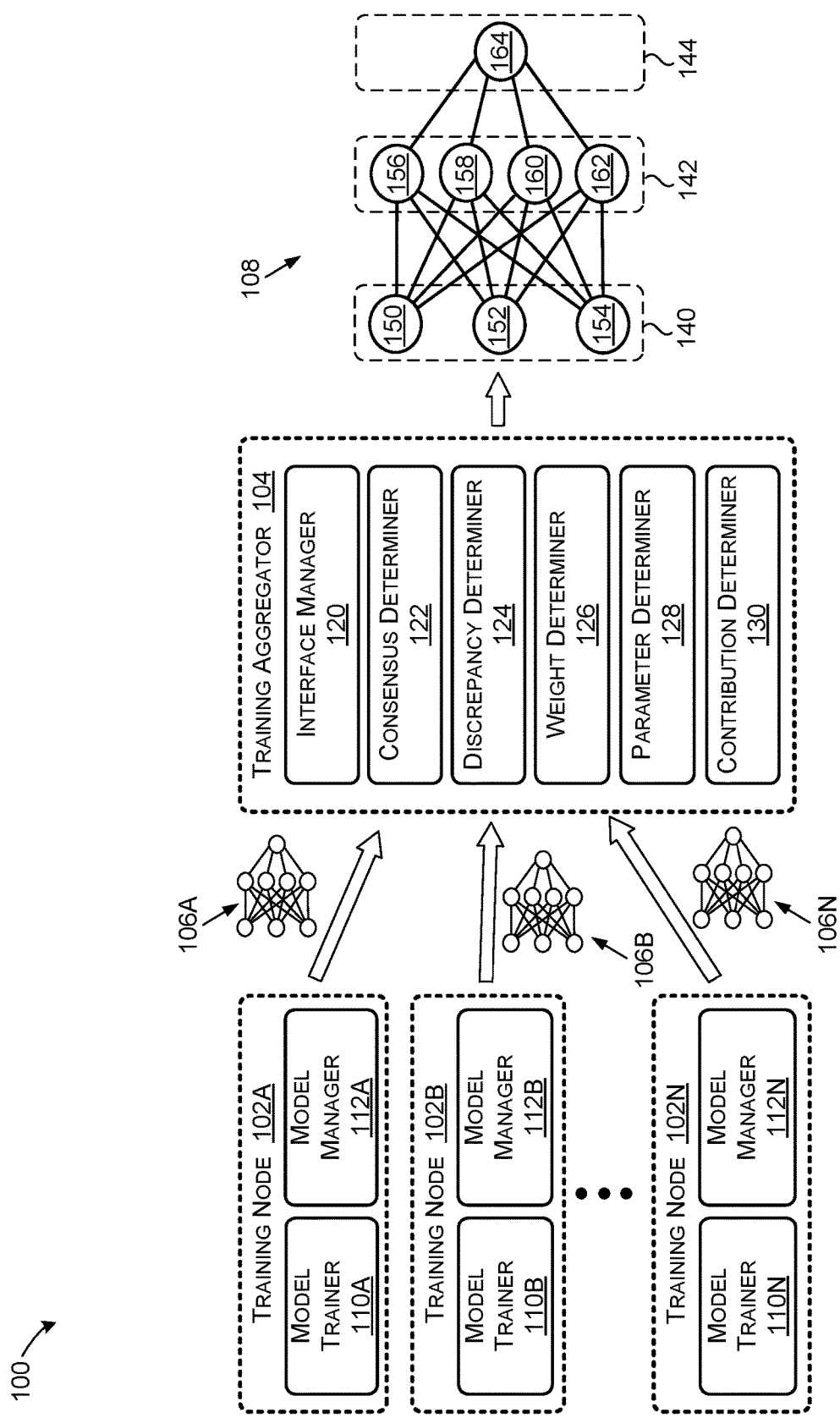
FIG. 1A illustrates a collaborative training environment, in at least one embodiment.

FIG. 1A illustrates collaborative training environment 100, in at least one embodiment. Collaborative training environment 100 may be used to perform inferencing and/or training operations in at least one embodiment.

In at least one embodiment, collaborative training environment 100 may include, without limitation, training nodes 102A and 102B through 102N (also referred to as "training nodes 102") and training aggregator 104. In at least one embodiment, training nodes 102A and 102B through 102N and training aggregator 104 may include hardware, software or some combination thereof. While training nodes 102A and 102B through 102N are shown, in at least one embodiment, collaborative training environment 100 may include two or more training nodes.

In at least one embodiment, training node 102A includes model trainer 110A and model manager 112A, training node 102B includes model trainer 110B and model trainer 112B, and training node 102N includes model trainer 110N and model trainer 112N. Where collaborative training environment 100 includes one or more additional training nodes, each training node may include a model manager and/or a model trainer, which may be similar to or different than model managers and/or model trainers of any of training nodes 102A and 102B through 102N.

In at least one embodiment, training aggregator 104 includes one or more of interface manager 120, consensus determiner 122, discrepancy determiner 124, weight determiner 126, parameter determiner 128, and contribution determiner 130.

In at least one embodiment, training nodes 102 and training aggregator 104 may be used to collaboratively train Machine Learning Model (MLM) 108. In particular, MLM(s) 108 may include one or more learned parameters (e.g., weights and/or biases). Values of one or more parameters of one or more of machine learning models 108 and/or portions thereof may be learned by leveraging training performed, at least in part, by model trainer 110A, model trainer 110B, and model trainer 110N (also referred to as "model trainers 110") of training nodes 102.

In at least one embodiment, training node 102A may use model trainer 110A and model manager 112A to train machine learning model(s) 106A, training node 102B may use model trainer 110B and model manager 112B to train machine learning model(s) 106B, and training node 102N may use model trainer 110N and model manager 112N to train machine learning model(s) 106N. By training machine learning model(s) 106A, 106B, and 106C (also referred to as machine learning models 106), training nodes 102 may learn values of one or more parameters of machine learning models 106, which may in turn be used by training aggregator 104 to determine a value(s) of one or more corresponding parameters of machine learning model(s) 108. To do so, training aggregator 104 may employ one or more of interface manager 120, consensus determiner 122, discrepancy determiner 124, weight determiner 126, parameter determiner 128, and contribution determiner 130.

In at least one embodiment, machine learning model(s) 108 includes a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In FIG. 1A, an example of machine learning model(s) 108 and machine learning models 106 including a neural network is shown, which may include a layer(s) 140, a layer(s) 142, and a layer(s) 144. In at least one embodiment, layer 140 includes an input layer(s), layer 142 includes a hidden layer(s), and layer 144 includes an output layer(s). One or more layers may include a convolutional layer, a rectified linear unit (ReLU) layer, a pooling layer, a fully connected layer, a normalization layer, a SoftMax layer, and/or other layer types.

Each layer of layers of machine learning models 108 and 106 may include one or more nodes, or neurons, examples of which include nodes 150, 152, and 154 of layer 140, nodes 156, 158, 160, and 162 of layer 142, and node 164 of layer 144. In at least one embodiment, machine learning model(s) include a deep neural network, such as a deep convolutional neural network.

In at least one embodiment, collaborative training environment 100 may be implemented as a federated inference and/or learning platform. In at least one embodiment, machine learning model(s) 108 may include a federated machine learning model collaboratively trained using training nodes 102 and machine learning models 106. In at least one embodiment, machine learning model(s) 108 may include a central model and each machine learning model 106 may include a local model used to train a central model of machine learning model(s) 108.

In at least one embodiment, interface manager 120 of training aggregator 104 may receive information from and/or provide information to training nodes 102, such as to facilitate collaborative training of machine learning model(s) 108. An example of such information includes values of parameters of machine learning models 106 (e.g., values of all parameters or a subset of parameters), as indicated in FIG. 1A. Consensus determiner 122 may analyze data regarding one or more parameters from training nodes 102 (e.g., received by interface manager 120) to determine a consensus between training nodes 102 (e.g., one or more consensus values for values of one or more parameters). Discrepancy determiner 124 may analyze data regarding one or more parameters from training node 102A, 102B, and/or 102N to determine a corresponding amount of discrepancy (e.g., individually for each training node 102) with a consensus between training nodes 102 (e.g., determined by consensus determiner 122). Weight determiner 126 may determine one or more weights for one or more values for one or more parameters from training node 102A, 102B, and/or 102N based at least in part on a corresponding amount of discrepancy with a consensus between training nodes 102 (e.g., determined by discrepancy determiner 124). Parameter determiner 128 may determine one or more values of one or more parameters of machine learning model(s) 108 by aggregating one or more values of one or more corresponding parameters from one or more of training nodes 102 using one or more corresponding weights determined by weight determiner 126. Interface manager 120 may provide data corresponding to aggregated values of parameters of machine learning model(s) 108 (e.g., determiner by parameter determiner 128) to training nodes 102.

Model manager 112A, model manager 112B, and model manager 112N (also referred to as "model managers 112") may use data corresponding to aggregated values of parameters to update values of corresponding parameters in machine learning model(s) 106. In at least one embodiment, this include replacing a machine learning models 106 with machine learning model(s) 108.

In at least one embodiment, in addition to or instead of weighting values in aggregating values for parameters of machine learning model(s) 108, contribution determiner 130 may be used to determine amounts of contributions of individual training nodes 102 to training machine learning model(s) 108 based on weights determined by weight determiner 126. In at least one embodiment, training aggregator 104 may use amounts of contributions to reward corresponding training nodes 102 for collaborative training, ban corresponding training nodes 102 from collaborative training (e.g., from one or more future and/or subsequent iterations of collaborative training), determine weights (e.g., using weight determiner 126) for one or more subsequent iterations of collaboratively training machine learning model(s) 108, and/or perform other actions.

In at least one embodiment, machine learning model(s) 108 is collaboratively training over multiple iterations. In at least one embodiment, each iteration may include each training node 102 individually training a corresponding machine learning model(s) 106 using a corresponding model trainer 110 to determine respective sets of values of parameters of machine learning models 106. In at least one embodiment, at an outset of one or more iterations, each of machine learning models 106 may include or be a same machine learning model with a same set of values for parameters, which may diverge through individual training using a model trainer 110. In at least one embodiment, each iteration may include training performed by each model trainer 110 occurring for a predetermined period of time, such as a training epoch, which may be a same or different training epoch used by different model trainers 110. In at least one embodiment, each iteration may include after a predetermined period of time, machine learning models 106 and/or portions thereof being provided to interface manager 120 of training aggregator 104 by a corresponding model manager 112.

In at least one embodiment, one or more iterations may include training aggregator 104 aggregated one or more received machine learning models 106 and/or portions thereof and determining corresponding parameters of machine learning model(s) 108 using parameter determiner 128. In at least one embodiment, one or more iterations may include interface manager 120 of training aggregator 104 then distributing machine learning models(s) 108 and/or portions thereof to one or more of training nodes 102. In at least one embodiment, one or more iterations may include one or more of model managers 112 using a received machine learning model(s) 108 and/or portion thereof as a replacement to a corresponding machine learning model 106 and/or a portions thereof. In at least one embodiment, one or more iterations may include one or more of model trainers 110 further training one or more of machine learning models 106 using a replacement to a corresponding machine learning model 106 and/or a portions thereof.

Figure 2A:
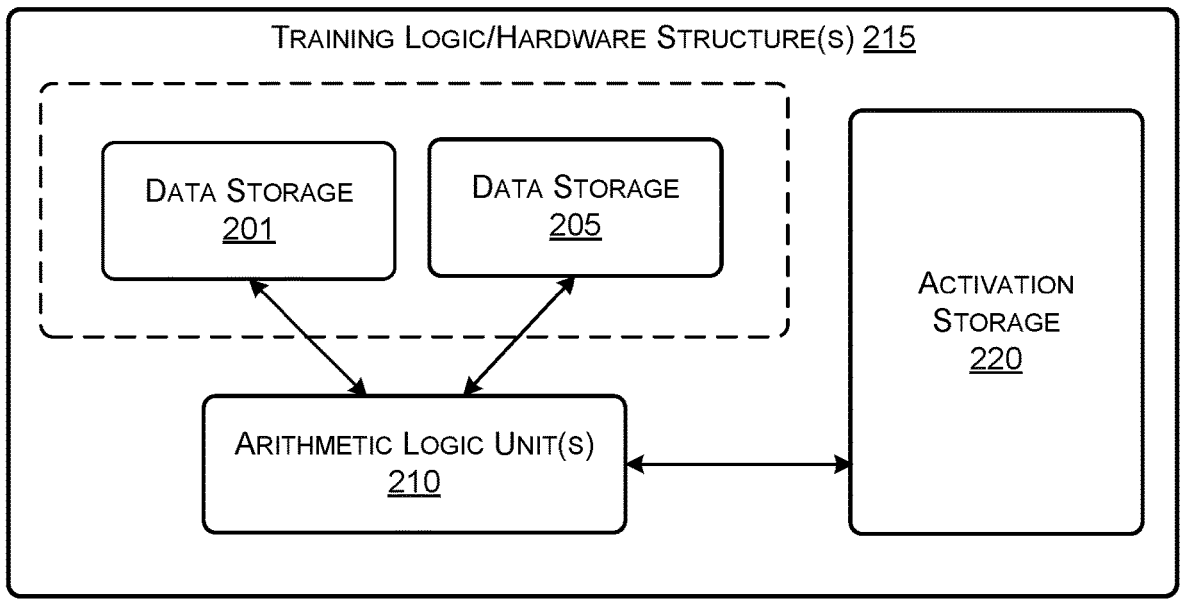
FIG. 2A illustrates inference and/or training logic, in at least one embodiment.

In at least one embodiment, model trainers 110 perform inference and/or training using inference and/or training logic 215 of FIGS. 2A and/or 2B. For example, each model trainer 110 may use a respective implementation of inference and/or training logic 215. In at least one embodiment, inference and/or training logic 215 is at least partially different amongst one or more of training nodes 102. In at least one embodiment, inference and/or training logic 215 is at least partially identical amongst one or more of training nodes 102. In at least one embodiment, a machine learning model referenced with respect to inference and/or training logic 215 corresponds to a respective one of machine learning models 106.

Figure 3:
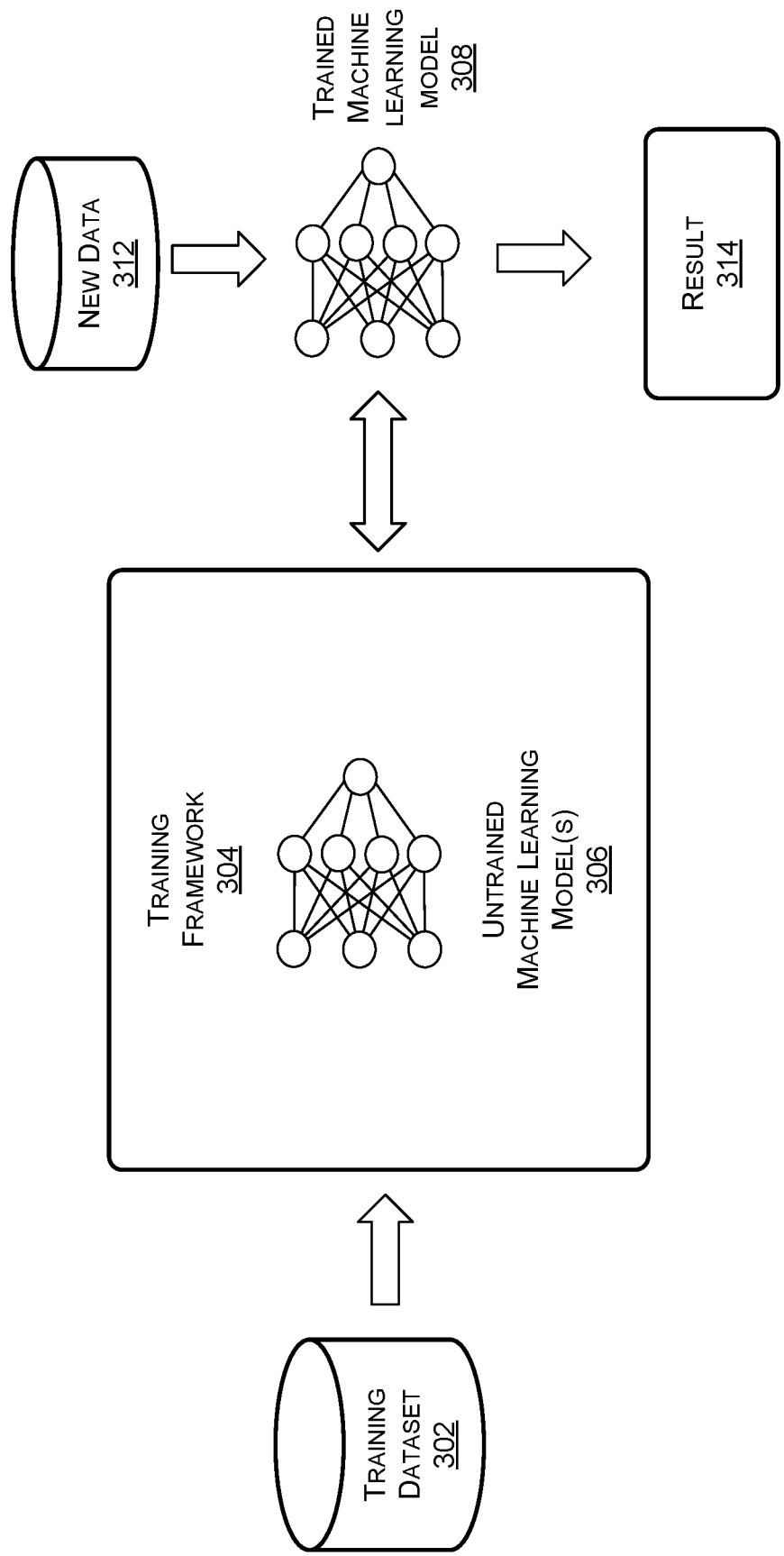
FIG. 3 illustrates training and deployment of a machine learning model, in at least one embodiment.

In at least one embodiment, each model trainer 110 is implemented using training framework 304 of FIG. 3, which may be a same training framework 304 or a different training framework 304 for each model trainer 110. In at least one embodiment, a training framework 304 is implemented at least partially on one or more of training aggregator 104 and/or training nodes 102. In at least one embodiment, in one or more iterations of training machine learning model(s) 108, each machine learning model 106 corresponds to a respective untrained machine learning model 306.

In at least one embodiment, training framework 304 may correspond a federated learning framework. In at least one embodiment, machine learning model 306 of each training node 102 is partially trained by a respective training framework 304, then aggregated with others of machine learning model 306 using training aggregator 104 to result in machine learning model(s) 108. Each machine learning model 306 may be replaced with a current state of machine learning model(s) 108 by a model manager 112. This process may repeat until machine learning model(s) 108 and/or machine learning models 106 correspond to trained machine learning model 308 of FIG. 3.

In at least one embodiment, one or more model trainers 110 uses a same training dataset 302 to train a respective untrained machine learning model 306. In at least one embodiment, one or more model trainers 110 uses a different training dataset 302 to train a respective untrained machine learning model 306. In at least one embodiment, at least one training dataset 302 comprises data generated on-site at a facility that hosts a corresponding training node 102. In at least one embodiment, training dataset 302 or data representatives or training dataset 302 or a portion thereof, does not reach training aggregator 104 and/or one or more servers hosting training aggregator 104 (e.g., aggregation server(s) 504 of FIG. 5).

In at least one embodiment, each training dataset 302 includes (for example, medical and/or imaging) data, generated by an imaging device(s) (e.g., MRI, CT scan, X-Ray, Ultrasound, etc.), a sequencing device(s), a radiology device(s), a genomics device(s), and/or other device types (e.g., on-site with a corresponding training node 102). In at least one embodiment, each training dataset 302 may include radiography, magnetic resonance imaging (MRI), nuclear medicine, ultrasound, sonography, elastography, photoacoustic imaging, tomography, echocardiography, functional near-infrared spectroscopy, and magnetic particle imaging data, or a combination of any of these types of data.

Inference and Training Logic

FIG. 2A illustrates inference and/or training logic 215, in at least one embodiment. Details regarding inference and/or training logic 215 are provided in conjunction with FIGS. 2A and/or 2B.

In at least one embodiment, inference and/or training logic 215 may include, or be coupled to code and/or data storage 201 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network and/or other machine learning model to which code corresponds. In at least one embodiment code and/or data storage 201 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 201 may be included with other on-chip or off-chip data storage, including a processor's L1, L2, or L3 cache or system memory.

In at least one embodiment, any portion of code and/or data storage 201 may be internal or external to one or more processors or other hardware logic devices or circuits. In at least one embodiment, code and/or code and/or data storage 201 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 201 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network and/or other machine learning model, or some combination of these factors.

In at least one embodiment, inference and/or training logic 215 may include, without limitation, code and/or data storage 205 to store backward and/or output weight and/or input/output data corresponding to neurons or layers of a neural network trained and/or used for inferencing in aspects of one or more embodiments. In at least one embodiment, code and/or data storage 205 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 215 may include, or be coupled to code and/or data storage 205 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network and/or other machine learning model to which code corresponds. In at least one embodiment, any portion of code and/or data storage 205 may be included with other on-chip or off-chip data storage, including a processor's L1, L2, or L3 cache or system memory. In at least one embodiment, any portion of code and/or data storage 205 may be internal or external to on one or more processors or other hardware logic devices or circuits. In at least one embodiment, code and/or data storage 205 may be cache memory, DRAM, SRAM, non-volatile memory (e.g., Flash memory), or other storage. In at least one embodiment, choice of whether code and/or data storage 205 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network and/or other machine learning model, or some combination of these factors.

In at least one embodiment, code and/or data storage 201 and code and/or data storage 205 may be separate storage structures. In at least one embodiment, code and/or data storage 201 and code and/or data storage 205 may be a same storage structure. In at least one embodiment, code and/or data storage 201 and code and/or data storage 205 may be partially a same storage structure and partially separate storage structures. In at least one embodiment, any portion of code and/or data storage 201 and code and/or data storage 205 may be included with other on-chip or off-chip data storage, including a processor's L1, L2, or L3 cache or system memory.

In at least one embodiment, inference and/or training logic 215 may include, without limitation, one or more arithmetic logic unit(s) ("ALU(s)") 210, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 220 that are functions of input/output and/or weight parameter data stored in code and/or data storage 201 and/or code and/or data storage 205. In at least one embodiment, activations stored in activation storage 220 are generated according to linear algebraic and or matrix-based mathematics performed by ALU(s) 210 in response to performing instructions or other code, wherein weight values stored in code and/or data storage 205 and/or data storage 201 are used as operands along with other values, such as bias values, gradient information, momentum values, or other parameters or hyperparameters, any or all of which may be stored in code and/or data storage 205 or code and/or data storage 201 or another storage on or off-chip.

In at least one embodiment, ALU(s) 210 are included within one or more processors or other hardware logic devices or circuits, whereas in another embodiment, ALU(s) 210 may be external to a processor or other hardware logic device or circuit that uses them (e.g., a co-processor). In at least one embodiment, ALUs 210 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 201, code and/or data storage 205, and activation storage 220 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 220 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 220 may be cache memory, DRAM, SRAM, non-volatile memory (e.g., Flash memory), or other storage. In at least one embodiment, activation storage 220 may be completely or partially within or external to one or more processors or other logical circuits. In at least one embodiment, choice of whether activation storage 220 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network and/or other machine learning model, or some combination of these factors. In at least one embodiment, inference and/or training logic 215 illustrated in FIG. 2A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 215 illustrated in FIG. 2A may be used in conjunction with central processing unit ("CPU") hardware, graphics processing unit ("GPU") hardware or other hardware, such as field programmable gate arrays ("FPGAs").

Figure 2B:
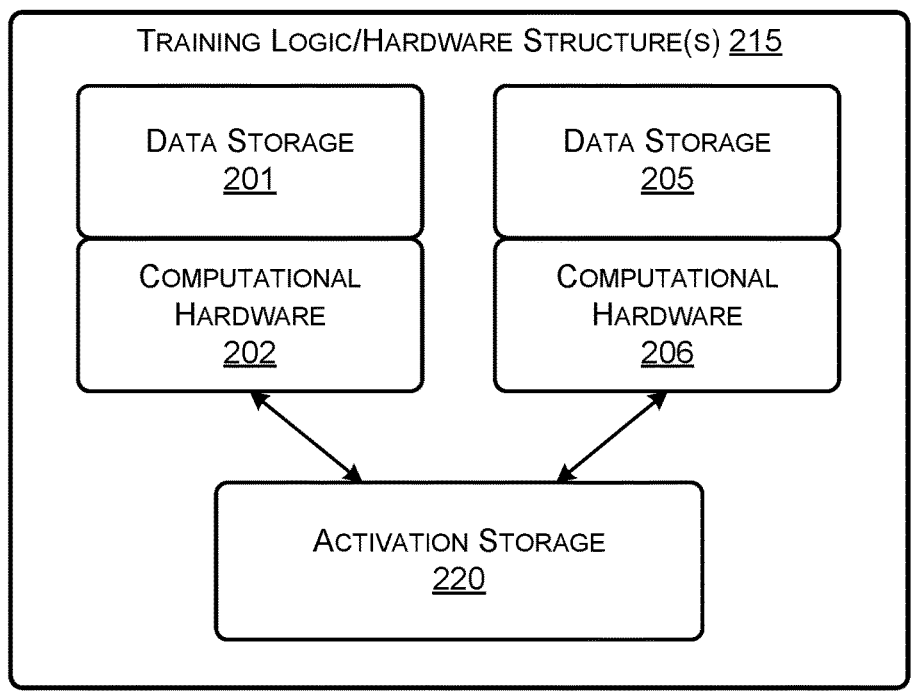
FIG. 2B illustrates inference and/or training logic, in at least one embodiment.

FIG. 2B illustrates inference and/or training logic 215, in at least one embodiment. In at least one embodiment, inference and/or training logic 215 may include, without limitation, hardware logic in which computational resources are dedicated or otherwise exclusively used in conjunction with weight values or other information corresponding to one or more layers of neurons within a neural network. In at least one embodiment, inference and/or training logic 215 illustrated in FIG. 2B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 215 illustrated in FIG. 2B may be used in conjunction with central processing unit (CPU) hardware, graphics processing unit (GPU) hardware or other hardware, such as field programmable gate arrays (FPGAs). In at least one embodiment, inference and/or training logic 215 includes, without limitation, code and/or data storage 201 and code and/or data storage 205, which may be used to store code (e.g., graph code), weight values and/or other information, including bias values, gradient information, momentum values, and/or other parameter or hyperparameter information. In at least one embodiment illustrated in FIG. 2B, each of code and/or data storage 201 and code and/or data storage 205 is associated with a dedicated computational resource, such as computational hardware 202 and computational hardware 206, respectively. In at least one embodiment, each of computational hardware 202 and computational hardware 206 comprises one or more ALUs that perform mathematical functions, such as linear algebraic functions, only on information stored in code and/or data storage 201 and code and/or data storage 205, respectively, result of which is stored in activation storage 220.

In at least one embodiment, each of code and/or data storage 201 and 205 and corresponding computational hardware 202 and 206, respectively, correspond to different layers of a neural network, such that resulting activation from one "storage/computational pair 201/202" of code and/or data storage 201 and computational hardware 202 is provided as an input to next "storage/computational pair 205/206" of code and/or data storage 205 and computational hardware 206, in order to mirror conceptual organization of a neural network. In at least one embodiment, each of storage/computational pairs 201/202 and 205/206 may correspond to more than one neural network layer. In at least one embodiment, additional storage/computation pairs (not shown) subsequent to or in parallel with storage computation pairs 201/202 and 205/206 may be included in inference and/or training logic 215.

Machine Learning Model Training and Deployment

FIG. 3 illustrates training and deployment of a machine learning model (e.g., a deep neural network), in at least one embodiment. In at least one embodiment, untrained machine learning model 306 is trained using a training dataset 302. In at least one embodiment, training framework 304 is a PyTorch framework, whereas in other embodiments, training framework 304 is a Tensorflow, Boost, Caffe, Microsoft Cognitive Toolkit/CNTK, MXNet, Chainer, Keras, Deeplearning4j, or other training framework. In at least one embodiment training framework 304 trains an untrained machine learning model 306 and enables it to be trained using processing resources described herein to generate a trained machine learning model 308. In at least one embodiment, weights may be chosen randomly or by pre-training using a deep belief network. In at least one embodiment, training may be performed in either a supervised, partially supervised, or unsupervised manner.

In at least one embodiment, untrained machine learning model 306 is trained using supervised learning, wherein training dataset 302 includes an input paired with a desired output for an input, or where training dataset 302 includes input having a known output and an output of machine learning model 306 is manually graded. In at least one embodiment, untrained machine learning model 306 is trained in a supervised manner processes inputs from training dataset 302 and compares resulting outputs against a set of expected or desired outputs. In at least one embodiment, errors are then propagated back through untrained machine learning model 306. In at least one embodiment, training framework 304 adjusts weights that control untrained machine learning model 306. In at least one embodiment, training framework 304 includes tools to monitor how well untrained machine learning model 306 is converging towards a model, such as trained machine learning model 308, suitable to generating correct answers, such as in result 314, based on known input data, such as new data 312. In at least one embodiment, training framework 304 trains untrained machine learning model 306 repeatedly while adjust weights to refine an output of untrained machine learning model 306 using a loss function and adjustment algorithm, such as stochastic gradient descent. In at least one embodiment, training framework 304 trains untrained machine learning model 306 until untrained machine learning model 306 achieves a desired accuracy. In at least one embodiment, trained machine learning model 308 can then be deployed to implement any number of machine learning operations.

In at least one embodiment, untrained machine learning model 306 is trained using unsupervised learning, wherein untrained machine learning model 306 attempts to train itself using unlabeled data. In at least one embodiment, unsupervised learning training dataset 302 will include input data without any associated output data or "ground truth" data. In at least one embodiment, untrained machine learning model 306 can learn groupings within training dataset 302 and can determine how individual inputs are related to training dataset 302. In at least one embodiment, unsupervised training can be used to generate a self-organizing map, which is a type of trained machine learning model 308 capable of performing operations useful in reducing dimensionality of new data 312. In at least one embodiment, unsupervised training can also be used to perform anomaly detection, which allows identification of data points in a new dataset 312 that deviate from normal patterns of new dataset 312.

In at least one embodiment, semi-supervised learning may be used, which is a technique in which in training dataset 302 includes a mix of labeled and unlabeled data. In at least one embodiment, training framework 304 may be used to perform incremental learning, such as through transferred learning techniques. In at least one embodiment, incremental learning enables trained machine learning model 308 to adapt to new data 312 without forgetting knowledge instilled within during initial training.

In at least one embodiment, one or more iterations of collaboratively training machine learning model(s) 108 includes consensus determiner 122 analyzing data corresponding to one or more parameters of machine learning models 106 from training nodes 102 (e.g., received by interface manager 120) to determine a consensus between one or more of training nodes 102. In at least one embodiment, data corresponding to one or more parameters of machine learning models 106 is representative of values of one or more parameters of machine learning models 106, updates to one or more parameters for machine learning model(s) 108, and/or contributions of training nodes 102 to one or more parameters for machine learning model(s) 108.

For example, consensus determiner 122 may compute a consensus as one or more consensus values representative of a consensus on one or more values for one or more parameters from machine learning models 106. In at least one embodiment, consensus determiner 122 determines a consensus on values for one or more parameters using an algorithm that is robust to outliers, which may include using a robust statistic, such as a median of values of one or more parameters.

In at least one embodiment, a consensus value may correspond to a consensus on values for multiple parameters. In such examples, computing a consensus for more than one parameter may include consensus determiner 122 aggregating or combining values, updates, and/or contributions of parameters for each training node 102. To aggregate or combine values, consensus determiner 122 may perform a vector based analysis on values from training nodes 102. As an example, aggregating or combining values for a training node 102 may include performing a Euclidian distance and/or cosine distance between values of parameters. As a result, consensus determiner 122 may compute a scalar value for each training node 102, and compute, using each scalar value a consensus value.

In at least one embodiment, a consensus value may correspond to a statistical value computed by consensus determiner 122 and representative of a consensus on values of at least one parameter of machine learning models 106. In at least one embodiment, a statistical value may be computed by consensus determiner 122 from values of one or more parameters of one or more of machine learning models 106 (e.g., from scalar values aggregated from training nodes 102). For example, a statistical value may correspond to a median value of values of one or more parameters from machine learning models 106. Other examples of a statistical value include a mean, a rounded mode, or a centroid of a cluster of values of one or more parameters (e.g., by determining a cluster using a one class clustering algorithm).

In at least one embodiment, consensus determiner 122 determines a consensus between for all parameters of machine learning models 106 and/or machine learning model(s) 108. For example, consensus determiner 122 may compute a consensus value (e.g., a scalar value) from aggregated values of corresponding parameters from each training node, then computing a consensus value therefrom.

In at least one embodiment, consensus determiner 122 determines a consensus for a subset of parameters of machine learning models 106 and/or machine learning model(s) 108. For example, consensus determiner 122 may compute a consensus value (e.g., a scalar value) from aggregated values of a corresponding set of parameters from each training node, then computing a consensus value therefrom.

A subset of parameters may correspond to one or more portions of machine learning models 106 and/or machine learning model(s) 108. In at least one embodiment, machine learning models 106 and machine learning model(s) 108 include a neural network and a subset of parameters correspond to one or more neural network portions, such as one or more nodes, layers, layer types, node types, a combination thereof, and/or other division of a neural network. As an example, a subset of parameters may correspond to parameters of one or more of nodes 150, 152, 154, 156, 158, 160, 162, and/or 164. Where a subset of parameters corresponds to layer 140, a subset of parameters may include parameters of nodes 150, 152, and 154. In at least one embodiment, consensus determiner 122 determines a layer-wise consensus on parameters of machine learning models 106. A layer-wise consensus may correspond to one or more layers of machine learning models 106.

In at least one embodiment, consensus determiner 122 determines a consensuses for multiple different sets of parameters of machine learning models 106 and/or machine learning model(s) 108 (each set of parameters may correspond to one or more parameters). For example, consensus determiner 122 may compute a consensus value corresponding to layer 140 and another consensus value corresponding to layer 142. In at least one embodiment, consensus determiner 122 respectively computes a consensus value (e.g., a scalar value) for each set of parameters.

In at least one embodiment, consensus determiner 122 partitions machine learning models 106 into sets of parameters based on one or more factors. An example of a factor may include one or more output classes of machine learning models 106 where machine learning models 106 include a classifier. For example, consensus determiner 122 may group portions of machine learning models 106 (e.g., neurons or nodes) into a set of parameters based on being activated to produce an output(s) corresponding to one or more particular output classes. Where output classes include an animal type, portions activated when outputting a dog may be grouped into one set of parameters, and portions activated when outputting a cat may be grouped into another set of parameters. In addition or instead, in at least one embodiment, sets of parameters may represent different semantic groupings of parameters of machine learning models 106. In at least one embodiment, portions of machine learning models 106 may be grouped into sets using unsupervised grouping or clustering of model portions (e.g., based on neuron activations).

In at least one embodiment, discrepancy determiner 124 may analyze data regarding one or more parameters from training node 102A, 102B, and/or 102N to determine a corresponding amount of discrepancy (e.g., for each training node 102) with a consensus between training nodes 102 (e.g., determined by consensus determiner 122). For example, for each training node 102, discrepancy determiner 124 may compute a discrepancy value representative of an amount of discrepancy between updates, contributions and/or values for one or more parameters from a training node 102 and corresponding consensus from training nodes 102 (e.g., computed by consensus determiner 122).

In at least one embodiment, consensus determiner 122 computes a consensus d using equation (1):

$$\tilde{d} = \text{Median}(\|p_i - \tilde{p}\|_2) \quad (1)$$

computed across i=$p_1, \ldots, p_N$, for N training nodes 102, where $p_i$ represents a vector of parameter values for training node i (e.g., all parameters of a machine learning model 106 or a subset thereof), and $\tilde{p}$ represents aggregated or combined parameter values from training node N, such as a median parameter value of $p_i$. Equation (1) may be used where a consensus is computed for a set of parameters with respect to training nodes 102.

In at least one embodiment, discrepancy determiner 124 computes an amount of discrepancy based at least in part on a distance between at least one value of at least one parameter from a training node 102 and a corresponding consensus value (e.g., a statistical value). For example, a discrepancy value representative of an amount of discrepancy may be computed as a distance between at least one value corresponding to at least one parameter from a training node 102 and a corresponding consensus value.

In at least one embodiment, an amount of discrepancy between a contribution, update, and/or value of at least one parameter and consensus may be based at least in part on an amount of dispersion in contributions, updates, and/or values amongst training nodes 102. In at least one embodiment, discrepancy determiner 124 computes an amount of dispersion using an estimator (e.g., a statistical estimator) of scale of discrepancies between updates, values, and/or parameters from training nodes 102. In at least one embodiment, an estimator computes an estimate of statistical dispersion in contributions, updates, and/or values amongst training nodes 102. In at least one embodiment, discrepancy determiner 124 uses a robust estimator to compute an amount of dispersion in contributions, updates, and/or values amongst training nodes 102.

In at least one embodiment, discrepancy determiner 124 computes an amount of dispersion as a measure of statistical dispersion in contributions, updates, and/or values amongst training nodes 102 from corresponding values from training nodes (e.g., from aggregated or combined parameter values where multiple parameters are considered). Examples of a measure of statistical dispersion which may be computed by discrepancy determiner 124 include a Median Absolute Deviation (MAD), a standard deviation, an interquartile range, a mean absolute difference, a biweight midvariance, an average absolute deviation, a distance standard deviation, or combination thereof.

In at least one embodiment, discrepancy determiner 124 computes a measure of statistical dispersion $\tilde{d}^{MAD}$ using equation (2):

$$\tilde{d}^{MAD} = \text{Mean}(\|p_i - \tilde{p}\|_{2-d}) \qquad (2)$$

computed across i=$p_1, \ldots, p_N$, for N training nodes 102. Equation (1) may be used where a statistical dispersion is computed for a set of parameters with respect to training nodes 102. In at least one embodiment, equation (1) may be used in with equation (1).

In at least one embodiment, discrepancy determiner 124 computes an amount of discrepancy $r_i$ using equation (3):

$$r_i = \frac{p_i - \tilde{d}}{a * \tilde{d}^{MAD}} \qquad (3)$$

computed across i=$p_1, \ldots, p_N$, for N training nodes 102, where a may be used to make $\tilde{d}^{MAD}$ (or a different estimator which may be used in its place) an asymptotically correct estimator for an estimation of standard deviation of parameter value discrepancies.

In at least one embodiment, weight determiner 126 computes weights for values, updates, and/or contributions from a training node 102 based at least in part on an amount of discrepancy on a consensus between training nodes 102. In at least one embodiment, a weight use for one or more values, updates, and/or contributions from a training node 102 may be a function (e.g., proportional to) of an amount of discrepancy on a consensus between training nodes 102.

In at least one embodiment, training nodes 102 having a larger amount of discrepancy (e.g., a greater distance from a consensus value) are more likely to be outliers than those having a smaller amount of discrepancy. In at least one embodiment, an outlier may indicate mistakes in data pre-processing, bugs, wrong hyper-parameter choices, deliberate adversarial actions, or other characteristics associated with a training node 102, which may negatively influence collaborative training of machine learning model(s) 108.

In at least one embodiment, weight determiner 126 computes at least one weight value for each training node 102. In at least one embodiment, weight determiner 126 maps a value(s) corresponding to one or more parameters from a training node 102 to a weight value using a model, such as a function and/or a machine learning model(s). In at least one embodiment, a value(s) corresponding to one or more parameters from a training node 102 is representative of an amount of discrepancy between a training node 102 (e.g., computed by discrepancy determiner 124) and a consensus of training nodes 102 (e.g., computed by consensus determiner 122).

In at least one embodiment, a value(s) corresponding to one or more parameters from a training node 102 is mapped to a weight value using a model (e.g., a function). For example, a value(s) representative of an amount of discrepancy between a training node 102 and a consensus of training nodes 102 may be used as a variable(s) of a function that outputs a weight value. Weight determiner 126 may use a same function to map values for each training node 102 to a corresponding weight node.

In at least one embodiment, weight determiner 126 uses discrepancy determiner 124 to fit (e.g., scale) values corresponding to one or more parameters from training nodes 102 to a model (e.g., a function) used compute weight values. In at least one embodiment, an estimator, such as a robust estimator (e.g., $\tilde{d}^{MAD}$) described with respect to discrepancy determiner 124 is used to fit values to a model (e.g., a function) used compute weight values. For example, equation (3) may compute $r_i$, such that $r_i$ for each training node 102 is fit to a model (e.g., a function) used compute weight values. In at least one embodiment, values corresponding to one or more parameters from training nodes 102 may in addition or instead be fit to a model (e.g., a function) used compute weight values using Random Sample Consensus (RANSAC).

Figure 1B:
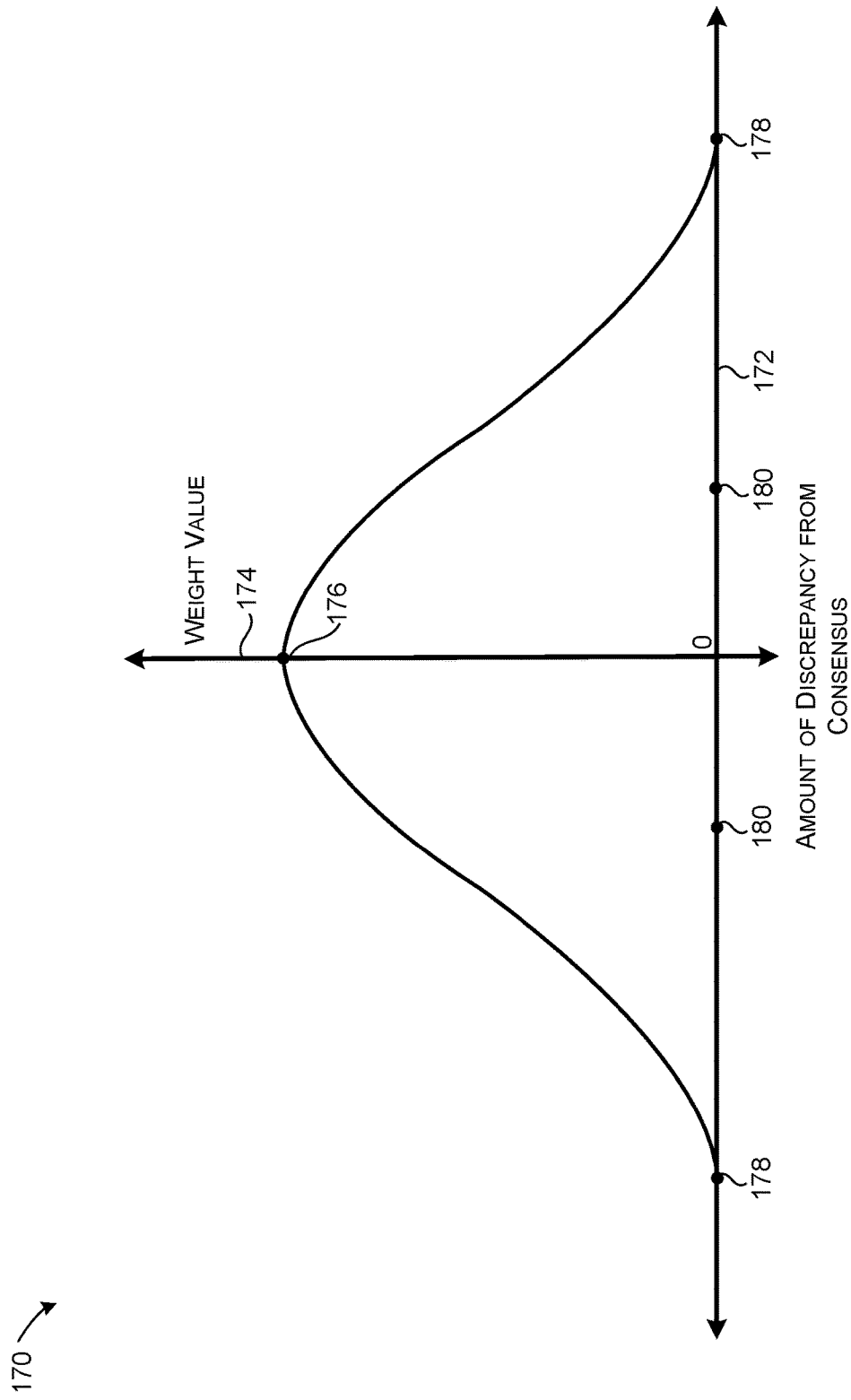
FIG. 1B illustrates a diagram of a model, in at least one embodiment.

In at least one embodiment, a model used by weight determiner 126 to compute weight values may decrease to a saturation point as an amount of discrepancy between a training node 102 and a consensus of training nodes 102 increases. FIG. 1B illustrates a diagram of a model 170, in at least one embodiment. Model 170 may be used by weight determiner 126 to compute weight values for parameter values, contributions, and/or updates from training nodes 102. In FIG. 1B, axis 172 may represent an amount of discrepancy from a consensus (e.g., computed by discrepancy determiner 124) and axis 174 may represent a weight value for a training node 102. Model 170 may decrease (e.g., linearly or quadratically) from maximum value 176 to saturation points 178 as an amount of discrepancy between a training node 102 and a consensus of training nodes 102 increases.

In at least one embodiment, model 170 corresponds to a biweight function, an absolute error function, a squared error function, or a winsorizing function. In at least one embodiment, model 170 corresponds to a Huber loss function or a Tukey biweight function. In at least one embodiment, model 170 corresponds to equation (4), which is an example of a Tukey biweight function:

$$\hat{w}(r_i) = \begin{cases} \frac{c^2}{b}\left[1 - \left(\frac{r_i}{c}\right)^2\right]^3, & -c > r_i < c \\ 0, & \text{elsewhere} \end{cases} \quad (4)$$

where weight values may be computed across $i = p_1, \ldots, p_N$, for N training nodes 102, and b controls maximum value 176, and c controls saturation points 178.

In at least one embodiment, weight determiner 126 may determine and normalize weight values for training nodes 102 for one or more parameters of machine learning models 106 and/or machine learning model(s) 108 (e.g., a set of parameters or all parameters). In at least one embodiment, normalizing weight values may produce normalized weight values summing up to one. Parameter determiner 128 and/or contribution determiner 130 may operate using normalized weight values for training nodes 102.

In at least one embodiment, weight determiner 126 may determine a set of weight values for training nodes 102 (e.g., including a weight value for each training node 102) for any number of sets of parameters of machine learning models 106. For example, a different set of weight values may be computed for each set of parameters. In at least one embodiment, a set of weight values for a set of parameters may be computed respectively using equations (1)-(4) with $p_i$ representing parameters of a set.

In at least one embodiment, parameter determiner 128 may determine one or more values of one or more parameters of machine learning model(s) 108 by aggregating one or more values of one or more corresponding parameters from one or more of training nodes 102 using one or more corresponding weights determined by weight determiner 126. In at least one embodiment, parameter determiner 128 aggregates parameter values using a weighted average, where a value(s) of a parameter(s) from a particular training node 102 are weighted by a weight value computed for a corresponding parameter(s) of machine learning model(s) 108. For example, where a set of weight values are computed for a set of parameters, each value of each parameter from a training node 102 may be weighted by a corresponding weight value when aggregating values for corresponding parameters of machine learning model(s) 108 (e.g., an entire layer may share a same weight value applied to parameter values).

In at least one embodiment, parameter determiner 128 may determine one or more values of one or more parameters of machine learning model(s) 108 by aggregating one or more values of one or more corresponding parameters from one or more of training nodes 102 by excluding one or more values of one or more corresponding parameters from one or more of training nodes 102 (in addition to or instead of using weight values for one or more values). For example, parameter determiner 128 may exclude one or more values of one or more corresponding parameters from one or more of training nodes 102 based at least in part on corresponding amounts of discrepancy from consensus (e.g., determined by discrepancy determiner 124). As an example, values corresponding to an amount of discrepancy greater than a threshold value may be excluded. In at least one embodiment, weight determiner 126 may not be included in training aggregator 104 and weight values may not be used to aggregate parameter values from training nodes 102.

In at least one embodiment, parameter determiner 128 updates machine learning model(s) 108 with determined values of parameters. In at least one embodiment, each parameter of machine learning model(s) 108 is updated with a corresponding aggregated parameter value. In least one embodiment, a parameter(s) of one or more portions of machine learning model(s) 108 may not be updated while at a parameter(s) of one or more other portions of machine learning model(s) 108 are updated.

In at least one embodiment, training aggregator 104 may provide one or more portions of machine learning model(s) 108, as updated by parameter determiner 128, to training nodes 102. In at least one embodiment, model managers 112 may update corresponding machine learning models 106 with machine learning model(s) 108 (e.g., by replacing parameter values of a machine learning models 106 with parameter values of machine learning model(s) 108). In at least one embodiment, subsequent collaborative training iterations may individually train updated machine learning models 106, then provide trained updated machine learning models 106 to training aggregator 104 for subsequent aggregation into machine learning model(s) 108.

In at least one embodiment, contribution determiner 130 determines amounts of contributions of training nodes 102 to training machine learning model(s) 108 based on weights determined by weight determiner 126 (e.g., pre-normalized or normalized). In at least one embodiment, contribution determiner 130 may determine amounts of contributions, or contribution scores, of individual training nodes 102 to training machine learning model(s) 108 based on weights determined by weight determiner 126.

In at least one embodiment, contribution determiner 130 may compute contribution scores to favor, at least in part, a training node 102 that is not contributing data for a parameter(s) that is too close to a consensus of training nodes 102. In at least one embodiment, contribution determiner 130 may compute contribution scores to favor, at least in part, a training node 102 that is not contributing data for a parameter(s) that is too far from a consensus of training nodes 102.

In at least one embodiment, contribution determiner 130 may compute a contribution score for a training node 102 such that it increases (e.g., linearly or quadratically) from a maximum weight value of a set of weight values to a maxima point(s) (e.g., local or global) as an amount of consensus between a training node 102 and a consensus of training nodes 102 decreases. In at least one embodiment, a maxima point(s), or a cutoff(s) for contribution scores, may be correspond to one or more standard deviations or percentiles from a maximum value of a model of parameter values from training nodes 102. For example, in FIG. 1B, maxima or cutoff points 180 may be based on a distance from maximum value 174, such as one standard deviation. In at least one embodiment, contribution determiner 130 may compute a contribution score for a training node 102 such that it decreases (e.g., linearly or quadratically) from a maxima point(s) (e.g., to a saturation point(s)) as an amount of consensus between a training node 102 and a consensus of training nodes 102 decreases.

In at least one embodiment, contribution determiner 130 may update contribution scores for training nodes 102 over time. For example, contribution determiner 130 may compute and track contributions scores of training nodes 102 over multiple iterations, such as using an average, running average, or other running contribution score metric. In at least embodiment, contribution determiner 130 may determine a contribution score(s) post hoc, such as by comparing a contribution for one state of machine learning model(s) 108 to one or more future states of machine learning model(s) 108 after additional training. In at least one embodiment, this allows contribution determiner 130 identify meaningful contributions to training that may not be readily identified from a current state of training.

In at least one embodiment, training aggregator 104 may use amounts of contributions, or contribution scores, to reward corresponding training nodes 102 for collaborative training. In at least one embodiment, training aggregator 104 may use amounts of contributions, or contribution scores, to ban corresponding training nodes 102 from collaborative training (e.g., from one or more future and/or subsequent iterations of collaborative training). A ban may be with respect to one or more particular portions of machine learning model(s) 108 and/or machine learning models 106 or machine learning model(s) 108 and/or machine learning models 106 in its entirety. For example, a contribution score for a training node may be computed for a set of parameters of machine learning model(s) 108 and/or machine learning models 106 and used to implement a corresponding limited ban. In at least embodiment, a ban may concurrently not be implemented for one or more other portions of machine learning model(s) 108 and/or machine learning models 106, such as based on a corresponding contribution score(s).

In at least one embodiment, a ban results in values from a training node 102 for a machine learning model 106 not being used in determining a consensus between training nodes 102, in determining an amount of discrepancy of a training node 102 from a consensus of training nodes 102, in determining weight values of training nodes 102, and/or in aggregating parameters of training nodes 102 for machine learning model(s) 108 based on a contribution score(s) associated with a training node 102.

In at least one embodiment, a ban may be permanent or temporary. In at least one embodiment, a ban for a training node 102 is from receiving an updated machine learning model(s) 108 and/or portions thereof. In at least one embodiment, a ban may be based on training aggregator 104 determining a contribution score fails to exceed a threshold value.

In at least one embodiment, training aggregator 104 may use amounts of contributions, or contribution scores, to determine or compute weights (e.g., using weight determiner 126) for one or more subsequent iterations of collaboratively training machine learning model(s) 108, and/or perform other actions. For example, a weight value may be increased for a training node 102 with a higher contribution score and/or decreased for a training node 102 with a lower contribution score. Weight values may be adjusted based on contribution scores with respect to one or more particular portions of machine learning model(s) 108 and/or machine learning models 106 or machine learning model(s) 108 and/or machine learning models 106 in its entirety.

Figure 4:
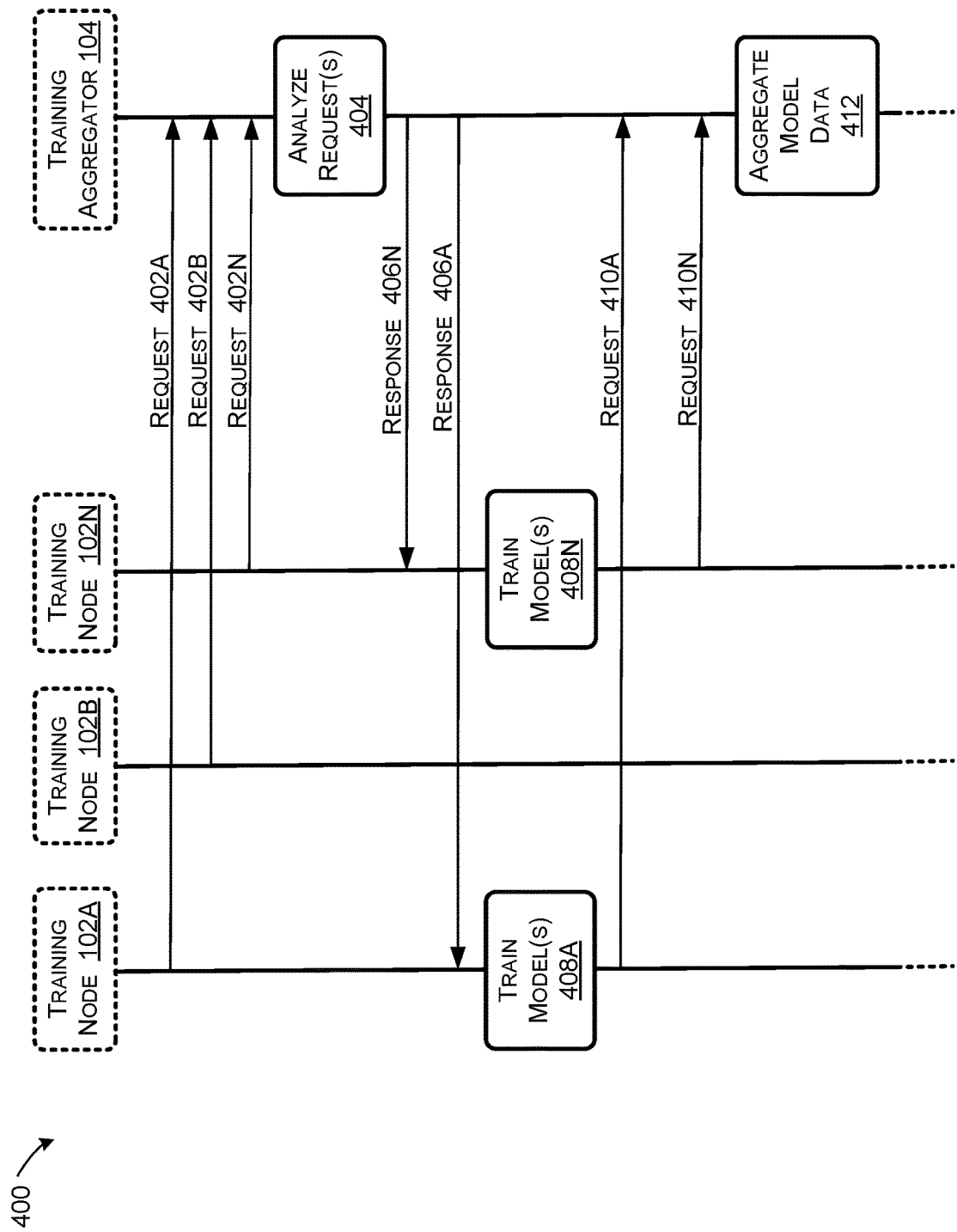
FIG. 4 illustrates a flow diagram for collaborative training, in at least one embodiment.

FIG. 4 illustrates a flow diagram 400 for collaborative training, in at least one embodiment. In at least one embodiment, training nodes 102 may collaboratively train machine learning model(s) 108 according to flow diagram 400. Flow diagram 400 may, for example, be used to implement federated learning of parameter values of machine learning model(s) 108 using training nodes 102.

Training nodes 102 may each transmit data over one or more communications representative of a request to participate in an iteration of collaboratively training machine learning model(s) 108. In at least one embodiment, training node 102A provides request 402A to training aggregator 104, training node 102B provides request 402B to training aggregator 104, and training node 102N provides request 402N to training aggregator 104.

In at least one embodiment, at block 404, interface manager 120 analyzes requests 402A and 402B through 402N (also referred to as "requests 402") from training nodes 102. Analyzing requests 402 may include accepting one or more of requests 402 and/or denying one or more requests 402. In at least one embodiment, accepting and/or denying one or more of requests 402 may be based at least in part on contributions scores determined by contribution determiner 130 and/or weight values determined by weight determiner 126 from one or more previous iterations of collaborative training (e.g., whether a training node 102 is banned, etc.).

In at least one embodiment, analyzing requests 402 includes authenticating one or more of training nodes 102 (e.g., using information in requests 402 such as data representative of a password and/or key) and/or verifying authentication of one or more of training nodes 102. Unauthenticated training nodes 102 may be denied from participation in an iteration of collaborative training.

In at least one embodiment, training aggregator 104 responds to requests 402 of one or more of training nodes 102 over one or more communications based on analyzing requests 402 at block 404. In at least one embodiment, a request may include data representative of one or more portions of machine learning model(s) 108. Responses 406A and 406N (also referred to as "responses 406") are examples of such responses. Each of responses 406 may include a copy of machine learning model(s) 108 and/or data sufficient for a corresponding training node 102 to produce a copy of a current state of machine learning model(s) 108 (e.g., to synchronize machine learning models 106 across participating training nodes 102). In flow diagram 400, request 402B from training node 102B may be denied based on analyzing request 402B at block 404.

In at least one embodiment, when training node 102A receives response 406A, model manager 112A may update machine learning model(s) 106A to correspond to machine learning model(s) 108, then at block 408A train machine learning model 106A using model trainer 110A (e.g., for an epoch). In at least one embodiment, when training node 102N receives response 406N, model manager 112N may update machine learning model(s) 106N to correspond to machine learning model(s) 108, then at block 408N train machine learning model 106N using model trainer 110N (e.g., for an epoch).

In at least one embodiment, after training at block 408A for a period of time, training node 102A may transmit data over one or more communications representative of a request 410A to aggregate parameter values from machine learning model(s) 106A into machine learning model(s) 108. Also after training at block 408N for a period of time, training node 102N may transmit data over one or more communications representative of a request 410N to aggregate parameter values from machine learning model(s) 106N into machine learning model(s) 108.

In at least one embodiment, interface manager 120 of training aggregator 104 may receive requests 410A, 410N, and/or similar requests from other training nodes which may be participating in collaborative training of machine learning model(s) 108. At block 412, consensus determiner 122, discrepancy determiner 124, weight determiner 126, parameter determiner 128, and/or contribution determiner 130 may use information from requests 410A, 410N, and/or similar requests to update machine learning model(s) 108 and/or compute contribution scores for one or more of training nodes 102. In at least one embodiment, flow chart 400 may then be repeated for any number of subsequent iterations of collaboratively training machine learning model(s) 108.

Figure 5:
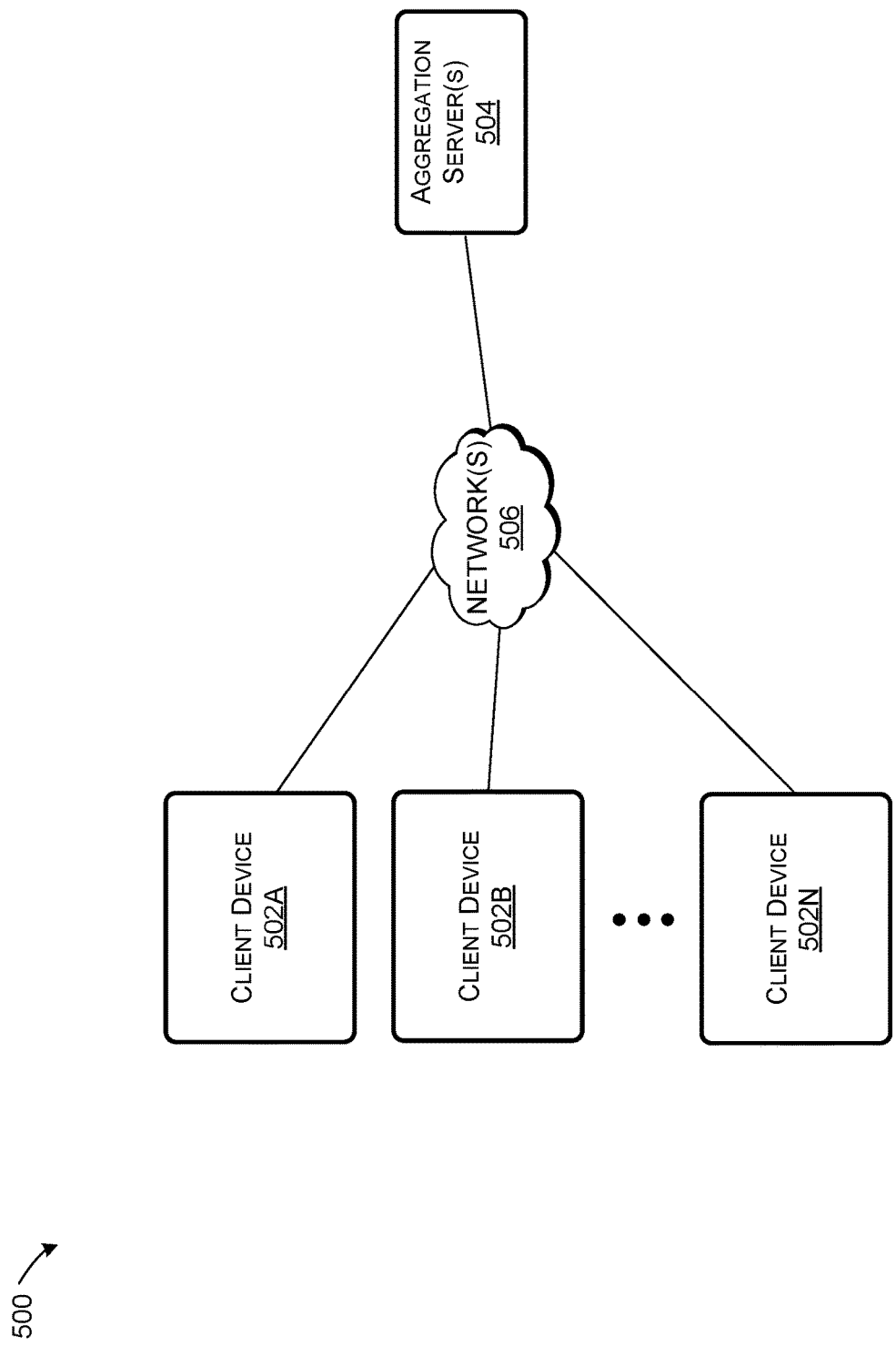
FIG. 5 illustrates a network environment for collaborative training, in at least one embodiment.

FIG. 5 illustrates a network environment 500 for collaborative training, in at least one embodiment. In at least one embodiment, network environment 500 may include one or more client devices 502A and 502B through 502N (also referred to as "client devices 502") and aggregation server(s) 504. In at least one embodiment, each client device 502A may include one or more training nodes 102. For example, client device(s) 502A include training node 102A, client device(s) 502B includes training node 102B, and client device(s) 502N includes training node 102N.

In at least one embodiment, aggregation server(s) 504 include one or more portions of training aggregator 104. In at least one embodiment, one or more portions of training aggregator 104 are distributed at least partially across one or more of client deices 502 and/or one or more other client devices that may or may not include a training node 102. In at least one embodiment, network environment 500 includes a peer-to-peer network environment. In at least one embodiment, aggregation server(s) 504 is not included in network environment 500. In at least one embodiment, includes a client-server network environment. In at least one embodiment, client devices 502 each corresponding to clients, or users, of aggregation server(s) 504.

In at least one embodiment, aggregation server(s) 504 may not in network environment 500 and/or used for one or more aspects of collaborative training. For example, network environment 500 may include a peer-to-peer network used by client devices 502 and training nodes 102 for collaborative learning (e.g., to implement peer-to-peer federated learning). In at least one embodiment, functionality of training aggregator 104 may be distributed across one or more of client devices 502 and/or assigned to one or more of client devices 502. In at least one embodiment, a client device 502 may individually implement all functionality of training aggregator 104. In at least one embodiment, a client device 502 may implement individually or partially implement some functionality of training aggregator 104.

In at least one embodiment, each component shown in FIG. 5 may communicate with each other via network 506, which may include one or more local area networks (LANs) and/or wide area networks (WANs).

In at least one embodiment, one or more client devices 502 correspond to an edge device. In at least one embodiment, each edge device may be of a federated or collaborative learning platform hosted, at least partially, by aggregation server(s) 504.

In at least one embodiment, a client device 502 and/or an edge device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a hospital device, a video player, a handheld communications device, a virtual reality headset, a gaming device or system, an entertainment system, a vehicle computer system, an embedded system controller, a remote control, an appliance, a consumer electronic device, a server, a datacenter, or a workstation. In at least one embodiment, one or more client devices 502 and/or edge devices may be located at different hospitals, medical laboratories, and/or medical research facilities from one another.

Figure 6:
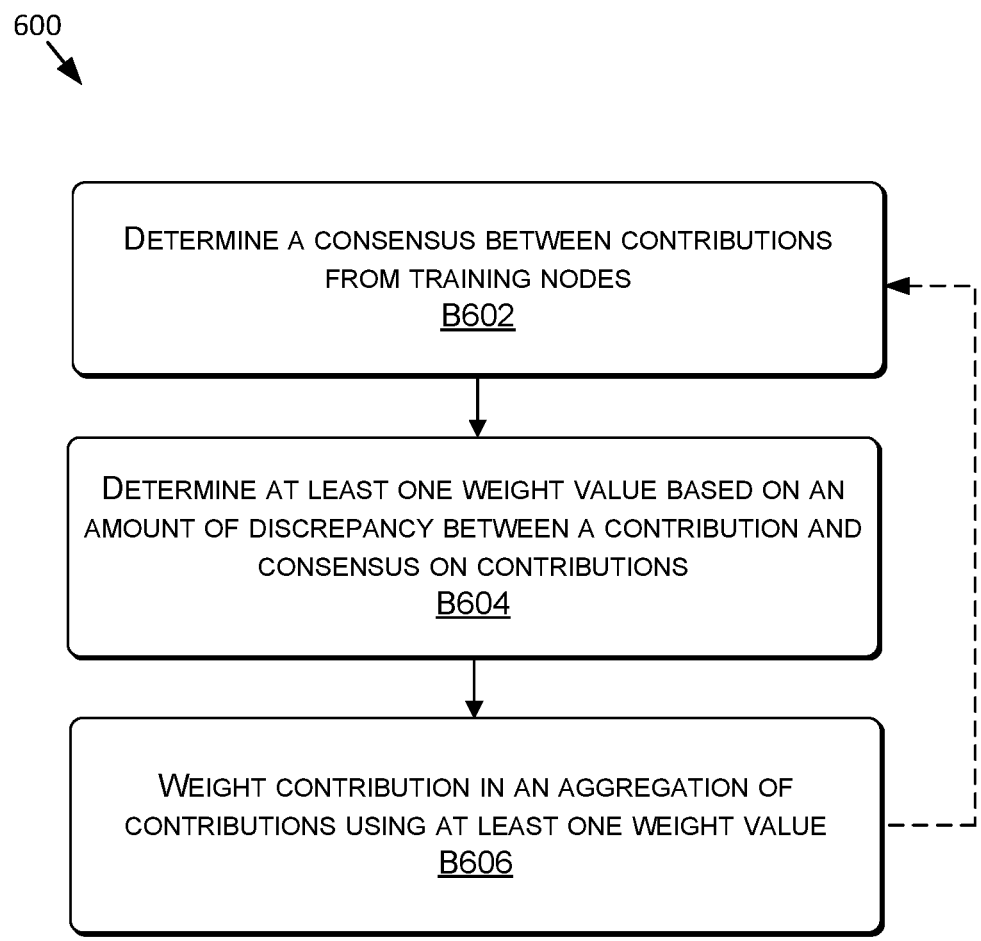
FIG. 6 illustrates a flowchart, in at least one embodiment.

FIG. 6 illustrates a flowchart of a method 600, in at least one embodiment. Method 600, at block B602, includes determining a consensus between contributions from training nodes. In at least one embodiment, consensus determiner 122 may determine a consensus between contributions from training nodes 102.

At block B604, method 600 includes determining at least one weight based on an amount of discrepancy between a contribution and consensus of contributions. In at least one embodiment, weight determiner 126 may determiner at least one weight based on an amount of discrepancy between a contribution from training node 102A and a consensus of contributions from training nodes 102.

At block B606, method 600 includes weighting contribution in an aggregation of contributions using at least one weight value. In at least one embodiment, parameter determiner 128 may weight a contribution from training node 102A in an aggregation of contributions from training nodes 102A using at least one weight value. As indicated in FIG. 6, method 600 may be repeated for any number of iterations of collaborative training.

Figure 7:
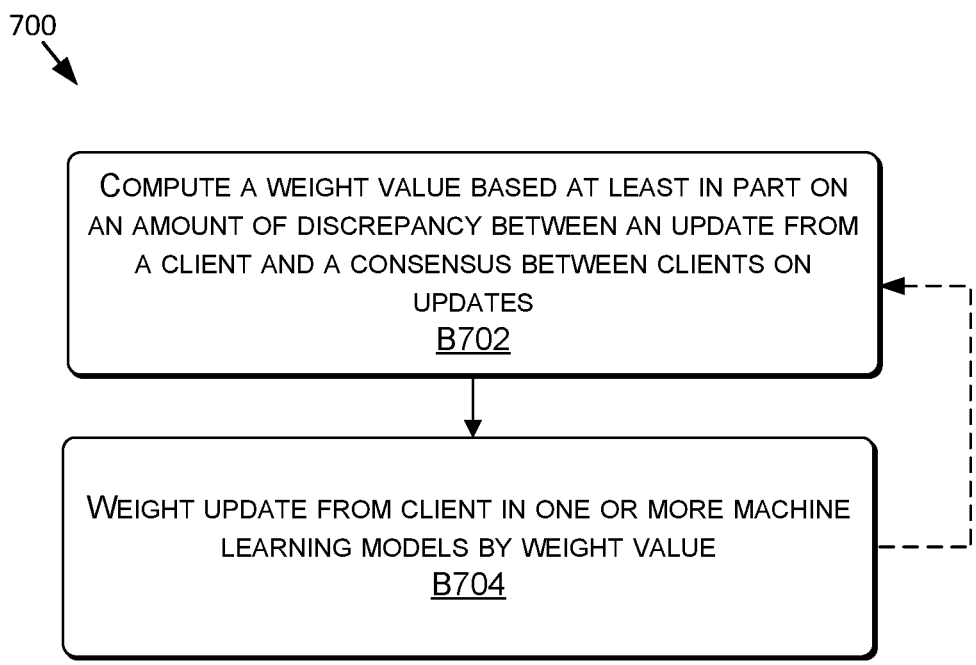
FIG. 7 illustrates a flowchart, in at least one embodiment.

FIG. 7 illustrates a flowchart of a method 700, in at least one embodiment. Method 700, at block B702, includes computing a weight value based at least in part on an amount of discrepancy between an update from a client and a consensus between clients on updates. In at least one embodiment, weight determiner 126 may compute a weight value based at least in part on an amount of discrepancy between an update to one or more parameters of machine learning model(s) 108 from a client corresponding to client device 502A and a consensus between clients corresponding to client devices 502 on updates to one or more parameters.

Method 700, at block B704, includes weighting update from client in one or more machine learning models by weight value. In at least one embodiment, training aggregator 104 may use parameter determiner 128 to weight an update from a client corresponding to client device 502A in machine learning model(s) 108 by weight value. As indicated in FIG. 7, method 700 may be repeated for any number of iterations of collaborative training.

Figure 8:
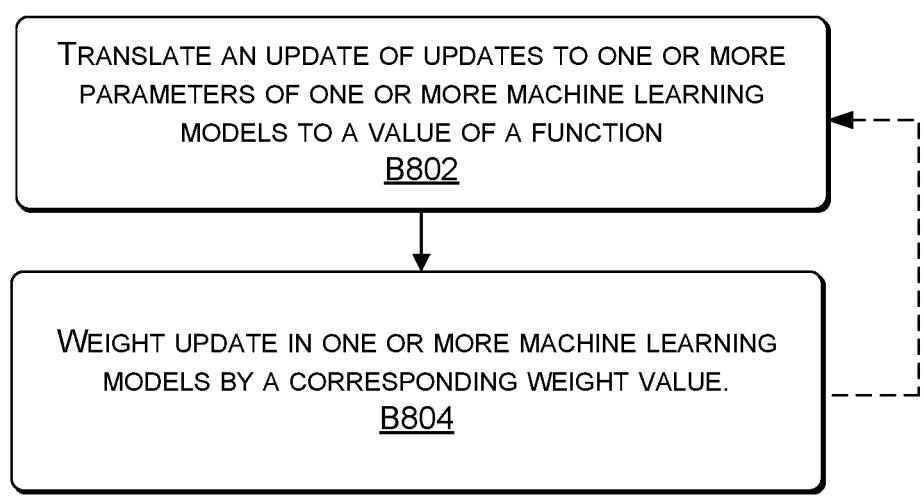
FIG. 8 illustrates a flowchart, in at least one embodiment.

FIG. 8 illustrates a flowchart of a method 800, in at least one embodiment. Method 800, at block B802, includes translating an update of updates to one or more parameters of one or more machine learning models to a value of a function. In at least one embodiment, weight determiner 126 translate a value(s) of one or more parameters from training node 102A translating an update to one or more parameters of machine learning model(s) 108 to a value of a function based at least in part on a measure of statistical dispersion in values of updates from training nodes 102 and a distance between update and a consensus on updates.

Method 800, at block B804, includes weighting update in one or more machine learning models by a corresponding weight value. In at least one embodiment, training aggregator 104 may use parameter determiner 128 to weight an update from training node 102A in machine learning model(s) 108 by a normalized weight value. As indicated in FIG. 8, method 800 may be repeated for any number of iterations of collaborative training.

Figure 9:
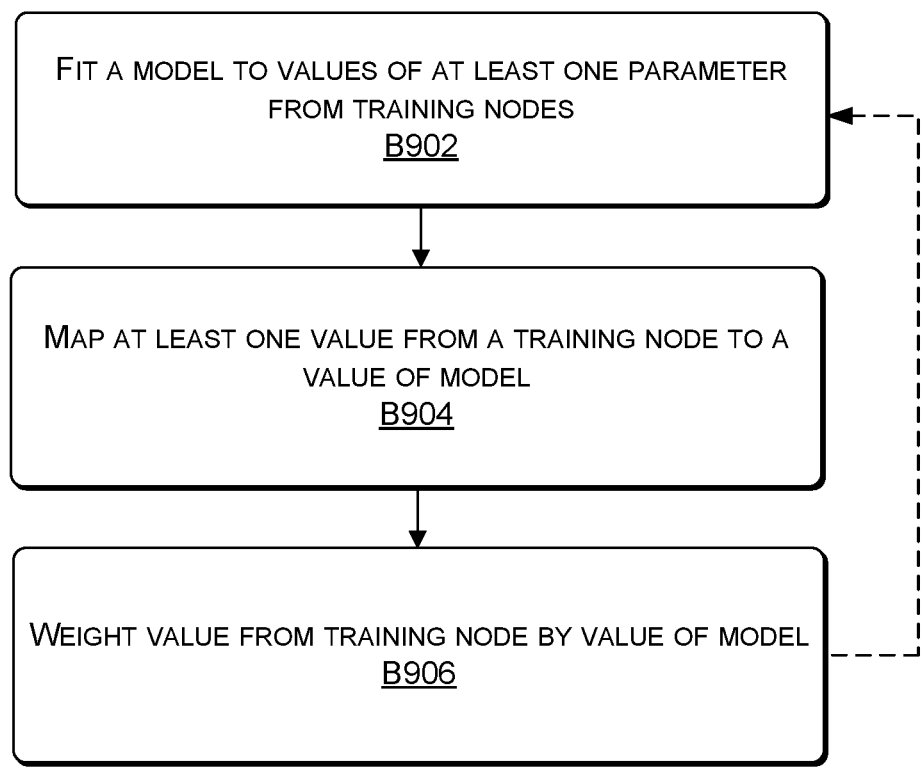
FIG. 9 illustrates a flowchart, in at least one embodiment.

FIG. 9 illustrates a flowchart of a method 900, in at least one embodiment. Method 900, at block B902, includes fitting a model to at least one parameter from training nodes. In at least one embodiment, training aggregator 104 may use consensus determiner 122 and/or discrepancy determiner 124 to fit model 170 to values of at least one parameter from training nodes 102 of machine learning model(s) 108.

Method 900, at block B904, includes mapping at least one value from a training node to a value of model. In at least one embodiment, weight determiner 126 may map at least one value of at least one parameter from training node 102A to a value of model 170 (e.g., using an amount of discrepancy for at least one value from training node 102A from a consensus of training nodes 102).

Method 900, at block B906, includes weighting value from training node by value of model. In at least one embodiment, training aggregator 104 may use parameter determiner 128 to weight at least one value of at least one parameter by value of model 170 (e.g., as normalized) in machine learning model(s) 108. As indicated in FIG. 9, method 900 may be repeated for any number of iterations of collaborative training.

Figure 10:
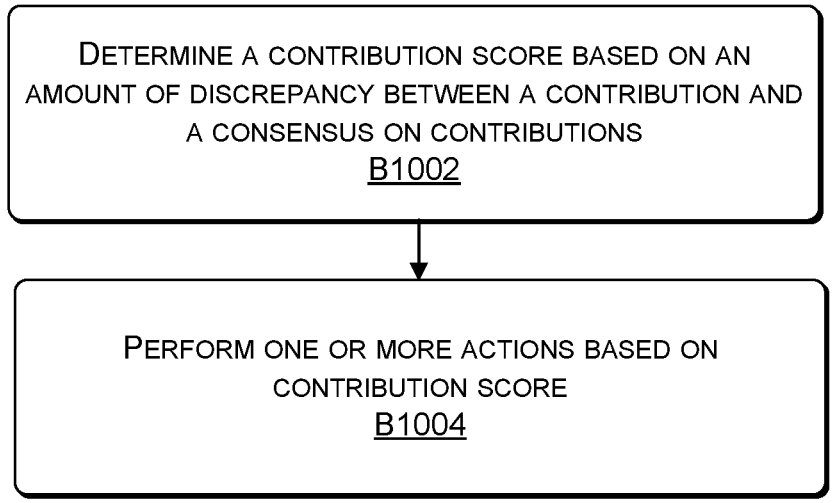
FIG. 10 illustrates a flowchart, in at least one embodiment.

FIG. 10 illustrates a flowchart of a method 1000, in at least one embodiment. Method 1000, at block B1002, includes determining a contribution score based on an amount of discrepancy between a contribution and a consensus on contributions. In at least one embodiment, contribution determiner 130 may determine a contribution score for training node 102A and/or a client corresponding to client device 502A based on a contribution from training node 102A to collaboratively training machine learning model(s) 108.

Method 1000, at block B1004, includes performing one or more actions based on contribution score. For example, training aggregator 104 may use a contribution score to reward training node 102A for collaborative training, ban training node 102A from collaborative training (e.g., from one or more future and/or subsequent iterations of collaborative training), determine weights (e.g., using weight determiner 126) for one or more subsequent iterations of collaboratively training machine learning model(s) 108, and/or perform other actions.

Parameter Review

Figure 11A:
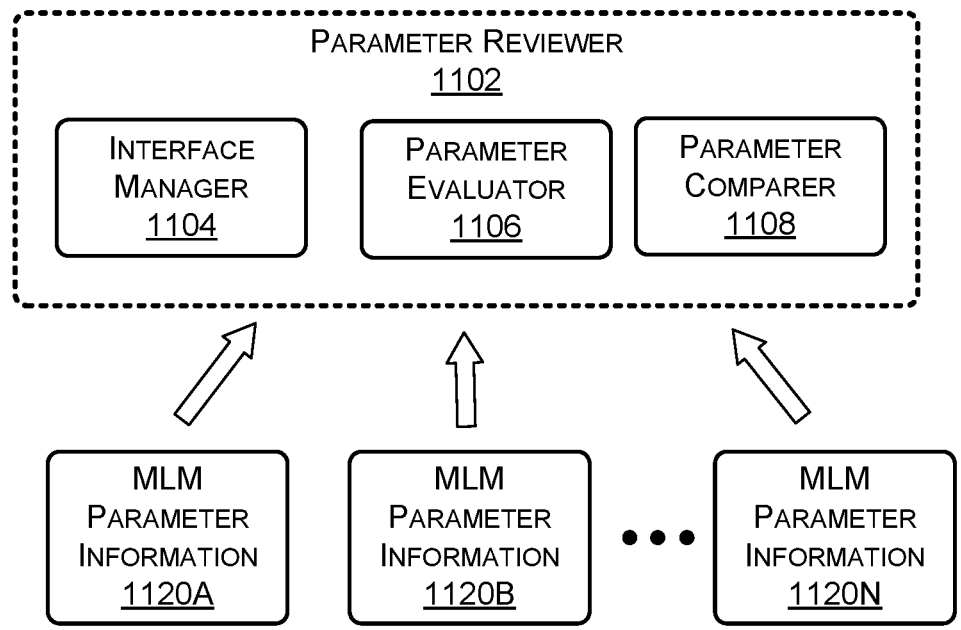
FIG. 11A illustrates an example parameter reviewer, in at least one embodiment.
Figure 11B:
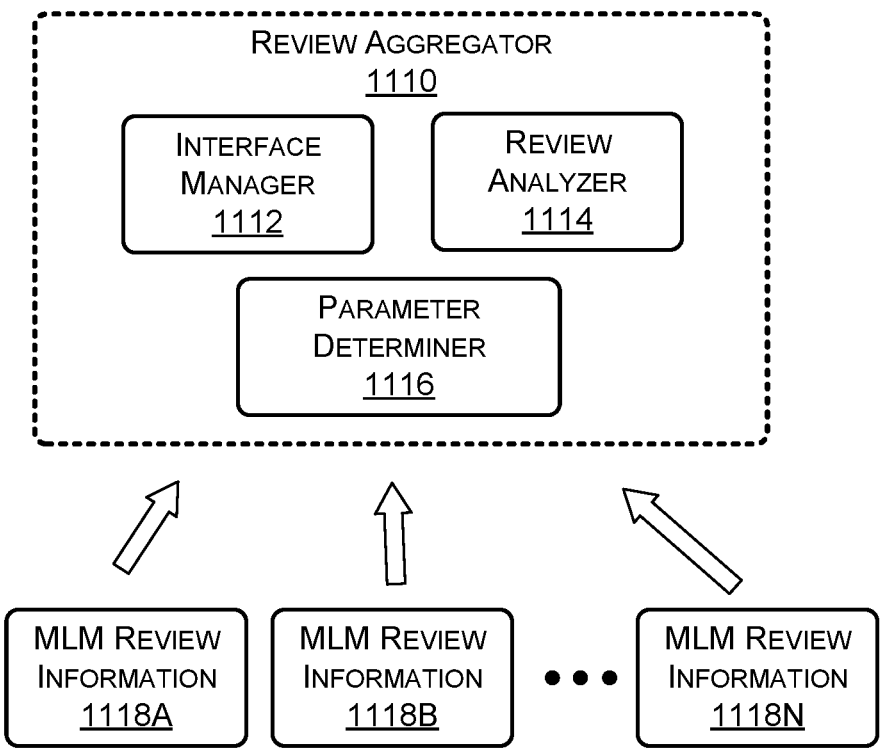
FIG. 11B illustrates an example review aggregator, in at least one embodiment.

FIG. 11A illustrates an example parameter reviewer 1102, in at least one embodiment. In at least one embodiment, parameter reviewer 1102 includes interface manager 1104, parameter evaluator 1106, and parameter comparer 1108. FIG. 11B illustrates an example review aggregator 1110, in at least one embodiment. In at least one embodiment, review aggregator 1110 includes interface manager 1112, review analyzer 1114, and parameter determiner 1116.

In at least one embodiment, one or more parameter reviewers 1102 and one or more review aggregators 1110 may be implemented in network environment 500 for collaborative training. In at least one embodiment, one or more of client device 502 includes a parameter reviewer 1102 and aggregation server(s) 504 includes review aggregator 1110. In at least one embodiment, aggregation server(s) 504 may not include review aggregator 1110, such as where network environment 500 includes a peer-to-peer network environment. In at least one embodiment, such as in a peer-to-peer network environment, one or more client devices 502 may include review aggregator 1110 and/or implement one or more portions of functionality of review aggregator 1110.

Parameter reviewer(s) 1102 and/or review aggregator(s) 1110 may be used to facilitate collaborative learning, such as federated learning. In at least one embodiment, parameter reviewer(s) 1102 and/or review aggregator(s) 1110 may be used to facilitate transfer learning, such between training nodes 102 of FIG. 1A (e.g., of parameters of machine learning models 106 and/or 108). In at least one embodiment, parameter reviewer(s) 1102 and/or review aggregator(s) 1110 may be used to facilitate federated transfer learning, multi-task federated learning, horizontal federated learning, and/or vertical federated learning, such between training nodes 102 of FIG. 1A (e.g., of parameters of machine learning models 106 and/or 108) (e.g., of parameters of machine learning models 106 and/or 108).

In at least one embodiment, interface manager 1104 of parameter reviewer 1102 may receive information from and/or provide information to other components, such as other interface managers 1104 of other parameter reviewers 1102 and/or interface manager 1112 of review aggregator(s) 1110. In at least one embodiment, examples of such information includes neural network weight information and/or MLM parameter information of one or more of machine learning model(s) 106 of FIG. 1A and/or machine learning model(s) 108 of FIG. 1A. In at least one embodiment, interface manager 1104 receives MLM parameter information 1120A, 1120B and/or 1120N, each of which may correspond to neural network weight information of one or more of machine learning model(s) 106 and/or machine learning model(s) 108. In at least embodiment, parameter evaluator 1106 may evaluate one or more portions of MLM parameter information 1120A, 1120B and/or 1120N (e.g., individually) to generate evaluation results information. Also in at least embodiment, parameter comparer 1108 may compare evaluation results information from parameter evaluator 1106 evaluating one or more portions of MLM parameter information 1120A, 1120B and/or 1120N to one another. In at least one embodiment, parameter comparer 1108 computes scoring information for one or more of MLM parameter information 1120A, 11208 and/or 1120N (or portions thereof) based at least in part on such comparisons.

In at least one embodiment, interface manager 1112 of review aggregator 1110 may receive information from and/or provide information to other components, such as one or more interface managers 1104 of one or more parameter reviewers 1102. In at least one embodiment, examples of such information includes neural network weight information and/or MLM parameter information of one or more of machine learning model(s) 106 of FIG. 1A and/or machine learning model(s) 108 of FIG. 1A. In at least one embodiment, examples of such information includes MLM review information, such as one or more sets of scoring information from one or more parameter comparers 1108. For example, MLM review information 1118A may be from one parameter reviewer 1102, MLM review information 1118B may be from another parameter reviewer 1102, and MLM review information 1118N may be from yet another parameter reviewer 1102.

In at least one embodiment, review analyzer 1114 may analyze MLM review information, which may include analyzing scoring information of one or more sets of MLM parameter information 1120 (e.g., from MLM review information 1118). In at least one embodiment, review analyzer 1114 may additionally or alternatively generate scoring information for one or more portions of neural network information. In such examples, review analyzer 1114 may include a parameter comparer 1108 and MLM review information from a parameter reviewer 1102 may include evaluation results information from one or more parameter evaluators 1106 (further one or more parameter reviewers 1102 may not include a parameter comparer 1108).

In at least one embodiment, parameter determiner 1116 of review aggregator 1110 may determine MLM parameter information (e.g., neural network information) of one or more MLMs, such as machine learning model(s) 108 based at least in part on analysis results information from review analyzer 1114. In at least one embodiment, parameter determiner 1116 determining MLM parameter information may include updating and/or replacing MLM parameter information of one or more MLM models, such as machine learning model(s) 108, based on corresponding MLM review information. In at least one embodiment, parameter determiner 1116 determining MLM parameter information may include excluding one or more portions of MLM parameter information 1120 from updating and/or replacing MLM parameter information of one or more MLM models, such as machine learning model(s) 108, based on corresponding MLM review information.

In at least one embodiment, interface manager 1112 of review aggregator 1110 receives MLM parameter information 1120A through 1120N, each of which may correspond to a respective MLM model(s). For example, each MLM parameter information 1120 may correspond to a respective MLM model trained for a period of time by a respective training node (e.g., for an epoch), such as a training node 102 of FIG. 1A, as described herein. As an example, MLM parameter information 1120A may correspond to MLM 106A, MLM parameter information 11208 may correspond to MLM 106B, and MLM parameter information 1120N may correspond to MLM 106N. In at least one embodiment, MLM parameter information 1120 received by review aggregator 1110 for a particular MLM 106 may be provided from a client device 502 that includes a training node 102 that at least partially trained such MLM 106. For example, model manager 112 of each training node 102 may provide corresponding MLM parameter information 1120.

In at least one embodiment, parameter determiner 1116 may be responsible for aggregating MLM parameter information 1120A, MLM parameter information 1120B, and/or MLM parameter information 1120N, such as to update one or more of MLMs 106 and/or 108 (e.g., for collaborative training). For example, parameter determiner 1116 may be used to update MLM 108 based on MLM parameter information 1120. In at least one embodiment, parameter determiner 1116 may correspond to parameter determiner 128 of FIG. 1A. In at least one embodiment, parameter determiner 1116 may be used in place of parameter determiner 128 of FIG. 1A. In at least one embodiment, parameter determiner 1116 may use consensus determiner 122, discrepancy determiner 124, weight determiner 126 and/or contribution determiner 130, as described herein. In at least one embodiment, parameter determiner 1116 may not use consensus determiner 122, discrepancy determiner 124, weight determiner 126 and/or contribution determiner 130, as described herein.

In at least one embodiment, to aggregate MLM parameter information 1120A, MLM parameter information 1120B, and/or MLM parameter information 1120N, review aggregator 1110 may use interface manager 1112 to provide one or more of MLM parameter information 1120A, MLM parameter information 11208, MLM parameter information 1120N and/or portions thereof to one or more parameter reviewers 1102 for review. For example, parameter reviewer 1102 is shown as receiving MLM parameter information 1120A through 1120N, any portion of which may be received from review aggregator 1110 for review and/or may be assigned by review aggregator 1110 to parameter reviewer 1102 for review. Review aggregator 1110 may similarly provide MLM parameter information 1120 to other parameter reviewers 1102 for review.

In at least one embodiment, one or more parameter reviewers 1102 may be on or associated with a same client and/or client device 502 as a training node 102. In such examples, review aggregator 1110 may not provide such client and/or client device 502 with corresponding portions of MLM parameter information 1120. For example, each client and/or client device 502 may be assigned to review MLM parameter information 1120 of at least one different client and/or client device 502. In at least one embodiment, one or more parameter reviewers 1102 may not include a training node 102 and/or may not have provided a portion of MLM parameter information 1120 to review aggregator 1110 for review.

In at least one embodiment, interface manager 1104 of each parameter reviewer 1102 receives MLM parameter information 1120 for review anonymously, without an indication of a client and/or client device associated with a corresponding portion of MLM parameter information 1120. In at least one embodiment, each parameter reviewer 1102 reviews each portion of MLM parameter information 1120 provided by a training node 102, except for those portions trained by an associated training node 102 (e.g., on a same client device 502 and/or of a same client). In at least one embodiment, interface manager 1112 of review aggregator 1110 does not transmit one or more portions of MLM parameter information 1120 to a particular parameter reviewer 1102 for review. For example, where review aggregator 1110 is on aggregation server(s) 504 of FIG. 5, or aggregation server(s) 504 are not included, corresponding data may be exchanged peer-to-peer between client devices 502 and/or in another manner. In at least one embodiment, assignments of portions of MLM parameter information 1120 to parameter reviewers 1102 for review may be implicit, such as defined by an exchange algorithm between client devices 502 (e.g., all-to-all, ring exchange, etc.). Considerations may be made for ensuring anonymity of a source of a corresponding portion of MLM parameter information 1120 to be reviewed.

In at least one embodiment, to review MLM parameter information 1120, parameter evaluator 1106 of parameter reviewer 1102 is configured to evaluate one or more portions of MLM parameter information 1120 to generate evaluation results information therefrom. Evaluating MLM parameter information 1120 may include parameter evaluator 1106 computing one or more metrics on accuracy of a corresponding portion(s) of MLM parameter information 1120 as applied to a MLM(s). For example, to evaluate MLM parameter information 1120A, parameter evaluator 1106 may test and measure accuracy of a MLM(s) comprising parameters defined by MLM parameter information 1120A. This may include parameter evaluator 1106 performing validation on a MLM(s) (e.g., a MLM 106) comprising parameters defined by MLM parameter information 1120A to compute one or more output accuracy metrics. For example, where MLM(s) are to identify one or more objects within one or more images, parameter evaluator 1106 may evaluate accuracy in terms of identification accuracy of one or more objects within one or more images. Metrics related to identification accuracy may be based on a number and/or percentage of identified objects, correctly and/or incorrectly identified objects (e.g., false positives or misidentifications), correctly and/or incorrectly classified objects, etc. Although object identification is described as an example, in at least one embodiment, an MLM that is evaluated may not identify one or more objects in one or more images and/or may perform one or more additional tasks.

In at least one embodiment, parameter evaluator 1106 of parameter reviewer 1102 generates evaluation result information representative of identification accuracy for different sets of MLM parameter information 1120, values of an identification accuracy metric for different sets of MLM parameter information 1120, and/or factors which may be used to compute identification accuracy and/or values of an identification accuracy metric for different sets of MLM parameter information 1120. Where MLM review information 1118 includes evaluation results information, any combination of this information may be included therein (e.g., for use by review analyzer 1114). In at least one embodiment, parameter evaluator 1106 of parameter reviewer 1102 may compute and/or determine an output accuracy metric value for each set of MLM parameter information 118 that is evaluated. In at least one embodiment, parameter evaluator 1106 may evaluate each MLM and/or corresponding MLM parameter information 1120 using a same validation dataset (e.g., a same set of input images and ground truth data).

In at least one embodiment, parameter comparer 1108 compares evaluation results information (e.g., from parameter evaluator 1106) to generate comparison information which may be included in MLM review information 1118. Examples of comparison information includes scoring information and/or ranking information regarding sets of MLM parameter information 1120 and/or particular portions thereof. For example, parameter comparer 1108 may rank MLM parameter information 1120 from most accurate to least accurate and/or compute scoring information based on evaluation results information (e.g., identification accuracy metric values). In at least one embodiment, comparison information and/or scoring information may be relative to a reference MLM and/or set of MLM parameter information 1120. As an example, where a parameter reviewer 1102 is associated with a particular training node 102, a reference MLM and/or set of MLM parameter information 1120 may correspond to a MLM that is training, at least partially, by that training node 102.

In at least one embodiment, where MLM parameter information 1120A is from MLM 106A of FIG. 1A that is trained by training node 102A, model manager 112A may provide parameter reviewer 1102 with MLM parameter information 1120A (e.g., within a same client device 502) for use as a benchmark, reference, or standard, against which other MLM parameter information 1120 is compared by parameter comparer 1108. For example, ranking or scoring information may be relative to MLM parameter information 1120A. In at least one embodiment, MLM parameter information 1120 may be ranked, or scored, based on how similar corresponding evaluation results information is to MLM parameter information 1120A (reference MLM parameter information) with more similar results being ranked higher than less similar results. In at least one embodiment, in addition to or instead of ranking or scoring information, comparison information may correspond to a vote, or opinion, on whether parameter determiner 1116 should use a particular set or portion of MLM parameter information 1120 in aggregating parameters for a MLM. For example, parameter comparer 1108 may vote for inclusion where corresponding scoring information, ranking information and/or an output accuracy metric value(s) is within a threshold value(s) of MLM parameter information 1120A (reference MLM parameter information).

In at least one embodiment, each parameter reviewer 1102 may independently determine a portion MLM review information 1118 and provide corresponding MLM review information 1118 to review aggregator 1110 for aggregation by parameter determiner 1116. In at least one embodiment, a single review aggregator 1110 is employed. In at least one embodiment, multiple review aggregators 1110 may be employed. For example, different review aggregators 1110 may aggregate different sets of MLM review information 1118, which may then be applied to update one or more MLMs. In at least one embodiment, aggregated sets of MLM review information 1118 from different review aggregators 1110 may be merged and used by a parameter determiner 1116 to determine parameters for a MLM (e.g., MLM 108).

In at least one embodiment, review analyzer 1114 may analyze MLM review information and may be used by parameter determiner 1116 to determine MLM parameter information. In at least one embodiment, review analyzer 1114 may analyze comparison information generated by one or more parameter comparers 1108 from one or more parameter reviewers 1102. In examples where MLM review information includes at least one evaluation results generated by one or more parameter evaluators 1106, review analyzer 1114 may include a parameter comparer 1108 to generate and analyze at least some comparison information.

In at least one embodiment, review analyzer 1114 may, based on MLM review information 1118 from multiple parameter reviewers 1102, determine one or more portions of MLM parameter information 1120 to exclude from an aggregation of MLM parameter information 1120. For example, where comparison information includes votes for inclusion or exclusion, as described herein, review analyzer 1114 may determine to exclude or include a portion of MLM parameter information 1120 (e.g., all parameters from a training node and/or a particular subset thereof) based on such votes (e.g., a vote count). In at least one embodiment, a portion of MLM parameter information 1120 may be included based at least in part on a majority of votes being for inclusion (or some other threshold value being exceeded) and/or excluded based at least in part on a majority of votes being for exclusion (or some other threshold value being exceeded). In at least one embodiment, review analyzer 1114 additionally or alternatively analyzes scoring information on a portion of MLM parameter information 1120 from different parameter reviewers 1102 to determine whether to include or exclude such MLM parameter information 1120. In at least one embodiment, a portion of MLM parameter information 1120 may be included based at least in part on determining an aggregate of corresponding scoring information (e.g., average) exceeds a threshold value and/or excluded based at least in part on determining an aggregate of corresponding scoring information (e.g., average) fails to exceed a threshold value.

In at least one embodiment, review analyzer 1114 may, based on MLM review information 1118 from multiple parameter reviewers 1102, determine one or more weights for MLM parameter information 1120 for an aggregation of MLM parameter information 1120. For example, review analyzer 1114 may use weight determiner 126 to determine weights for one or more portions of MLM parameter information 1120 based at least in part on corresponding comparison information. In at least one embodiment, one or more portions of MLM parameter information 1120 may have weight values that are proportional to corresponding aggregated scoring information. For example, a portion of MLM parameter information 1120 from a training node 102 may have a weight value that corresponds to its score relative to corresponding portions of MLM parameter information 1120 from other training nodes 102. In at least one embodiment, one or more portions of MLM parameter information 1120 may have weight values that are proportional to corresponding aggregated vote information. For example, a portion of MLM parameter information 1120 from a training node 102 may have a weight value that corresponds to its number of votes relative to corresponding portions of MLM parameter information 1120 from other training nodes 102 and/or a total number of votes. In at least one embodiment, one or more portions of MLM parameter information 1120 may have weight values that are based at least in part on contribution information of a corresponding training node 102 (and/or client or client device 502), as described herein.

As described herein, in at least one embodiment, parameter determiner 1116 of review aggregator 1110 may determine MLM parameter information (e.g., neural network information) of one or more MLMs, such as machine learning model(s) 108 based at least in part on analysis results information from review analyzer 1114. In at least one embodiment, parameter determiner 1116 determining MLM parameter information may include updating and/or replacing MLM parameter information of one or more MLM models, such as machine learning model(s) 108, based on corresponding MLM review information. In at least one embodiment, parameter determiner 1116 determining MLM parameter information may include excluding one or more portions of MLM parameter information 1120 from updating and/or replacing MLM parameter information of one or more MLM models, such as machine learning model(s) 108, based on corresponding MLM review information (e.g., based on determinations made by review analyzer 1114).

In at least one embodiment, parameter reviewer(s) 1102 and review aggregator(s) 1110 may be operated in accordance with description of flow diagram 400 of FIG. 4. In at least one embodiment, parameter reviewer(s) 1102 and review aggregator(s) 1110 collaboratively train one or more MLMs over multiple iterations for federated transfer learning, multi-task federated learning, horizontal federated learning, and/or vertical federated learning, or another collaborative training technique. In at least one embodiment, one or more training nodes 102 may include a parameter reviewer 1102 and/or a review aggregator 1110 used to update a local MLM, such as MLM 106. In at least one embodiment, one or more portions of local MLMs 106 may be periodically synchronized (e.g., after parameter aggregation) across training nodes 102 and/or client devices 502 (e.g., with MLM 108). In at least one embodiment, one or more MLMs 106 or portions thereof may not be synchronized across training nodes 102 and/or client devices 502 (e.g., for transfer learning or multi-task learning). In at least one embodiment, one or more sets of MLMs 106 or portions thereof may be periodically synchronized (e.g., after parameter aggregation) while one or more other sets of MLMs 106 may not be synchronized (e.g., where training nodes 102 are grouped by task).

In at least one embodiment, different review aggregators 1110 may operate on different sets of MLM review information 1118 from different sets of training nodes 102 and/or client devices 502 to aggregate MLM parameter information. In at least one embodiment, one or more parameter reviewers 1102 may further review such aggregated sets of MLM parameter information and/or such aggregated MLM parameter information may be further aggregated by a parameter determiner 1116 and/or 128.

Model Branching

In at least one embodiment, a review aggregator 1110 and/or a training aggregator 104 may branch MLM 108 and/or a MLM 106. Each branch of an MLM may correspond to a different set of one or more training nodes 102, client devices 502, and/or clients. In at least one embodiment, when updating a branch of an MLM, a parameter determiner 128 and/or 1116 may aggregate MLM parameter information from members of a corresponding set. For example, one branch of an MLM may be updated with MLM parameter information from training nodes 102A and 102B, while another branch of an MLM is updated with MLM parameter information from training node 102N. In at least one embodiment, training nodes 102, client devices 502, and/or clients may be unaware that particular or any branches of a MLM exist and/or an identity of a branch of an MLM to which they have been assigned.

In at least one embodiment, a review aggregator 1110 and/or a training aggregator 104 may form a branch and/or assign one or more members to a branch of an MLM based at least in part on corresponding amounts of discrepancy between a member and a consensus. In at least one embodiment, such information is derived using consensus determiner 122 and/or discrepancy determiner 124, as described herein. In at least one embodiment, a review aggregator 1110 and/or a training aggregator 104 may form a branch and/or assign one or more members to a branch of an MLM based at least in part on corresponding contributions of members to training. In at least one embodiment, such information is derived using contribution determiner 130, as described herein. In at least one embodiment, review aggregator 1110 and/or a training aggregator 104 may form a branch and/or assign one or more members to a branch of an MLM based at least in part on determining statistical incompatibilities between MLM parameter information (e.g., of layer-wise parameters) from one or more training nodes 102. In at least one embodiment, training nodes 102 may be grouped into statistically compatible sets, which may correspond to branches of an MLM (e.g., MLM 108). In at least one embodiment, members assigned a common branch may be periodically synchronized with such branch (e.g., according to flow chart 400 of FIG. 4).

In at least one embodiment, a review aggregator 1110 and/or a training aggregator 104 may merge branches and/or assign one or more members to a different branch of an MLM based at least in part on corresponding amounts of discrepancy between a member and a consensus. In at least one embodiment, such information is derived using consensus determiner 122 and/or discrepancy determiner 124, as described herein. In at least one embodiment, a review aggregator 1110 and/or a training aggregator 104 may merge a branch and/or assign one or more members to a different branch of an MLM based at least in part on corresponding contributions of members to training. In at least one embodiment, such information is derived using contribution determiner 130, as described herein. In at least one embodiment, review aggregator 1110 and/or a training aggregator 104 may merge a branch and/or assign one or more members to a different branch of an MLM based at least in part on determining statistical compatibilities between MLM parameter information (e.g., of layer-wise parameters) from one or more training nodes 102. In at least one embodiment, training nodes 102 may be periodically grouped into statistically compatible sets, and branches of an MLM (e.g., MLM 108) may be merged and/or assignments to branches may be updated accordingly.

Figure 12:
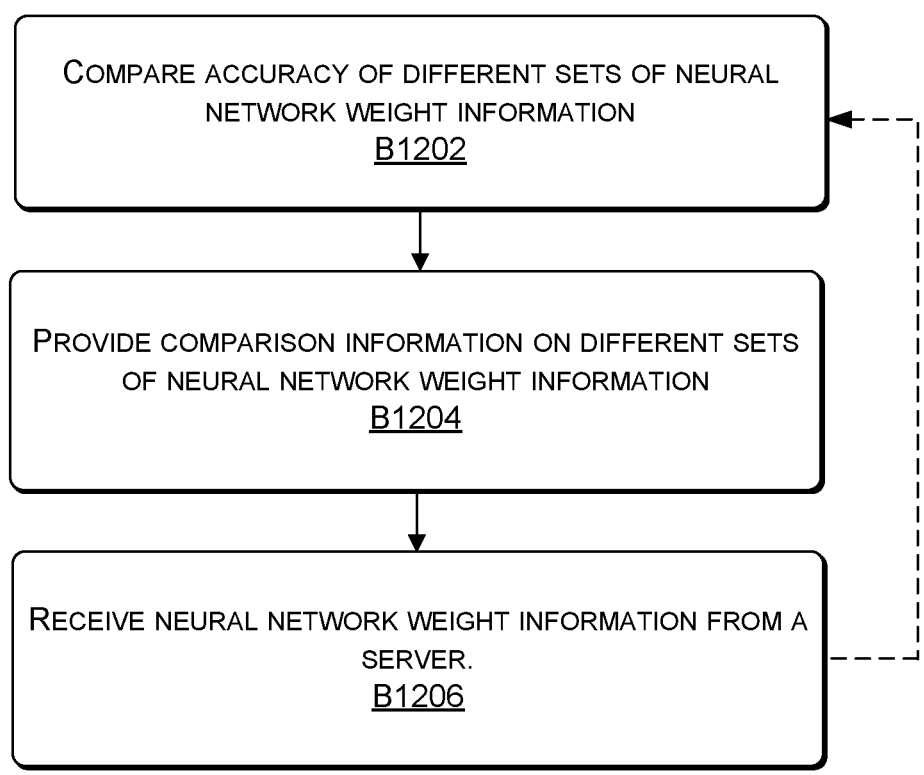
FIG. 12 illustrates a flowchart, in at least one embodiment.

FIG. 12 illustrates a flowchart of a method 1200, in at least one embodiment. Method 1200, at block B1202, includes comparing accuracy of different sets of neural network weight information. In at least one embodiment, a parameter comparer 1108 of a parameter reviewer 1102 or a review aggregator 1110 may compare accuracy of one or more portions of MLM parameter information 1120 associated with different training nodes 102, client devices 502, edge devices, and/or clients.

At block B1204, method 1200 includes providing comparison information on different sets of neural network weight information. For example, a client device 502 and/or edge device generates comparison information, comparison information may be transmitted to another client device 502 and/or edge device and/or aggregation server(s) 504. Where aggregation server(s) 504 generates comparison information, comparison information may be provided for analysis by review analyzer 1114, which may be within aggregation server(s) 504.

At block B1206, method 1200 includes receiving neural network weight information from a server. For example, aggregation server(s) 504 may provide neural network weight information determined by parameter determiner 1116 to one or more training nodes 102, client devices 502, and/or edge devices (e.g., to synchronize MLMs 106 or one or more portions thereof).

Figure 13:
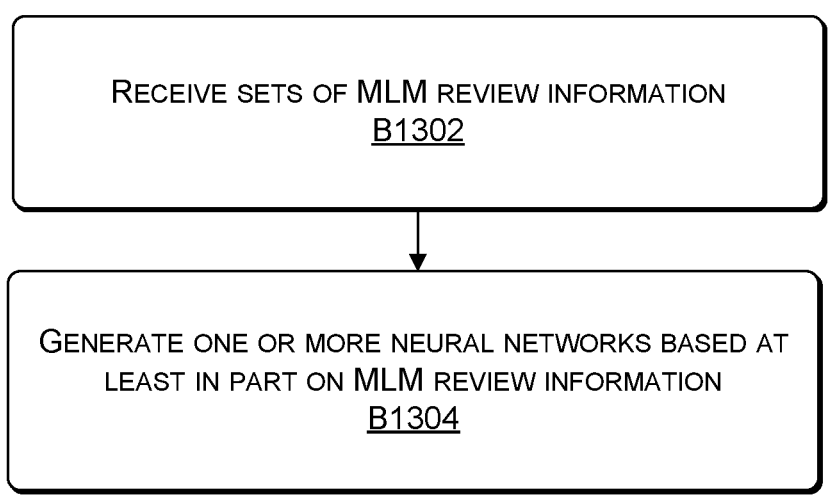
FIG. 13 illustrates a flowchart, in at least one embodiment.

FIG. 13 illustrates a flowchart of a method 1300, in at least one embodiment. Method 1300, at block B1302 includes receiving sets of MLM review information. For example, aggregation server(s) 504 may receive MLM review information 1118 (e.g., using interface manager 1112 of review aggregator 1110).

Method 1300, at block B1304 includes generating one or more neural networks based at least in part on MLM review information. For example, aggregation server(s) 504 may use MLM review information 1118 to generate MLM(s) 108 (e.g., using review analyzer 1114 and parameter determiner 1116).

Data Center

Figure 14:
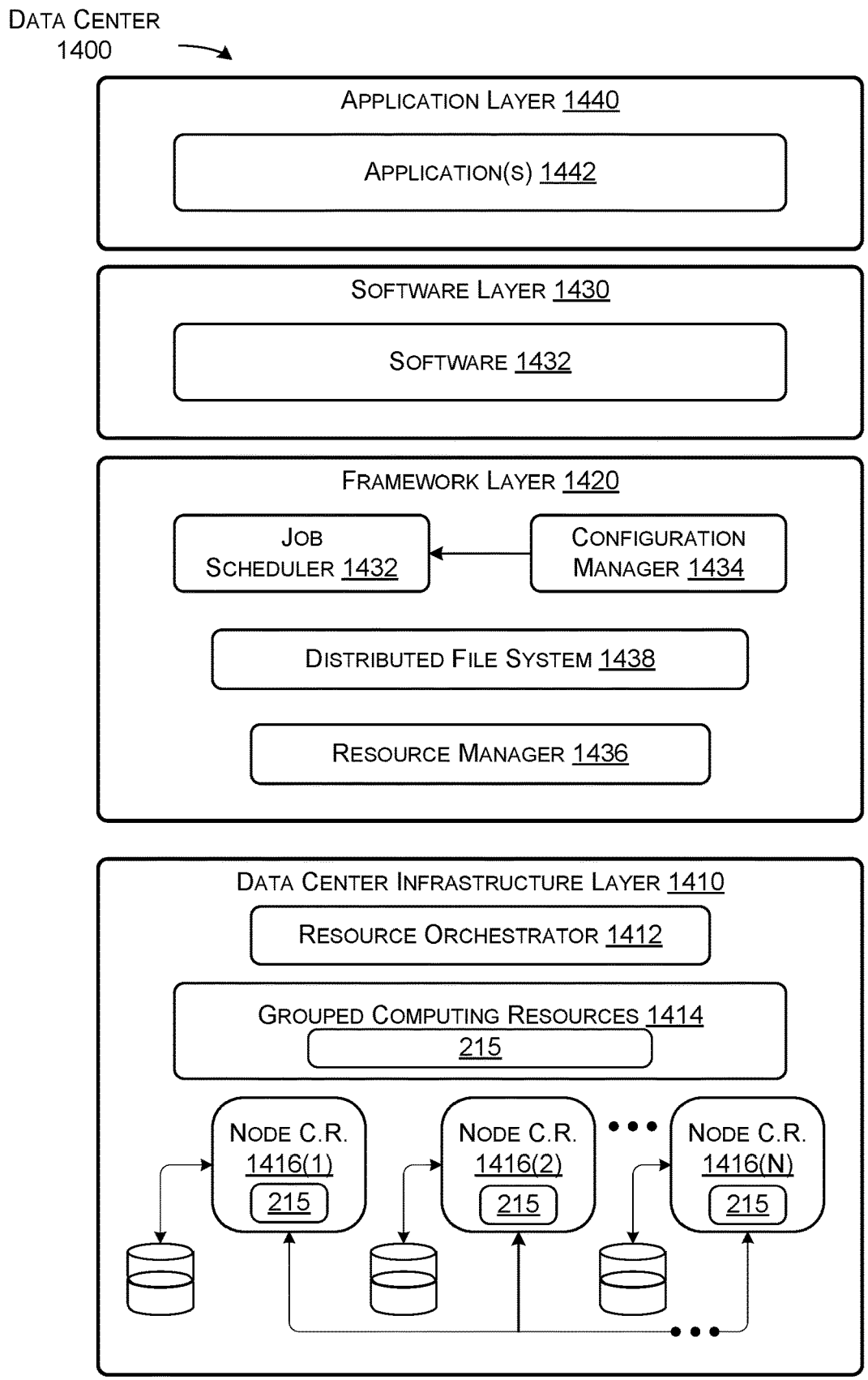
FIG. 14 illustrates an example data center system, in at least one embodiment.

FIG. 14 illustrates an example data center 1400, in at least one embodiment. In at least one embodiment, data center 1400 includes a data center infrastructure layer 1410, a framework layer 1420, a software layer 1430 and an application layer 1440.

In at least one embodiment, as shown in FIG. 14, data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1416(1)-1416(N) may be a server having one or more of above-mentioned computing resources.

In at least one embodiment, grouped computing resources 1414 may include separate groupings of node C.R.s housed within one or more racks (not shown), or many racks housed in data centers at various geographical locations (also not shown). Separate groupings of node C.R.s within grouped computing resources 1414 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1422 may configure or otherwise control one or more node C.R.s 1416(1)-1416(N) and/or grouped computing resources 1414. In at least one embodiment, resource orchestrator 1422 may include a software design infrastructure ("SDI") management entity for data center 1400. In at least one embodiment, resource orchestrator may include hardware, software or some combination thereof.

In at least one embodiment, as shown in FIG. 14, framework layer 1420 includes a job scheduler 1432, a configuration manager 1434, a resource manager 1436 and a distributed file system 1438. In at least one embodiment, framework layer 1420 may include a framework to support software 1432 of software layer 1430 and/or one or more application(s) 1442 of application layer 1440. In at least one embodiment, software 1432 or application(s) 1442 may respectively include web-based service software or applications, such as those provided by Amazon Web Services, Google Cloud and Microsoft Azure. In at least one embodiment, framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1432 may include a Spark driver to facilitate scheduling of workloads supported by various layers of data center 1400. In at least one embodiment, configuration manager 1434 may be capable of configuring different layers such as software layer 1430 and framework layer 1420 including Spark and distributed file system 1438 for supporting large-scale data processing. In at least one embodiment, resource manager 1436 may be capable of managing clustered or grouped computing resources mapped to or allocated for support of distributed file system 1438 and job scheduler 1432. In at least one embodiment, clustered or grouped computing resources may include grouped computing resource 1414 at data center infrastructure layer 1410. In at least one embodiment, resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416(1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. In at least one embodiment, self-modifying actions may relieve a data center operator of data center 1400 from making possibly bad configuration decisions and possibly avoiding underutilized and/or poor performing portions of a data center.

In at least one embodiment, data center 1400 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1400. In at least one embodiment, trained machine learning models corresponding to one or more neural networks may be used to infer or predict information using resources described above with respect to data center 1400 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 14 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented on one or more data center 1100.

Autonomous Vehicle

Figure 15A:
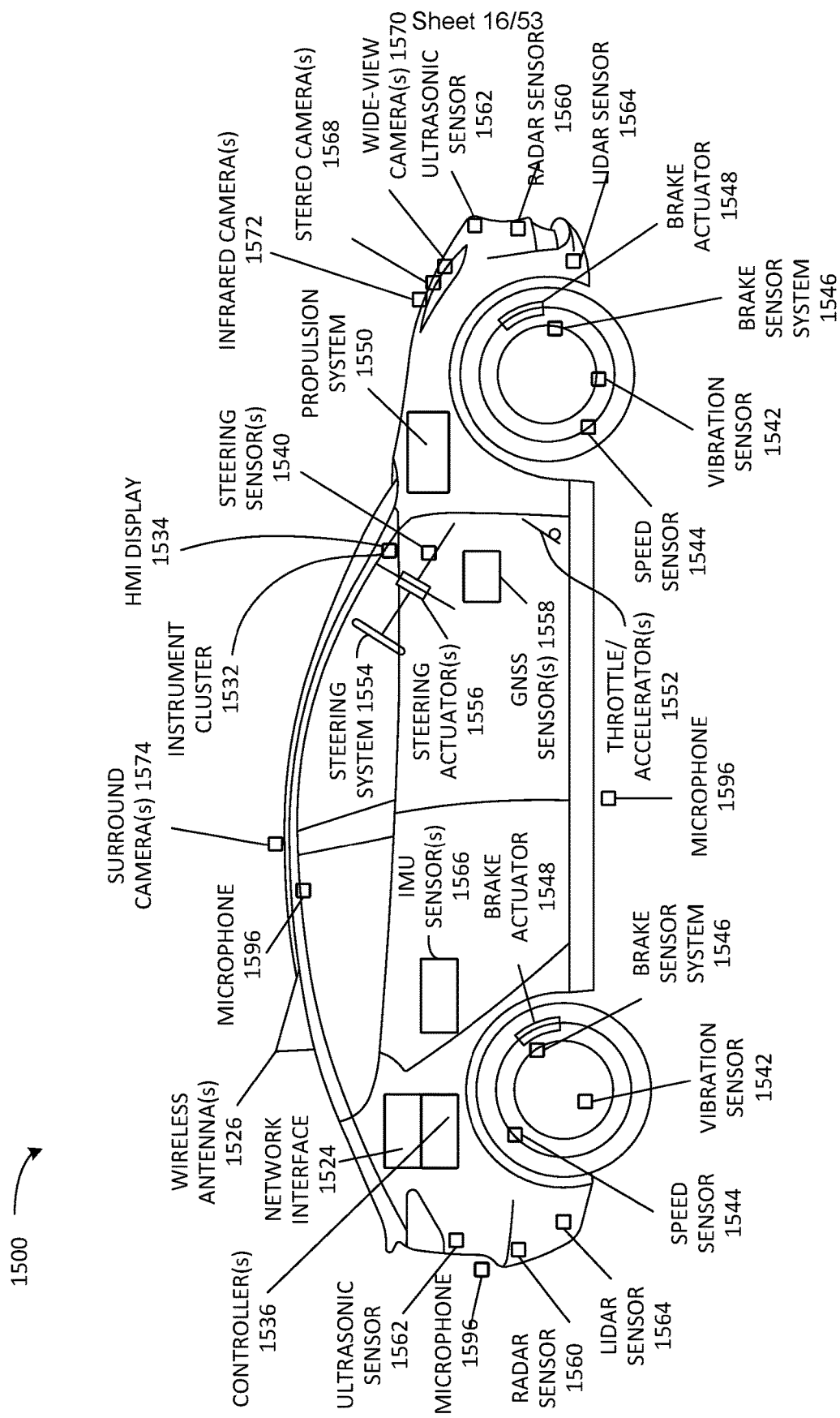
FIG. 15A illustrates an example of an autonomous vehicle, in at least one embodiment.

FIG. 15A illustrates an example of an autonomous vehicle 1500, in at least one embodiment. In at least one embodiment, autonomous vehicle 1500 (alternatively referred to herein as "vehicle 1500") may be, without limitation, a passenger vehicle, such as a car, a truck, a bus, and/or another type of vehicle that accommodates one or more passengers. In at least one embodiment, vehicle 1a00 may be a semi-tractor-trailer truck used for hauling cargo. In at least one embodiment, vehicle 1500 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1500 may be capable of functionality in accordance with one or more of level 1-level 5 of autonomous driving levels. For example, in at least one embodiment, vehicle 1500 may be capable of conditional automation (Level 3), high automation (Level 4), and/or full automation (Level 5), depending on embodiment.

In at least one embodiment, vehicle 1500 may include, without limitation, components such as a chassis, a vehicle body, wheels (e.g., 2, 4, 6, 8, 18, etc.), tires, axles, and other components of a vehicle. In at least one embodiment, vehicle 1500 may include, without limitation, a propulsion system 1550, such as an internal combustion engine, hybrid electric power plant, an all-electric engine, and/or another propulsion system type. In at least one embodiment, propulsion system 1550 may be connected to a drive train of vehicle 1500, which may include, without limitation, a transmission, to enable propulsion of vehicle 1500. In at least one embodiment, propulsion system 1550 may be controlled in response to receiving signals from a throttle/accelerator(s) 1552.

In at least one embodiment, a steering system 1554, which may include, without limitation, a steering wheel, is used to steer a vehicle 1500 (e.g., along a desired path or route) when a propulsion system 1550 is operating (e.g., when vehicle is in motion). In at least one embodiment, a steering system 1554 may receive signals from steering actuator(s) 1556. In at least one embodiment, a steering wheel is not used for full automation (Level 5) functionality. In at least one embodiment, a brake sensor system 1546 may be used to operate vehicle brakes in response to receiving signals from brake actuator(s) 1548 and/or brake sensors.

In at least one embodiment, controller(s) 1536, which may include, without limitation, one or more system on chips ("SoCs") (not shown in FIG. 15A) and/or graphics processing unit(s) ("GPU(s)"), provide signals (e.g., representative of commands) to one or more components and/or systems of vehicle 1500. For instance, in at least one embodiment, controller(s) 1536 may send signals to operate vehicle brakes via brake actuators 1548, to operate steering system 1554 via steering actuator(s) 1556, to operate propulsion system 1550 via throttle/accelerator(s) 1552. Controller 1536 may include one or more onboard (e.g., integrated) computing devices (e.g., supercomputers) that process sensor signals, and output operation commands (e.g., signals representing commands) to enable autonomous driving and/or to assist a human driver in driving vehicle 1500. In at least one embodiment, controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In at least one embodiment, a single controller 1536 may handle two or more of above functionalities, two or more controllers 1536 may handle a single functionality, and/or any combination thereof.

In at least one embodiment, controller(s) 1536 provide signals for controlling one or more components and/or systems of vehicle 1500 in response to sensor data received from one or more sensors (e.g., sensor inputs). In at least one embodiment, sensor data may be received from, for example and without limitation, global navigation satellite systems ("GNSS") sensor(s) 1558 (e.g., Global Positioning System sensor(s)), RADAR sensor(s) 1560, ultrasonic sensor(s) 1562, LIDAR sensor(s) 1564, inertial measurement unit ("IMU") sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range cameras (not shown in FIG. 15A), mid-range camera(s) (not shown in FIG. 15A), speed sensor(s) 1544 (e.g., for measuring speed of vehicle 1500), vibration sensor(s) 1542, steering sensor(s) 1540, brake sensor(s) (e.g., as part of brake sensor system 1546), and/or other sensor types.

In at least one embodiment, one or more of controller(s) 1536 may receive inputs (e.g., represented by input data) from an instrument cluster 1532 of vehicle 1500 and provide outputs (e.g., represented by output data, display data, etc.) via a human-machine interface ("HMI") display 1534, an audible annunciator, a loudspeaker, and/or via other components of vehicle 1500. In at least one embodiment, outputs may include information such as vehicle velocity, speed, time, map data (e.g., a High Definition map (not shown in FIG. 15A), location data (e.g., vehicle's 1500 location, such as on a map), direction, location of other vehicles (e.g., an occupancy grid), information about objects and status of objects as perceived by controller(s) 1536, etc. For example, in at least one embodiment, HMI display 1534 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1500 further includes a network interface 1524 which may use wireless antenna(s) 1526 and/or modem(s) to communicate over one or more networks. For example, in at least one embodiment, network interface 1524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1526 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 15A for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more autonomous vehicle 1500.

Figure 15B:
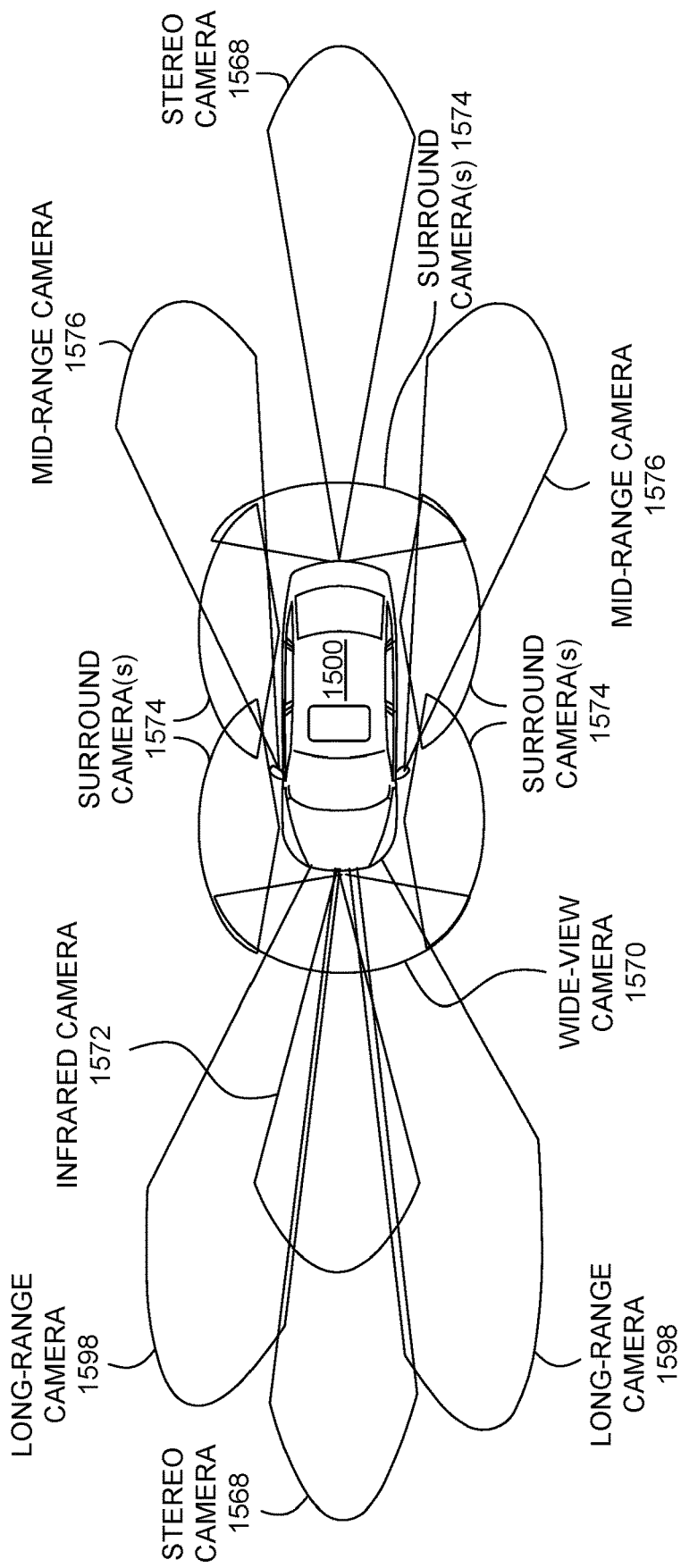
FIG. 15B illustrates an example of camera locations and fields of view for the autonomous vehicle of FIG. 15A, in at least one embodiment.

FIG. 15B illustrates an example of camera locations and fields of view for autonomous vehicle 1500 of FIG. 15A, in at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1500.

In at least one embodiment, camera types for cameras may include, but are not limited to, digital cameras that may be adapted for use with components and/or systems of vehicle 1500. Camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of a cabin in at least one embodiment.

In at least one embodiment, cameras with a field of view that include portions of environment in front of vehicle 1500 (e.g., front-facing cameras) may be used for surround view, to help identify forward facing paths and obstacles, as well as aid in, with help of one or more of controllers 1536 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1570 may be used to perceive objects coming into view from periphery (e.g., pedestrians, crossing traffic or bicycles). Although only one wide-view camera 1570 is illustrated in FIG. 15B, in other embodiments, there may be any number (including zero) of wide-view camera(s) 1570 on vehicle 1500. In at least one embodiment, any number of long-range camera(s) 1598 (e.g., a long-view stereo camera pair) may be used for depth-based object detection, especially for objects for which a neural network has not yet been trained. In at least one embodiment, long-range camera(s) 1598 may also be used for object detection and classification, as well as basic object tracking.

In at least one embodiment, any number of stereo camera(s) 1568 may also be included in a front-facing configuration. In at least one embodiment, one or more of stereo camera(s) 1568 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1500, including a distance estimate for all points in image. In at least one embodiment, one or more of stereo camera(s) 1568 may include, without limitation, compact stereo vision sensor(s) that may include, without limitation, two camera lenses (one each on left and right) and an image processing chip that may measure distance from vehicle 1500 to target object and use generated information (e.g., metadata) to activate autonomous emergency braking and lane departure warning functions. In at least one embodiment, other types of stereo camera(s) 1568 may be used in addition to, or alternatively from, those described herein.

In at least one embodiment, cameras with a field of view that include portions of environment to side of vehicle 1500 (e.g., side-view cameras) may be used for surround view, providing information used to create and update occupancy grid, as well as to generate side impact collision warnings. For example, in at least one embodiment, surround camera(s) 1574 (e.g., four surround cameras 1574 as illustrated in FIG. 15B) could be positioned on vehicle 1500. Surround camera(s) 1574 may include, without limitation, any number and combination of wide-view camera(s) 1570, fisheye camera(s), 360 degree camera(s), and/or like. For instance, in at least one embodiment, four fisheye cameras may be positioned on front, rear, and sides of vehicle 1500. In at least one embodiment, vehicle 1500 may use three surround camera(s) 1574 (e.g., left, right, and rear), and may leverage one or more other camera(s) (e.g., a forward-facing camera) as a fourth surround-view camera.

In at least one embodiment, cameras with a field of view that include portions of environment to rear of vehicle 1500 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1598 and/or mid-range camera(s) 1576, stereo camera(s) 1568, infrared camera(s) 1572, etc.), as described herein.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 15B for inferencing or predicting operations based, at least in part, on weight parameters calculated using neural network training operations, neural network functions and/or architectures, or neural network use cases described herein.

In at least one embodiment, a training dataset 302 used by one or more of client devices 502, aggregation server(s) 504, training nodes 102, training aggregator 104, parameter reviewer(s) 1102, and/or review aggregator(s) 1110 correspond to sensor data generated by one or more sensors of FIG. 15B.

Figure 15C:
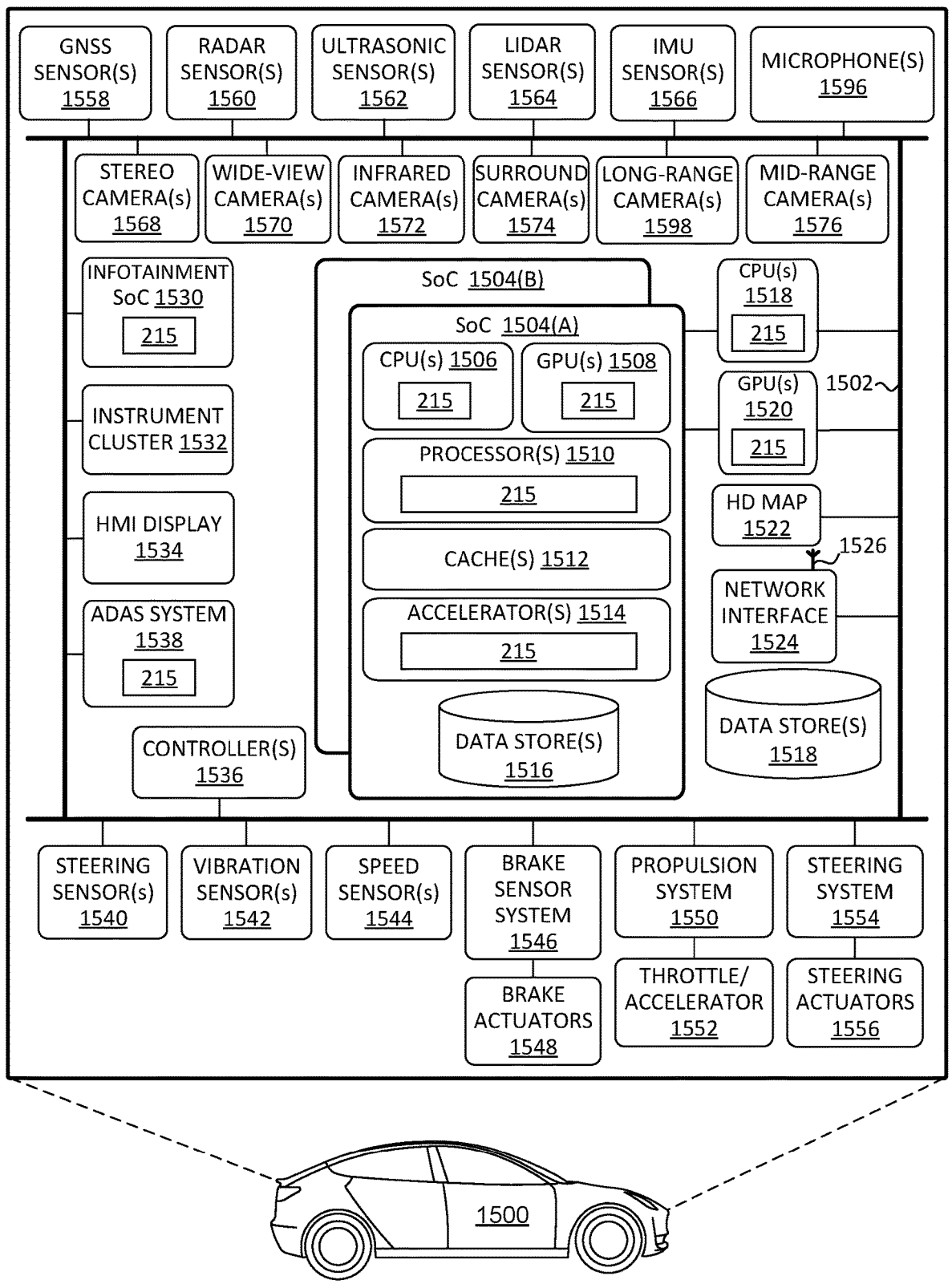
FIG. 15C is a block diagram illustrating an example system architecture for the autonomous vehicle of FIG. 15A, in at least one embodiment.

FIG. 15C is a block diagram illustrating an example system architecture for autonomous vehicle 1500 of FIG. 15A, in at least one embodiment. In at least one embodiment, each of components, features, and systems of vehicle 1500 in FIG. 15C are illustrated as being connected via a bus 1502. In at least one embodiment, bus 1502 may include, without limitation, a CAN data interface (alternatively referred to herein as a "CAN bus"). In at least one embodiment, a CAN may be a network inside vehicle 1500 used to aid in control of various features and functionality of vehicle 1500, such as actuation of brakes, acceleration, braking, steering, windshield wipers, etc. In at least one embodiment, bus 1502 may be configured to have dozens or even hundreds of nodes, each with its own unique identifier (e.g., a CAN ID). In at least one embodiment, bus 1502 may be read to find steering wheel angle, ground speed, engine revolutions per minute ("RPMs"), button positions, and/or other vehicle status indicators. In at least one embodiment, bus 1502 may be a CAN bus that is ASIL B compliant.

In at least one embodiment, in addition to, or alternatively from CAN, FlexRay and/or Ethernet may be used. In at least one embodiment, there may be any number of busses 1502, which may include, without limitation, zero or more CAN busses, zero or more FlexRay busses, zero or more Ethernet busses, and/or zero or more other types of busses using a different protocol. In at least one embodiment, two or more busses 1502 may be used to perform different functions, and/or may be used for redundancy. For example, a first bus 1502 may be used for collision avoidance functionality and a second bus 1502 may be used for actuation control. In at least one embodiment, each bus 1502 may communicate with any of components of vehicle 1500, and two or more busses 1502 may communicate with same components. In at least one embodiment, each of any number of system(s) on chip(s) ("SoC(s)") 1504, each of controller(s) 1536, and/or each computer within vehicle may have access to same input data (e.g., inputs from sensors of vehicle 1500), and may be connected to a common bus, such CAN bus.

In at least one embodiment, vehicle 1500 may include one or more controller(s) 1536, such as those described herein with respect to FIG. 15A. Controller 1536 may be used for a variety of functions. In at least one embodiment, controller(s) 1536 may be coupled to any of various other components and systems of vehicle 1500, and may be used for control of vehicle 1500, artificial intelligence of vehicle 1500, infotainment for vehicle 1500, and/or like.

In at least one embodiment, vehicle 1500 may include any number of SoCs 1504. Each of SoCs 1504 may include, without limitation, central processing units ("CPU(s)") 1506, graphics processing units ("GPU(s)") 1508, processor(s) 1510, cache(s) 1512, accelerator(s) 1514, data store(s) 1516, and/or other components and features not illustrated. In at least one embodiment, SoC(s) 1504 may be used to control vehicle 1500 in a variety of platforms and systems. For example, in at least one embodiment, SoC(s) 1504 may be combined in a system (e.g., system of vehicle 1500) with a High Definition ("HD") map 1522 which may obtain map refreshes and/or updates via network interface 1524 from one or more servers (not shown in FIG. 15C).

In at least one embodiment, CPU(s) 1506 may include a CPU cluster or CPU complex (alternatively referred to herein as a "CCPLEX"). In at least one embodiment, CPU(s) 1506 may include multiple cores and/or level two ("L2") caches. For instance, in at least one embodiment, CPU(s) 1506 may include eight cores in a coherent multi-processor configuration. In at least one embodiment, CPU(s) 1506 may include four dual-core clusters where each cluster has a dedicated L2 cache (e.g., a 2 MB L2 cache). In at least one embodiment, CPU(s) 1506 (e.g., CCPLEX) may be configured to support simultaneous cluster operation enabling any combination of clusters of CPU(s) 1506 to be active at any given time.

In at least one embodiment, one or more of CPU(s) 1506 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1506 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1508 may include an integrated GPU (alternatively referred to herein as an "iGPU"). In at least one embodiment, GPU(s) 1508 may be programmable and may be efficient for parallel workloads. In at least one embodiment, GPU(s) 1508, in at least one embodiment, may use an enhanced tensor instruction set. In on embodiment, GPU(s) 1508 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1508 may include at least eight streaming microprocessors. In at least one embodiment, GPU(s) 1508 may use compute application programming interface(s) (API(s)). In at least one embodiment, GPU(s) 1508 may use one or more parallel computing platforms and/or programming models (e.g., NVIDIA's CUDA).

In at least one embodiment, one or more of GPU(s) 1508 may be power-optimized for best performance in automotive and embedded use cases. For example, in on embodiment, GPU(s) 1508 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1508 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1508 may include unified memory technology. In at least one embodiment, address translation services ("ATS") support may be used to allow GPU(s) 1508 to access CPU(s) 1506 page tables directly. In at least one embodiment, embodiment, when GPU(s) 1508 memory management unit ("MMU") experiences a miss, an address translation request may be transmitted to CPU(s) 1506. In response, CPU(s) 1506 may look in its page tables for virtual-to-physical mapping for address and transmits translation back to GPU(s) 1508, in at least one embodiment. In at least one embodiment, unified memory technology may allow a single unified virtual address space for memory of both CPU(s) 1506 and GPU(s) 1508, thereby simplifying GPU(s) 1508 programming and porting of applications to GPU(s) 1508.

In at least one embodiment, GPU(s) 1508 may include any number of access counters that may keep track of frequency of access of GPU(s) 1508 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1504 may include any number of cache(s) 1512, including those described herein. For example, in at least one embodiment, cache(s) 1512 could include a level three ("L3") cache that is available to both CPU(s) 1506 and GPU(s) 1508 (e.g., that is connected both CPU(s) 1506 and GPU(s) 1508). In at least one embodiment, cache(s) 1512 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1504 may include one or more accelerator(s) 1514 (e.g., hardware accelerators, software accelerators, or a combination thereof). In at least one embodiment, SoC(s) 1504 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1508 and to off-load some of tasks of GPU(s) 1508 (e.g., to free up more cycles of GPU(s) 1508 for performing other tasks). In at least one embodiment, accelerator(s) 1514 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1514 (e.g., hardware acceleration cluster) may include a deep learning accelerator(s) ("DLA"). DLA(s) may include, without limitation, one or more Tensor processing units ("TPU") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1596; a CNN for facial recognition and vehicle owner identification using data from camera sensors; and/or a CNN for security and/or safety related events.

In at least one embodiment, DLA(s) may perform any function of GPU(s) 1508, and by using an inference accelerator, for example, a designer may target either DLA(s) or GPU(s) 1508 for any function. For example, in at least one embodiment, designer may focus processing of CNNs and floating point operations on DLA(s) and leave other functions to GPU(s) 1508 and/or other accelerator(s) 1514.

In at least one embodiment, accelerator(s) 1514 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1538, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1506. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), or very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1514 (e.g., hardware acceleration cluster) may include a computer vision network on-chip and static random-access memory ("SRAM"), for providing a high-bandwidth, low latency SRAM for accelerator(s) 1514. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1504 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1514 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1500, PVAs are designed to run classic computer vision algorithms, as they are efficient at object detection and operating on integer math.

For example, in at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1566 that correlates with vehicle 1500 orientation, distance, 3D location estimates of object obtained from neural network and/or other sensors (e.g., LIDAR sensor(s) 1564 or RADAR sensor(s) 1560), among others.

In at least one embodiment, one or more of SoC(s) 1504 may include data store(s) 1516 (e.g., memory). In at least one embodiment, data store(s) 1516 may be on-chip memory of SoC(s) 1504, which may store neural networks to be executed on GPU(s) 1508 and/or DLA. In at least one embodiment, data store(s) 1516 may be large enough in capacity to store multiple instances of neural networks for redundancy and safety. In at least one embodiment, data store(s) 1512 may comprise L2 or L3 cache(s).

In at least one embodiment, one or more of SoC(s) 1504 may include any number of processor(s) 1510 (e.g., embedded processors). Processor 1510 may include a boot and power management processor that may be a dedicated processor and subsystem to handle boot power and management functions and related security enforcement. In at least one embodiment, boot and power management processor may be a part of SoC(s) 1504 boot sequence and may provide runtime power management services. In at least one embodiment, boot power and management processor may provide clock and voltage programming, assistance in system low power state transitions, management of SoC(s) 1504 thermals and temperature sensors, and/or management of SoC(s) 1504 power states. In at least one embodiment, each temperature sensor may be implemented as a ring-oscillator whose output frequency is proportional to temperature, and SoC(s) 1504 may use ring-oscillators to detect temperatures of CPU(s) 1506, GPU(s) 1508, and/or accelerator(s) 1514. In at least one embodiment, if temperatures are determined to exceed a threshold, then boot and power management processor may enter a temperature fault routine and put SoC(s) 1504 into a lower power state and/or put vehicle 1500 into a chauffeur to safe stop mode (e.g., bring vehicle 1500 to a safe stop).

In at least one embodiment, processor(s) 1510 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1510 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1510 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1510 may further include a real-time camera engine that may include, without limitation, a dedicated processor subsystem for handling real-time camera management. In at least one embodiment, processor(s) 1510 may further include a high-dynamic range signal processor that may include, without limitation, an image signal processor that is a hardware engine that is part of camera processing pipeline.

In at least one embodiment, processor(s) 1510 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1570, surround camera(s) 1574, and/or on in-cabin monitoring camera sensor(s). In at least one embodiment, in-cabin monitoring camera sensor(s) are monitored by a neural network running on another instance of SoC 1504, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1508 are not required to continuously render new surfaces. In at least one embodiment, when GPU(s) 1508 are powered on and active doing 3D rendering, video image compositor may be used to offload GPU(s) 1508 to improve performance and responsiveness.

In at least one embodiment, one or more of SoC(s) 1504 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1504 may further include an input/output controller(s) that may be controlled by software and may be used for receiving I/O signals that are uncommitted to a specific role.

In at least one embodiment, one or more of SoC(s) 1504 may further include a broad range of peripheral interfaces to enable communication with peripherals, audio encoders/decoders ("codecs"), power management, and/or other devices. SoC(s) 1504 may be used to process data from cameras (e.g., connected over Gigabit Multimedia Serial Link and Ethernet), sensors (e.g., LIDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus), etc. In at least one embodiment, one or more of SoC(s) 1504 may further include dedicated high-performance mass storage controllers that may include their own DMA engines, and that may be used to free CPU(s) 1506 from routine data management tasks.

In at least one embodiment, SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1504 may be faster, more reliable, and even more energy-efficient and space-efficient than other systems. For example, in at least one embodiment, accelerator(s) 1514, when combined with CPU(s) 1506, GPU(s) 1508, and data store(s) 1516, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1520) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1508.

In at least one embodiment, a CNN for facial recognition and vehicle owner identification may use data from camera sensors to identify presence of an authorized driver and/or owner of vehicle 1500. In at least one embodiment, an always on sensor processing engine may be used to unlock vehicle when owner approaches driver door and turn on lights, and, in security mode, to disable vehicle when owner leaves vehicle. In this way, SoC(s) 1504 provide for security against theft and/or carjacking.

In at least one embodiment, a CNN for emergency vehicle detection and identification may use data from microphones 1596 to detect and identify emergency vehicle sirens. In at least one embodiment, SoC(s) 1504 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1558. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1562, until emergency vehicle(s) passes.

In at least one embodiment, vehicle 1500 may include CPU(s) 1518 (e.g., discrete CPU(s), or dCPU(s)), that may be coupled to SoC(s) 1504 via a high-speed interconnect (e.g., PCIe). In at least one embodiment, CPU(s) 1518 may include an X86 processor, for example. CPU(s) 1518 may be used to perform any of a variety of functions, including arbitrating potentially inconsistent results between ADAS sensors and SoC(s) 1504, and/or monitoring status and health of controller(s) 1536 and/or an infotainment system on a chip ("infotainment SoC") 1530, for example.

In at least one embodiment, vehicle 1500 may include GPU(s) 1520 (e.g., discrete GPU(s), or dGPU(s)), that may be coupled to SoC(s) 1504 via a high-speed interconnect (e.g., NVIDIA's NVLINK). In at least one embodiment, GPU(s) 1520 may provide additional artificial intelligence functionality, such as by executing redundant and/or different neural networks, and may be used to train and/or update neural networks based at least in part on input (e.g., sensor data) from sensors of vehicle 1500.

In at least one embodiment, vehicle 1500 may further include network interface 1524 which may include, without limitation, wireless antenna(s) 1526 (e.g., one or more wireless antennas 1526 for different communication protocols, such as a cellular antenna, a Bluetooth antenna, etc.). In at least one embodiment, network interface 1524 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 1500 and other vehicles and/or an indirect link may be established (e.g., across networks and over Internet). In at least one embodiment, direct links may be provided using a vehicle-to-vehicle communication link. Vehicle-to-vehicle communication link may provide vehicle 1500 information about vehicles in proximity to vehicle 1500 (e.g., vehicles in front of, on side of, and/or behind vehicle 1500). In at least one embodiment, aforementioned functionality may be part of a cooperative adaptive cruise control functionality of vehicle 1500.

In at least one embodiment, network interface 1524 may include an SoC that provides modulation and demodulation functionality and enables controller(s) 1536 to communicate over wireless networks. In at least one embodiment, network interface 1524 may include a radio frequency front-end for up-conversion from baseband to radio frequency, and down conversion from radio frequency to baseband. In at least one embodiment, frequency conversions may be performed in any technically feasible fashion. For example, frequency conversions could be performed through various processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1500 may further include data store(s) 1528 which may include, without limitation, off-chip (e.g., off SoC(s) 1504) storage. In at least one embodiment, data store(s) 1528 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1500 may further include GNSS sensor(s) 1558 (e.g., GPS and/or assisted GPS sensors), to assist in mapping, perception, occupancy grid generation, and/or path planning functions. In at least one embodiment, any number of GNSS sensor(s) 1558 may be used, including, for example and without limitation, a GPS using a USB connector with an Ethernet to Serial (e.g., RS-232) bridge.

In at least one embodiment, vehicle 1500 may further include RADAR sensor(s) 1560. RADAR sensor(s) 1560 may be used by vehicle 1500 for long-range vehicle detection, even in darkness and/or severe weather conditions. In at least one embodiment, RADAR functional safety levels may be ASIL B. RADAR sensor(s) 1560 may use CAN and/or bus 1502 (e.g., to transmit data generated by RADAR sensor(s) 1560) for control and to access object tracking data, with access to Ethernet to access raw data in some examples. In at least one embodiment, wide variety of RADAR sensor types may be used. For example, and without limitation, RADAR sensor(s) 1560 may be suitable for front, rear, and side RADAR use. In at least one embodiment, one or more of RADAR sensors(s) 1560 are Pulse Doppler RADAR sensor(s).

In at least one embodiment, RADAR sensor(s) 1560 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1560 may help in distinguishing between static and moving objects, and may be used by ADAS system 1538 for emergency brake assist and forward collision warning. Sensors 1560(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1500 surroundings at higher speeds with minimal interference from traffic in adjacent lanes. In at least one embodiment, other two antennae may expand field of view, making it possible to quickly detect vehicles entering or leaving vehicle's 1500 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1560 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1538 for blind spot detection and/or lane change assist.

In at least one embodiment, vehicle 1500 may further include ultrasonic sensor(s) 1562. Ultrasonic sensor(s) 1562, which may be positioned at front, back, and/or sides of vehicle 1500, may be used for park assist and/or to create and update an occupancy grid. In at least one embodiment, a wide variety of ultrasonic sensor(s) 1562 may be used, and different ultrasonic sensor(s) 1562 may be used for different ranges of detection (e.g., 2.5 m, 4 m). In at least one embodiment, ultrasonic sensor(s) 1562 may operate at functional safety levels of ASIL B.

In at least one embodiment, vehicle 1500 may include LIDAR sensor(s) 1564. LIDAR sensor(s) 1564 may be used for object and pedestrian detection, emergency braking, collision avoidance, and/or other functions. In at least one embodiment, LIDAR sensor(s) 1564 may be functional safety level ASIL B. In at least one embodiment, vehicle 1500 may include multiple LIDAR sensors 1564 (e.g., two, four, six, etc.) that may use Ethernet (e.g., to provide data to a Gigabit Ethernet switch).

In at least one embodiment, LIDAR sensor(s) 1564 may be capable of providing a list of objects and their distances for a 360-degree field of view. In at least one embodiment, commercially available LIDAR sensor(s) 1564 may have an advertised range of approximately 100 m, with an accuracy of 2 cm-3 cm, and with support for a 100 Mbps Ethernet connection, for example. In at least one embodiment, one or more non-protruding LIDAR sensors 1564 may be used. In such an embodiment, LIDAR sensor(s) 1564 may be implemented as a small device that may be embedded into front, rear, sides, and/or corners of vehicle 1500. In at least one embodiment, LIDAR sensor(s) 1564, in such an embodiment, may provide up to a 120-degree horizontal and 35-degree vertical field-of-view, with a 200 m range even for low-reflectivity objects. In at least one embodiment, front-mounted LIDAR sensor(s) 1564 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1500 up to approximately 200 m. In at least one embodiment, a flash LIDAR unit includes, without limitation, a receptor, which records laser pulse transit time and reflected light on each pixel, which in turn corresponds to range from vehicle 1500 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1500. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 1566. In at least one embodiment, IMU sensor(s) 1566 may be located at a center of rear axle of vehicle 1500, in at least one embodiment. In at least one embodiment, IMU sensor(s) 1566 may include, for example and without limitation, accelerometer(s), magnetometer(s), gyroscope(s), magnetic compass(es), and/or other sensor types. In at least one embodiment, such as in six-axis applications, IMU sensor(s) 1566 may include, without limitation, accelerometers and gyroscopes. In at least one embodiment, such as in nine-axis applications, IMU sensor(s) 1566 may include, without limitation, accelerometers, gyroscopes, and magnetometers.

In at least one embodiment, IMU sensor(s) 1566 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1566 may enable vehicle 1500 to estimate heading without requiring input from a magnetic sensor by directly observing and correlating changes in velocity from GPS to IMU sensor(s) 1566. In at least one embodiment, IMU sensor(s) 1566 and GNSS sensor(s) 1558 may be combined in a single integrated unit.

In at least one embodiment, vehicle 1500 may include microphone(s) 1596 placed in and/or around vehicle 1500. In at least one embodiment, microphone(s) 1596 may be used for emergency vehicle detection and identification, among other things.

In at least one embodiment, vehicle 1500 may further include any number of camera types, including stereo camera(s) 1568, wide-view camera(s) 1570, infrared camera(s) 1572, surround camera(s) 1574, long-range camera(s) 1598, mid-range camera(s) 1576, and/or other camera types. In at least one embodiment, cameras may be used to capture image data around an entire periphery of vehicle 1500. In at least one embodiment, types of cameras used depends vehicle 1500. In at least one embodiment, any combination of camera types may be used to provide necessary coverage around vehicle 1500. In at least one embodiment, number of cameras may differ depending on embodiment. For example, in at least one embodiment, vehicle 1500 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 15A and FIG. 15B.

In at least one embodiment, vehicle 1500 may further include vibration sensor(s) 1542. Vibration sensor(s) 1542 may measure vibrations of components of vehicle 1500, such as axle(s). For example, in at least one embodiment, changes in vibrations may indicate a change in road surfaces. In at least one embodiment, when two or more vibration sensors 1542 are used, differences between vibrations may be used to determine friction or slippage of road surface (e.g., when difference in vibration is between a power-driven axle and a freely rotating axle).

In at least one embodiment, vehicle 1500 may include ADAS system 1538. ADAS system 1538 may include, without limitation, an SoC, in some examples. In at least one embodiment, ADAS system 1538 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1560, LIDAR sensor(s) 1564, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1500 and automatically adjust speed of vehicle 1500 to maintain a safe distance from vehicles ahead. In at least one embodiment, lateral ACC system performs distance keeping, and advises vehicle 1500 to change lanes when necessary. In at least one embodiment, lateral ACC is related to other ADAS applications such as LC and CW.

In at least one embodiment, CACC system uses information from other vehicles that may be received via network interface 1524 and/or wireless antenna(s) 1526 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1500), while I2V communication concept provides information about traffic further ahead. In at least one embodiment, CACC system may include either or both I2V and V2V information sources. In at least one embodiment, given information of vehicles ahead of vehicle 1500, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1560, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1560, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1500 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1500 if vehicle 1500 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1500 is backing up. In at least one embodiment, RCTW system includes AEB system to ensure that vehicle brakes are applied to avoid a crash. In at least one embodiment, RCTW system may use one or more rear-facing RADAR sensor(s) 1560, coupled to a dedicated processor, DSP, FPGA, and/or ASIC, that is electrically coupled to driver feedback, such as a display, speaker, and/or vibrating component.

In at least one embodiment, other ADAS systems may be prone to false positive results which may be annoying and distracting to a driver, but typically are not catastrophic, because other ADAS systems alert driver and allow driver to decide whether a safety condition truly exists and act accordingly. In at least one embodiment, vehicle 1500 itself decides, in case of conflicting results, whether to heed result from a primary computer or a secondary computer (e.g., first controller 1536 or second controller 1536). For example, in at least one embodiment, ADAS system 1538 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1538 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1504.

In at least one embodiment, ADAS system 1538 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1538 may be fed into primary computer's perception block and/or primary computer's dynamic driving task block. For example, in at least one embodiment, if ADAS system 1538 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1500 may further include infotainment SoC 1530 (e.g., an in-vehicle infotainment system (IVI)). Although illustrated and described as an SoC, infotainment system 1530, in at least one embodiment, may not be an SoC, and may include, without limitation, two or more discrete components. In at least one embodiment, infotainment SoC 1530 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1500. For example, infotainment SoC 1530 could include radios, disk players, navigation systems, video players, USB and Bluetooth connectivity, carputers, in-car entertainment, WiFi, steering wheel audio controls, hands free voice control, a heads-up display ("HUD"), HMI display 1534, a telematics device, a control panel (e.g., for controlling and/or interacting with various components, features, and/or systems), and/or other components. In at least one embodiment, infotainment SoC 1530 may further be used to provide information (e.g., visual and/or audible) to user(s) of vehicle, such as information from ADAS system 1538, autonomous driving information such as planned vehicle maneuvers, trajectories, surrounding environment information (e.g., intersection information, vehicle information, road information, etc.), and/or other information.

In at least one embodiment, infotainment SoC 1530 may include any amount and type of GPU functionality. In at least one embodiment, infotainment SoC 1530 may communicate over bus 1502 (e.g., CAN bus, Ethernet, etc.) with other devices, systems, and/or components of vehicle 1500. In at least one embodiment, infotainment SoC 1530 may be coupled to a supervisory MCU such that GPU of infotainment system may perform some self-driving functions in event that primary controller(s) 1536 (e.g., primary and/or backup computers of vehicle 1500) fail. In at least one embodiment, infotainment SoC 1530 may put vehicle 1500 into a chauffeur to safe stop mode, as described herein.

In at least one embodiment, vehicle 1500 may further include instrument cluster 1532 (e.g., a digital dash, an electronic instrument cluster, a digital instrument panel, etc.). Instrument cluster 1532 may include, without limitation, a controller and/or supercomputer (e.g., a discrete controller or supercomputer). In at least one embodiment, instrument cluster 1532 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1530 and instrument cluster 1532. In at least one embodiment, instrument cluster 1532 may be included as part of infotainment SoC 1530, or vice versa.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 15C for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more of SoC(B) and/or SoC(A) of FIG. 12C.

Figure 15D:
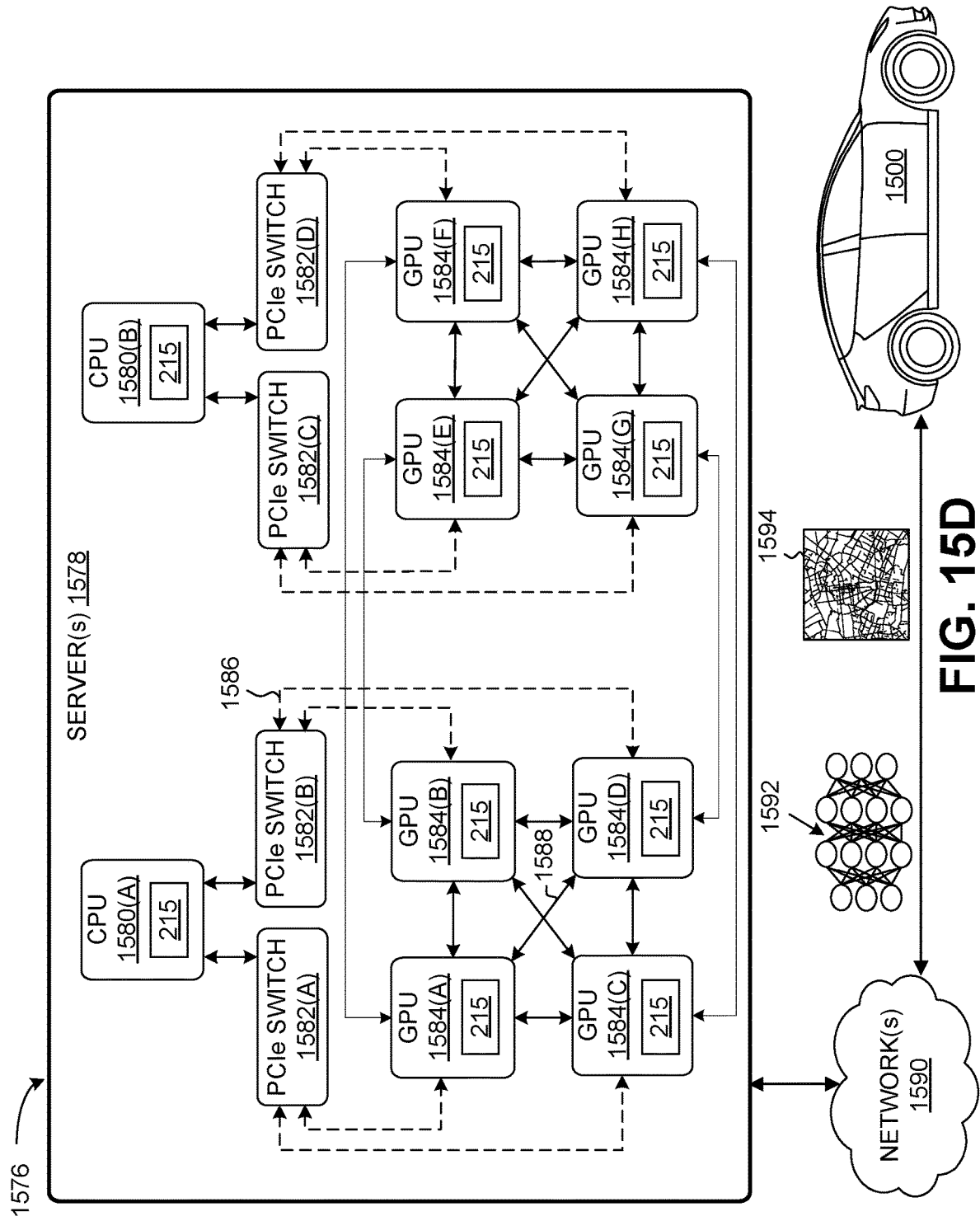
FIG. 15D is a diagram illustrating a system for communication between cloud-based server(s) and the autonomous vehicle of FIG. 15A, in at least one embodiment.

FIG. 15D is a diagram of a system 1576 for communication between cloud-based server(s) and autonomous vehicle 1500 of FIG. 15A, in at least one embodiment. In at least one embodiment, system 1576 may include, without limitation, server(s) 1578, network(s) 1590, and any number and type of vehicles, including vehicle 1500. Server(s) 1578 may include, without limitation, a plurality of GPUs 1584(A)-1584(H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). GPUs 1584, CPUs 1580, and PCIe switches 1582 may be interconnected with high-speed interconnects such as, for example and without limitation, NVLink interfaces 1588 developed by NVIDIA and/or PCIe connections 1586. In at least one embodiment, GPUs 1584 are connected via an NVLink and/or NVSwitch SoC and GPUs 1584 and PCIe switches 1582 are connected via PCIe interconnects. In at least one embodiment, although eight GPUs 1584, two CPUs 1580, and four PCIe switches 1582 are illustrated, this is not intended to be limiting. In at least one embodiment, each of server(s) 1578 may include, without limitation, any number of GPUs 1584, CPUs 1580, and/or PCIe switches 1582, in any combination. For example, in at least one embodiment, server(s) 1578 could each include eight, sixteen, thirty-two, and/or more GPUs 1584.

In at least one embodiment, server(s) 1578 may receive, over network(s) 1590 and from vehicles, image data representative of images showing unexpected or changed road conditions, such as recently commenced road-work. In at least one embodiment, server(s) 1578 may transmit, over network(s) 1590 and to vehicles, neural networks 1592, updated neural networks 1592, and/or map information 1594, including, without limitation, information regarding traffic and road conditions. In at least one embodiment, updates to map information 1594 may include, without limitation, updates for HD map 1522, such as information regarding construction sites, potholes, detours, flooding, and/or other obstructions. In at least one embodiment, neural networks 1592, updated neural networks 1592, and/or map information 1594 may have resulted from new training and/or experiences represented in data received from any number of vehicles in environment, and/or based at least in part on training performed at a data center (e.g., using server(s) 1578 and/or other servers).

In at least one embodiment, server(s) 1578 may be used to train machine learning models (e.g., neural networks) based at least in part on training data. Training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1590, and/or machine learning models may be used by server(s) 1578 to remotely monitor vehicles.

In at least one embodiment, server(s) 1578 may receive data from vehicles and apply data to up-to-date real-time neural networks for real-time intelligent inferencing. In at least one embodiment, server(s) 1578 may include deep-learning supercomputers and/or dedicated AI computers powered by GPU(s) 1584, such as a DGX and DGX Station machines developed by NVIDIA. However, in at least one embodiment, server(s) 1578 may include deep learning infrastructure that use CPU-powered data centers.

In at least one embodiment, deep-learning infrastructure of server(s) 1578 may be capable of fast, real-time inferencing, and may use that capability to evaluate and verify health of processors, software, and/or associated hardware in vehicle 1500. For example, in at least one embodiment, deep-learning infrastructure may receive periodic updates from vehicle 1500, such as a sequence of images and/or objects that vehicle 1500 has located in that sequence of images (e.g., via computer vision and/or other machine learning object classification techniques). In at least one embodiment, deep-learning infrastructure may run its own neural network to identify objects and compare them with objects identified by vehicle 1500 and, if results do not match and deep-learning infrastructure concludes that AI in vehicle 1500 is malfunctioning, then server(s) 1578 may transmit a signal to vehicle 1500 instructing a fail-safe computer of vehicle 1500 to assume control, notify passengers, and complete a safe parking maneuver.

In at least one embodiment, server(s) 1578 may include GPU(s) 1584 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 215 are used to perform one or more embodiments. Details regarding hardware structure(s) 215 are provided in conjunction with FIGS. 2A and/or 2B.

Computer Systems

FIG. 16A is a block diagram illustrating an exemplary computer system, which may be a system with interconnected devices and components, a system-on-a-chip (SOC) or some combination thereof 1600 formed with a processor that may include execution units to execute an instruction, in at least one embodiment. In at least one embodiment, computer system 1600 may include, without limitation, a component, such as a processor 1602 to employ execution units including logic to perform algorithms for process data, in accordance with present disclosure, such as in embodiment described herein. In at least one embodiment, computer system 1600 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1600 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in at least one embodiment.

In at least one embodiment, computer system 1600 may include, without limitation, processor 1602 that may include, without limitation, one or more execution units 1608 to perform machine learning model training and/or inferencing according to techniques described herein. In at least one embodiment, system 16A is a single processor desktop or server system, but in another embodiment system 16A may be a multiprocessor system. In at least one embodiment, processor 1602 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1602 may be coupled to a processor bus 1610 that may transmit data signals between processor 1602 and other components in computer system 1600.

In at least one embodiment, processor 1602 may include, without limitation, a Level 1 ("L1") internal cache memory ("cache") 1604. In at least one embodiment, processor 1602 may have a single internal cache or multiple levels of internal cache. In at least one embodiment, cache memory may reside external to processor 1602. Other embodiments may also include a combination of both internal and external caches depending on particular implementation and needs. In at least one embodiment, register file 1606 may store different types of data in various registers including, without limitation, integer registers, floating point registers, status registers, and instruction pointer register.

In at least one embodiment, execution unit 1608, including, without limitation, logic to perform integer and floating point operations, also resides in processor 1602. Processor 1602 may also include a microcode ("ucode") read only memory ("ROM") that stores microcode for certain macro instructions. In at least one embodiment, execution unit 1608 may include logic to handle a packed instruction set 1609. In at least one embodiment, by including packed instruction set 1609 in instruction set of a general-purpose processor 1602, along with associated circuitry to execute instructions, operations used by many multimedia applications may be performed using packed data in a general-purpose processor 1602. In one or more embodiments, many multimedia applications may be accelerated and executed more efficiently by using full width of a processors data bus for performing operations on packed data, which may eliminate need to transfer smaller units of data across processors data bus to perform one or more operations one data element at a time.

In at least one embodiment, execution unit 1608 may also be used in microcontrollers, embedded processors, graphics devices, DSPs, and other types of logic circuits. In at least one embodiment, computer system 1600 may include, without limitation, a memory 1620. In at least one embodiment, memory 1620 may be implemented as a Dynamic Random Access Memory ("DRAM") device, a Static Random Access Memory ("SRAM") device, flash memory device, or other memory device. Memory 1620 may store instruction(s) 1619 and/or data 1621 represented by data signals that may be executed by processor 1602.

In at least one embodiment, system logic chip may be coupled to processor bus 1610 and memory 1620. In at least one embodiment, system logic chip may include, without limitation, a memory controller hub ("MCH") 1616, and processor 1602 may communicate with MCH 1616 via processor bus 1610. In at least one embodiment, MCH 1616 may provide a high bandwidth memory path 1618 to memory 1620 for instruction and data storage and for storage of graphics commands, data and textures. In at least one embodiment, MCH 1616 may direct data signals between processor 1602, memory 1620, and other components in computer system 1600 and to bridge data signals between processor bus 1610, memory 1620, and a system I/O 1622. In at least one embodiment, system logic chip may provide a graphics port for coupling to a graphics controller. In at least one embodiment, MCH 1616 may be coupled to memory 1620 through a high bandwidth memory path 1618 and graphics/video card 1612 may be coupled to MCH 1616 through an Accelerated Graphics Port ("AGP") interconnect 1614.

In at least one embodiment, computer system 1600 may use system I/O 1622 that is a proprietary hub interface bus to couple MCH 1616 to I/O controller hub ("ICH") 1630. In at least one embodiment, ICH 1630 may provide direct connections to some I/O devices via a local I/O bus. In at least one embodiment, local I/O bus may include, without limitation, a high-speed I/O bus for connecting peripherals to memory 1620, chipset, and processor 1602. Examples may include, without limitation, an audio controller 1629, a firmware hub ("flash BIOS") 1628, a wireless transceiver 1626, a data storage 1624, a legacy I/O controller 1623 containing user input and keyboard interfaces, a serial expansion port 1627, such as Universal Serial Bus ("USB"), and a network controller 1634. Data storage 1624 may comprise a hard disk drive, a floppy disk drive, a CD-ROM device, a flash memory device, or other mass storage device.

In at least one embodiment, FIG. 16A illustrates a system, which includes interconnected hardware devices or "chips", whereas in other embodiments, FIG. 16A may illustrate an exemplary System on a Chip ("SoC"). In at least one embodiment, devices illustrated in FIG. cc may be interconnected with proprietary interconnects, standardized interconnects (e.g., PCIe) or some combination thereof. In at least one embodiment, one or more components of system 1600 are interconnected using compute express link (CXL) interconnects.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 16A for inferencing or predicting operations based, at least in part, on weight parameters calculated using neural network training operations, neural network functions and/or architectures, or neural network use cases described herein.

Figure 16:
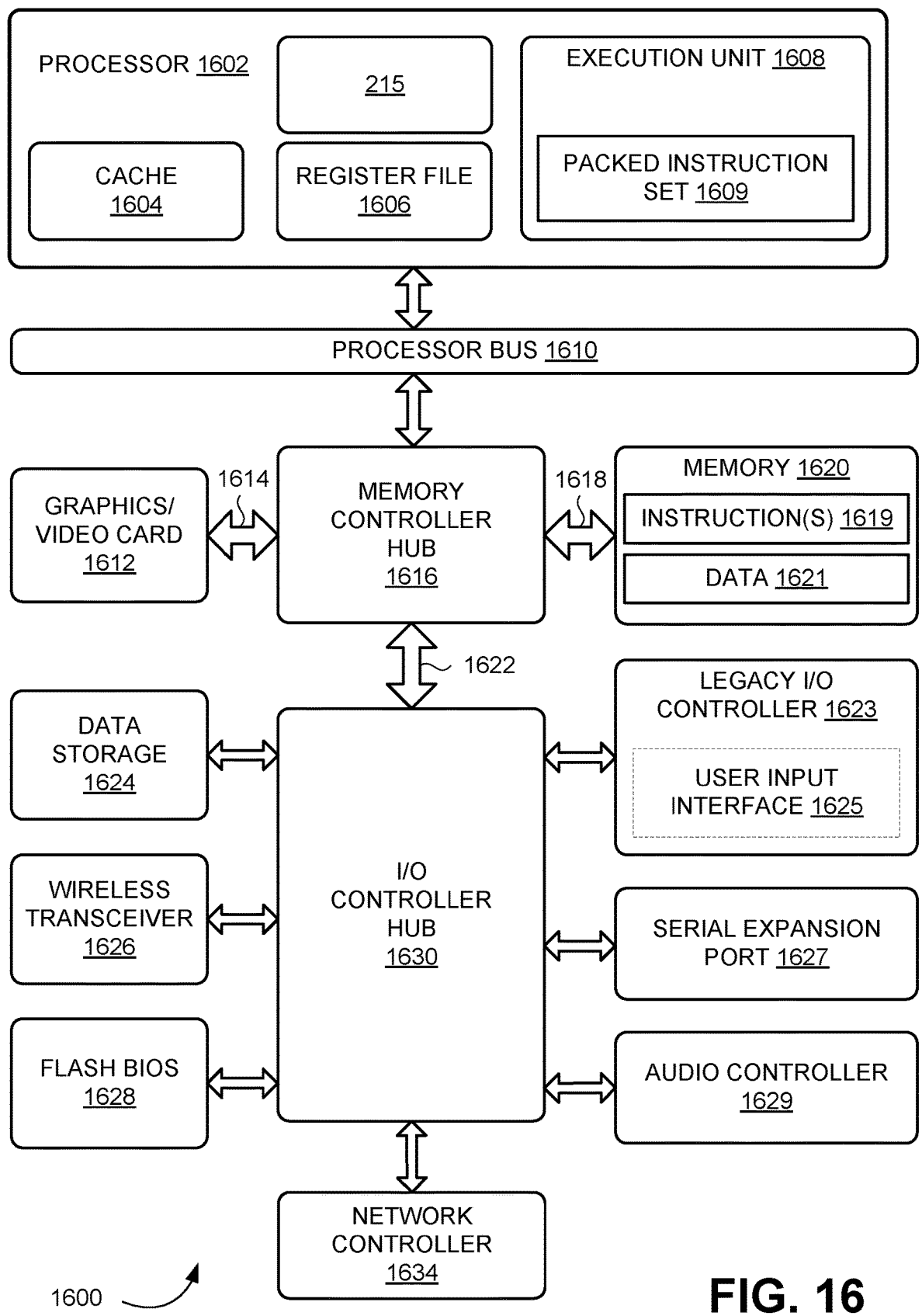
FIG. 16A is a block diagram illustrating a computer system, in at least one embodiment.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on system 1600 of FIG. 16.

Figure 17:
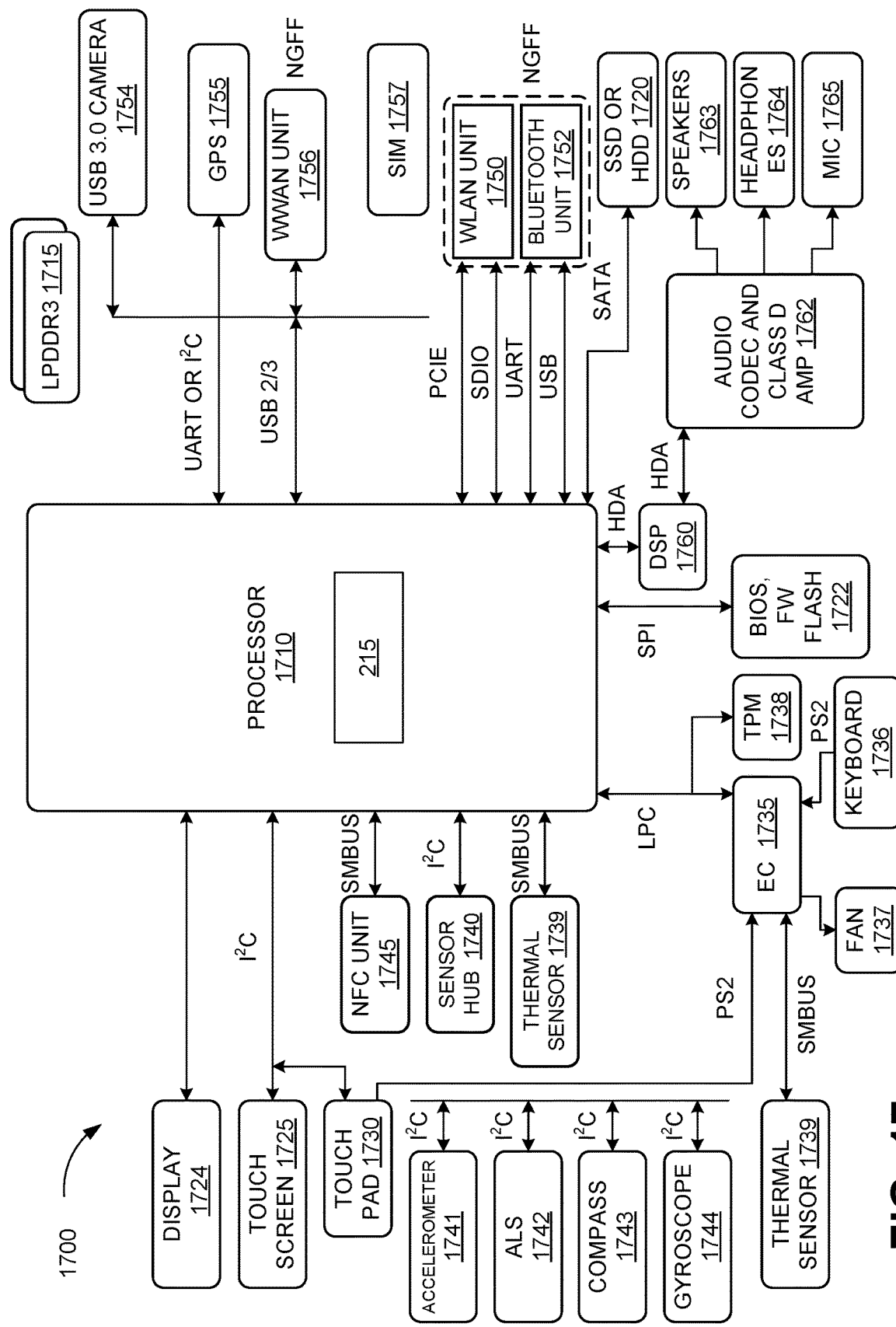
FIG. 17 is a block diagram illustrating computer system, in at least one embodiment.

FIG. 17 is a block diagram illustrating an electronic device 1700 for utilizing a processor 1710, in at least one embodiment. In at least one embodiment, electronic device 1700 may be, for example and without limitation, a notebook, a tower server, a rack server, a blade server, a laptop, a desktop, a tablet, a mobile device, a phone, an embedded computer, or any other suitable electronic device.

In at least one embodiment, system 1700 may include, without limitation, processor 1710 communicatively coupled to any suitable number or kind of components, peripherals, modules, or devices. In at least one embodiment, processor 1710 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 17 illustrates a system, which includes interconnected hardware devices or "chips", whereas in other embodiments, FIG. 17 may illustrate an exemplary System on a Chip ("SoC"). In at least one embodiment, devices illustrated in FIG. 17 may be interconnected with proprietary interconnects, standardized interconnects (e.g., PCIe) or some combination thereof. In at least one embodiment, one or more components of FIG. 17 are interconnected using compute express link (CXL) interconnects.

In at least one embodiment, FIG. 17 may include a display 1724, a touch screen 1725, a touch pad 1730, a Near Field Communications unit ("NFC") 1745, a sensor hub 1740, a thermal sensor 1746, an Express Chipset ("EC") 1735, a Trusted Platform Module ("TPM") 1738, BIOS/firmware/flash memory ("BIOS, FW Flash") 1722, a DSP 1760, a drive "SSD or HDD") 1720 such as a Solid State Disk ("SSD") or a Hard Disk Drive ("HDD"), a wireless local area network unit ("WLAN") 1750, a Bluetooth unit 1752, a Wireless Wide Area Network unit ("WWAN") 1756, a Global Positioning System (GPS) 1755, a camera ("USB 3.0 camera") 1754 such as a USB 3.0 camera, or a Low Power Double Data Rate ("LPDDR") memory unit ("LPDDR3") 1715 implemented in, for example, LPDDR3 standard. These components may each be implemented in any suitable manner.

In at least one embodiment, other components may be communicatively coupled to processor 1710 through components discussed above. In at least one embodiment, an accelerometer 1741, Ambient Light Sensor ("ALS") 1742, compass 1743, and a gyroscope 1744 may be communicatively coupled to sensor hub 1740. In at least one embodiment, thermal sensor 1739, a fan 1737, a keyboard 1746, and a touch pad 1730 may be communicatively coupled to EC 1735. In at least one embodiment, speaker 1763, a headphones 1764, and a microphone ("mic") 1765 may be communicatively coupled to an audio unit ("audio codec and class d amp") 1764, which may in turn be communicatively coupled to DSP 1760. In at least one embodiment, audio unit 1764 may include, for example and without limitation, an audio coder/decoder ("codec") and a class D amplifier. In at least one embodiment, SIM card ("SIM") 1757 may be communicatively coupled to WWAN unit 1756. In at least one embodiment, components such as WLAN unit 1750 and Bluetooth unit 1752, as well as WWAN unit 1756 may be implemented in a Next Generation Form Factor ("NGFF").

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 17 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more electronic device 1700 of FIG. 17.

Figure 18:
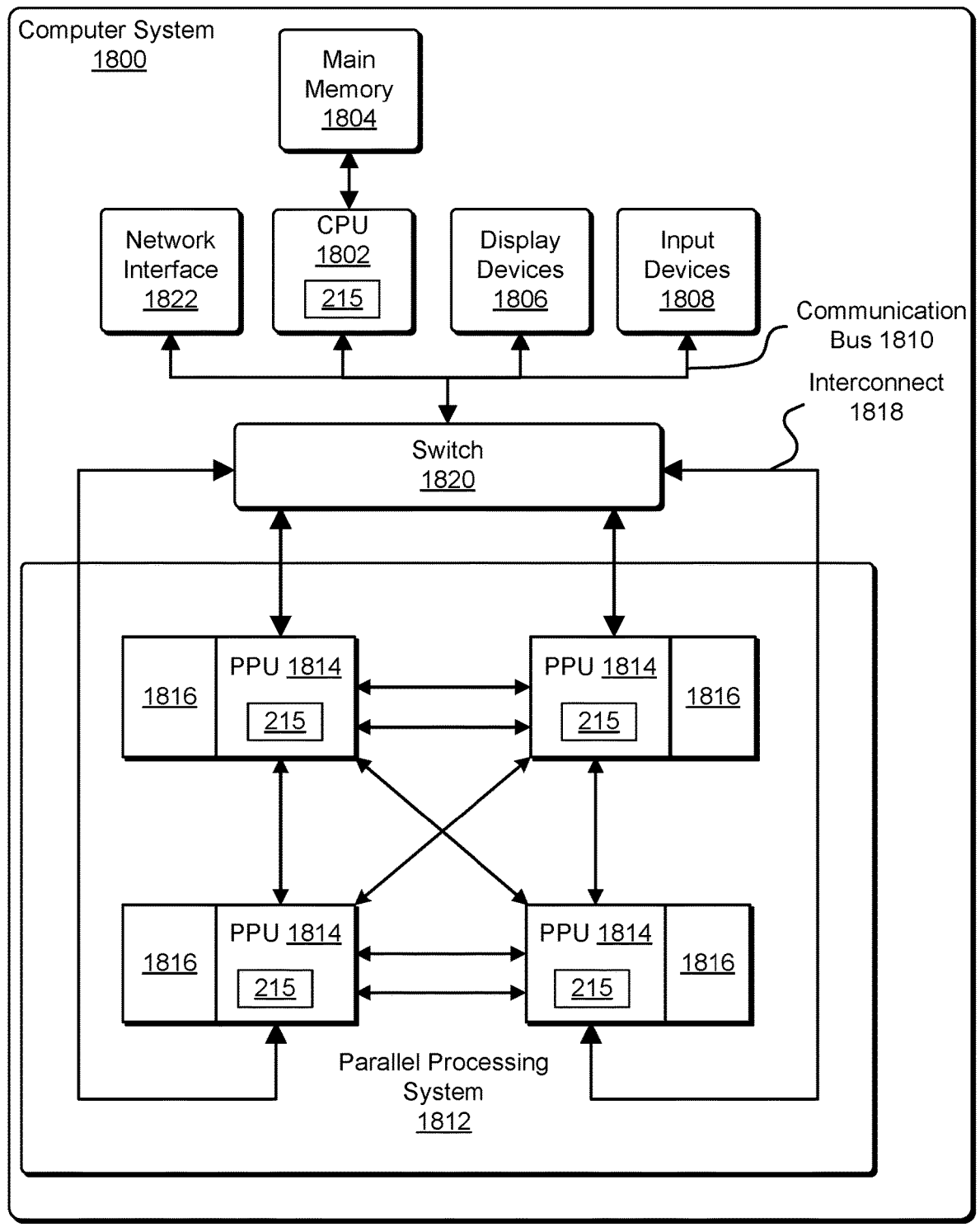
FIG. 18 illustrates a computer system, in at least one embodiment.

FIG. 18 illustrates a computer system 1800, in at least one embodiment. In at least one embodiment, computer system 1800 is configured to implement various processes and methods described throughout this disclosure.

In at least one embodiment, computer system 1800 comprises, without limitation, at least one central processing unit ("CPU") 1802 that is connected to a communication bus 1810 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1800 includes, without limitation, a main memory 1804 and control logic (e.g., implemented as hardware, software, or a combination thereof) and data are stored in main memory 1804 which may take form of random access memory ("RAM"). In at least one embodiment, a network interface subsystem ("network interface") 1822 provides an interface to other computing devices and networks for receiving data from and transmitting data to other systems from computer system 1800.

In at least one embodiment, computer system 1800, in at least one embodiment, includes, without limitation, input devices 1808, parallel processing system 1812, and display devices 1806 which can be implemented using cathode ray tube ("CRT"), liquid crystal display ("LCD"), light emitting diode ("LED"), plasma display, or other suitable display technologies. In at least one embodiment, user input is received from input devices 1808 such as keyboard, mouse, touchpad, microphone, and more. In at least one embodiment, each of foregoing modules can be situated on a single semiconductor platform to form a processing system.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 18 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more computer system 1800 of FIG. 18.

Figure 19:
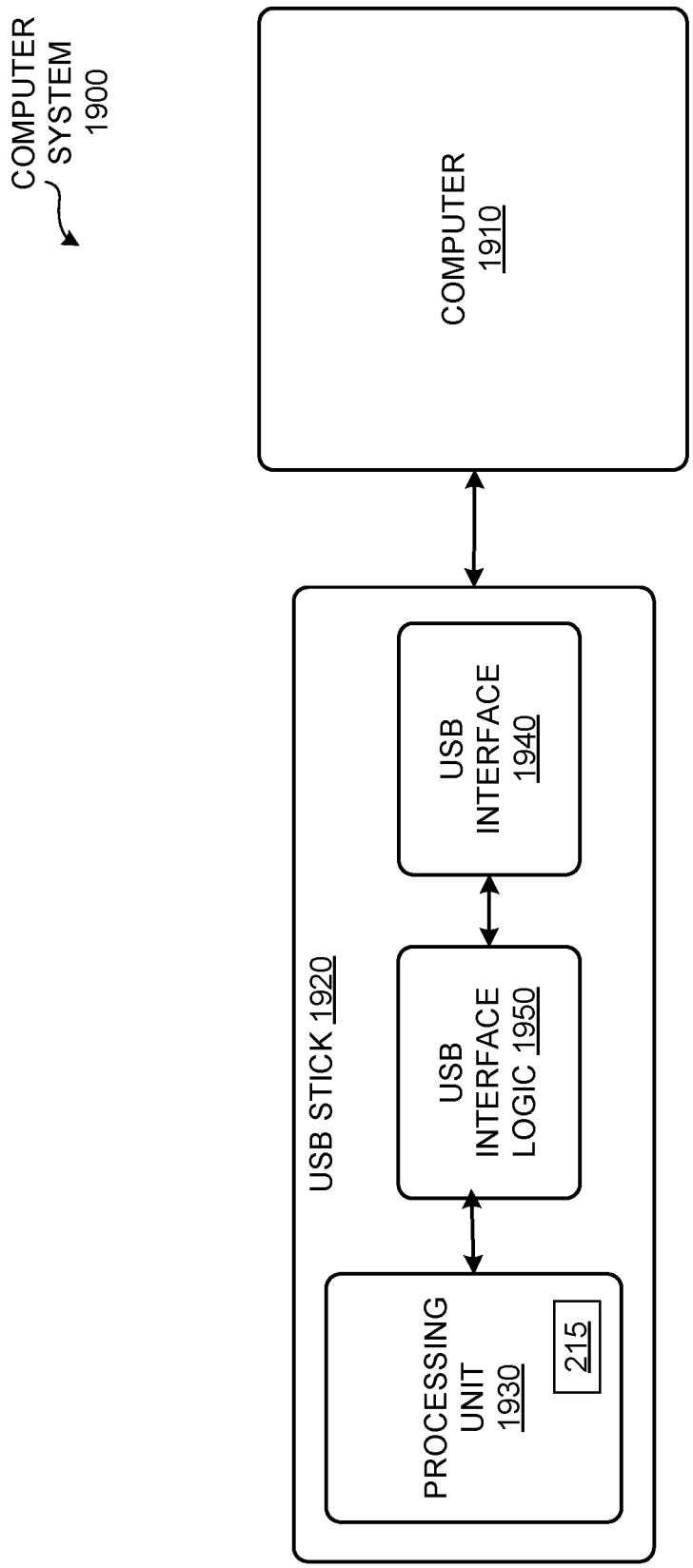
FIG. 19 illustrates a computer system, according at least one embodiment.

FIG. 19 illustrates a computer system 1900, in at least one embodiment. In at least one embodiment, computer system 1900 includes, without limitation, a computer 1910 and a USB stick 1920. In at least one embodiment, computer 1910 may include, without limitation, any number and type of processor(s) (not shown) and a memory (not shown). In at least one embodiment, computer 1910 includes, without limitation, a server, a cloud instance, a laptop, and a desktop computer.

In at least one embodiment, USB stick 1920 includes, without limitation, a processing unit 1930, a USB interface 1940, and USB interface logic 1950. In at least one embodiment, processing unit 1930 may be any instruction execution system, apparatus, or device capable of executing instructions. In at least one embodiment, processing unit 1930 may include, without limitation, any number and type of processing cores (not shown). In at least one embodiment, processing core 1930 comprises an application specific integrated circuit ("ASIC") that is optimized to perform any amount and type of operations associated with machine learning. For instance, in at least one embodiment, processing core 1930 is a tensor processing unit ("TPC") that is optimized to perform machine learning inference operations. In at least one embodiment, processing core 1930 is a vision processing unit ("VPU") that is optimized to perform machine vision and machine learning inference operations.

In at least one embodiment, USB interface 1940 may be any type of USB connector or USB socket. For instance, in at least one embodiment, USB interface 1940 is a USB 3.0 Type-C socket for data and power. In at least one embodiment, USB interface 1940 is a USB 3.0 Type-A connector. In at least one embodiment, USB interface logic 1950 may include any amount and type of logic that enables processing unit 1930 to interface with or devices (e.g., computer 1910) via USB connector 1940.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 19 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more computer system 1900 of FIG. 19.

Figure 20A:
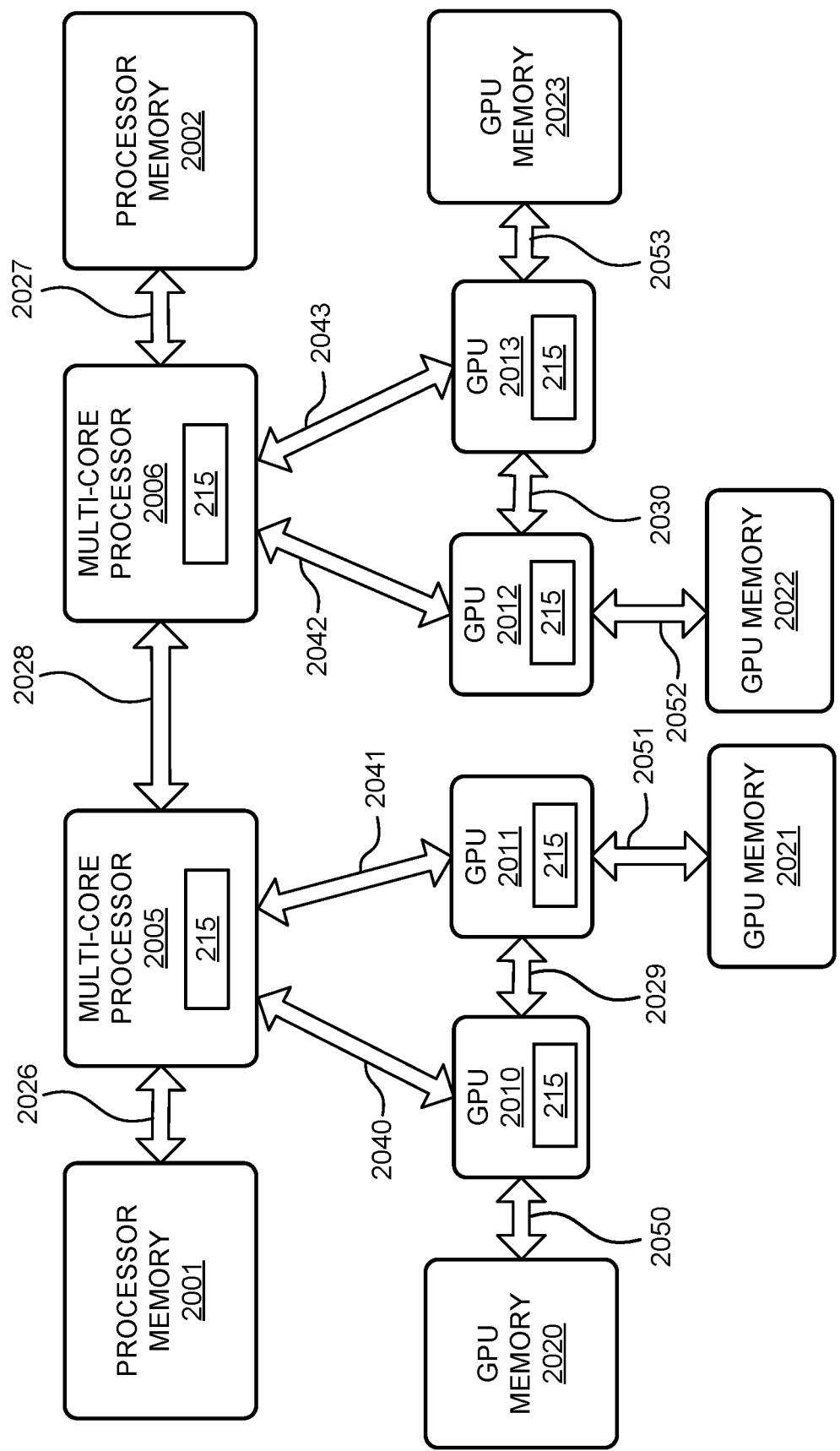
FIG. 20A illustrates a computer system, in at least one embodiment.

FIG. 20A illustrates an exemplary architecture in which a plurality of GPUs 2010-2013 is communicatively coupled to a plurality of multi-core processors 2005-2006 over high-speed links 2040-2043 (e.g., buses, point-to-point interconnects, etc.). In one embodiment, high-speed links 2040-2043 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2010-2013 are interconnected over high-speed links 2029-2030, which may be implemented using same or different protocols/links than those used for high-speed links 2040-2043. Similarly, two or more of multi-core processors 2005-2006 may be connected over high speed link 2028 which may be symmetric multi-processor (SMP) buses operating at 20 GB/s, 30 GB/s, 120 GB/s or higher. Alternatively, all communication between various system components shown in FIG. 20A may be accomplished using same protocols/links (e.g., over a common interconnection fabric).

In one embodiment, each multi-core processor 2005-2006 is communicatively coupled to a processor memory 2001-2002, via memory interconnects 2026-2027, respectively, and each GPU 2010-2013 is communicatively coupled to GPU memory 2020-2023 over GPU memory interconnects 2050-2053, respectively. Memory interconnects 2026-2027 and 2050-2053 may utilize same or different memory access technologies. By way of example, and not limitation, processor memories 2001-2002 and GPU memories 2020-2023 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2001-2002 may be volatile memory and another portion may be non-volatile memory (e.g., using a two-level memory (2LM) hierarchy).

As described below, although various processors 2005-2006 and GPUs 2010-2013 may be physically coupled to a particular memory 2001-2002, 2020-2023, respectively, a unified memory architecture may be implemented in which a same virtual system address space (also referred to as "effective address" space) is distributed among various physical memories. For example, processor memories 2001-2002 may each comprise 64 GB of system memory address space and GPU memories 2020-2023 may each comprise 32 GB of system memory address space (resulting in a total of 256 GB addressable memory in this example).

Figure 20B:
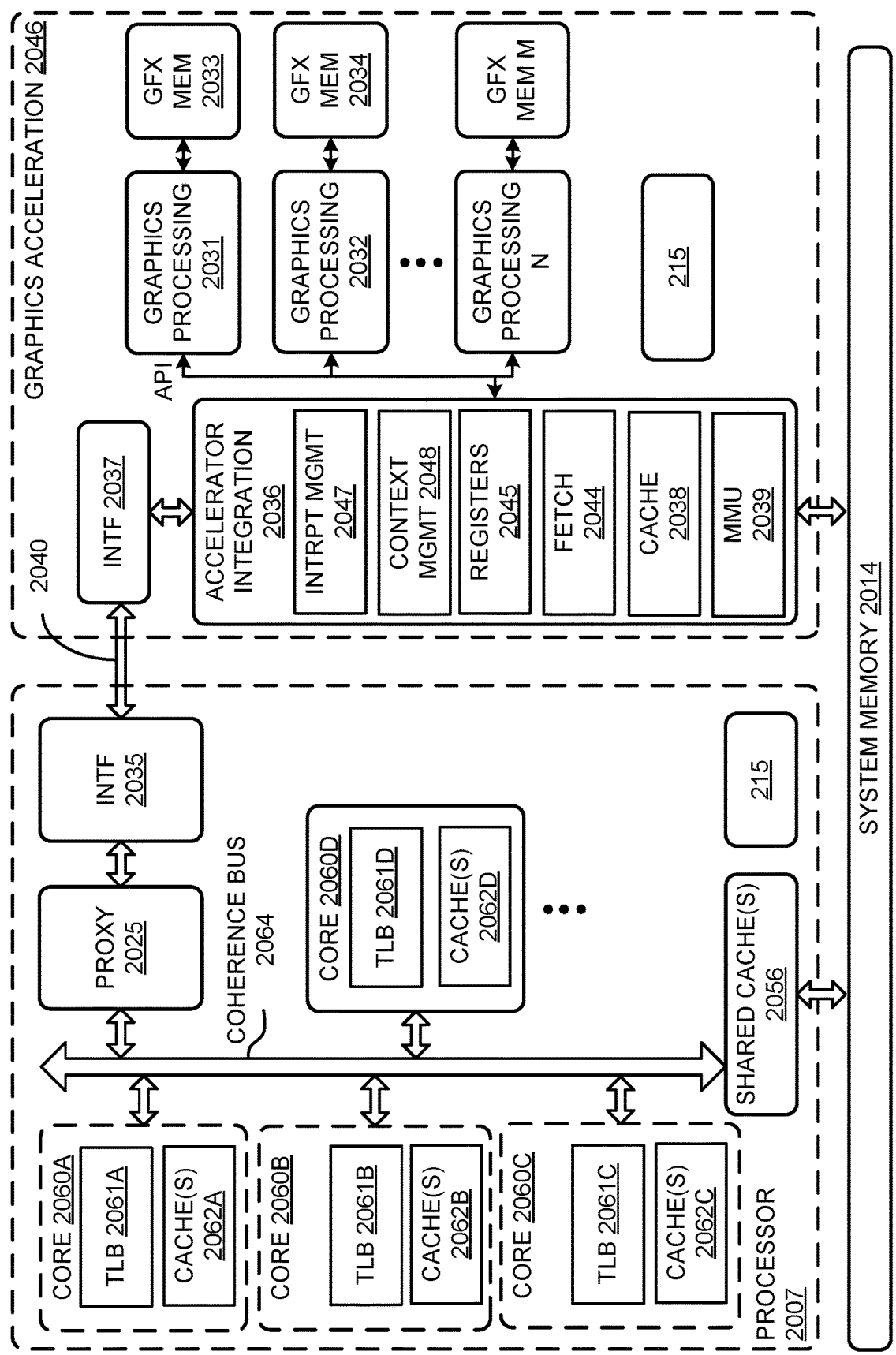
FIG. 20B illustrates a computer system, in at least one embodiment.

FIG. 20B illustrates additional details for an interconnection between a multi-core processor 2007 and a graphics acceleration module 2046 in accordance with one exemplary embodiment. Graphics acceleration module 2046 may include one or more GPU chips integrated on a line card which is coupled to processor 2007 via high-speed link 2040. Alternatively, graphics acceleration module 2046 may be integrated on a same package or chip as processor 2007.

In at least one embodiment, illustrated processor 2007 includes a plurality of cores 2060A-2060D, each with a translation lookaside buffer 2061A-2061D and one or more caches 2062A-2062D. In at least one embodiment, cores 2060A-2060D may include various other components for executing instructions and processing data which are not illustrated. Caches 2062A-2062D may comprise level 1 (L1) and level 2 (L2) caches. In addition, one or more shared caches 2056 may be included in caches 2062A-2062D and shared by sets of cores 2060A-2060D. For example, one embodiment of processor 2007 includes 24 cores, each with its own L1 cache, twelve shared L2 caches, and twelve shared L3 caches. In this embodiment, one or more L2 and L3 caches are shared by two adjacent cores. Processor 2007 and graphics acceleration module 2046 connect with system memory 2014, which may include processor memories 2001-2002 of FIG. 20A.

Coherency is maintained for data and instructions stored in various caches 2062A-2062D, 2056 and system memory 2014 via inter-core communication over a coherence bus 2064. For example, each cache may have cache coherency logic/circuitry associated therewith to communicate to over coherence bus 2064 in response to detected reads or writes to particular cache lines. In one implementation, a cache snooping protocol is implemented over coherence bus 2064 to snoop cache accesses.

In one embodiment, a proxy circuit 2025 communicatively couples graphics acceleration module 2046 to coherence bus 2064, allowing graphics acceleration module 2046 to participate in a cache coherence protocol as a peer of cores 2060A-2060D. In particular, an interface 2035 provides connectivity to proxy circuit 2025 over high-speed link 2040 (e.g., a PCIe bus, NVLink, etc.) and an interface 2037 connects graphics acceleration module 2046 to link 2040.

In one implementation, an accelerator integration circuit 2036 provides cache management, memory access, context management, and interrupt management services on behalf of a plurality of graphics processing engines 2031, 2032, N of graphics acceleration module 2046. Graphics processing engines 2031, 2032, N may each comprise a separate graphics processing unit (GPU). Alternatively, graphics processing engines 2031, 2032, N may comprise different types of graphics processing engines within a GPU such as graphics execution units, media processing engines (e.g., video encoders/decoders), samplers, and blit engines. In at least one embodiment, graphics acceleration module 2046 may be a GPU with a plurality of graphics processing engines 2031-2032, N or graphics processing engines 2031-2032, N may be individual GPUs integrated on a common package, line card, or chip.

In one embodiment, accelerator integration circuit 2036 includes a memory management unit (MMU) 2039 for performing various memory management functions such as virtual-to-physical memory translations (also referred to as effective-to-real memory translations) and memory access protocols for accessing system memory 2014. MMU 2039 may also include a translation lookaside buffer (TLB) (not shown) for caching virtual/effective to physical/real address translations. In one implementation, a cache 2038 stores commands and data for efficient access by graphics processing engines 2031-2032, N. In one embodiment, data stored in cache 2038 and graphics memories 2033-2034, M is kept coherent with core caches 2062A-2062D, 2056 and system memory 2014. As mentioned, this may be accomplished via proxy circuit 2025 on behalf of cache 2038 and memories 2033-2034, M (e.g., sending updates to cache 2038 related to modifications/accesses of cache lines on processor caches 2062A-2062D, 2056 and receiving updates from cache 2038).

A set of registers 2045 store context data for threads executed by graphics processing engines 2031-2032, N and a context management circuit 2048 manages thread contexts. For example, context management circuit 2048 may perform save and restore operations to save and restore contexts of various threads during contexts switches (e.g., where a first thread is saved and a second thread is stored so that a second thread can be execute by a graphics processing engine). For example, on a context switch, context management circuit 2048 may store current register values to a designated region in memory (e.g., identified by a context pointer). It may then restore register values when returning to a context. In one embodiment, an interrupt management circuit 2047 receives and processes interrupts received from system devices.

In one implementation, virtual/effective addresses from a graphics processing engine 2031 are translated to real/physical addresses in system memory 2014 by MMU 2039. One embodiment of accelerator integration circuit 2036 supports multiple (e.g., 4, 8, 16) graphics accelerator modules 2046 and/or other accelerator devices. Graphics accelerator module 2046 may be dedicated to a single application executed on processor 2007 or may be shared between multiple applications. In one embodiment, a virtualized graphics execution environment is presented in which resources of graphics processing engines 2031-2032, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2036 performs as a bridge to a system for graphics acceleration module 2046 and provides address translation and system memory cache services. In addition, accelerator integration circuit 2036 may provide virtualization facilities for a host processor to manage virtualization of graphics processing engines 2031-2032, interrupts, and memory management.

Because hardware resources of graphics processing engines 2031-2032, N are mapped explicitly to a real address space seen by host processor 2007, any host processor can address these resources directly using an effective address value. One function of accelerator integration circuit 2036, in one embodiment, is physical separation of graphics processing engines 2031-2032, N so that they appear to a system as independent units.

In at least one embodiment, one or more graphics memories 2033-2034, M are coupled to each of graphics processing engines 2031-2032, N, respectively. Graphics memories 2033-2034, M store instructions and data being processed by each of graphics processing engines 2031-2032, N. Graphics memories 2033-2034, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 2040, biasing techniques are used to ensure that data stored in graphics memories 2033-2034, M is data which will be used most frequently by graphics processing engines 2031-2032, N and not used by cores 2060A-2060D (at least not frequently). Similarly, a biasing mechanism attempts to keep data needed by cores (and not graphics processing engines 2031-2032, N) within caches 2062A-2062D, 2056 of cores and system memory 2014.

Figure 20C:
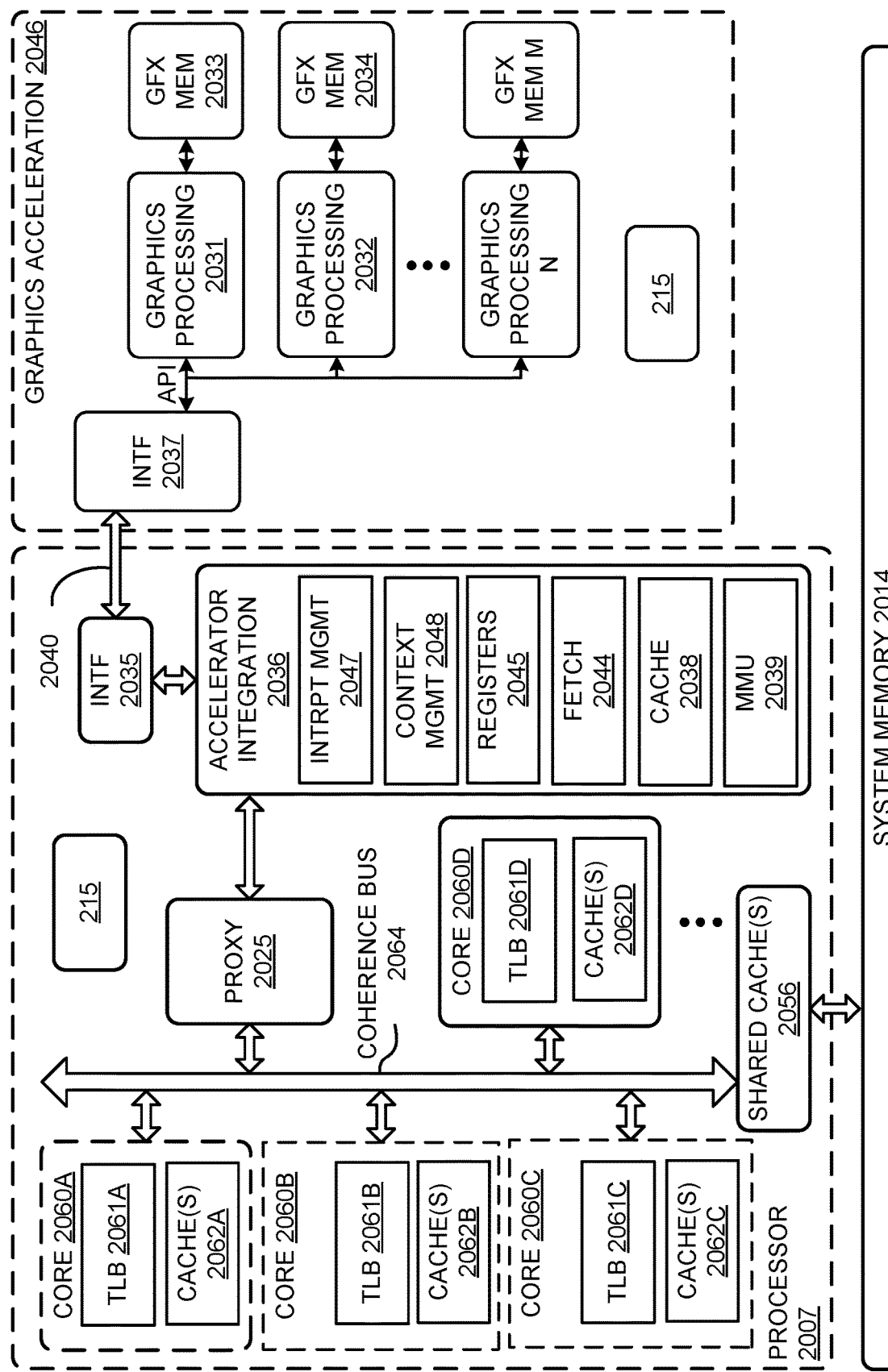
FIG. 20C illustrates a computer system, in at least one embodiment.

FIG. 20C illustrates another exemplary embodiment in which accelerator integration circuit 2036 is integrated within processor 2007. In this embodiment, graphics processing engines 2031-2032, N communicate directly over high-speed link 2040 to accelerator integration circuit 2036 via interface 2037 and interface 2035 (which, again, may be utilize any form of bus or interface protocol). Accelerator integration circuit 2036 may perform same operations as those described with respect to FIG. 20B, but potentially at a higher throughput given its close proximity to coherence bus 2064 and caches 2062A-2062D, 2056. One embodiment supports different programming models including a dedicated-process programming model (no graphics acceleration module virtualization) and shared programming models (with virtualization), which may include programming models which are controlled by accelerator integration circuit 2036 and programming models which are controlled by graphics acceleration module 2046.

In at least one embodiment, graphics processing engines 2031-2032, N are dedicated to a single application or process under a single operating system. In at least one embodiment, a single application can funnel other application requests to graphics processing engines 2031-2032, N, providing virtualization within a VM/partition.

In at least one embodiment, graphics processing engines 2031-2032, N, may be shared by multiple VM/application partitions. In at least one embodiment, shared models may use a system hypervisor to virtualize graphics processing engines 2031-2032, N to allow access by each operating system. For single-partition systems without a hypervisor, graphics processing engines 2031-2032, N are owned by an operating system. In at least one embodiment, an operating system can virtualize graphics processing engines 2031-2032, N to provide access to each process or application.

In at least one embodiment, graphics acceleration module 2046 or an individual graphics processing engine 2031-2032, N selects a process element using a process handle. In one embodiment, process elements are stored in system memory 2014 and are addressable using an effective address to real address translation techniques described herein. In at least one embodiment, a process handle may be an implementation-specific value provided to a host process when registering its context with graphics processing engine 2031-2032, N (that is, calling system software to add a process element to a process element linked list). In at least one embodiment, a lower 16-bits of a process handle may be an offset of a process element within a process element linked list.

Figure 20D:
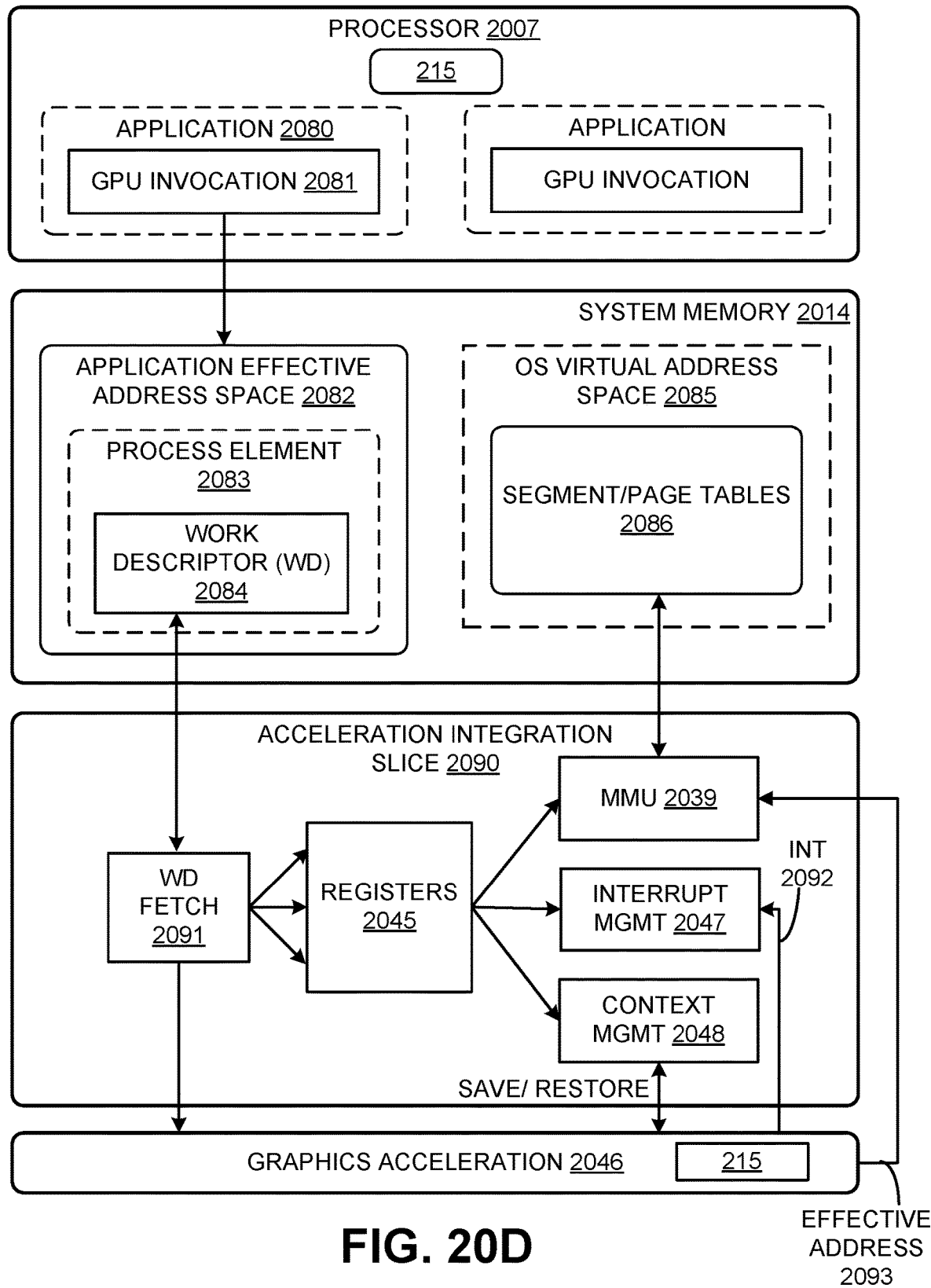
FIG. 20D illustrates a computer system, in at least one embodiment.

FIG. 20D illustrates an exemplary accelerator integration slice 2090. As used herein, a "slice" comprises a specified portion of processing resources of accelerator integration circuit 2036. Application effective address space 2082 within system memory 2014 stores process elements 2083. In one embodiment, process elements 2083 are stored in response to GPU invocations 2081 from applications 2080 executed on processor 2007. A process element 2083 contains process state for corresponding application 2080. A work descriptor (WD) 2084 contained in process element 2083 can be a single job requested by an application or may contain a pointer to a queue of jobs. In at least one embodiment, WD 2084 is a pointer to a job request queue in an application's address space 2082.

Graphics acceleration module 2046 and/or individual graphics processing engines 2031-2032, N can be shared by all or a subset of processes in a system. In at least one embodiment, an infrastructure for setting up process state and sending a WD 2084 to a graphics acceleration module 2046 to start a job in a virtualized environment may be included.

In at least one embodiment, a dedicated-process programming model is implementation-specific. In this model, a single process owns graphics acceleration module 2046 or an individual graphics processing engine 2031. Because graphics acceleration module 2046 is owned by a single process, a hypervisor initializes accelerator integration circuit 2036 for an owning partition and an operating system initializes accelerator integration circuit 2036 for an owning process when graphics acceleration module 2046 is assigned.

In operation, a WD fetch unit 2091 in accelerator integration slice 2090 fetches next WD 2084 which includes an indication of work to be done by one or more graphics processing engines of graphics acceleration module 2046. Data from WD 2084 may be stored in registers 2045 and used by MMU 2039, interrupt management circuit 2047 and/or context management circuit 2048 as illustrated. For example, one embodiment of MMU 2039 includes segment/page walk circuitry for accessing segment/page tables 2086 within OS virtual address space 2085. Interrupt management circuit 2047 may process interrupt events 2092 received from graphics acceleration module 2046. When performing graphics operations, an effective address 2093 generated by a graphics processing engine 2031-2032, N is translated to a real address by MMU 2039.

In one embodiment, a same set of registers 2045 are duplicated for each graphics processing engine 2031-2032, N and/or graphics acceleration module 2046 and may be initialized by a hypervisor or operating system. Each of these duplicated registers may be included in an accelerator integration slice 2090. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2084 is specific to a particular graphics acceleration module 2046 and/or graphics processing engines 2031-2032, N. It contains all information required by a graphics processing engine 2031-2032, N to do work or it can be a pointer to a memory location where an application has set up a command queue of work to be completed.

Figure 20E:
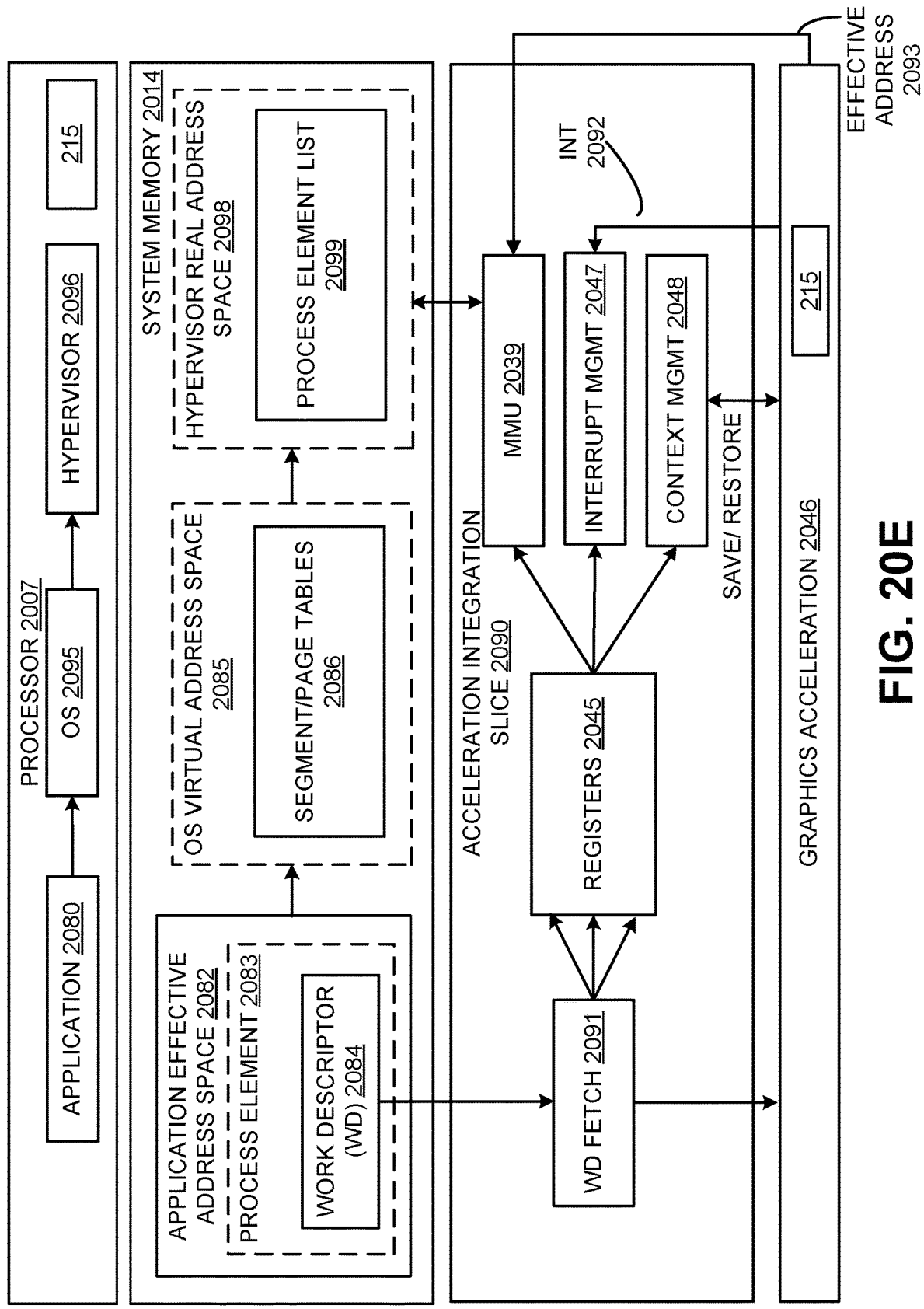
FIGS. 20E and 20F illustrate a shared programming model, in at least one embodiment.

FIG. 20E illustrates additional details for one exemplary embodiment of a shared model. This embodiment includes a hypervisor real address space 2098 in which a process element list 2099 is stored. Hypervisor real address space 2098 is accessible via a hypervisor 2096 which virtualizes graphics acceleration module engines for operating system 2095.

In at least one embodiment, shared programming models allow for all or a subset of processes from all or a subset of partitions in a system to use a graphics acceleration module 2046. There are two programming models where graphics acceleration module 2046 is shared by multiple processes and partitions: time-sliced shared and graphics directed shared.

In this model, system hypervisor 2096 owns graphics acceleration module 2046 and makes its function available to all operating systems 2095. For a graphics acceleration module 2046 to support virtualization by system hypervisor 2096, graphics acceleration module 2046 may adhere to a following list: 1) an application's job request must be autonomous (that is, state does not need to be maintained between jobs), or graphics acceleration module 2046 must provide a context save and restore mechanism. 2) An application's job request is guaranteed by graphics acceleration module 2046 to complete in a specified amount of time, including any translation faults, or graphics acceleration module 2046 provides an ability to preempt processing of a job. 3) Graphics acceleration module 2046 must be guaranteed fairness between processes when operating in a directed shared programming model.

In at least one embodiment, application 2080 is required to make an operating system 2095 system call with a graphics acceleration module 2046 type, a work descriptor (WD), an authority mask register (AMR) value, and a context save/restore area pointer (CSRP). In at least one embodiment, graphics acceleration module 2046 type describes a targeted acceleration function for a system call. In at least one embodiment, graphics acceleration module 2046 type may be a system-specific value. In at least one embodiment, WD is formatted specifically for graphics acceleration module 2046 and can be in a form of a graphics acceleration module 2046 command, an effective address pointer to a user-defined structure, an effective address pointer to a queue of commands, or any other data structure to describe work to be done by graphics acceleration module 2046. In one embodiment, an AMR value is an AMR state to use for a current process. In at least one embodiment, a value passed to an operating system is similar to an application setting an AMR. If accelerator integration circuit 2036 and graphics acceleration module 2046 implementations do not support a User Authority Mask Override Register (UAMOR), an operating system may apply a current UAMOR value to an AMR value before passing an AMR in a hypervisor call. Hypervisor 2096 may apply a current Authority Mask Override Register (AMOR) value before placing an AMR into process element 2083. In at least one embodiment, CSRP is one of registers 2045 containing an effective address of an area in an application's address space 2082 for graphics acceleration module 2046 to save and restore context state. This pointer may not be included such as is if no state is required to be saved between jobs or when a job is preempted. In at least one embodiment, context save/restore area may be pinned system memory.

Upon receiving a system call, operating system 2095 may verify that application 2080 has registered and been given authority to use graphics acceleration module 2046. Operating system 2095 then calls hypervisor 2096 with information shown in Table 3.

TABLE 3

OS to Hypervisor Call Parameters

1  A work descriptor (WD)
2  An Authority Mask Register (AMR) value (potentially masked)
3  An effective address (EA) Context Save/Restore Area Pointer (CSRP)
4  A process ID (PID) and optional thread ID (TID)
5  A virtual address (VA) accelerator utilization record pointer (AURP)
6  Virtual address of storage segment table pointer (SSTP)
7  A logical interrupt service number (LISN)

Upon receiving a hypervisor call, hypervisor 2096 verifies that operating system 2095 has registered and been given authority to use graphics acceleration module 2046. Hypervisor 2096 then puts process element 2083 into a process element linked list for a corresponding graphics acceleration module 2046 type. A process element may include information shown in Table 4.

TABLE 4

Process Element Information

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  Virtual address of storage segment table pointer (SSTP)

TABLE 4-continued

Process Element Information

7   A logical interrupt service number (LISN)
8   Interrupt vector table, derived from hypervisor call parameters
9   A state register (SR) value
10  A logical partition ID (LPID)
11  A real address (RA) hypervisor accelerator utilization record pointer
12  Storage Descriptor Register (SDR)

In at least one embodiment, hypervisor initializes a plurality of accelerator integration slice 2090 registers 2045.

Figure 20F:
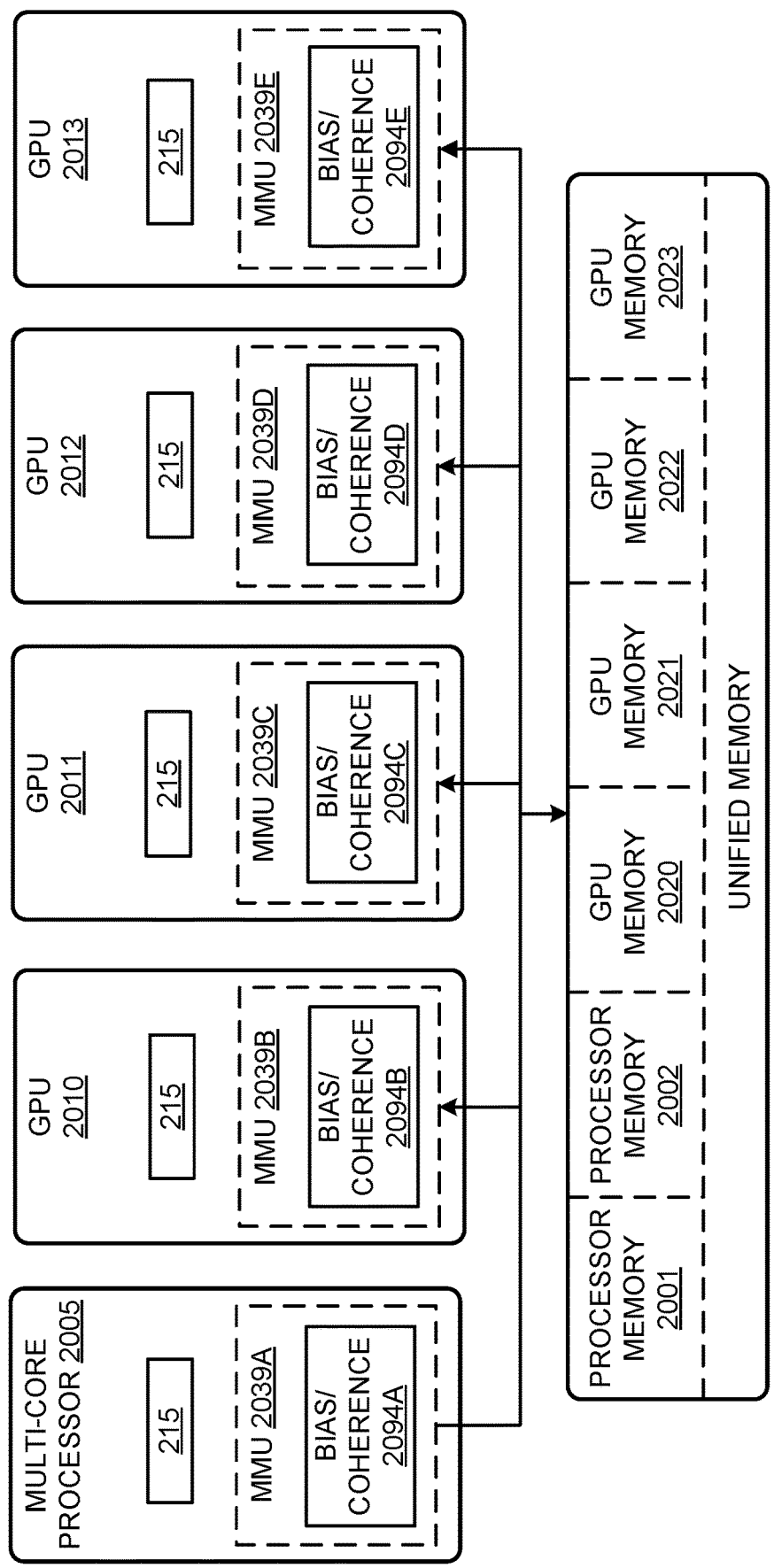

As illustrated in FIG. 20F, in at least one embodiment, a unified memory is used, addressable via a common virtual memory address space used to access physical processor memories 2001-2002 and GPU memories 2020-2023. In this implementation, operations executed on GPUs 2010-2013 utilize a same virtual/effective memory address space to access processor memories 2001-2002 and vice versa, thereby simplifying programmability. In one embodiment, a first portion of a virtual/effective address space is allocated to processor memory 2001, a second portion to second processor memory 2002, a third portion to GPU memory 2020, and so on. In at least one embodiment, an entire virtual/effective memory space (sometimes referred to as an effective address space) is thereby distributed across each of processor memories 2001-2002 and GPU memories 2020-2023, allowing any processor or GPU to access any physical memory with a virtual address mapped to that memory.

In one embodiment, bias/coherence management circuitry 2094A-2094E within one or more of MMUs 2039A-2039E ensures cache coherence between caches of one or more host processors (e.g., 2005) and GPUs 2010-2013 and implements biasing techniques indicating physical memories in which certain types of data should be stored. While multiple instances of bias/coherence management circuitry 2094A-2094E are illustrated in FIG. 20F, bias/coherence circuitry may be implemented within an MMU of one or more host processors 2005 and/or within accelerator integration circuit 2036.

One embodiment allows GPU-attached memory 2020-2023 to be mapped as part of system memory, and accessed using shared virtual memory (SVM) technology, but without suffering performance drawbacks associated with full system cache coherence. In at least one embodiment, an ability for GPU-attached memory 2020-2023 to be accessed as system memory without onerous cache coherence overhead provides a beneficial operating environment for GPU offload. This arrangement allows host processor 2005 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2020-2023 without cache coherence overheads can be critical to execution time of an offloaded computation. In cases with substantial streaming write memory traffic, for example, cache coherence overhead can significantly reduce an effective write bandwidth seen by a GPU 2010-2013. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU-attached memories 2020-2023, with or without a bias cache in GPU 2010-2013 (e.g., to cache frequently/recently used entries of a bias table). Alternatively, an entire bias table may be maintained within a GPU.

In at least one embodiment, a bias table entry associated with each access to GPU-attached memory 2020-2023 is accessed prior to actual access to a GPU memory, causing following operations. First, local requests from GPU 2010-2013 that find their page in GPU bias are forwarded directly to a corresponding GPU memory 2020-2023. Local requests from a GPU that find their page in host bias are forwarded to processor 2005 (e.g., over a high-speed link as discussed above). In one embodiment, requests from processor 2005 that find a requested page in host processor bias complete a request like a normal memory read. Alternatively, requests directed to a GPU-biased page may be forwarded to GPU 2010-2013. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2005 bias to GPU bias, but is not for an opposite transition.

In one embodiment, cache coherency is maintained by temporarily rendering GPU-biased pages uncacheable by host processor 2005. To access these pages, processor 2005 may request access from GPU 2010 which may or may not grant access right away. Thus, to reduce communication between processor 2005 and GPU 2010 it is beneficial to ensure that GPU-biased pages are those which are required by a GPU but not host processor 2005 and vice versa.

Hardware structure(s) 215 are used to perform one or more embodiments. Details regarding hardware structure(s) 215 are provided in conjunction with FIGS. 2A and/or 2B.

Figure 21:
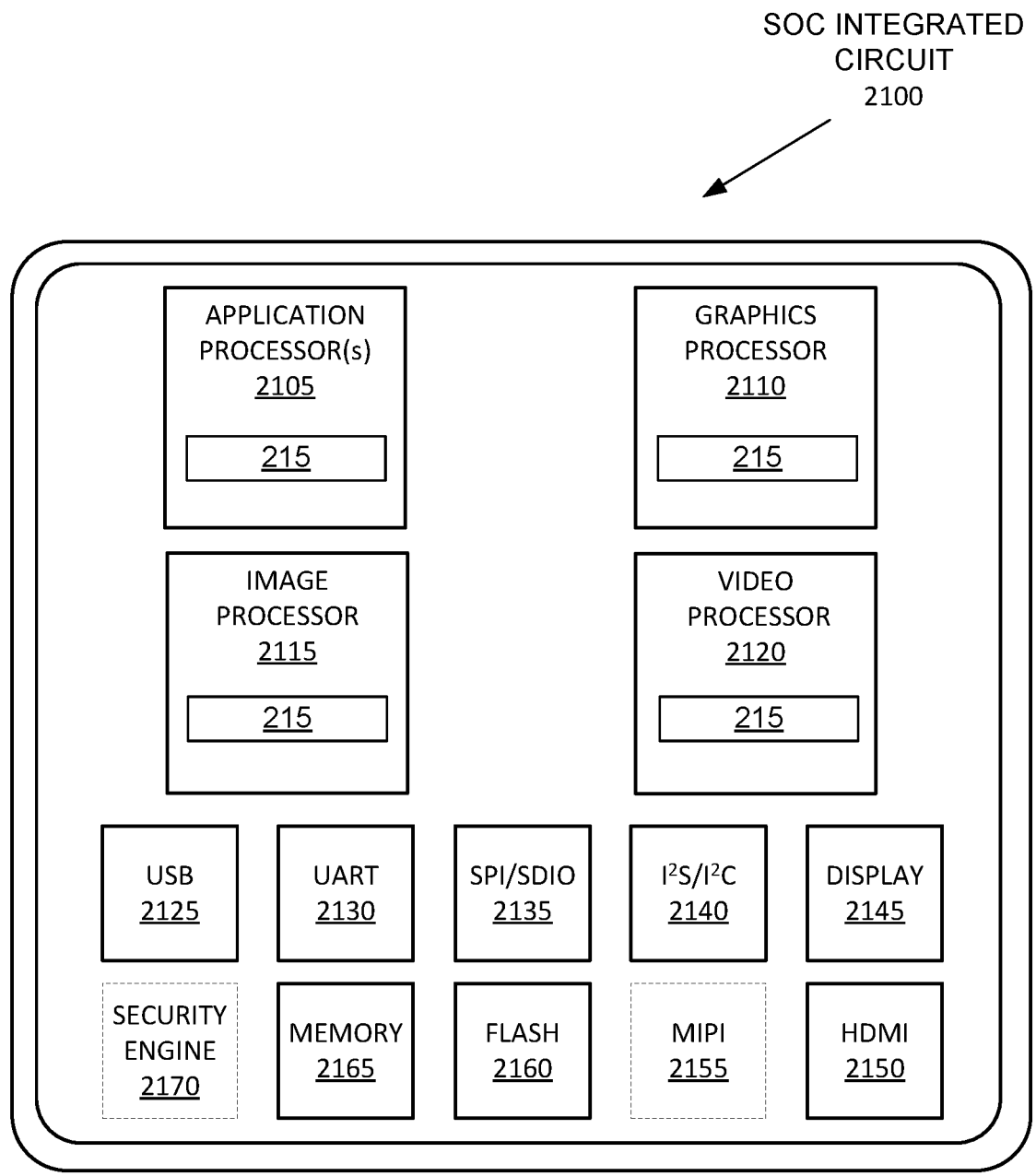
FIG. 21 illustrates exemplary integrated circuits and associated graphics processors, in at least one embodiment.

FIG. 21 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 21 is a block diagram illustrating an exemplary system on a chip integrated circuit 2100 that may be fabricated using one or more IP cores, in at least one embodiment. In at least one embodiment, integrated circuit 2100 includes one or more application processor(s) 2105 (e.g., CPUs), at least one graphics processor 2110, and may additionally include an image processor 2115 and/or a video processor 2120, any of which may be a modular IP core. In at least one embodiment, integrated circuit 2100 includes peripheral or bus logic including a USB controller 2125, UART controller 2130, an SPI/SDIO controller 2135, and an I²S/I²C controller 2140. In at least one embodiment, integrated circuit 2100 can include a display device 2145 coupled to one or more of a high-definition multimedia interface (HDMI) controller 2150 and a mobile industry processor interface (MIPI) display interface 2155. In at least one embodiment, storage may be provided by a flash memory subsystem 2160 including flash memory and a flash memory controller. In at least one embodiment, memory interface may be provided via a memory controller 2165 for access to SDRAM or SRAM memory devices. In at least one embodiment, some integrated circuits additionally include an embedded security engine 2170.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in integrated circuit 2100 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more integrated circuit 2100 of FIG. 21.

Figure 22A:
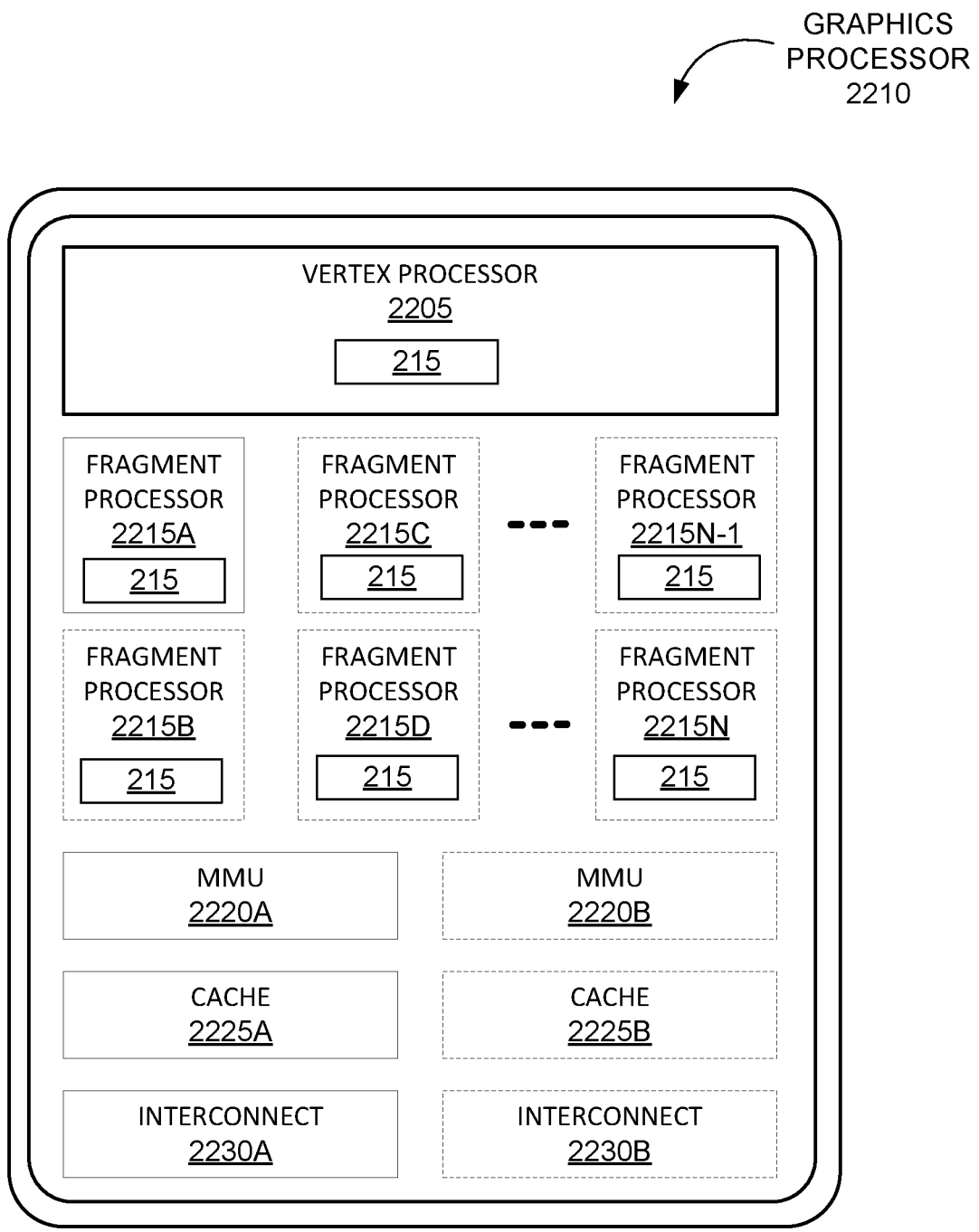
FIGS. 22A-22B illustrate exemplary integrated circuits and associated graphics processors, in at least one embodiment.
Figure 22B:
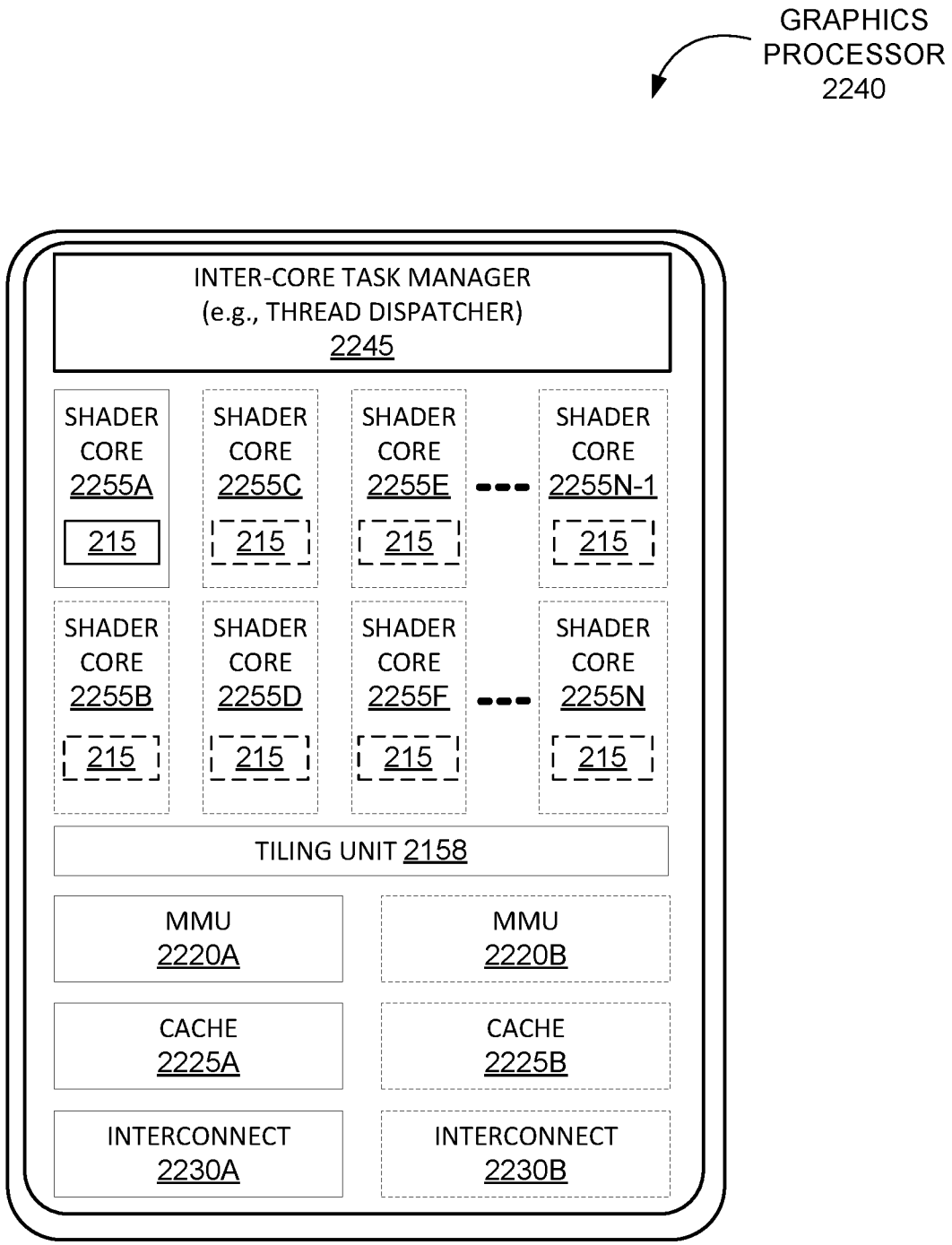

FIGS. 22A-22B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 22A-22B are block diagrams illustrating exemplary graphics processors for use within an SoC, according to embodiments described herein. FIG. 22A illustrates an exemplary graphics processor 2210 of a system on a chip integrated circuit that may be fabricated using one or more IP cores, in at least one embodiment. FIG. 22B illustrates an additional exemplary graphics processor 2240 of a system on a chip integrated circuit that may be fabricated using one or more IP cores, in at least one embodiment. In at least one embodiment, graphics processor 2210 of FIG. 22A is a low power graphics processor core. In at least one embodiment, graphics processor 2240 of FIG. 22B is a higher performance graphics processor core. In at least one embodiment, each of graphics processors 2210, 2240 can be variants of graphics processor 2110 of FIG. 21.

In at least one embodiment, graphics processor 2210 includes a vertex processor 2205 and one or more fragment processor(s) 2215A-2215N (e.g., 2215A, 2215B, 2215C, 2215D, through 2215N-1, and 2215N). In at least one embodiment, graphics processor 2210 can execute different shader programs via separate logic, such that vertex processor 2205 is optimized to execute operations for vertex shader programs, while one or more fragment processor(s) 2215A-2215N execute fragment (e.g., pixel) shading operations for fragment or pixel shader programs. In at least one embodiment, vertex processor 2205 performs a vertex processing stage of a 3D graphics pipeline and generates primitives and vertex data. In at least one embodiment, fragment processor(s) 2215A-2215N use primitive and vertex data generated by vertex processor 2205 to produce a framebuffer that is displayed on a display device. In at least one embodiment, fragment processor(s) 2215A-2215N are optimized to execute fragment shader programs as provided for in an OpenGL API, which may be used to perform similar operations as a pixel shader program as provided for in a Direct 3D API.

In at least one embodiment, graphics processor 2210 additionally includes one or more memory management units (MMUs) 2220A-2220B, cache(s) 2225A-2225B, and circuit interconnect(s) 2230A-2230B. In at least one embodiment, one or more MMU(s) 2220A-2220B provide for virtual to physical address mapping for graphics processor 2210, including for vertex processor 2205 and/or fragment processor(s) 2215A-2215N, which may reference vertex or image/texture data stored in memory, in addition to vertex or image/texture data stored in one or more cache(s) 2225A-2225B. In at least one embodiment, one or more MMU(s) 2220A-2220B may be synchronized with other MMUs within system, including one or more MMUs associated with one or more application processor(s) 2105, image processors 2115, and/or video processors 2120 of FIG. 21, such that each processor 2105-2120 can participate in a shared or unified virtual memory system. In at least one embodiment, one or more circuit interconnect(s) 2230A-2230B enable graphics processor 2210 to interface with other IP cores within SoC, either via an internal bus of SoC or via a direct connection.

In at least one embodiment, graphics processor 2240 includes one or more MMU(s) 2220A-2220B, caches 2225A-2225B, and circuit interconnects 2230A-2230B of graphics processor 2210 of FIG. 22A. In at least one embodiment, graphics processor 2240 includes one or more shader core(s) 2255A-2255N (e.g., 2255A, 2255B, 2255C, 2255D, 2255E, 2255F, through 2255N-1, and 2255N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2240 includes an inter-core task manager 2245, which acts as a thread dispatcher to dispatch execution threads to one or more shader cores 2255A-2255N and a tiling unit 2258 to accelerate tiling operations for tile-based rendering, in which rendering operations for a scene are subdivided in image space, for example to exploit local spatial coherence within a scene or to optimize use of internal caches.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in integrated circuit 22A and/or 22B for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more graphics processor 2210 of FIG. 22A and/or graphics processor 2240 of FIG. 22B.

Figure 23A:
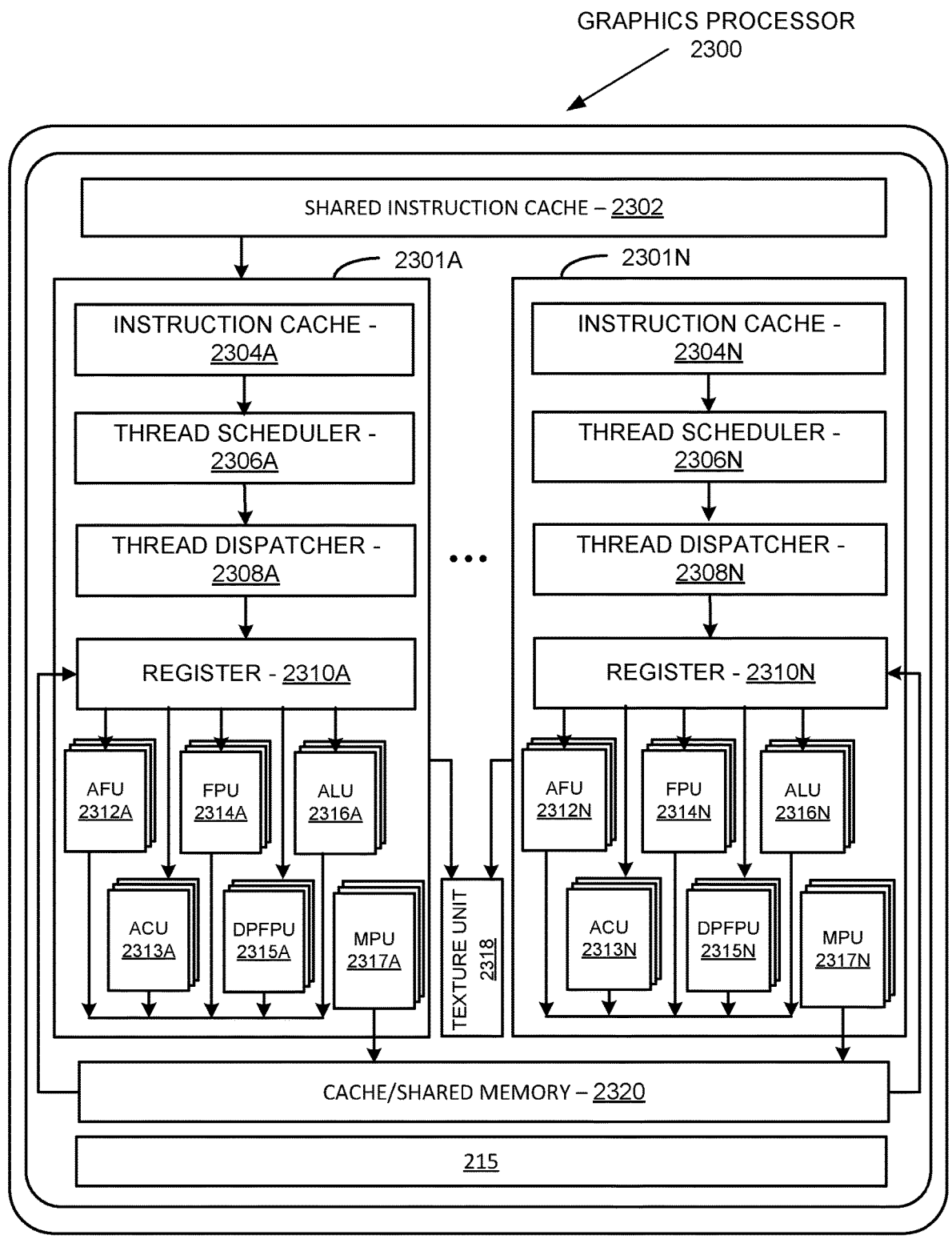
FIGS. 23A-23B illustrate additional exemplary graphics processor logic in at least one embodiment.
Figure 23B:
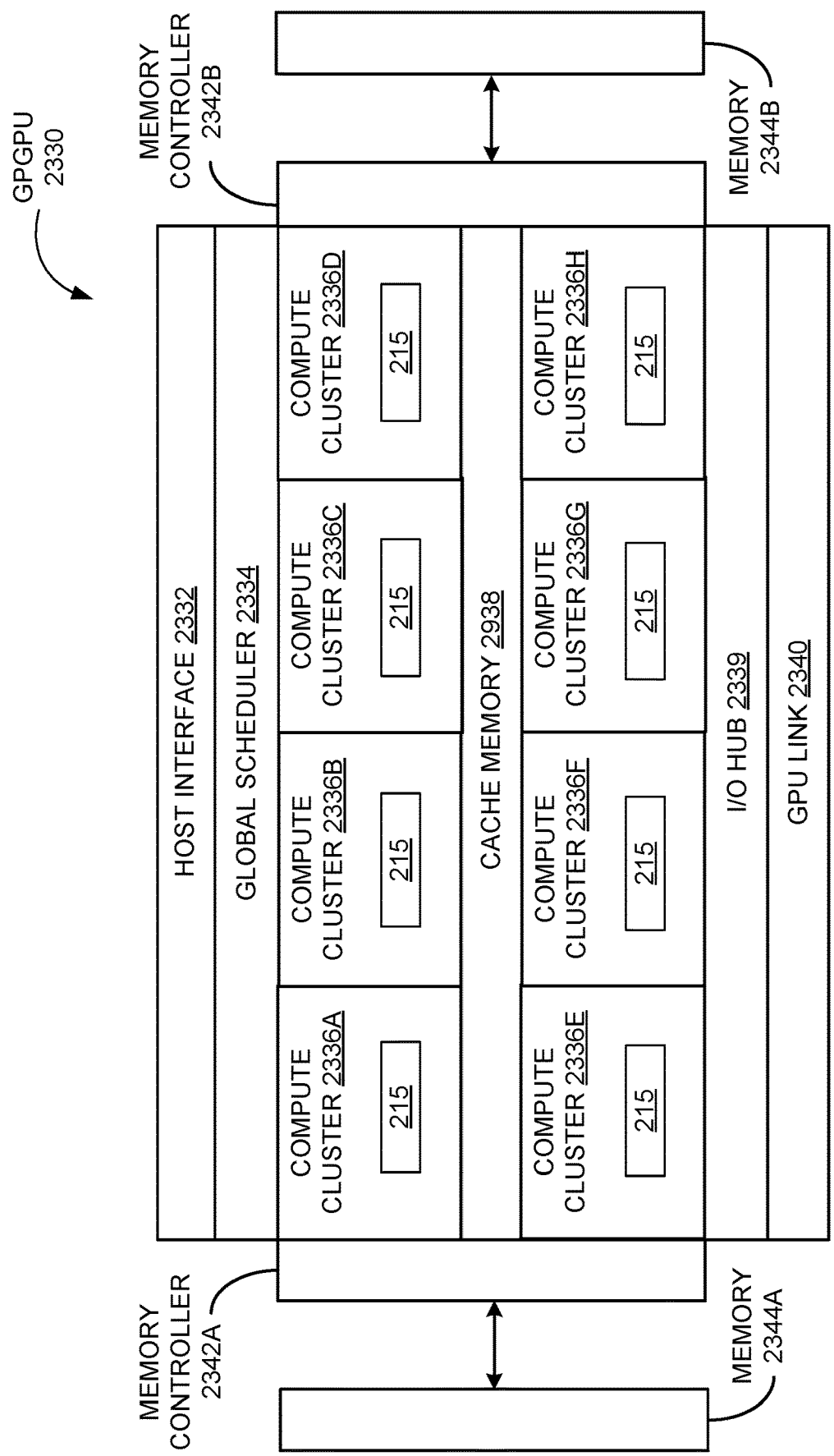

FIGS. 23A-23B illustrate additional exemplary graphics processor logic according to embodiments described herein. FIG. 23A illustrates a graphics core 2300 that may be included within graphics processor 2110 of FIG. 21, in at least one embodiment, and may be a unified shader core 2255A-2255N as in FIG. 22B in at least one embodiment. FIG. 23B illustrates a highly-parallel general-purpose graphics processing unit 2330 suitable for deployment on a multi-chip module in at least one embodiment.

In at least one embodiment, graphics core 2300 includes a shared instruction cache 2302, a texture unit 2318, and a cache/shared memory 2320 that are common to execution resources within graphics core 2300. In at least one embodiment, graphics core 2300 can include multiple slices 2301A-2301N or partition for each core, and a graphics processor can include multiple instances of graphics core 2300. Slices 2301A-2301N can include support logic including a local instruction cache 2304A-2304N, a thread scheduler 2306A-2306N, a thread dispatcher 2308A-2308N, and a set of registers 2310A-2310N. In at least one embodiment, slices 2301A-2301N can include a set of additional function units (AFUs 2312A-2312N), floating-point units (FPU 2314A-2314N), integer arithmetic logic units (ALUs 2316-2316N), address computational units (ACU 2313A-2313N), double-precision floating-point units (DPFPU 2315A-2315N), and matrix processing units (MPU 2317A-2317N).

In at least one embodiment, FPUs 2314A-2314N can perform single-precision (32-bit) and half-precision (16-bit) floating point operations, while DPFPUs 2315A-2315N perform double precision (64-bit) floating point operations. In at least one embodiment, ALUs 2316A-2316N can perform variable precision integer operations at 8-bit, 16-bit, and 32-bit precision, and can be configured for mixed precision operations. In at least one embodiment, MPUs 2317A-2317N can also be configured for mixed precision matrix operations, including half-precision floating point and 8-bit integer operations. In at least one embodiment, MPUs 2317-2317N can perform a variety of matrix operations to accelerate machine learning application frameworks, including enabling support for accelerated general matrix to matrix multiplication (GEMM). In at least one embodiment, AFUs 2312A-2312N can perform additional logic operations not supported by floating-point or integer units, including trigonometric operations (e.g., Sine, Cosine, etc.).

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in graphics core 2300 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more graphics processor 2300 of FIG. 23A.

FIG. 23B illustrates a general-purpose processing unit (GPGPU) 2330 that can be configured to enable highly-parallel compute operations to be performed by an array of graphics processing units, in at least one embodiment. In at least one embodiment, GPGPU 2330 can be linked directly to other instances of GPGPU 2330 to create a multi-GPU cluster to improve training speed for deep neural networks. In at least one embodiment, GPGPU 2330 includes a host interface 2332 to enable a connection with a host processor. In at least one embodiment, host interface 2332 is a PCI Express interface. In at least one embodiment, host interface 2332 can be a vendor specific communications interface or communications fabric. In at least one embodiment, GPGPU 2330 receives commands from a host processor and uses a global scheduler 2334 to distribute execution threads associated with those commands to a set of compute clusters 2336A-2336H. In at least one embodiment, compute clusters 2336A-2336H share a cache memory 2338. In at least one embodiment, cache memory 2338 can serve as a higher-level cache for cache memories within compute clusters 2336A-2336H.

In at least one embodiment, GPGPU 2330 includes memory 2344A-2344B coupled with compute clusters 2336A-2336H via a set of memory controllers 2342A-2342B. In at least one embodiment, memory 2344A-2344B can include various types of memory devices including dynamic random access memory (DRAM) or graphics random access memory, such as synchronous graphics random access memory (SGRAM), including graphics double data rate (GDDR) memory.

In at least one embodiment, compute clusters 2336A-2336H each include a set of graphics cores, such as graphics core 2300 of FIG. 23A, which can include multiple types of integer and floating point logic units that can perform computational operations at a range of precisions including suited for machine learning computations. For example, in at least one embodiment, at least a subset of floating point units in each of compute clusters 2336A-2336H can be configured to perform 16-bit or 32-bit floating point operations, while a different subset of floating point units can be configured to perform 64-bit floating point operations.

In at least one embodiment, multiple instances of GPGPU 2330 can be configured to operate as a compute cluster. In at least one embodiment, communication used by compute clusters 2336A-2336H for synchronization and data exchange varies across embodiments. In at least one embodiment, multiple instances of GPGPU 2330 communicate over host interface 2332. In at least one embodiment, GPGPU 2330 includes an I/O hub 2339 that couples GPGPU 2330 with a GPU link 2340 that enables a direct connection to other instances of GPGPU 2330. In at least one embodiment, GPU link 2340 is coupled to a dedicated GPU-to-GPU bridge that enables communication and synchronization between multiple instances of GPGPU 2330. In at least one embodiment GPU link 2340 couples with a high speed interconnect to transmit and receive data to other GPGPUs or parallel processors. In at least one embodiment, multiple instances of GPGPU 2330 are located in separate data processing systems and communicate via a network device that is accessible via host interface 2332. In at least one embodiment GPU link 2340 can be configured to enable a connection to a host processor in addition to or as an alternative to host interface 2332.

In at least one embodiment, GPGPU 2330 can be configured to train neural networks. In at least one embodiment, GPGPU 2330 can be used within an inferencing platform. In at least one embodiment, in which GPGPU 2330 is used for inferencing, GPGPU may include fewer compute clusters 2336A-2336H relative to when GPGPU is used for training a neural network. In at least one embodiment, memory technology associated with memory 2344A-2344B may differ between inferencing and training configurations, with higher bandwidth memory technologies devoted to training configurations. In at least one embodiment, inferencing configuration of GPGPU 2330 can support inferencing specific instructions. For example, in at least one embodiment, an inferencing configuration can provide support for one or more 8-bit integer dot product instructions, which may be used during inferencing operations for deployed neural networks.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in GPGPU 2330 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more GPGPU 2330 of FIG. 23B.

Figure 24:
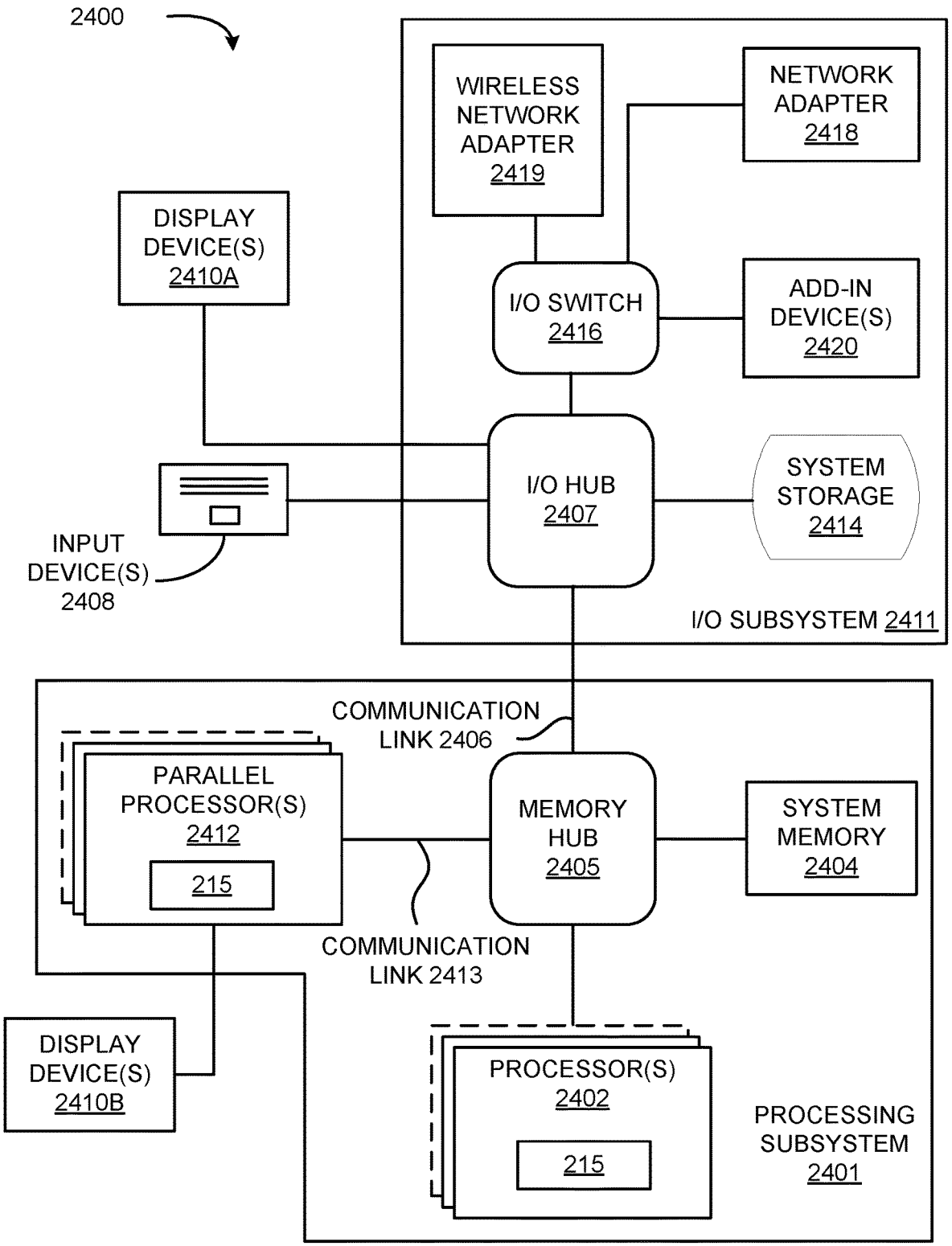
FIG. 24 illustrates a computer system, in at least one embodiment.

FIG. 24 is a block diagram illustrating a computing system 2400 in at least one embodiment. In at least one embodiment, computing system 2400 includes a processing subsystem 2401 having one or more processor(s) 2402 and a system memory 2404 communicating via an interconnection path that may include a memory hub 2405. In at least one embodiment, memory hub 2405 may be a separate component within a chipset component or may be integrated within one or more processor(s) 2402. In at least one embodiment, memory hub 2405 couples with an I/O subsystem 2411 via a communication link 2406. In at least one embodiment, I/O subsystem 2411 includes an I/O hub 2407 that can enable computing system 2400 to receive input from one or more input device(s) 2408. In at least one embodiment, I/O hub 2407 can enable a display controller, which may be included in one or more processor(s) 2402, to provide outputs to one or more display device(s) 2410A. In at least one embodiment, one or more display device(s) 2410A coupled with I/O hub 2407 can include a local, internal, or embedded display device.

In at least one embodiment, processing subsystem 2401 includes one or more parallel processor(s) 2412 coupled to memory hub 2405 via a bus or other communication link 2413. In at least one embodiment, communication link 2413 may be one of any number of standards based communication link technologies or protocols, such as, but not limited to PCI Express, or may be a vendor specific communications interface or communications fabric. In at least one embodiment, one or more parallel processor(s) 2412 form a computationally focused parallel or vector processing system that can include a large number of processing cores and/or processing clusters, such as a many integrated core (MIC) processor. In at least one embodiment, one or more parallel processor(s) 2412 form a graphics processing subsystem that can output pixels to one of one or more display device(s) 2410A coupled via I/O Hub 2407. In at least one embodiment, one or more parallel processor(s) 2412 can also include a display controller and display interface (not shown) to enable a direct connection to one or more display device(s) 2410B.

In at least one embodiment, a system storage unit 2414 can connect to I/O hub 2407 to provide a storage mechanism for computing system 2400. In at least one embodiment, an I/O switch 2416 can be used to provide an interface mechanism to enable connections between I/O hub 2407 and other components, such as a network adapter 2418 and/or wireless network adapter 2419 that may be integrated into platform, and various other devices that can be added via one or more add-in device(s) 2420. In at least one embodiment, network adapter 2418 can be an Ethernet adapter or another wired network adapter. In at least one embodiment, wireless network adapter 2419 can include one or more of a Wi-Fi, Bluetooth, near field communication (NFC), or other network device that includes one or more wireless radios.

In at least one embodiment, computing system 2400 can include other components not explicitly shown, including USB or other port connections, optical storage drives, video capture devices, and like, may also be connected to I/O hub 2407. In at least one embodiment, communication paths interconnecting various components in FIG. 24 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2412 incorporate circuitry optimized for graphics and video processing, including, for example, video output circuitry, and constitutes a graphics processing unit (GPU). In at least one embodiment, one or more parallel processor(s) 2412 incorporate circuitry optimized for general purpose processing. In at least embodiment, components of computing system 2400 may be integrated with one or more other system elements on a single integrated circuit. For example, in at least one embodiment, one or more parallel processor(s) 2412, memory hub 2405, processor(s) 2402, and I/O hub 2407 can be integrated into a system on chip (SoC) integrated circuit. In at least one embodiment, components of computing system 2400 can be integrated into a single package to form a system in package (SIP) configuration. In at least one embodiment, at least a portion of components of computing system 2400 can be integrated into a multi-chip module (MCM), which can be interconnected with other multi-chip modules into a modular computing system.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in system FIG. 2400 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more computing system 2400 of FIG. 24.

Processors

Figure 25A:
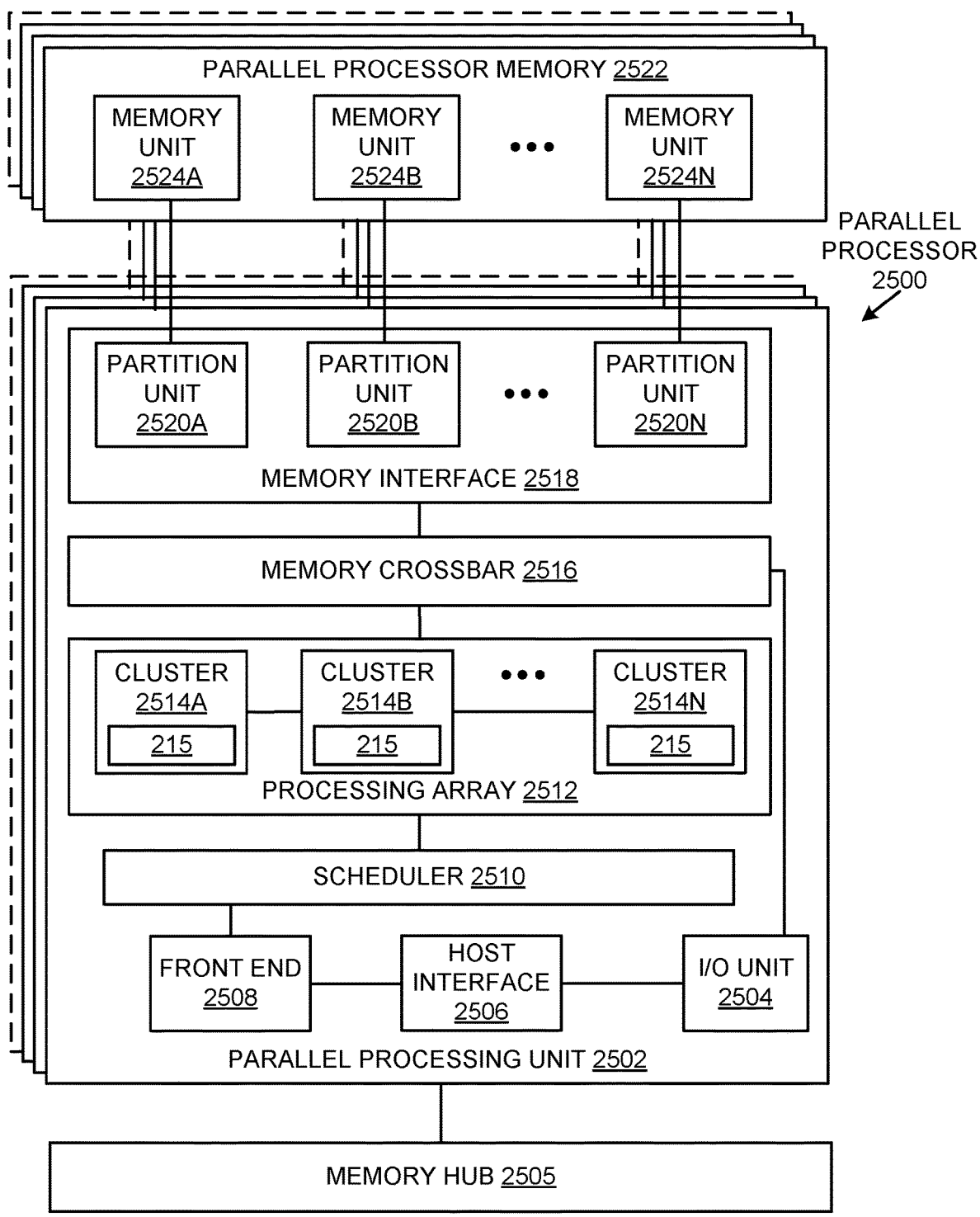
FIG. 25A illustrates a parallel processor, in at least one embodiment.

FIG. 25A illustrates a parallel processor 2500 according to at least on embodiment. In at least one embodiment, various components of parallel processor 2500 may be implemented using one or more integrated circuit devices, such as programmable processors, application specific integrated circuits (ASICs), or field programmable gate arrays (FPGA). In at least one embodiment, illustrated parallel processor 2500 is a variant of one or more parallel processor(s) 2412 shown in FIG. 24 according to an exemplary embodiment.

In at least one embodiment, parallel processor 2500 includes a parallel processing unit 2502. In at least one embodiment, parallel processing unit 2502 includes an I/O unit 2504 that enables communication with other devices, including other instances of parallel processing unit 2502. In at least one embodiment, I/O unit 2504 may be directly connected to other devices. In at least one embodiment, I/O unit 2504 connects with other devices via use of a hub or switch interface, such as memory hub 2405. In at least one embodiment, connections between memory hub 2405 and I/O unit 2504 form a communication link 2413. In at least one embodiment, I/O unit 2504 connects with a host interface 2506 and a memory crossbar 2516, where host interface 2506 receives commands directed to performing processing operations and memory crossbar 2516 receives commands directed to performing memory operations.

In at least one embodiment, when host interface 2506 receives a command buffer via I/O unit 2504, host interface 2506 can direct work operations to perform those commands to a front end 2508. In at least one embodiment, front end 2508 couples with a scheduler 2510, which is configured to distribute commands or other work items to a processing cluster array 2512. In at least one embodiment, scheduler 2510 ensures that processing cluster array 2512 is properly configured and in a valid state before tasks are distributed to processing cluster array 2512 of processing cluster array 2512. In at least one embodiment, scheduler 2510 is implemented via firmware logic executing on a microcontroller. In at least one embodiment, microcontroller implemented scheduler 2510 is configurable to perform complex scheduling and work distribution operations at coarse and fine granularity, enabling rapid preemption and context switching of threads executing on processing array 2512. In at least one embodiment, host software can prove workloads for scheduling on processing array 2512 via one of multiple graphics processing doorbells. In at least one embodiment, workloads can then be automatically distributed across processing array 2512 by scheduler 2510 logic within a microcontroller including scheduler 2510.

In at least one embodiment, processing cluster array 2512 can include up to "N" processing clusters (e.g., cluster 2514A, cluster 2514B, through cluster 2514N). In at least one embodiment, each cluster 2514A-2514N of processing cluster array 2512 can execute a large number of concurrent threads. In at least one embodiment, scheduler 2510 can allocate work to clusters 2514A-2514N of processing cluster array 2512 using various scheduling and/or work distribution algorithms, which may vary depending on workload arising for each type of program or computation. In at least one embodiment, scheduling can be handled dynamically by scheduler 2510, or can be assisted in part by compiler logic during compilation of program logic configured for execution by processing cluster array 2512. In at least one embodiment, different clusters 2514A-2514N of processing cluster array 2512 can be allocated for processing different types of programs or for performing different types of computations.

In at least one embodiment, processing cluster array 2512 can be configured to perform various types of parallel processing operations. In at least one embodiment, processing cluster array 2512 is configured to perform general-purpose parallel compute operations. For example, in at least one embodiment, processing cluster array 2512 can include logic to execute processing tasks including filtering of video and/or audio data, performing modeling operations, including physics operations, and performing data transformations.

In at least one embodiment, processing cluster array 2512 is configured to perform parallel graphics processing operations. In at least one embodiment, processing cluster array 2512 can include additional logic to support execution of such graphics processing operations, including, but not limited to texture sampling logic to perform texture operations, as well as tessellation logic and other vertex processing logic. In at least one embodiment, processing cluster array 2512 can be configured to execute graphics processing related shader programs such as, but not limited to vertex shaders, tessellation shaders, geometry shaders, and pixel shaders. In at least one embodiment, parallel processing unit 2502 can transfer data from system memory via I/O unit 2504 for processing. In at least one embodiment, during processing, transferred data can be stored to on-chip memory (e.g., parallel processor memory 2522) during processing, then written back to system memory.

In at least one embodiment, when parallel processing unit 2502 is used to perform graphics processing, scheduler 2510 can be configured to divide a processing workload into approximately equal sized tasks, to better enable distribution of graphics processing operations to multiple clusters 2514A-2514N of processing cluster array 2512. In at least one embodiment, portions of processing cluster array 2512 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2514A-2514N may be stored in buffers to allow intermediate data to be transmitted between clusters 2514A-2514N for further processing.

In at least one embodiment, processing cluster array 2512 can receive processing tasks to be executed via scheduler 2510, which receives commands defining processing tasks from front end 2508. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2510 may be configured to fetch indices corresponding to tasks or may receive indices from front end 2508. In at least one embodiment, front end 2508 can be configured to ensure processing cluster array 2512 is configured to a valid state before a workload specified by incoming command buffers (e.g., batch-buffers, push buffers, etc.) is initiated.

In at least one embodiment, each of one or more instances of parallel processing unit 2502 can couple with parallel processor memory 2522. In at least one embodiment, parallel processor memory 2522 can be accessed via memory crossbar 2516, which can receive memory requests from processing cluster array 2512 as well as I/O unit 2504. In at least one embodiment, memory crossbar 2516 can access parallel processor memory 2522 via a memory interface 2518. In at least one embodiment, memory interface 2518 can include multiple partition units (e.g., partition unit 2520A, partition unit 2520B, through partition unit 2520N) that can each couple to a portion (e.g., memory unit) of parallel processor memory 2522. In at least one embodiment, a number of partition units 2520A-2520N is configured to be equal to a number of memory units, such that a first partition unit 2520A has a corresponding first memory unit 2524A, a second partition unit 2520B has a corresponding memory unit 2524B, and an Nth partition unit 2520N has a corresponding Nth memory unit 2524N. In at least one embodiment, a number of partition units 2520A-2520N may not be equal to a number of memory devices.

In at least one embodiment, memory units 2524A-2524N can include various types of memory devices, including dynamic random access memory (DRAM) or graphics random access memory, such as synchronous graphics random access memory (SGRAM), including graphics double data rate (GDDR) memory. In at least one embodiment, memory units 2524A-2524N may also include 3D stacked memory, including but not limited to high bandwidth memory (HBM). In at least one embodiment, render targets, such as frame buffers or texture maps may be stored across memory units 2524A-2524N, allowing partition units 2520A-2520N to write portions of each render target in parallel to efficiently use available bandwidth of parallel processor memory 2522. In at least one embodiment, a local instance of parallel processor memory 2522 may be excluded in favor of a unified memory design that utilizes system memory in conjunction with local cache memory.

In at least one embodiment, any one of clusters 2514A-2514N of processing cluster array 2512 can process data that will be written to any of memory units 2524A-2524N within parallel processor memory 2522. In at least one embodiment, memory crossbar 2516 can be configured to transfer an output of each cluster 2514A-2514N to any partition unit 2520A-2520N or to another cluster 2514A-2514N, which can perform additional processing operations on an output. In at least one embodiment, each cluster 2514A-2514N can communicate with memory interface 2518 through memory crossbar 2516 to read from or write to various external memory devices. In at least one embodiment, memory crossbar 2516 has a connection to memory interface 2518 to communicate with I/O unit 2504, as well as a connection to a local instance of parallel processor memory 2522, enabling processing units within different processing clusters 2514A-2514N to communicate with system memory or other memory that is not local to parallel processing unit 2502. In at least one embodiment, memory crossbar 2516 can use virtual channels to separate traffic streams between clusters 2514A-2514N and partition units 2520A-2520N.

In at least one embodiment, multiple instances of parallel processing unit 2502 can be provided on a single add-in card, or multiple add-in cards can be interconnected. In at least one embodiment, different instances of parallel processing unit 2502 can be configured to inter-operate even if different instances have different numbers of processing cores, different amounts of local parallel processor memory, and/or other configuration differences. For example, in at least one embodiment, some instances of parallel processing unit 2502 can include higher precision floating point units relative to other instances. In at least one embodiment, systems incorporating one or more instances of parallel processing unit 2502 or parallel processor 2500 can be implemented in a variety of configurations and form factors, including but not limited to desktop, laptop, or handheld personal computers, servers, workstations, game consoles, and/or embedded systems.

Figure 25B:
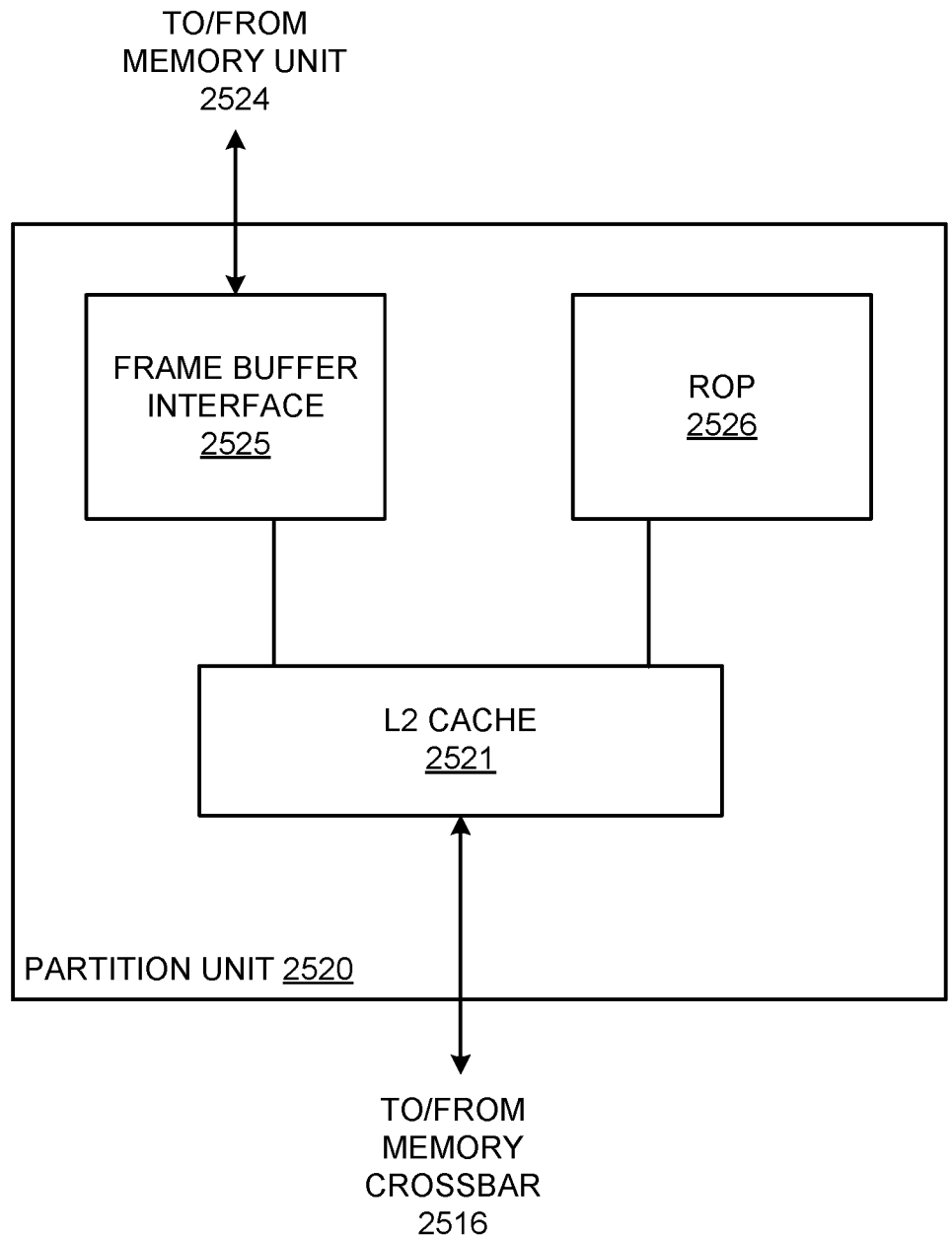
FIG. 25B illustrates a partition unit, in at least one embodiment.

FIG. 25B is a block diagram of a partition unit 2520 in at least one embodiment. In at least one embodiment, partition unit 2520 is an instance of one of partition units 2520A-2520N of FIG. 25A. In at least one embodiment, partition unit 2520 includes an L2 cache 2521, a frame buffer interface 2525, and a ROP 2526 (raster operations unit). L2 cache 2521 is a read/write cache that is configured to perform load and store operations received from memory crossbar 2516 and ROP 2526. In at least one embodiment, read misses and urgent write-back requests are output by L2 cache 2521 to frame buffer interface 2525 for processing. In at least one embodiment, updates can also be sent to a frame buffer via frame buffer interface 2525 for processing. In at least one embodiment, frame buffer interface 2525 interfaces with one of memory units in parallel processor memory, such as memory units 2524A-2524N of FIG. 25 (e.g., within parallel processor memory 2522).

In at least one embodiment, ROP 2526 is a processing unit that performs raster operations such as stencil, z test, blending, and like. In at least one embodiment, ROP 2526 then outputs processed graphics data that is stored in graphics memory. In at least one embodiment, ROP 2526 includes compression logic to compress depth or color data that is written to memory and decompress depth or color data that is read from memory. In at least one embodiment, compression logic can be lossless compression logic that makes use of one or more of multiple compression algorithms. A type of compression that is performed by ROP 2526 can vary based on statistical characteristics of data to be compressed. For example, in at least one embodiment, delta color compression is performed on depth and color data on a per-tile basis.

In In at least one embodiment, ROP 2526 is included within each processing cluster (e.g., cluster 2514A-2514N of FIG. 25) instead of within partition unit 2520. In at least one embodiment, read and write requests for pixel data are transmitted over memory crossbar 2516 instead of pixel fragment data. In at least one embodiment, processed graphics data may be displayed on a display device, such as one of one or more display device(s) 2410 of FIG. 24, routed for further processing by processor(s) 2402, or routed for further processing by one of processing entities within parallel processor 2500 of FIG. 25A.

Figure 25C:
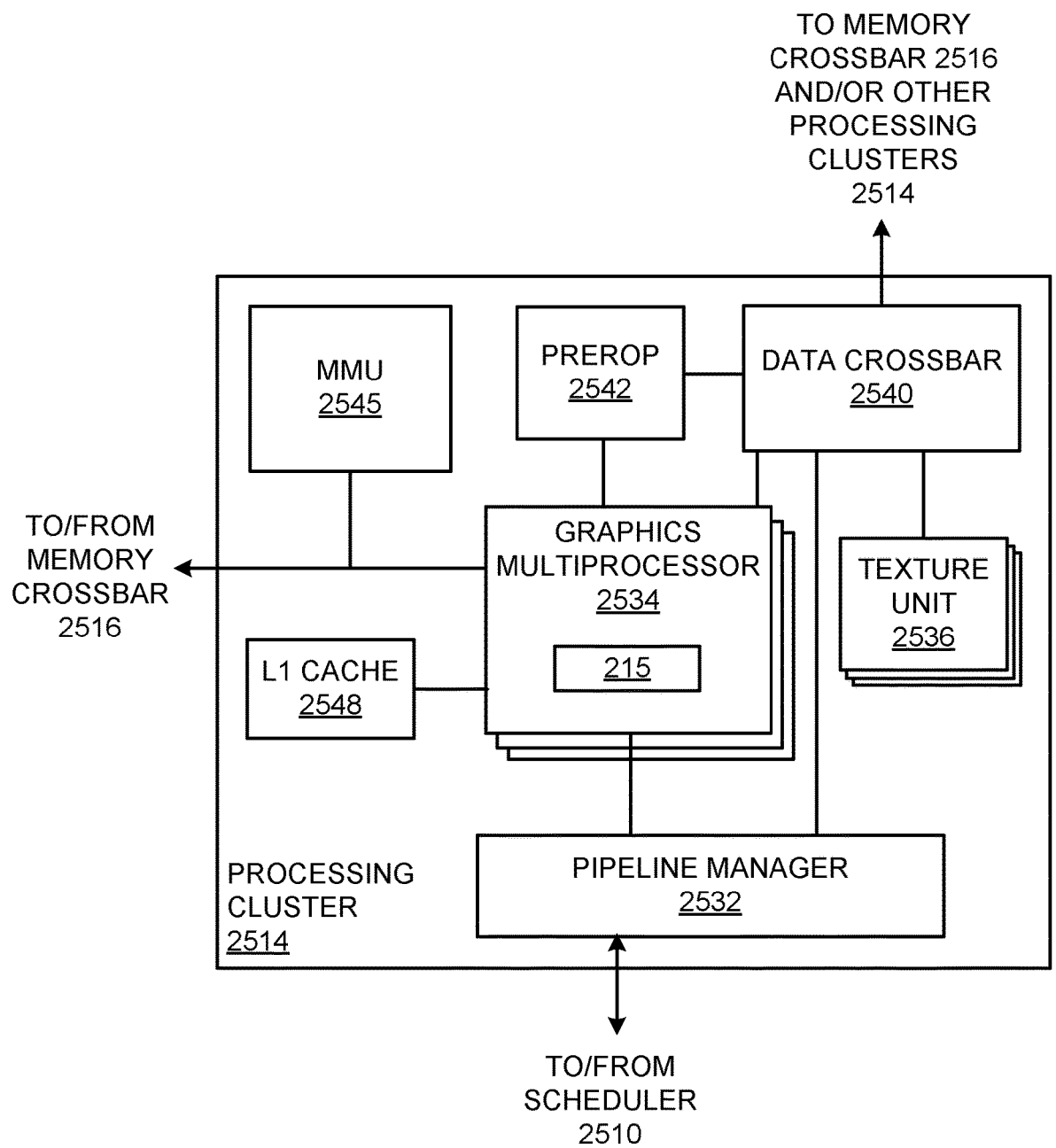
FIG. 25C illustrates a processing cluster, in at least one embodiment.

FIG. 25C is a block diagram of a processing cluster 2514 within a parallel processing unit in at least one embodiment. In at least one embodiment, a processing cluster is an instance of one of processing clusters 2514A-2514N of FIG. 25. In at least one embodiment, processing cluster 2514 can be configured to execute many threads in parallel, where a term "thread" may in at least one embodiment refer to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2514 can be controlled via a pipeline manager 2532 that distributes processing tasks to SIMT parallel processors. In at least one embodiment, pipeline manager 2532 receives instructions from scheduler 2510 of FIG. 25 and manages execution of those instructions via a graphics multiprocessor 2534 and/or a texture unit 2536. In at least one embodiment, graphics multiprocessor 2534 is an exemplary instance of a SIMT parallel processor. However, in at least one embodiment, various types of SIMT parallel processors of differing architectures may be included within processing cluster 2514. In at least one embodiment, one or more instances of graphics multiprocessor 2534 can be included within a processing cluster 2514. In at least one embodiment, graphics multiprocessor 2534 can process data and a data crossbar 2540 can be used to distribute processed data to one of multiple possible destinations, including other shader units. In at least one embodiment, pipeline manager 2532 can facilitate distribution of processed data by specifying destinations for processed data to be distributed using data crossbar 2540.

In at least one embodiment, each graphics multiprocessor 2534 within processing cluster 2514 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2514 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2534. In at least one embodiment, a thread group may include fewer threads than a number of processing engines within graphics multiprocessor 2534. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2534. In at least one embodiment, when a thread group includes more threads than number of processing engines within graphics multiprocessor 2534, processing can be performed over consecutive clock cycles. In at least one embodiment, multiple thread groups can be executed concurrently on a graphics multiprocessor 2534.

In at least one embodiment, graphics multiprocessor 2534 includes an internal cache memory to perform load and store operations. In at least one embodiment, graphics multiprocessor 2534 can forego an internal cache and use a cache memory (e.g., L1 cache 2548) within processing cluster 2514. In at least one embodiment, each graphics multiprocessor 2534 also has access to L2 caches within partition units (e.g., partition units 2520A-2520N of FIG. 25) that are shared among all processing clusters 2514 and may be used to transfer data between threads. In at least one embodiment, graphics multiprocessor 2534 may also access off-chip global memory, which can include one or more of local parallel processor memory and/or system memory. In at least one embodiment, any memory external to parallel processing unit 2502 may be used as global memory. In at least one embodiment, processing cluster 2514 includes multiple instances of graphics multiprocessor 2534 can share common instructions and data, which may be stored in L1 cache 2548.

In at least one embodiment, each processing cluster 2514 may include an MMU 2545 (memory management unit) that is configured to map virtual addresses into physical addresses. In at least one embodiment, one or more instances of MMU 2545 may reside within memory interface 2518 of FIG. 25. In at least one embodiment, MMU 2545 includes a set of page table entries (PTEs) used to map a virtual address to a physical address of a tile and in at least one embodiment a cache line index. In at least one embodiment, MMU 2545 may include address translation lookaside buffers (TLB) or caches that may reside within graphics multiprocessor 2534 or L1 cache or processing cluster 2514. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2514 may be configured such that each graphics multiprocessor 2534 is coupled to a texture unit 2536 for performing texture mapping operations, e.g., determining texture sample positions, reading texture data, and filtering texture data. In at least one embodiment, texture data is read from an internal texture L1 cache (not shown) or from an L1 cache within graphics multiprocessor 2534 and is fetched from an L2 cache, local parallel processor memory, or system memory, as needed. In at least one embodiment, each graphics multiprocessor 2534 outputs processed tasks to data crossbar 2540 to provide processed task to another processing cluster 2514 for further processing or to store processed task in an L2 cache, local parallel processor memory, or system memory via memory crossbar 2516. In at least one embodiment, preROP 2542 (pre-raster operations unit) is configured to receive data from graphics multiprocessor 2534, direct data to ROP units, which may be located with partition units as described herein (e.g., partition units 2520A-2520N of FIG. 25). In at least one embodiment, PreROP 2542 unit can perform optimizations for color blending, organize pixel color data, and perform address translations.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in graphics processing cluster 2514 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more parallel processor 2500.

Figure 25D:
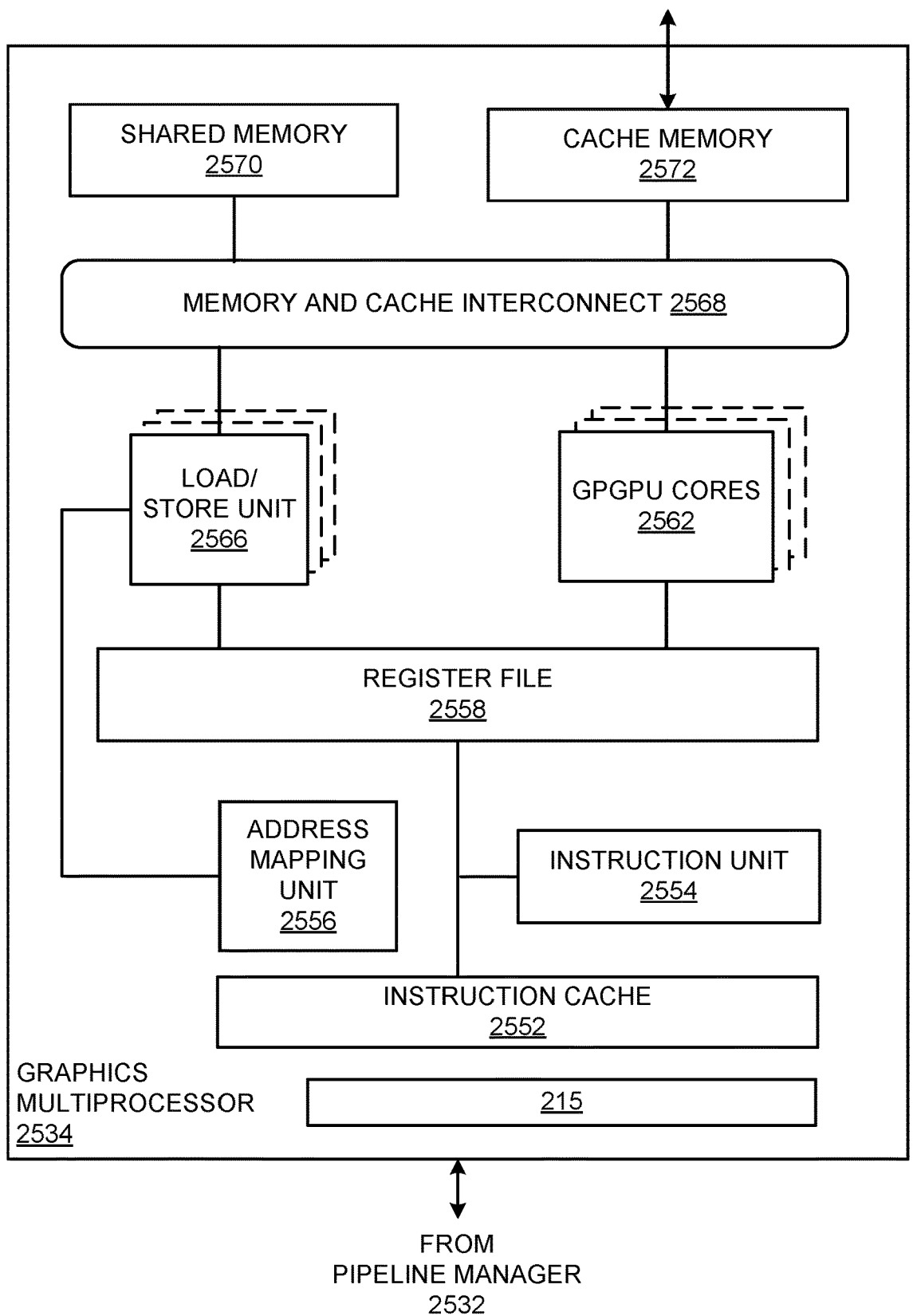
FIG. 25D illustrates a graphics multiprocessor, in at least one embodiment.

FIG. 25D shows a graphics multiprocessor 2534 in at least one embodiment. In at least one embodiment, graphics multiprocessor 2534 couples with pipeline manager 2532 of processing cluster 2514. In at least one embodiment, graphics multiprocessor 2534 has an execution pipeline including but not limited to an instruction cache 2552, an instruction unit 2554, an address mapping unit 2556, a register file 2558, one or more general purpose graphics processing unit (GPGPU) cores 2562, and one or more load/store units 2566. GPGPU cores 2562 and load/store units 2566 are coupled with cache memory 2572 and shared memory 2570 via a memory and cache interconnect 2568.

In at least one embodiment, instruction cache 2552 receives a stream of instructions to execute from pipeline manager 2532. In at least one embodiment, instructions are cached in instruction cache 2552 and dispatched for execution by instruction unit 2554. In at least one embodiment, instruction unit 2554 can dispatch instructions as thread groups (e.g., warps), with each thread of thread group assigned to a different execution unit within GPGPU core 2562. In at least one embodiment, an instruction can access any of a local, shared, or global address space by specifying an address within a unified address space. In at least one embodiment, address mapping unit 2556 can be used to translate addresses in a unified address space into a distinct memory address that can be accessed by load/store units 2566.

In at least one embodiment, register file 2558 provides a set of registers for functional units of graphics multiprocessor 2534. In at least one embodiment, register file 2558 provides temporary storage for operands connected to data paths of functional units (e.g., GPGPU cores 2562, load/store units 2566) of graphics multiprocessor 2534. In at least one embodiment, register file 2558 is divided between each of functional units such that each functional unit is allocated a dedicated portion of register file 2558. In at least one embodiment, register file 2558 is divided between different warps being executed by graphics multiprocessor 2534.

In at least one embodiment, GPGPU cores 2562 can each include floating point units (FPUs) and/or integer arithmetic logic units (ALUs) that are used to execute instructions of graphics multiprocessor 2534. GPGPU cores 2562 can be similar in architecture or can differ in architecture. In at least one embodiment, a first portion of GPGPU cores 2562 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2534 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2562 include SIMD logic capable of performing a single instruction on multiple sets of data. In at least one embodiment GPGPU cores 2562 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2568 is an interconnect network that connects each functional unit of graphics multiprocessor 2534 to register file 2558 and to shared memory 2570. In at least one embodiment, memory and cache interconnect 2568 is a crossbar interconnect that allows load/store unit 2566 to implement load and store operations between shared memory 2570 and register file 2558. In at least one embodiment, register file 2558 can operate at a same frequency as GPGPU cores 2562, thus data transfer between GPGPU cores 2562 and register file 2558 is very low latency. In at least one embodiment, shared memory 2570 can be used to enable communication between threads that execute on functional units within graphics multiprocessor 2534. In at least one embodiment, cache memory 2572 can be used as a data cache for example, to cache texture data communicated between functional units and texture unit 2536. In at least one embodiment, shared memory 2570 can also be used as a program managed cached. In at least one embodiment, threads executing on GPGPU cores 2562 can programmatically store data within shared memory in addition to automatically cached data that is stored within cache memory 2572.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/ interconnect (e.g., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in graphics multiprocessor 2534 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more graphics multiprocessor 2534.

Figure 26:
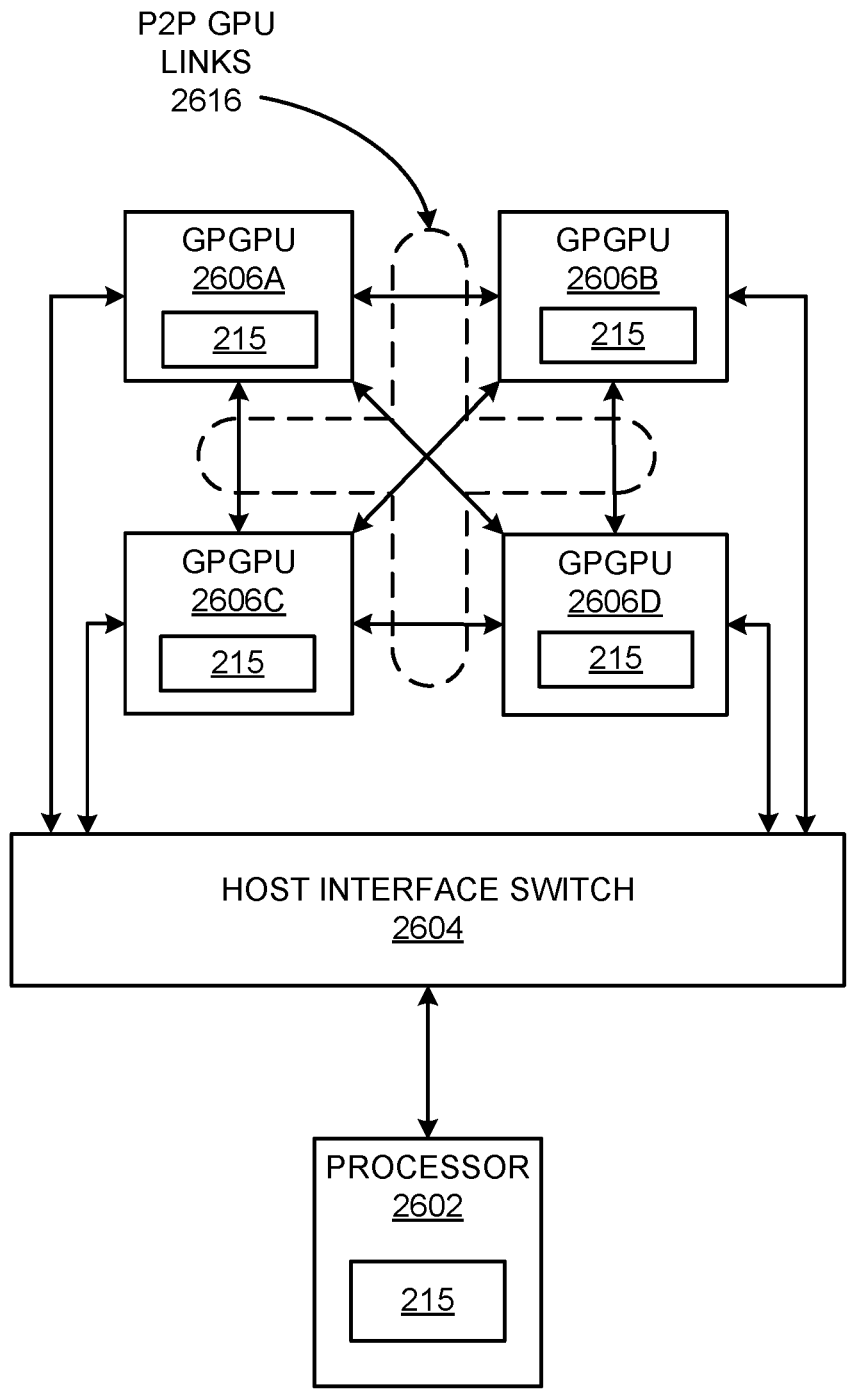
FIG. 26 illustrates a multi-graphics processing unit (GPU) system, in at least one embodiment.

FIG. 26 illustrates a multi-GPU computing system 2600, in at least one embodiment. In at least one embodiment, multi-GPU computing system 2600 can include a processor 2602 coupled to multiple general purpose graphics processing units (GPGPUs) 2606A-2606D via a host interface switch 2604. In at least one embodiment, host interface switch 2604 is a PCI express switch device that couples processor 2602 to a PCI express bus over which processor 2602 can communicate with GPGPUs 2606A-2026D. GPGPUs 2606A-2606D can interconnect via a set of high-speed point to point GPU to GPU links 2616. In at least one embodiment, GPU to GPU links 2616 connect to each of GPGPUs 2606A-D via a dedicated GPU link. In at least one embodiment, P2P GPU links 2616 enable direct communication between each of GPGPUs 2606A-2606D without requiring communication over host interface bus 2604 to which processor 2602 is connected. In at least one embodiment, with GPU-to-GPU traffic directed to P2P GPU links 2616, host interface bus 2604 remains available for system memory access or to communicate with other instances of multi-GPU computing system 2600, for example, via one or more network devices. While in at least one embodiment GPGPUs 2606A-2606D connect to processor 2602 via host interface switch 2604, in at least one embodiment processor 2602 includes direct support for P2P GPU links 2616 and can connect directly to GPGPUs 2606A-2606D.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in multi-GPU computing system 2600 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more GPU computing system 2600.

Figure 27:
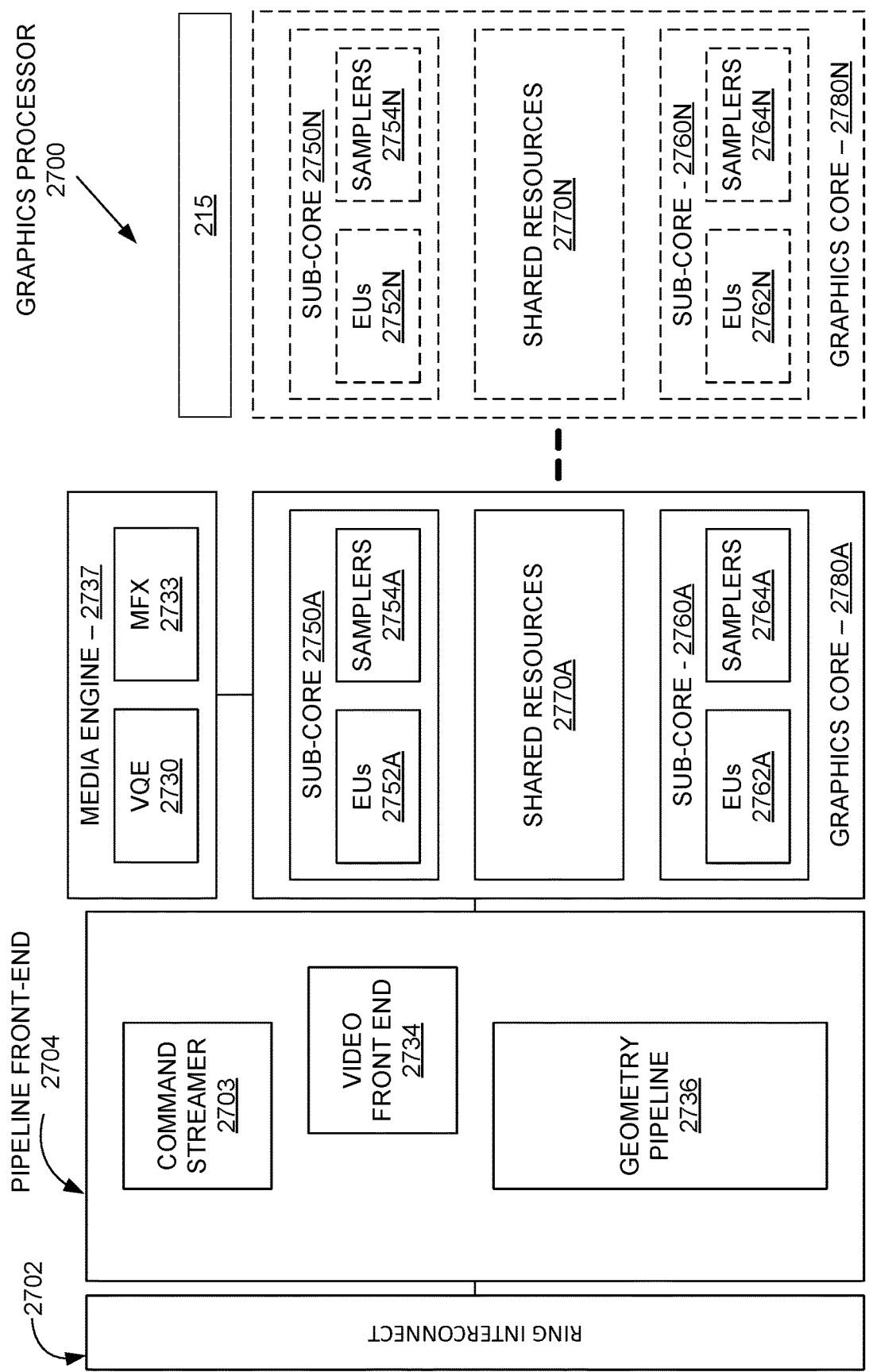
FIG. 27 illustrates a graphics processor, in at least one embodiment.

FIG. 27 is a block diagram of a graphics processor 2700, in at least one embodiment. In at least one embodiment, graphics processor 2700 includes a ring interconnect 2702, a pipeline front-end 2704, a media engine 2737, and graphics cores 2780A-2780N. In at least one embodiment, ring interconnect 2702 couples graphics processor 2700 to other processing units, including other graphics processors or one or more general-purpose processor cores. In at least one embodiment, graphics processor 2700 is one of many processors integrated within a multi-core processing system.

In at least one embodiment, graphics processor 2700 receives batches of commands via ring interconnect 2702. In at least one embodiment, incoming commands are interpreted by a command streamer 2703 in pipeline front-end 2704. In at least one embodiment, graphics processor 2700 includes scalable execution logic to perform 3D geometry processing and media processing via graphics core(s) 2780A-2780N. In at least one embodiment, for 3D geometry processing commands, command streamer 2703 supplies commands to geometry pipeline 2736. In at least one embodiment, for at least some media processing commands, command streamer 2703 supplies commands to a video front end 2734, which couples with a media engine 2737. In at least one embodiment, media engine 2737 includes a Video Quality Engine (VQE) 2730 for video and image post-processing and a multi-format encode/decode (MFX) 2733 engine to provide hardware-accelerated media data encode and decode. In at least one embodiment, geometry pipeline 2736 and media engine 2737 each generate execution threads for thread execution resources provided by at least one graphics core 2780A.

In at least one embodiment, graphics processor 2700 includes scalable thread execution resources featuring modular cores 2780A-2780N (sometimes referred to as core slices), each having multiple sub-cores 2750A-550N, 2760A-2760N (sometimes referred to as core sub-slices). In at least one embodiment, graphics processor 2700 can have any number of graphics cores 2780A through 2780N. In at least one embodiment, graphics processor 2700 includes a graphics core 2780A having at least a first sub-core 2750A and a second sub-core 2760A. In at least one embodiment, graphics processor 2700 is a low power processor with a single sub-core (e.g., 2750A). In at least one embodiment, graphics processor 2700 includes multiple graphics cores 2780A-2780N, each including a set of first sub-cores 2750A-2750N and a set of second sub-cores 2760A-2760N. In at least one embodiment, each sub-core in first sub-cores 2750A-2750N includes at least a first set of execution units 2752A-2752N and media/texture samplers 2754A-2754N. In at least one embodiment, each sub-core in second sub-cores 2760A-2760N includes at least a second set of execution units 2762A-2762N and samplers 2764A-2764N. In at least one embodiment, each sub-core 2750A-2750N, 2760A-2760N shares a set of shared resources 2770A-2770N. In at least one embodiment, shared resources include shared cache memory and pixel operation logic.

Inference and/or training logic 215 are used to perform inferencing and/or training operations associated with one or more embodiments. Details regarding inference and/or training logic 215 are provided in conjunction with FIGS. 2A and/or 2B. In at least one embodiment, inference and/or training logic 215 may be used in graphics processor 2700 for inferencing or predicting operations based, at least in part, on weight parameters calculated using neural network training operations, neural network functions and/or architectures, or neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more graphics processor 2700.

Figure 28:
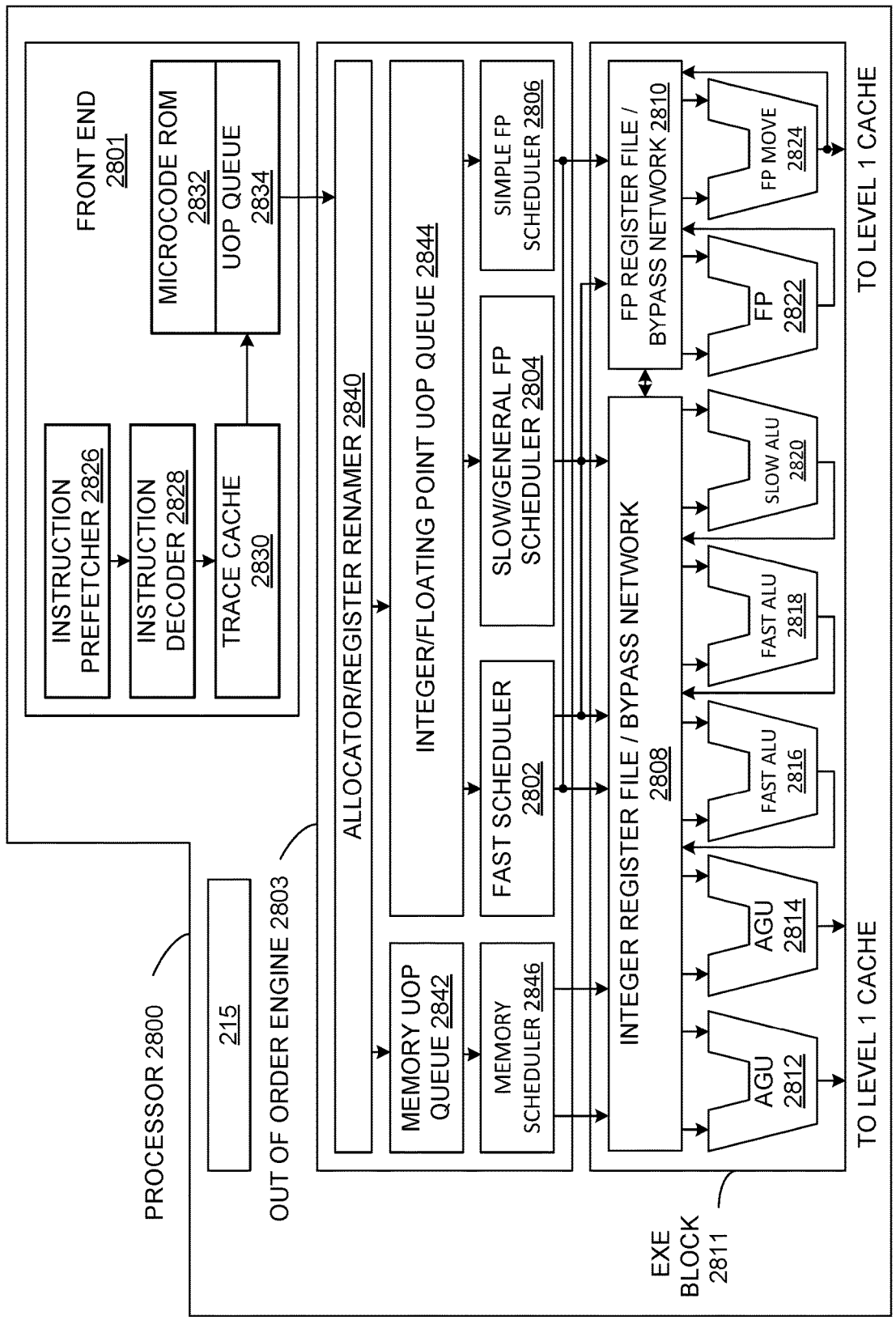
FIG. 28 is a block diagram illustrating a processor microarchitecture for a processor, in at least one embodiment.

FIG. 28 is a block diagram illustrating micro-architecture for a processor 2800 that may include logic circuits to perform instructions, in at least one embodiment. In at least one embodiment, processor 2800 may perform instructions, including x86 instructions, ARM instructions, specialized instructions for application-specific integrated circuits (ASICs), etc. In at least one embodiment, processor 2810 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2810 may perform instructions to accelerate machine learning or deep learning algorithms, training, or inferencing.

In at least one embodiment, processor 2800 includes an in-order front end ("front end") 2801 to fetch instructions to be executed and prepare instructions to be used later in processor pipeline. In at least one embodiment, front end 2801 may include several units. In at least one embodiment, an instruction prefetcher 2826 fetches instructions from memory and feeds instructions to an instruction decoder 2828 which in turn decodes or interprets instructions. For example, in at least one embodiment, instruction decoder 2828 decodes a received instruction into one or more operations called "micro-instructions" or "micro-operations" (also called "micro ops" or "uops") that machine may execute. In at least one embodiment, instruction decoder 2828 parses instruction into an opcode and corresponding data and control fields that may be used by micro-architecture to perform operations in at least one embodiment. In at least one embodiment, a trace cache 2830 may assemble decoded uops into program ordered sequences or traces in a uop queue 2834 for execution. In at least one embodiment, when trace cache 2830 encounters a complex instruction, a microcode ROM 2832 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 2828 may access microcode ROM 2832 to perform instruction. In at least one embodiment, an instruction may be decoded into a small number of micro-ops for processing at instruction decoder 2828. In at least one embodiment, an instruction may be stored within microcode ROM 2832 should a number of micro-ops be needed to accomplish operation. In at least one embodiment, trace cache 2830 refers to an entry point programmable logic array ("PLA") to determine a correct micro-instruction pointer for reading microcode sequences to complete one or more instructions from microcode ROM 2832 in at least one embodiment. In at least one embodiment, after microcode ROM 2832 finishes sequencing micro-ops for an instruction, front end 2801 of machine may resume fetching micro-ops from trace cache 2830.

In at least one embodiment, out-of-order execution engine ("out of order engine") 2803 may prepare instructions for execution. In at least one embodiment, out-of-order execution logic has a number of buffers to smooth out and re-order flow of instructions to optimize performance as they go down pipeline and get scheduled for execution. out-of-order execution engine 2803 includes, without limitation, an allocator/register renamer 2840, a memory uop queue 2842, an integer/floating point uop queue 2844, a memory scheduler 2846, a fast scheduler 2802, a slow/general floating point scheduler ("slow/general FP scheduler") 2804, and a simple floating point scheduler ("simple FP scheduler") 2806. In at least one embodiment, fast schedule 2802, slow/general floating point scheduler 2804, and simple floating point scheduler 2806 are also collectively referred to herein as "uop schedulers 2802, 2804, 2806." Allocator/register renamer 2840 allocates machine buffers and resources that each uop needs in order to execute. In at least one embodiment, allocator/register renamer 2840 renames logic registers onto entries in a register file. In at least one embodiment, allocator/register renamer 2840 also allocates an entry for each uop in one of two uop queues, memory uop queue 2842 for memory operations and integer/floating point uop queue 2844 for non-memory operations, in front of memory scheduler 2846 and uop schedulers 2802, 2804, 2806. In at least one embodiment, uop schedulers 2802, 2804, 2806, determine when a uop is ready to execute based on readiness of their dependent input register operand sources and availability of execution resources uops need to complete their operation. In at least one embodiment, fast scheduler 2802 of at least one embodiment may schedule on each half of main clock cycle while slow/general floating point scheduler 2804 and simple floating point scheduler 2806 may schedule once per main processor clock cycle. In at least one embodiment, uop schedulers 2802, 2804, 2806 arbitrate for dispatch ports to schedule uops for execution.

In at least one embodiment, execution block 2811 includes, without limitation, an integer register file/bypass network 2808, a floating point register file/bypass network ("FP register file/bypass network") 2810, address generation units ("AGUs") 2812 and 2814, fast Arithmetic Logic Units (ALUs) ("fast ALUs") 2816 and 2818, a slow Arithmetic Logic Unit ("slow ALU") 2820, a floating point ALU ("FP") 2822, and a floating point move unit ("FP move") 2824. In at least one embodiment, integer register file/bypass network 2808 and floating point register file/bypass network 2810 are also referred to herein as "register files 2808, 2810." In at least one embodiment, AGUSs 2812 and 2814, fast ALUs

2816 and 2818, slow ALU 2820, floating point ALU 2822, and floating point move unit 2824 are also referred to herein as "execution units 2812, 2814, 2816, 2818, 2820, 2822, and 2824." In at least one embodiment, execution block 2811 may include, without limitation, any number (including zero) and type of register files, bypass networks, address generation units, and execution units, in any combination.

In at least one embodiment, register files 2808, 2810 may be arranged between uop schedulers 2802, 2804, 2806, and execution units 2812, 2814, 2816, 2818, 2820, 2822, and 2824. In at least one embodiment, integer register file/bypass network 2808 performs integer operations. In at least one embodiment, floating point register file/bypass network 2810 performs floating point operations. In at least one embodiment, each of register files 2808, 2810 may include, without limitation, a bypass network that may bypass or forward just completed results that have not yet been written into register file to new dependent uops. In at least one embodiment, register files 2808, 2810 may communicate data with each other. In at least one embodiment, integer register file/bypass network 2808 may include, without limitation, two separate register files, one register file for low-order thirty-two bits of data and a second register file for high order thirty-two bits of data. In at least one embodiment, floating point register file/bypass network 2810 may include, without limitation, 128-bit wide entries because floating point instructions typically have operands from 64 to 128 bits in width.

In at least one embodiment, execution units 2812, 2814, 2816, 2818, 2820, 2822, 2824 may execute instructions. In at least one embodiment, register files 2808, 2810 store integer and floating point data operand values that microinstructions need to execute. In at least one embodiment, processor 2800 may include, without limitation, any number and combination of execution units 2812, 2814, 2816, 2818, 2820, 2822, 2824. In at least one embodiment, floating point ALU 2822 and floating point move unit 2824, may execute floating point, MMX, SIMD, AVX and SSE, or other operations, including specialized machine learning instructions. In at least one embodiment, floating point ALU 2822 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2816, 2818. In at least one embodiment, fast ALUS 2816, 2818 may execute fast operations with an effective latency of half a clock cycle. In at least one embodiment, most complex integer operations go to slow ALU 2820 as slow ALU 2820 may include, without limitation, integer execution hardware for long-latency type of operations, such as a multiplier, shifts, flag logic, and branch processing. In at least one embodiment, memory load/store operations may be executed by AGUS 2812, 2814. In at least one embodiment, fast ALU 2816, fast ALU 2818, and slow ALU 2820 may perform integer operations on 64-bit data operands. In at least one embodiment, fast ALU 2816, fast ALU 2818, and slow ALU 2820 may be implemented to support a variety of data bit sizes including sixteen, thirty-two, 128, 256, etc. In at least one embodiment, floating point ALU 2822 and floating point move unit 2824 may be implemented to support a range of operands having bits of various widths. In at least one embodiment, floating point ALU 2822 and floating point move unit 2824 may operate on 128-bit wide packed data operands in conjunction with SIMD and multimedia instructions.

In at least one embodiment, uop schedulers 2802, 2804, 2806, dispatch dependent operations before parent load has finished executing. In at least one embodiment, as uops may be speculatively scheduled and executed in processor 2800, processor 2800 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, a term "registers" may refer to on-board processor storage locations that may be used as part of instructions to identify operands. In at least one embodiment, registers may be those that may be usable from outside of processor (from a programmers perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 215 are used to perform inferencing and/or training operations associated with one or more embodiments. Details regarding inference and/or training logic 215 are provided in conjunction with FIGS. 2A and/or 2B. In at least one embodiment portions or all of inference and/or training logic 215 may be incorporated into EXE Block 2811 and other memory or registers shown or not shown. For example, in at least one embodiment, training and/or inferencing techniques described herein may use one or more of ALUs illustrated in EXE Block 2811. Moreover, weight parameters may be stored in on-chip or off-chip memory and/or registers (shown or not shown) that configure ALUs of EXE Block 2811 to perform one or more machine learning algorithms, neural network architectures, use cases, or training techniques described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more processor 2800.

Figure 29:
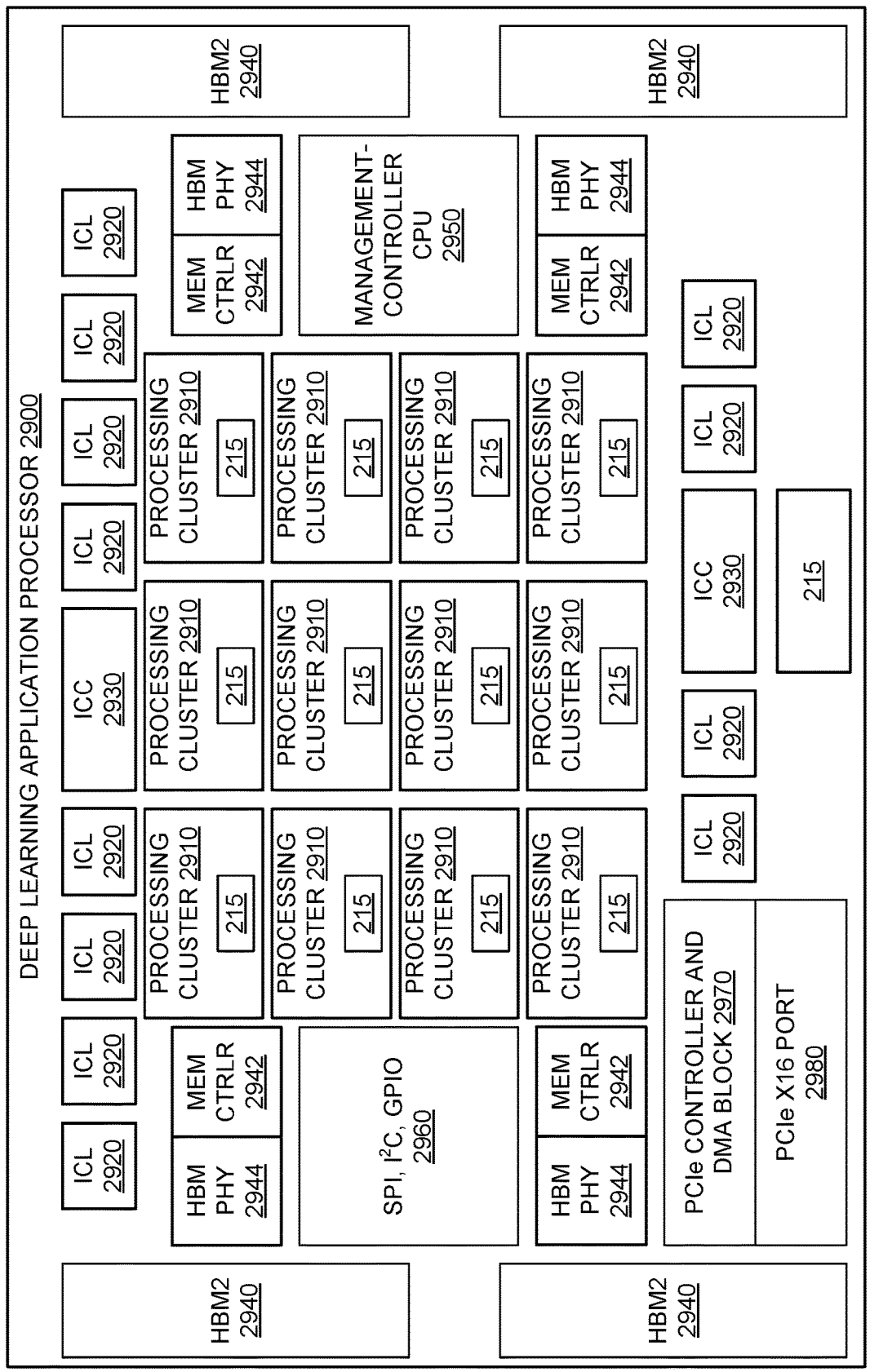
FIG. 29 illustrates a deep learning application processor, in at least one embodiment.

FIG. 29 illustrates a deep learning application processor 2900, in at least one embodiment. In at least one embodiment, deep learning application processor 2900 uses instructions that, if executed by deep learning application processor 2900, cause deep learning application processor 2900 to perform some or all of processes and techniques described throughout this disclosure. In at least one embodiment, deep learning application processor 2900 is an application-specific integrated circuit (ASIC). In at least one embodiment, application processor 2900 performs matrix multiply operations either "hard-wired" into hardware as a result of performing one or more instructions or both. In at least one embodiment, deep learning application processor 2900 includes, without limitation, processing clusters 2910(1)-2910(12), Inter-Chip Links ("ICLs") 2920(1)-2920(12), Inter-Chip Controllers ("ICCs") 2930(1)-2930(2), high bandwidth memory second generation ("HBM2") 2940(1)-2940(4), memory controllers ("Mem Ctrlrs") 2942(1)-2942(4), high bandwidth memory physical layer ("HBM PHY") 2944(1)-2944(4), a management-controller central processing unit ("management-controller CPU") 2950, a Serial Peripheral Interface, Inter-Integrated Circuit, and General Purpose Input/Output block ("SPI, I2C, GPIO") 2960, a peripheral component interconnect express controller and direct memory access block ("PCIe Controller and DMA") 2970, and a sixteen-lane peripheral component interconnect express port ("PCI Express×16") 2980.

In at least one embodiment, processing clusters 2910 may perform deep learning operations, including inference or prediction operations based on weight parameters calculated one or more training techniques, including those described herein. In at least one embodiment, each processing cluster 2910 may include, without limitation, any number and type of processors. In at least one embodiment, deep learning application processor 2900 may include any number and type of processing clusters 2900. In at least one embodiment, Inter-Chip Links 2920 are bi-directional. In at least one embodiment, Inter-Chip Links 2920 and Inter-Chip Controllers 2930 enable multiple deep learning application processors 2900 to exchange information, including activation information resulting from performing one or more machine learning algorithms embodied in one or more neural networks. In at least one embodiment, deep learning application processor 2900 may include any number (including zero) and type of ICLs 2920 and ICCs 2930.

In at least one embodiment, HBM2s 2940 provide a total of 32 Gigabytes (GB) of memory. HBM2 2940(*i*) is associated with both memory controller 2942(*i*) and HBM PHY 2944(*i*). In at least one embodiment, any number of HBM2s 2940 may provide any type and total amount of high bandwidth memory and may be associated with any number (including zero) and type of memory controllers 2942 and HBM PHYs 2944. In at least one embodiment, SPI, I2C, GPIO 2960, PCIe Controller and DMA 2970, and/or PCIe 2980 may be replaced with any number and type of blocks that enable any number and type of communication standards in any technically feasible fashion.

Inference and/or training logic 215 are used to perform inferencing and/or training operations associated with one or more embodiments. Details regarding inference and/or training logic 215 are provided in conjunction with FIGS. 2A and/or 2B. In at least one embodiment, deep learning application processor is used to train a machine learning model, such as a neural network, to predict or infer information provided to deep learning application processor 2900. In at least one embodiment, deep learning application processor 2900 is used to infer or predict information based on a trained machine learning model (e.g., neural network) that has been trained by another processor or system or by deep learning application processor 2900. In at least one embodiment, processor 2900 may be used to perform one or more neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more processor 2900.

Figure 30:
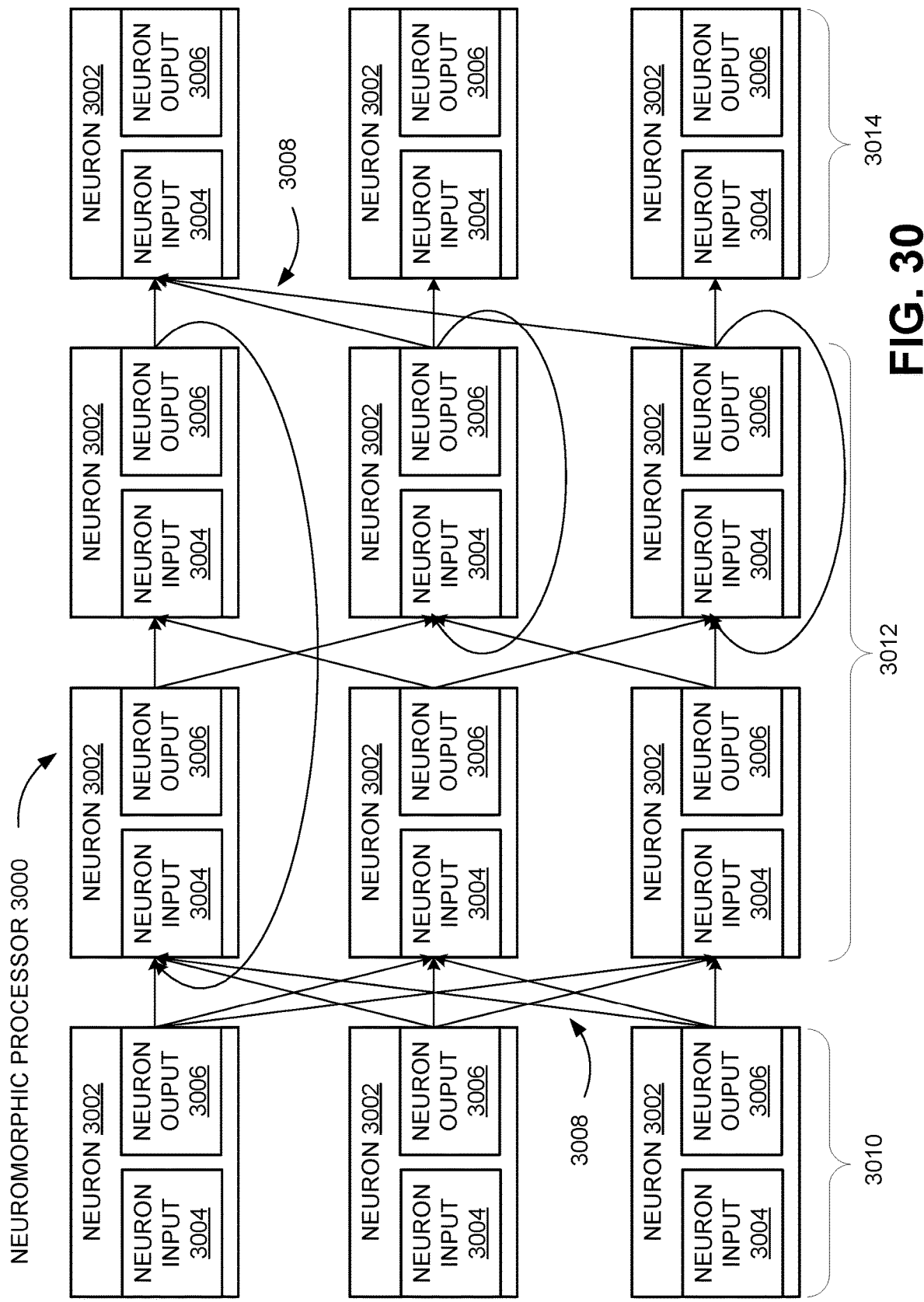
FIG. 30 is a block diagram illustrating an example neuromorphic processor, in at least one embodiment.

FIG. 30 is a block diagram of a neuromorphic processor 3000, in at least one embodiment. In at least one embodiment, neuromorphic processor 3000 may receive one or more inputs from sources external to neuromorphic processor 3000. In at least one embodiment, these inputs may be transmitted to one or more neurons 3002 within neuromorphic processor 3000. In at least one embodiment, neurons 3002 and components thereof may be implemented using circuitry or logic, including one or more arithmetic logic units (ALUs). In at least one embodiment, neuromorphic processor 3000 may include, without limitation, thousands or millions of instances of neurons 3002, but any suitable number of neurons 3002 may be used. In at least one embodiment, each instance of neuron 3002 may include a neuron input 3004 and a neuron output 3006. In at least one embodiment, neurons 3002 may generate outputs that may be transmitted to inputs of other instances of neurons 3002. For example, in at least one embodiment, neuron inputs 3004 and neuron outputs 3006 may be interconnected via synapses 3008.

In at least one embodiment, neurons 3002 and synapses 3008 may be interconnected such that neuromorphic processor 3000 operates to process or analyze information received by neuromorphic processor 3000. In at least one embodiment, neurons 3002 may transmit an output pulse (or "fire" or "spike") when inputs received through neuron input 3004 exceed a threshold. In at least one embodiment, neurons 3002 may sum or integrate signals received at neuron inputs 3004. For example, in at least one embodiment, neurons 3002 may be implemented as leaky integrate-and-fire neurons, wherein if a sum (referred to as a "membrane potential") exceeds a threshold value, neuron 3002 may generate an output (or "fire") using a transfer function such as a sigmoid or threshold function. In at least one embodiment, a leaky integrate-and-fire neuron may sum signals received at neuron inputs 3004 into a membrane potential and may also apply a decay factor (or leak) to reduce a membrane potential. In at least one embodiment, a leaky integrate-and-fire neuron may fire if multiple input signals are received at neuron inputs 3004 rapidly enough to exceed a threshold value (e.g., before a membrane potential decays too low to fire). In at least one embodiment, neurons 3002 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3002 may include, without limitation, comparator circuits or logic that generate an output spike at neuron output 3006 when result of applying a transfer function to neuron input 3004 exceeds a threshold. In at least one embodiment, once neuron 3002 fires, it may disregard previously received input information by, for example, resetting a membrane potential to 0 or another suitable default value. In at least one embodiment, once membrane potential is reset to 0, neuron 3002 may resume normal operation after a suitable period of time (or refractory period).

In at least one embodiment, neurons 3002 may be interconnected through synapses 3008. In at least one embodiment, synapses 3008 may operate to transmit signals from an output of a first neuron 3002 to an input of a second neuron 3002. In at least one embodiment, neurons 3002 may transmit information over more than one instance of synapse 3008. In at least one embodiment, one or more instances of neuron output 3006 may be connected, via an instance of synapse 3008, to an instance of neuron input 3004 in same neuron 3002. In at least one embodiment, an instance of neuron 3002 generating an output to be transmitted over an instance of synapse 3008 may be referred to as a "pre-synaptic neuron" with respect to that instance of synapse 3008. In at least one embodiment, an instance of neuron 3002 receiving an input transmitted over an instance of synapse 3008 may be referred to as a "post-synaptic neuron" with respect to that instance of synapse 3008. Because an instance of neuron 3002 may receive inputs from one or more instances of synapse 3008, and may also transmit outputs over one or more instances of synapse 3008, a single instance of neuron 3002 may therefore be both a "pre-synaptic neuron" and "post-synaptic neuron," with respect to various instances of synapses 3008, in at least one embodiment.

In at least one embodiment, neurons 3002 may be organized into one or more layers. Each instance of neuron 3002 may have one neuron output 3006 that may fan out through one or more synapses 3008 to one or more neuron inputs 3004. In at least one embodiment, neuron outputs 3006 of neurons 3002 in a first layer 3010 may be connected to neuron inputs 3004 of neurons 3002 in a second layer 3012. In at least one embodiment, layer 3010 may be referred to as a "feed-forward layer." In at least one embodiment, each instance of neuron 3002 in an instance of first layer 3010 may fan out to each instance of neuron 3002 in second layer 3012. In at least one embodiment, first layer 3010 may be referred to as a "fully connected feed-forward layer." In at least one embodiment, each instance of neuron 3002 in an instance of second layer 3012 may fan out to fewer than all instances of neuron 3002 in a third layer 3014. In at least one embodiment, second layer 3012 may be referred to as a "sparsely connected feed-forward layer." In at least one embodiment, neurons 3002 in second layer 3012 may fan out to neurons 3002 in multiple other layers, including to neurons 3002 in (same) second layer 3012. In at least one embodiment, second layer 3012 may be referred to as a "recurrent layer." Neuromorphic processor 3000 may include, without limitation, any suitable combination of recurrent layers and feed-forward layers, including, without limitation, both sparsely connected feed-forward layers and fully connected feed-forward layers.

In at least one embodiment, neuromorphic processor 3000 may include, without limitation, a reconfigurable interconnect architecture or dedicated hard wired interconnects to connect synapse 3008 to neurons 3002. In at least one embodiment, neuromorphic processor 3000 may include, without limitation, circuitry or logic that allows synapses to be allocated to different neurons 3002 as needed based on neural network topology and neuron fan-in/out. For example, in at least one embodiment, synapses 3008 may be connected to neurons 3002 using an interconnect fabric, such as network-on-chip, or with dedicated connections. In at least one embodiment, synapse interconnections and components thereof may be implemented using circuitry or logic.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more neuromorphic processor 3000.

Figure 31:
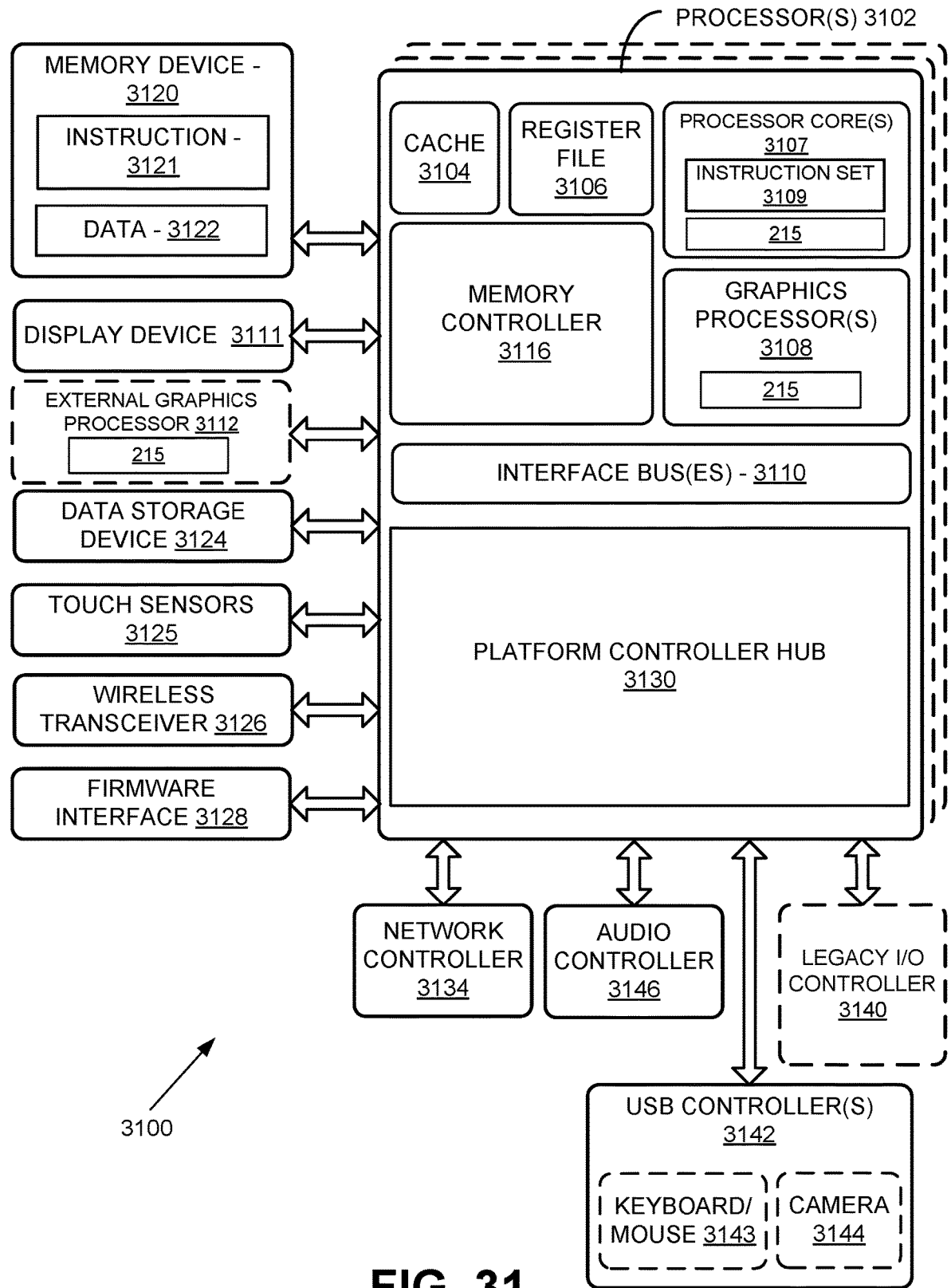
FIGS. 31 and 32 illustrates at least portions of a graphics processor, according to one or more embodiments.

FIG. 31 is a block diagram of a processing system, in at least one embodiment. In at least one embodiment, system 3100 includes one or more processors 3102 and one or more graphics processors 3108, and may be a single processor desktop system, a multiprocessor workstation system, or a server system having a large number of processors 3102 or processor cores 3107. In at least one embodiment, system 3100 is a processing platform incorporated within a system-on-a-chip (SoC) integrated circuit for use in mobile, handheld, or embedded devices.

In at least one embodiment, system 3100 can include, or be incorporated within a server-based gaming platform, a game console, including a game and media console, a mobile gaming console, a handheld game console, or an online game console. In at least one embodiment, system 3100 is a mobile phone, smart phone, tablet computing device or mobile Internet device. In at least one embodiment, processing system 3100 can also include, couple with, or be integrated within a wearable device, such as a smart watch wearable device, smart eyewear device, augmented reality device, or virtual reality device. In at least one embodiment, processing system 3100 is a television or set top box device having one or more processors 3102 and a graphical interface generated by one or more graphics processors 3108.

In at least one embodiment, one or more processors 3102 each include one or more processor cores 3107 to process instructions which, when executed, perform operations for system and user software. In at least one embodiment, each of one or more processor cores 3107 is configured to process a specific instruction set 3109. In at least one embodiment, instruction set 3109 may facilitate Complex Instruction Set Computing (CISC), Reduced Instruction Set Computing (RISC), or computing via a Very Long Instruction Word (VLIW). In at least one embodiment, processor cores 3107 may each process a different instruction set 3109, which may include instructions to facilitate emulation of other instruction sets. In at least one embodiment, processor core 3107 may also include other processing devices, such a Digital Signal Processor (DSP).

In at least one embodiment, processor 3102 includes cache memory 3104. In at least one embodiment, processor 3102 can have a single internal cache or multiple levels of internal cache. In at least one embodiment, cache memory is shared among various components of processor 3102. In at least one embodiment, processor 3102 also uses an external cache (e.g., a Level-3 (L3) cache or Last Level Cache (LLC)) (not shown), which may be shared among processor cores 3107 using cache coherency techniques. In at least one embodiment, register file 3106 is additionally included in processor 3102 which may include different types of registers for storing different types of data (e.g., integer registers, floating point registers, status registers, and an instruction pointer register). In at least one embodiment, register file 3106 may include general-purpose registers or other registers.

In at least one embodiment, one or more processor(s) 3102 are coupled with one or more interface bus(es) 3110 to transmit communication signals such as address, data, or control signals between processor 3102 and other components in system 3100. In at least one embodiment interface bus 3110, in one embodiment, can be a processor bus, such as a version of a Direct Media Interface (DMI) bus. In at least one embodiment, interface 3110 is not limited to a DMI bus, and may include one or more Peripheral Component Interconnect buses (e.g., PCI, PCI Express), memory busses, or other types of interface busses. In at least one embodiment processor(s) 3102 include an integrated memory controller 3116 and a platform controller hub 3130. In at least one embodiment, memory controller 3116 facilitates communication between a memory device and other components of system 3100, while platform controller hub (PCH) 3130 provides connections to I/O devices via a local I/O bus.

In at least one embodiment, memory device 3120 can be a dynamic random access memory (DRAM) device, a static random access memory (SRAM) device, flash memory device, phase-change memory device, or some other memory device having suitable performance to serve as process memory. In at least one embodiment memory device 3120 can operate as system memory for system 3100, to store data 3122 and instructions 3121 for use when one or more processors 3102 executes an application or process. In at least one embodiment, memory controller 3116 also couples with an external graphics processor 3112, which may communicate with one or more graphics processors 3108 in processors 3102 to perform graphics and media operations. In at least one embodiment, a display device 3111 can connect to processor(s) 3102. In at least one embodiment display device 3111 can include one or more of an internal display device, as in a mobile electronic device or a laptop device or an external display device attached via a display interface (e.g., DisplayPort, etc.). In at least one embodiment, display device 3111 can include a head mounted display (HMD) such as a stereoscopic display device for use in virtual reality (VR) applications or augmented reality (AR) applications.

In at least one embodiment, platform controller hub 3130 enables peripherals to connect to memory device 3120 and processor 3102 via a high-speed I/O bus. In at least one embodiment, I/O peripherals include, but are not limited to, an audio controller 3146, a network controller 3134, a firmware interface 3128, a wireless transceiver 3126, touch sensors 3125, a data storage device 3124 (e.g., hard disk drive, flash memory, etc.). In at least one embodiment, data storage device 3124 can connect via a storage interface (e.g., SATA) or via a peripheral bus, such as a Peripheral Component Interconnect bus (e.g., PCI, PCI Express). In at least one embodiment, touch sensors 3125 can include touch screen sensors, pressure sensors, or fingerprint sensors. In at least one embodiment, wireless transceiver 3126 can be a Wi-Fi transceiver, a Bluetooth transceiver, or a mobile network transceiver such as a 3G, 4G, or Long Term Evolution (LTE) transceiver. In at least one embodiment, firmware interface 3128 enables communication with system firmware, and can be, for example, a unified extensible firmware interface (UEFI). In at least one embodiment, network controller 3134 can enable a network connection to a wired network. In at least one embodiment, a high-performance network controller (not shown) couples with interface bus 3110. In at least one embodiment, audio controller 3146 is a multi-channel high definition audio controller. In at least one embodiment, system 3100 includes a legacy I/O controller 3140 for coupling legacy (e.g., Personal System 2 (PS/2)) devices to system. In at least one embodiment, platform controller hub 3130 can also connect to one or more Universal Serial Bus (USB) controllers 3142 connect input devices, such as keyboard and mouse 3143 combinations, a camera 3144, or other USB input devices.

In at least one embodiment, an instance of memory controller 3116 and platform controller hub 3130 may be integrated into a discreet external graphics processor, such as external graphics processor 3112. In at least one embodiment, platform controller hub 3130 and/or memory controller 3116 may be external to one or more processor(s) 3102. For example, in at least one embodiment, system 3100 can include an external memory controller 3116 and platform controller hub 3130, which may be configured as a memory controller hub and peripheral controller hub within a system chipset that is in communication with processor(s) 3102.

Inference and/or training logic 215 are used to perform inferencing and/or training operations associated with one or more embodiments. Details regarding inference and/or training logic 215 are provided in conjunction with FIGS. 2A and/or 2B. In at least one embodiment portions or all of inference and/or training logic 215 may be incorporated into graphics processor 3100. For example, in at least one embodiment, training and/or inferencing techniques described herein may use one or more of ALUs embodied in 3D pipeline 3112. Moreover, in at least one embodiment, inferencing and/or training operations described herein may be done using logic other than logic illustrated in FIG. 2A or 2B. In at least one embodiment, weight parameters may be stored in on-chip or off-chip memory and/or registers (shown or not shown) that configure ALUs of graphics processor 3100 to perform one or more machine learning algorithms, neural network architectures, use cases, or training techniques described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more graphics processor 3100.

Figure 32:
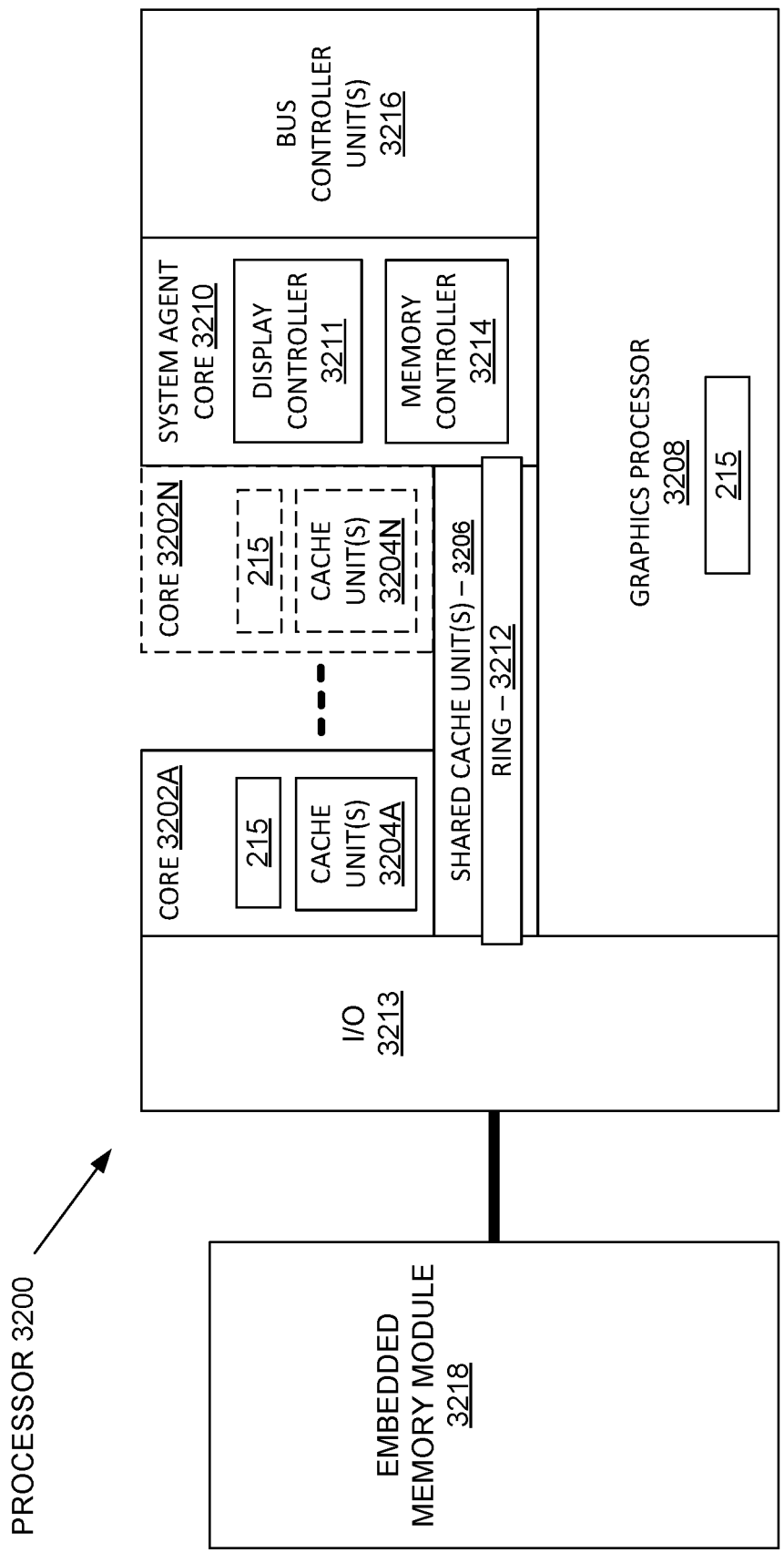

FIG. 32 is a block diagram of a processor 3200 having one or more processor cores 3202A-3202N, an integrated memory controller 3214, and an integrated graphics processor 3208, according to at least one embodiment. In at least one embodiment, processor 3200 can include additional cores up to and including additional core 3202N represented by dashed lined boxes. In at least one embodiment, each of processor cores 3202A-3202N includes one or more internal cache units 3204A-3204N. In at least one embodiment, each processor core also has access to one or more shared cached units 3206.

In at least one embodiment, internal cache units 3204A-3204N and shared cache units 3206 represent a cache memory hierarchy within processor 3200. In at least one embodiment, cache memory units 3204A-3204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3206 and 3204A-3204N.

In at least one embodiment, processor 3200 may also include a set of one or more bus controller units 3216 and a system agent core 3210. In at least one embodiment, one or more bus controller units 3216 manage a set of peripheral buses, such as one or more PCI or PCI express busses. In at least one embodiment, system agent core 3210 provides management functionality for various processor components. In at least one embodiment, system agent core 3210 includes one or more integrated memory controllers 3214 to manage access to various external memory devices (not shown).

In at least one embodiment, one or more of processor cores 3202A-3202N include support for simultaneous multi-threading. In at least one embodiment, system agent core 3210 includes components for coordinating and operating cores 3202A-3202N during multi-threaded processing. In at least one embodiment, system agent core 3210 may additionally include a power control unit (PCU), which includes logic and components to regulate one or more power states of processor cores 3202A-3202N and graphics processor 3208.

In at least one embodiment, processor 3200 additionally includes graphics processor 3208 to execute graphics processing operations. In at least one embodiment, graphics processor 3208 couples with shared cache units 3206, and system agent core 3210, including one or more integrated memory controllers 3214. In at least one embodiment, system agent core 3210 also includes a display controller 3211 to drive graphics processor output to one or more coupled displays. In at least one embodiment, display controller 3211 may also be a separate module coupled with graphics processor 3208 via at least one interconnect, or may be integrated within graphics processor 3208.

In at least one embodiment, a ring based interconnect unit 3212 is used to couple internal components of processor 3200. In at least one embodiment, an alternative interconnect unit may be used, such as a point-to-point interconnect, a switched interconnect, or other techniques. In at least one embodiment, graphics processor 3208 couples with ring interconnect 3212 via an I/O link 3213.

In at least one embodiment, I/O link 3213 represents at least one of multiple varieties of I/O interconnects, including an on package I/O interconnect which facilitates communication between various processor components and a high-performance embedded memory module 3218, such as an eDRAM module. In at least one embodiment, each of processor cores 3202A-3202N and graphics processor 3208 use embedded memory modules 3218 as a shared Last Level Cache.

In at least one embodiment, processor cores 3202A-3202N are homogenous cores executing a common instruction set architecture. In at least one embodiment, processor cores 3202A-3202N are heterogeneous in terms of instruction set architecture (ISA), where one or more of processor cores 3202A-3202N execute a common instruction set, while one or more other cores of processor cores 3202A-3202N executes a subset of a common instruction set or a different instruction set. In at least one embodiment, processor cores 3202A-3202N are heterogeneous in terms of microarchitecture, where one or more cores having a relatively higher power consumption couple with one or more power cores having a lower power consumption. In at least one embodiment, processor 3200 can be implemented on one or more chips or as an SoC integrated circuit.

Inference and/or training logic 215 are used to perform inferencing and/or training operations associated with one or more embodiments. Details regarding inference and/or training logic 215 are provided in conjunction with FIGS. 2A and/or 2B. In at least one embodiment portions or all of inference and/or training logic 215 may be incorporated into graphics processor 3210. For example, in at least one embodiment, training and/or inferencing techniques described herein may use one or more of ALUs embodied in 3D pipeline 3112, graphics core(s) 3215A, shared function logic 3216, graphics core(s) 3215B, shared function logic 3220, or other logic in FIG. 32. Moreover, in at least one embodiment, inferencing and/or training operations described herein may be done using logic other than logic illustrated in FIG. 2A or 2B. In at least one embodiment, weight parameters may be stored in on-chip or off-chip memory and/or registers (shown or not shown) that configure ALUs of graphics processor 3210 to perform one or more machine learning algorithms, neural network architectures, use cases, or training techniques described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more graphics processor 3210.

Figure 33:
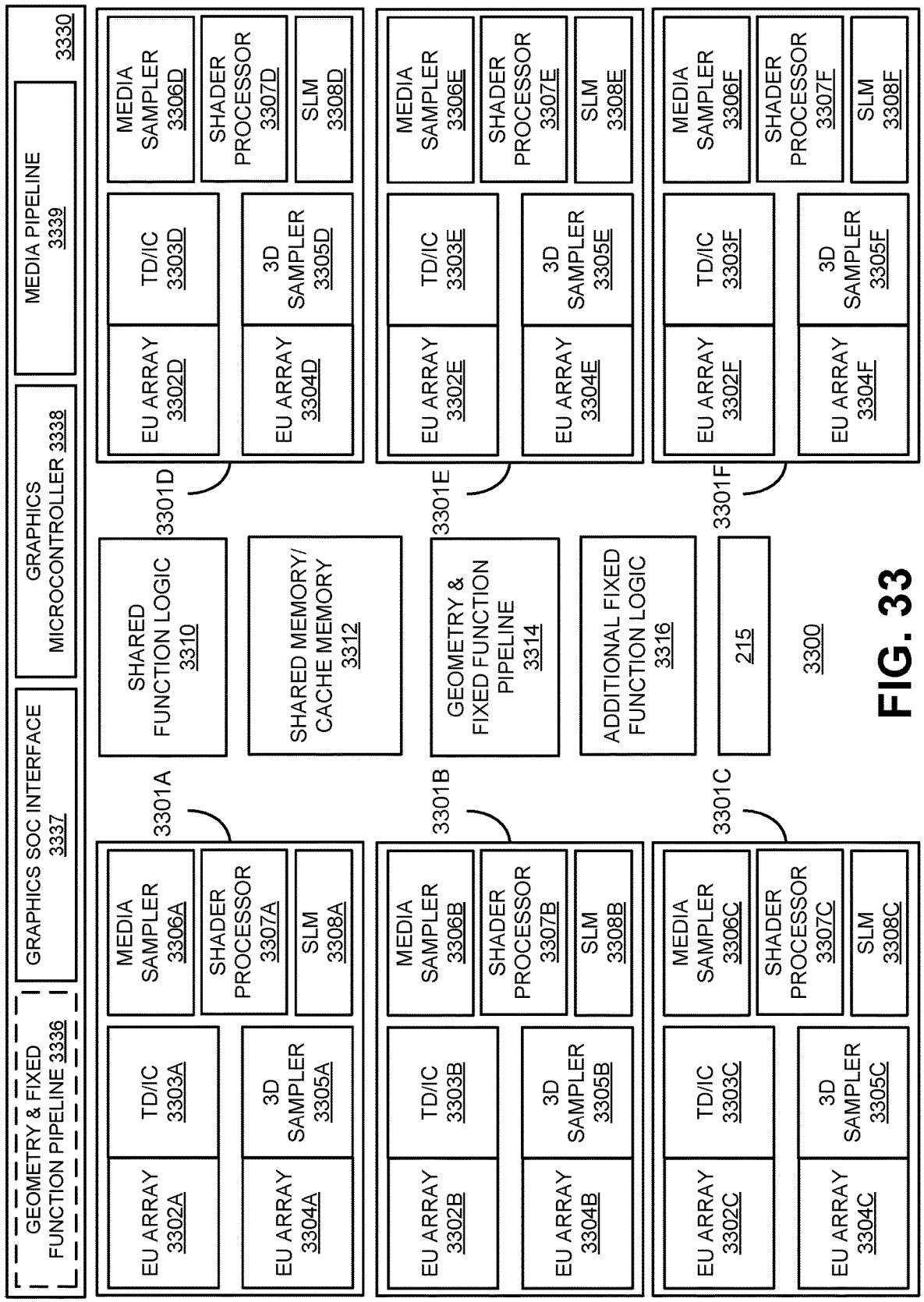
FIG. 33 is a block diagram of at least portions of a graphics processor core, in at least one embodiment.

FIG. 33 is a block diagram of hardware logic of a graphics processor core 3300, in at least one embodiment described herein. In at least one embodiment, graphics processor core 3300 is included within a graphics core array. In at least one embodiment, graphics processor core 3300, sometimes referred to as a core slice, can be one or multiple graphics cores within a modular graphics processor. In at least one embodiment, graphics processor core 3300 is exemplary of one graphics core slice, and a graphics processor as described herein may include multiple graphics core slices based on target power and performance envelopes. In at least one embodiment, each graphics core 3300 can include a fixed function block 3330 coupled with multiple sub-cores 3301A-3301F, also referred to as sub-slices, that include modular blocks of general-purpose and fixed function logic.

In at least one embodiment, fixed function block 3330 includes a geometry/fixed function pipeline 3336 that can be shared by all sub-cores in graphics processor 3300, for example, in lower performance and/or lower power graphics processor implementations. In at least one embodiment, geometry/fixed function pipeline 3336 includes a 3D fixed function pipeline, a video front-end unit, a thread spawner and thread dispatcher, and a unified return buffer manager, which manages unified return buffers.

In at least one embodiment fixed function block 3330 also includes a graphics SoC interface 3337, a graphics microcontroller 3338, and a media pipeline 3339. Graphics SoC interface 3337 provides an interface between graphics core 3300 and other processor cores within a system on a chip integrated circuit. In at least one embodiment, graphics microcontroller 3338 is a programmable sub-processor that is configurable to manage various functions of graphics processor 3300, including thread dispatch, scheduling, and pre-emption. In at least one embodiment, media pipeline 3339 includes logic to facilitate decoding, encoding, pre-processing, and/or post-processing of multimedia data, including image and video data. In at least one embodiment, media pipeline 3339 implement media operations via requests to compute or sampling logic within sub-cores 3301-3301F.

In at least one embodiment, SoC interface 3337 enables graphics core 3300 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3337 can also enable communication with fixed function devices within an SoC, such as camera imaging pipelines, and enables use of and/or implements global memory atomics that may be shared between graphics core 3300 and CPUs within an SoC. In at least one embodiment, SoC interface 3337 can also implement power management controls for graphics core 3300 and enable an interface between a clock domain of graphic core 3300 and other clock domains within an SoC. In at least one embodiment, SoC interface 3337 enables receipt of command buffers from a command streamer and global thread dispatcher that are configured to provide commands and instructions to each of one or more graphics cores within a graphics processor. In at least one embodiment, commands and instructions can be dispatched to media pipeline 3339, when media operations are to be performed, or a geometry and fixed function pipeline (e.g., geometry and fixed function pipeline 3336, geometry and fixed function pipeline 3314) when graphics processing operations are to be performed.

In at least one embodiment, graphics microcontroller 3338 can be configured to perform various scheduling and management tasks for graphics core 3300. In at least one embodiment, graphics microcontroller 3338 can perform graphics and/or compute workload scheduling on various graphics parallel engines within execution unit (EU) arrays 3302A-3302F, 3304A-3304F within sub-cores 3301A-3301F. In at least one embodiment, host software executing on a CPU core of an SoC including graphics core 3300 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 3338 can also facilitate low-power or idle states for graphics core 3300, providing graphics core 3300 with an ability to save and restore registers within graphics core 3300 across low-power state transitions independently from an operating system and/or graphics driver software on a system.

In at least one embodiment, graphics core 3300 may have greater than or fewer than illustrated sub-cores 3301A-3301F, up to N modular sub-cores. For each set of N sub-cores, in at least one embodiment, graphics core 3300 can also include shared function logic 3310, shared and/or cache memory 3312, a geometry/fixed function pipeline 3314, as well as additional fixed function logic 3316 to accelerate various graphics and compute processing operations. In at least one embodiment, shared function logic 3310 can include logic units (e.g., sampler, math, and/or inter-thread communication logic) that can be shared by each N sub-cores within graphics core 3300. Shared and/or cache memory 3312 can be a last-level cache for N sub-cores 3301A-3301F within graphics core 3300 and can also serve as shared memory that is accessible by multiple sub-cores. In at least one embodiment, geometry/fixed function pipeline 3314 can be included instead of geometry/fixed function pipeline 3336 within fixed function block 3330 and can include same or similar logic units.

In at least one embodiment, graphics core 3300 includes additional fixed function logic 3316 that can include various fixed function acceleration logic for use by graphics core 3300. In at least one embodiment, additional fixed function logic 3316 includes an additional geometry pipeline for use in position only shading. In position-only shading, at least two geometry pipelines exist, whereas in a full geometry pipeline within geometry/fixed function pipeline 3316, 3336, and a cull pipeline, which is an additional geometry pipeline which may be included within additional fixed function logic 3316. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3316 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3316 can also include machine-learning acceleration logic, such as fixed function matrix multiplication logic, for implementations including optimizations for machine learning training or inferencing.

In at least one embodiment, within each graphics sub-core 3301A-3301F includes a set of execution resources that may be used to perform graphics, media, and compute operations in response to requests by graphics pipeline, media pipeline, or shader programs. In at least one embodiment, graphics sub-cores 3301A-3301F include multiple EU arrays 3302A-3302F, 3304A-3304F, thread dispatch and inter-thread communication (TD/IC) logic 3303A-3303F, a 3D (e.g., texture) sampler 3305A-3305F, a media sampler 3306A-3306F, a shader processor 3307A-3307F, and shared local memory (SLM) 3308A-3308F. EU arrays 3302A-3302F, 3304A-3304F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3303A-3303F performs local thread dispatch and thread control operations for execution units within a sub-core and facilitate communication between threads executing on execution units of a sub-core. In at least one embodiment, 3D sampler 3305A-3305F can read texture or other 3D graphics related data into memory. In at least one embodiment, 3D sampler can read texture data differently based on a configured sample state and texture format associated with a given texture. In at least one embodiment, media sampler 3306A-3306F can perform similar read operations based on a type and format associated with media data. In at least one embodiment, each graphics sub-core 3301A-3301F can alternately include a unified 3D and media sampler. In at least one embodiment, threads executing on execution units within each of sub-cores 3301A-3301F can make use of shared local memory 3308A-3308F within each sub-core, to enable threads executing within a thread group to execute using a common pool of on-chip memory.

Inference and/or training logic 215 are used to perform inferencing and/or training operations associated with one or more embodiments. Details regarding inference and/or training logic 215 are provided in conjunction with FIGS. 2A and/or 2B. In at least one embodiment, portions or all of inference and/or training logic 215 may be incorporated into graphics processor 3310. For example, in at least one embodiment, training and/or inferencing techniques described herein may use one or more of ALUs embodied in 3D pipeline 3310, graphics microcontroller 3338, geometry & fixed function pipeline 3314 and 3336, or other logic in FIG. 32. Moreover, in at least one embodiment, inferencing and/or training operations described herein may be done using logic other than logic illustrated in FIG. 2A or 2B. In at least one embodiment, weight parameters may be stored in on-chip or off-chip memory and/or registers (shown or not shown) that configure ALUs of graphics processor 3300 to perform one or more machine learning algorithms, neural network architectures, use cases, or training techniques described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more graphics processor 3300.

Figure 34A:
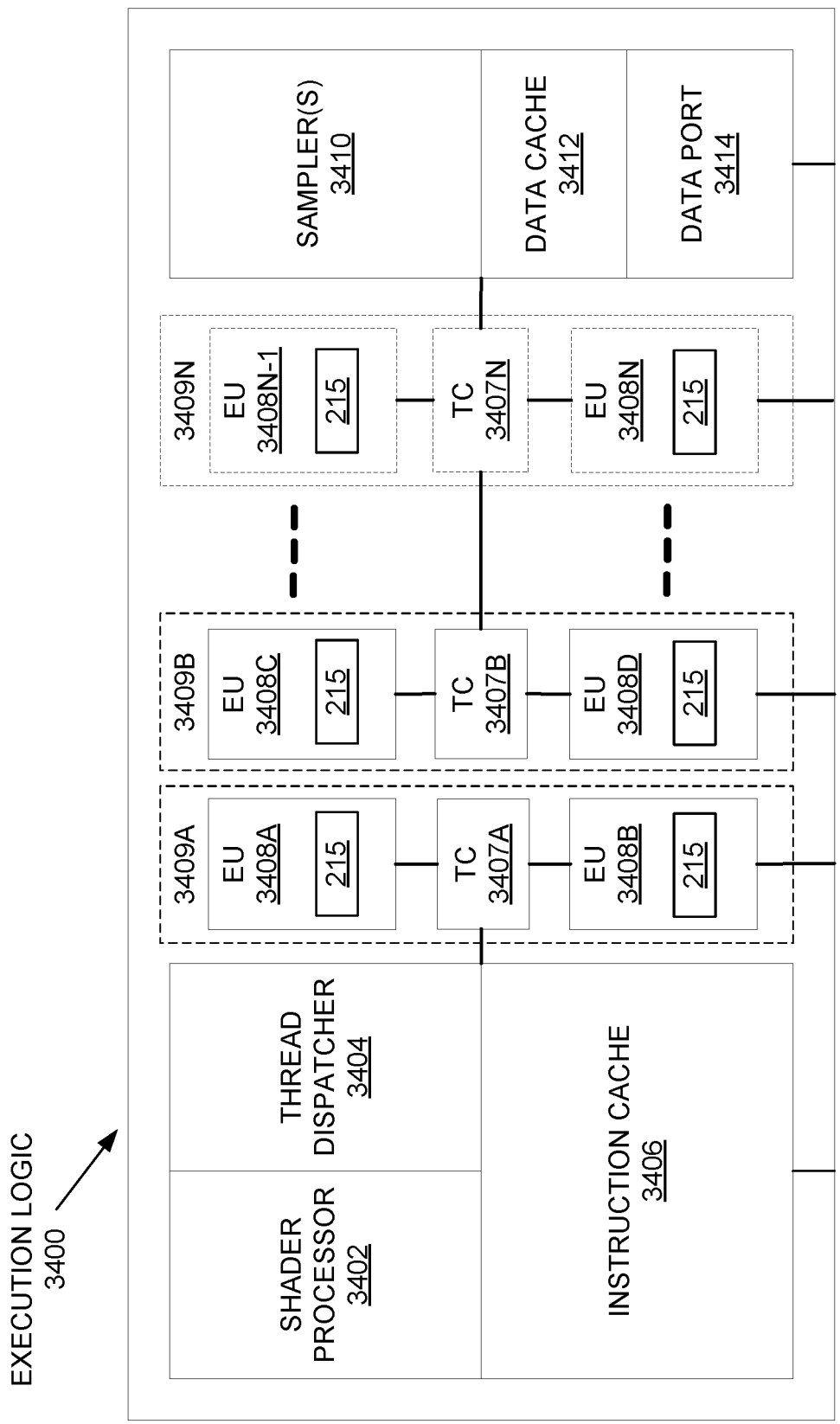
FIGS. 34A-34B illustrate thread execution logic including an array of processing elements of a graphics processor core, in at least one embodiment.
Figure 34B:
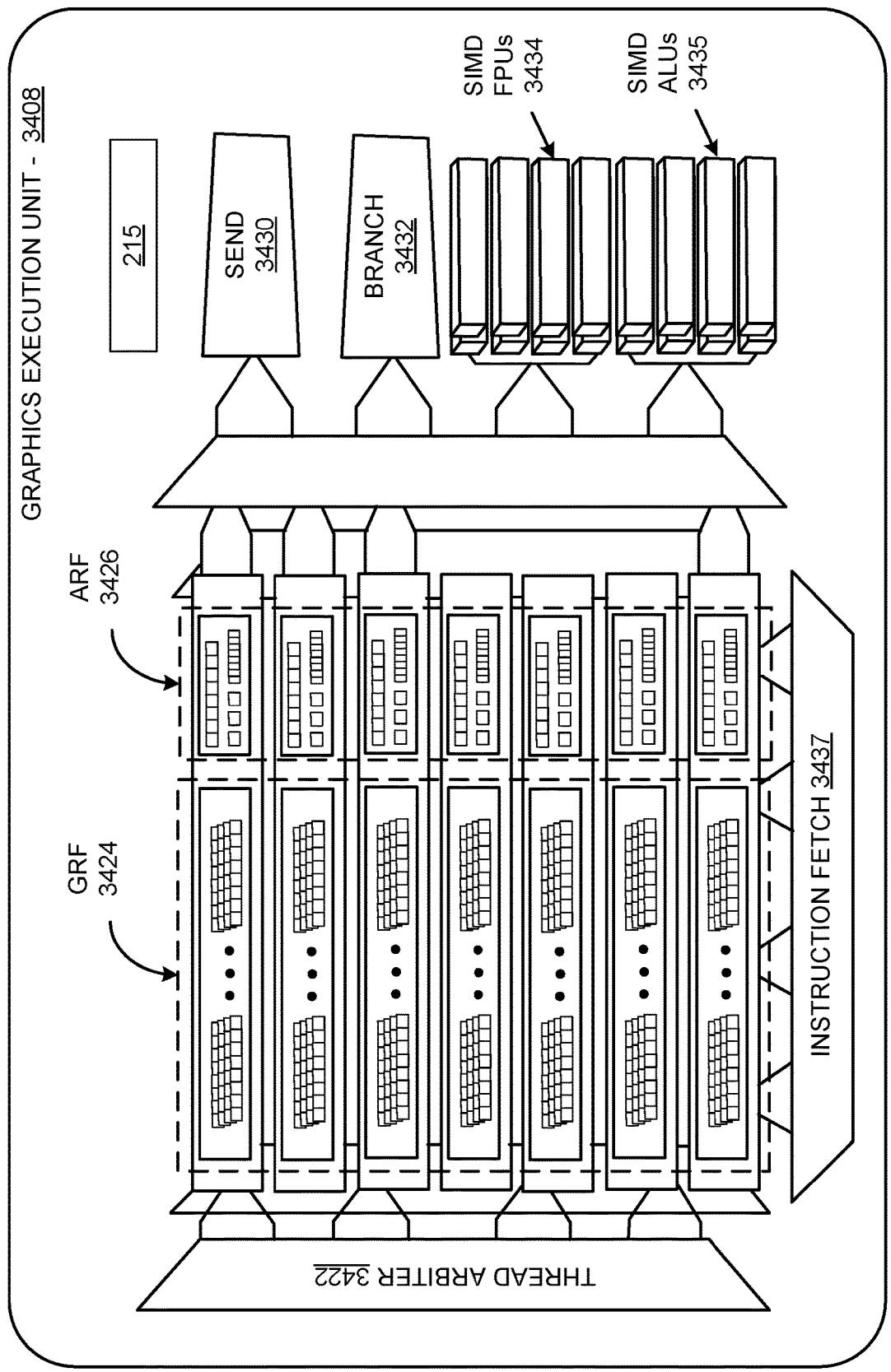

FIGS. 34A-34B illustrate thread execution logic 3400 including an array of processing elements of a graphics processor core, in at least one embodiment. FIG. 34A illustrates at least one embodiment, in which thread execution logic 3400 is used. FIG. 34B illustrates exemplary internal details of an execution unit, in at least one embodiment.

As illustrated in FIG. 34A, in at least one embodiment, thread execution logic 3400 includes a shader processor 3402, a thread dispatcher 3404, instruction cache 3406, a scalable execution unit array including a plurality of execution units 3408A-3408N, a sampler 3410, a data cache 3412, and a data port 3414. In at least one embodiment a scalable execution unit array can dynamically scale by enabling or disabling one or more execution units (e.g., any of execution unit 3408A, 3408B, 3408C, 3408D, through 3408N–1 and 3408N) based on computational requirements of a workload, for example. In at least one embodiment, scalable execution units are interconnected via an interconnect fabric that links to each execution unit. In at least one embodiment, thread execution logic 3400 includes one or more connections to memory, such as system memory or cache memory, through one or more of instruction cache 3406, data port 3414, sampler 3410, and execution units 3408A-3408N. In at least one embodiment, each execution unit (e.g., 3408A) is a stand-alone programmable general-purpose computational unit that is capable of executing multiple simultaneous hardware threads while processing multiple data elements in parallel for each thread. In at least one embodiment, array of execution units 3408A-3408N is scalable to include any number individual execution units.

In at least one embodiment, execution units 3408A-3408N are primarily used to execute shader programs. In at least one embodiment, shader processor 3402 can process various shader programs and dispatch execution threads associated with shader programs via a thread dispatcher 3404. In at least one embodiment, thread dispatcher 3404 includes logic to arbitrate thread initiation requests from graphics and media pipelines and instantiate requested threads on one or more execution units in execution units 3408A-3408N. For example, in at least one embodiment, a geometry pipeline can dispatch vertex, tessellation, or geometry shaders to thread execution logic for processing. In at least one embodiment, thread dispatcher 3404 can also process runtime thread spawning requests from executing shader programs.

In at least one embodiment, execution units 3408A-3408N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3408A-3408N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3408A-3408N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3408A-3408N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3408A-3408N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (N) size data elements), or thirty-two separate 8-bit data elements (byte (B) size data elements). However, in at least one embodiment, different vector widths and register sizes are possible.

In at least one embodiment, one or more execution units can be combined into a fused execution unit 3409A-3409N having thread control logic (3407A-3407N) that is common to fused EUs. In at least one embodiment, multiple EUs can be fused into an EU group. In at least one embodiment, each EU in fused EU group can be configured to execute a separate SIMD hardware thread. A number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 3409A-3409N includes at least two execution units. For example, in at least one embodiment, fused execution unit 3409A includes a first EU 3408A, second EU 3408B, and thread control logic 3407A that is common to first EU 3408A and second EU 3408B. In at least one embodiment, thread control logic 3407A controls threads executed on fused graphics execution unit 3409A, allowing each EU within fused execution units 3409A-3409N to execute using a common instruction pointer register.

In at least one embodiment, one or more internal instruction caches (e.g., 3406) are included in thread execution logic 3400 to cache thread instructions for execution units. In at least one embodiment, one or more data caches (e.g., 3412) are included to cache thread data during thread execution. In at least one embodiment, a sampler 3410 is included to provide texture sampling for 3D operations and media sampling for media operations. In at least one embodiment, sampler 3410 includes specialized texture or media sampling functionality to process texture or media data during sampling process before providing sampled data to an execution unit.

During execution, in at least one embodiment, graphics and media pipelines send thread initiation requests to thread execution logic 3400 via thread spawning and dispatch logic. In at least one embodiment, once a group of geometric objects has been processed and rasterized into pixel data, pixel processor logic (e.g., pixel shader logic, fragment shader logic, etc.) within shader processor 3402 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 3402 then executes an application programming interface (API)-supplied pixel or fragment shader program. In at least one embodiment, to execute a shader program, shader processor 3402 dispatches threads to an execution unit (e.g., 3408A) via thread dispatcher 3404. In at least one embodiment, shader processor 3402 uses texture sampling logic in sampler 3410 to access texture data in texture maps stored in memory. In at least one embodiment, arithmetic operations on texture data and input geometry data compute pixel color data for each geometric fragment, or discards one or more pixels from further processing.

In at least one embodiment, data port 3414 provides a memory access mechanism for thread execution logic 3400 to output processed data to memory for further processing on a graphics processor output pipeline. In at least one embodiment, data port 3414 includes or couples to one or more cache memories (e.g., data cache 3412) to cache data for memory access via a data port.

As illustrated in FIG. 34B, in at least one embodiment, a graphics execution unit 3408 can include an instruction fetch unit 3437, a general register file array (GRF) 3424, an architectural register file array (ARF) 3426, a thread arbiter 3422, a send unit 3430, a branch unit 3432, a set of SIMD floating point units (FPUs) 3434, and In at least one embodiment a set of dedicated integer SIMD ALUs 3435. In at least one embodiment, GRF 3424 and ARF 3426 includes a set of general register files and architecture register files associated with each simultaneous hardware thread that may be active in graphics execution unit 3408. In at least one embodiment, per thread architectural state is maintained in ARF 3426, while data used during thread execution is stored in GRF 3424. In at least one embodiment, execution state of each thread, including instruction pointers for each thread, can be held in thread-specific registers in ARF 3426.

In at least one embodiment, graphics execution unit 3408 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3408 can co-issue multiple instructions, which may each be different instructions. In at least one embodiment, thread arbiter 3422 of graphics execution unit thread 3408 can dispatch instructions to one of send unit 3430, branch unit 3442, or SIMD FPU(s) 3434 for execution. In at least one embodiment, each execution thread can access 128 general-purpose registers within GRF 3424, where each register can store 32 bytes, accessible as a SIMD 8-element vector of 32-bit data elements. In at least one embodiment, each execution unit thread has access to 4 Kbytes within GRF 3424, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 3424 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 3430. In at least one embodiment, branch instructions are dispatched to a dedicated branch unit 3432 to facilitate SIMD divergence and eventual convergence.

In at least one embodiment graphics execution unit 3408 includes one or more SIMD floating point units (FPU(s)) 3434 to perform floating-point operations. In at least one embodiment, FPU(s) 3434 also support integer computation. In at least one embodiment FPU(s) 3434 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 3435 are also present, and may be specifically optimized to perform operations associated with machine learning computations.

In at least one embodiment, arrays of multiple instances of graphics execution unit 3408 can be instantiated in a graphics sub-core grouping (e.g., a sub-slice). In at least one embodiment execution unit 3408 can execute instructions across a plurality of execution channels. In at least one embodiment, each thread executed on graphics execution unit 3408 is executed on a different channel.

Inference and/or training logic 215 are used to perform inferencing and/or training operations associated with one or more embodiments. Details regarding inference and/or training logic 215 are provided in conjunction with FIGS. 2A and/or 2B. In at least one embodiment, portions or all of inference and/or training logic 215 may be incorporated into execution logic 3400. Moreover, in at least one embodiment, inferencing and/or training operations described herein may be done using logic other than logic illustrated in FIG. 2A or 2B. In at least one embodiment, weight parameters may be stored in on-chip or off-chip memory and/or registers (shown or not shown) that configure ALUs of execution logic 3400 to perform one or more machine learning algorithms, neural network architectures, use cases, or training techniques described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially using one or more of execution logic 3400.

Figure 35:
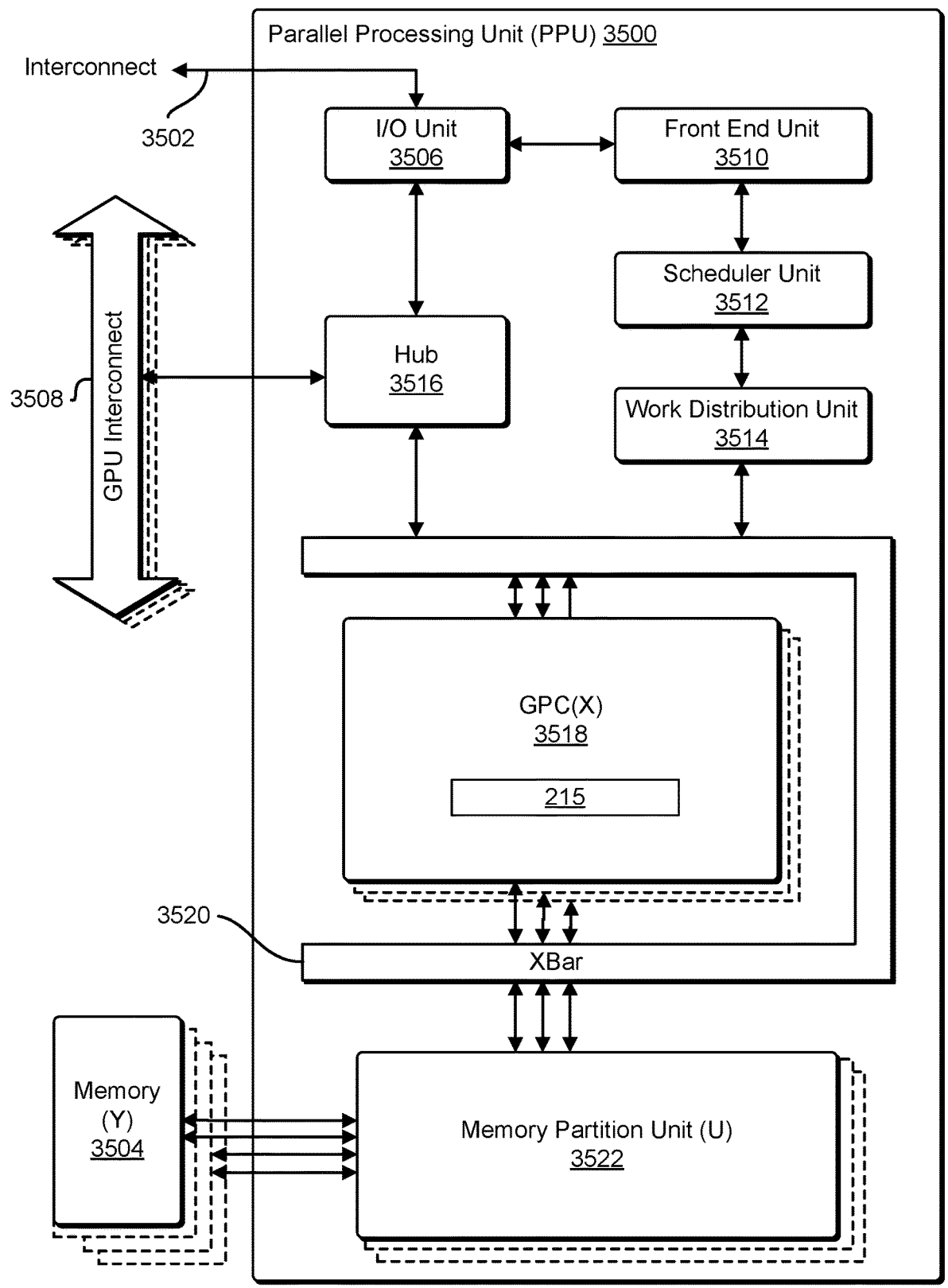
FIG. 35 illustrates a parallel processing unit ("PPU"), in at least one embodiment.

FIG. 35 illustrates a parallel processing unit ("PPU") 3500, in at least one embodiment. In at least one embodiment, PPU 3500 is configured with machine-readable code that, if executed by PPU 3500, causes PPU 3500 to perform some or all of processes and techniques described throughout this disclosure. In at least one embodiment, PPU 3500 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3500. In at least one embodiment, PPU 3500 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3500 is utilized to perform computations such as linear algebra operations and machine-learning operations. FIG. 35 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3500 are configured to accelerate High Performance Computing ("HPC"), data center, and machine learning applications. In at least one embodiment, PPU 3500 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3500 includes, without limitation, an Input/Output ("I/O") unit 3506, a front-end unit 3510, a scheduler unit 3512, a work distribution unit 3514, a hub 3516, a crossbar ("Xbar") 3520, one or more general processing clusters ("GPCs") 3518, and one or more partition units ("memory partition units") 3522. In at least one embodiment, PPU 3500 is connected to a host processor or other PPUs 3500 via one or more high-speed GPU interconnects ("GPU interconnects") 3508. In at least one embodiment, PPU 3500 is connected to a host processor or other peripheral devices via an interconnect 3502. In at least one embodiment, PPU 3500 is connected to a local memory comprising one or more memory devices ("memory") 3504. In at least one embodiment, memory devices 3504 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3508 may refer to a wire-based multi-lane communications link that is used by systems to scale and include one or more PPUs 3500 combined with one or more central processing units ("CPUs"), supports cache coherence between PPUs 3500 and CPUs, and CPU mastering. In at least one embodiment, data and/or commands are transmitted by high-speed GPU interconnect 3508 through hub 3516 to/from other units of PPU 3500 such as one or more copy engines, video encoders, video decoders, power management units, and other components which may not be explicitly illustrated in FIG. 35.

In at least one embodiment, I/O unit 3506 is configured to transmit and receive communications (e.g., commands, data) from a host processor (not illustrated in FIG. 35) over system bus 3502. In at least one embodiment, I/O unit 3506 communicates with host processor directly via system bus 3502 or through one or more intermediate devices such as a memory bridge. In at least one embodiment, I/O unit 3506 may communicate with one or more other processors, such as one or more of PPUs 3500 via system bus 3502. In at least one embodiment, I/O unit 3506 implements a Peripheral Component Interconnect Express ("PCIe") interface for communications over a PCIe bus. In at least one embodiment, I/O unit 3506 implements interfaces for communicating with external devices.

In at least one embodiment, I/O unit 3506 decodes packets received via system bus 3502. In at least one embodiment, at least some packets represent commands configured to cause PPU 3500 to perform various operations. In at least one embodiment, I/O unit 3506 transmits decoded commands to various other units of PPU 3500 as specified by commands. In at least one embodiment, commands are transmitted to front-end unit 3510 and/or transmitted to hub 3516 or other units of PPU 3500 such as one or more copy engines, a video encoder, a video decoder, a power management unit, etc. (not explicitly illustrated in FIG. 35). In at least one embodiment, I/O unit 3506 is configured to route communications between and among various logical units of PPU 3500.

In at least one embodiment, a program executed by host processor encodes a command stream in a buffer that provides workloads to PPU 3500 for processing. In at least one embodiment, a workload comprises instructions and data to be processed by those instructions. In at least one embodiment, buffer is a region in a memory that is accessible (e.g., read/write) by both host processor and PPU 3500—a host interface unit may be configured to access buffer in a system memory connected to system bus 3502 via memory requests transmitted over system bus 3502 by I/O unit 3506. In at least one embodiment, host processor writes command stream to buffer and then transmits a pointer to start of command stream to PPU 3500 such that front-end unit 3510 receives pointers to one or more command streams and manages one or more command streams, reading commands from command streams and forwarding commands to various units of PPU 3500.

In at least one embodiment, front-end unit 3510 is coupled to scheduler unit 3512 that configures various GPCs 3518 to process tasks defined by one or more command streams. In at least one embodiment, scheduler unit 3512 is configured to track state information related to various tasks managed by scheduler unit 3512 where state information may indicate which of GPCs 3518 a task is assigned to, whether task is active or inactive, a priority level associated with task, and so forth. In at least one embodiment, scheduler unit 3512 manages execution of a plurality of tasks on one or more of GPCs 3518.

In at least one embodiment, scheduler unit 3512 is coupled to work distribution unit 3514 that is configured to dispatch tasks for execution on GPCs 3518. In at least one embodiment, work distribution unit 3514 tracks a number of scheduled tasks received from scheduler unit 3512 and work distribution unit 3514 manages a pending task pool and an active task pool for each of GPCs 3518. In at least one embodiment, pending task pool comprises a number of slots (e.g., 32 slots) that contain tasks assigned to be processed by a particular GPC 3518; active task pool may comprise a number of slots (e.g., 4 slots) for tasks that are actively being processed by GPCs 3518 such that as one of GPCs 3518 completes execution of a task, that task is evicted from active task pool for GPC 3518 and one of other tasks from pending task pool is selected and scheduled for execution on GPC 3518. In at least one embodiment, if an active task is idle on GPC 3518, such as while waiting for a data dependency to be resolved, then active task is evicted from GPC 3518 and returned to pending task pool while another task in pending task pool is selected and scheduled for execution on GPC 3518.

In at least one embodiment, work distribution unit 3514 communicates with one or more GPCs 3518 via XBar 3520. In at least one embodiment, XBar 3520 is an interconnect network that couples many of units of PPU 3500 to other units of PPU 3500 and can be configured to couple work distribution unit 3514 to a particular GPC 3518. In at least one embodiment, one or more other units of PPU 3500 may also be connected to XBar 3520 via hub 3516.

In at least one embodiment, tasks are managed by scheduler unit 3512 and dispatched to one of GPCs 3518 by work distribution unit 3514. GPC 3518 is configured to process task and generate results. In at least one embodiment, results may be consumed by other tasks within GPC 3518, routed to a different GPC 3518 via XBar 3520, or stored in memory 3504. In at least one embodiment, results can be written to memory 3504 via partition units 3522, which implement a memory interface for reading and writing data to/from memory 3504. In at least one embodiment, results can be transmitted to another PPU 3504 or CPU via high-speed GPU interconnect 3508. In at least one embodiment, PPU 3500 includes, without limitation, a number U of partition units 3522 that is equal to number of separate and distinct memory devices 3504 coupled to PPU 3500. In at least one embodiment, partition unit 3522 will be described in more detail below in conjunction with FIG. 37.

In at least one embodiment, a host processor executes a driver kernel that implements an application programming interface ("API") that enables one or more applications executing on host processor to schedule operations for execution on PPU 3500. In at least one embodiment, multiple compute applications are simultaneously executed by PPU 3500 and PPU 3500 provides isolation, quality of service ("QoS"), and independent address spaces for multiple compute applications. In at least one embodiment, an application generates instructions (e.g., in form of API calls) that cause driver kernel to generate one or more tasks for execution by PPU 3500 and driver kernel outputs tasks to one or more streams being processed by PPU 3500. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in at least one embodiment, in conjunction with FIG. 37.

Inference and/or training logic 215 are used to perform inferencing and/or training operations associated with one or more embodiments. Details regarding inference and/or training logic 215 are provided in conjunction with FIGS. 2A and/or 2B. In at least one embodiment, deep learning application processor is used to train a machine learning model, such as a neural network, to predict or infer information provided to PPU 3500. In at least one embodiment, deep learning application processor 3500 is used to infer or predict information based on a trained machine learning model (e.g., neural network) that has been trained by another processor or system or by PPU 3500. In at least one embodiment, PPU 3500 may be used to perform one or more neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more PPU 3500.

Figure 36:
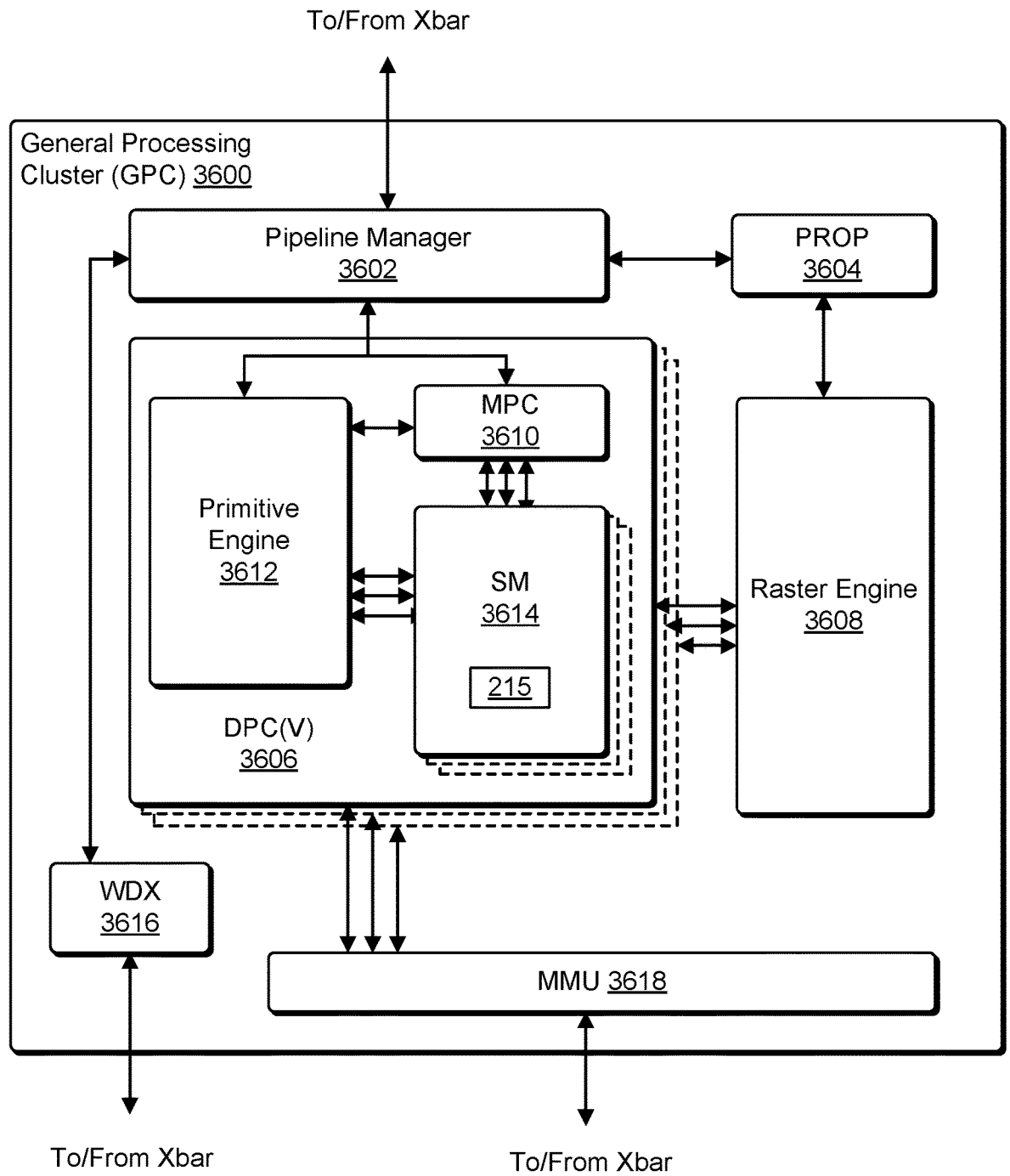
FIG. 36 illustrates a general processing cluster ("GPC"), in at least one embodiment.

FIG. 36 illustrates a general processing cluster ("GPC") 3600, in at least one embodiment. In at least one embodiment, GPC 3600 is GPC 3518 of FIG. 35. In at least one embodiment, each GPC 3600 includes, without limitation, a number of hardware units for processing tasks and each GPC 3600 includes, without limitation, a pipeline manager 3602, a pre-raster operations unit ("PROP") 3604, a raster engine 3608, a work distribution crossbar ("WDX") 3616, a memory management unit ("MMU") 3618, one or more Data Processing Clusters ("DPCs") 3606, and any suitable combination of parts.

In at least one embodiment, operation of GPC 3600 is controlled by pipeline manager 3602. In at least one embodiment, pipeline manager 3602 manages configuration of one or more DPCs 3606 for processing tasks allocated to GPC 3600. In at least one embodiment, pipeline manager 3602 configures at least one of one or more DPCs 3606 to implement at least a portion of a graphics rendering pipeline. In at least one embodiment, DPC 3606 is configured to execute a vertex shader program on a programmable streaming multi-processor ("SM") 3614. In at least one embodiment, pipeline manager 3602 is configured to route packets received from a work distribution unit to appropriate logical units within GPC 3600, in at least one embodiment, and some packets may be routed to fixed function hardware units in PROP 3604 and/or raster engine 3608 while other packets may be routed to DPCs 3606 for processing by a primitive engine 3612 or SM 3614. In at least one embodiment, pipeline manager 3602 configures at least one of DPCs 3606 to implement a neural network model and/or a computing pipeline.

In at least one embodiment, PROP unit 3604 is configured, in at least one embodiment, to route data generated by raster engine 3608 and DPCs 3606 to a Raster Operations ("ROP") unit in partition unit 3522, described in more detail above in conjunction with FIG. 35. In at least one embodiment, PROP unit 3604 is configured to perform optimizations for color blending, organize pixel data, perform address translations, and more. In at least one embodiment, raster engine 3608 includes, without limitation, a number of fixed function hardware units configured to perform various raster operations, in at least one embodiment, and raster engine 3608 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 3608 comprises fragments to be processed by any suitable entity such as by a fragment shader implemented within DPC 3606.

In at least one embodiment, each DPC 3606 included in GPC 3600 comprise, without limitation, an M-Pipe Controller ("MPC") 3610; primitive engine 3612; one or more SMs 3614; and any suitable combination thereof. In at least one embodiment, MPC 3610 controls operation of DPC 3606, routing packets received from pipeline manager 3602 to appropriate units in DPC 3606. In at least one embodiment, packets associated with a vertex are routed to primitive engine 3612, which is configured to fetch vertex attributes associated with vertex from memory; in contrast, packets associated with a shader program may be transmitted to SM 3614.

In at least one embodiment, SM 3614 comprises, without limitation, a programmable streaming processor that is configured to process tasks represented by a number of threads. In at least one embodiment, SM 3614 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 3614 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 3614 are described in more detail below.

In at least one embodiment, MMU 3618 provides an interface between GPC 3600 and memory partition unit (e.g., partition unit 3522 of FIG. 35) and MMU 3618 provides translation of virtual addresses into physical addresses, memory protection, and arbitration of memory requests. In at least one embodiment, MMU 3618 provides one or more translation lookaside buffers ("TLBs") for performing translation of virtual addresses into physical addresses in memory.

Inference and/or training logic 215 are used to perform inferencing and/or training operations associated with one or more embodiments. Details regarding inference and/or training logic 215 are provided in conjunction with FIGS. 2A and/or 2B. In at least one embodiment, deep learning application processor is used to train a machine learning model, such as a neural network, to predict or infer information provided to GPC 3600. In at least one embodiment, GPC 3600 is used to infer or predict information based on a trained machine learning model (e.g., neural network) that has been trained by another processor or system or by GPC 3600. In at least one embodiment, GPC 3600 may be used to perform one or more neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more GPC 3600.

Figure 37:
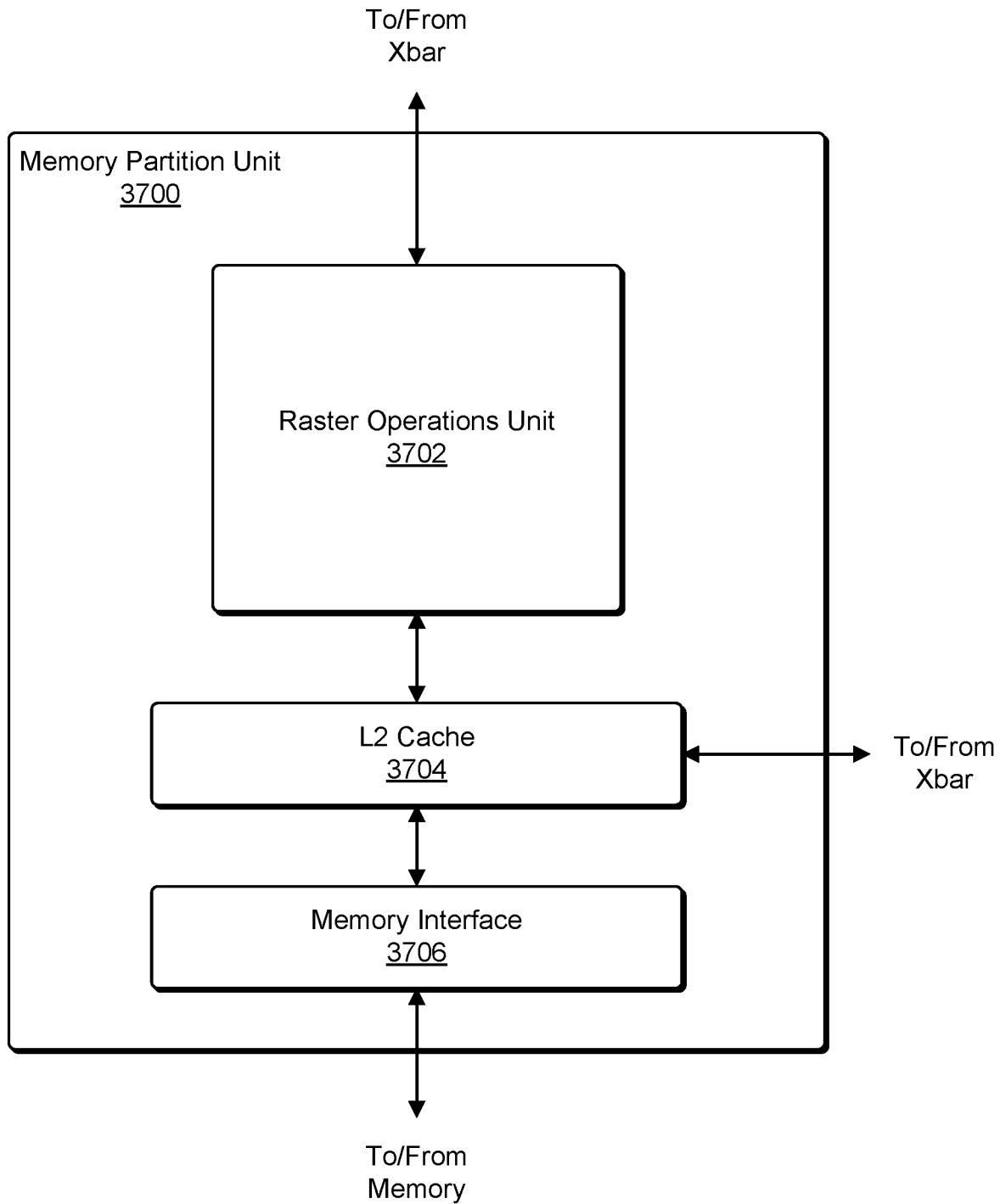
FIG. 37 illustrates a memory partition unit of a parallel processing unit ("PPU"), in at least one embodiment.

FIG. 37 illustrates a memory partition unit 3700 of a parallel processing unit ("PPU"), in accordance with at least one embodiment. In at least one embodiment, memory partition unit 3700 includes, without limitation, a Raster Operations ("ROP") unit 3702; a level two ("L2") cache 3704; a memory interface 3706; and any suitable combination thereof. Memory interface 3706 is coupled to memory. Memory interface 3706 may implement 32, 64, 128, 1024-bit data buses, or like, for high-speed data transfer. In at least one embodiment, PPU incorporates U memory interfaces 3706, one memory interface 3706 per pair of partition units 3700, where each pair of partition units 3700 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 3706 implements a high bandwidth memory second generation ("HBM2") memory interface and Y equals half U. In at least one embodiment, HBM2 memory stacks are located on same physical package as PPU, providing substantial power and area savings compared with other GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 3700 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 3508 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 3700 then services page faults, mapping addresses into page table, after which copy engine performs transfer. In at least one embodiment, memory is pinned (e.g., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3504 of FIG. 35 or other system memory is fetched by memory partition unit 3700 and stored in L2 cache 3704, which is located on-chip and is shared between various GPCs, in accordance with at least one embodiment. Each memory partition unit 3700, in at least one embodiment, includes, without limitation, at least a portion of L2 cache associated with a corresponding memory device. In at least one embodiment, lower level caches are implemented in various units within GPCs. In at least one embodiment, each of SMs 3614 may implement a level one ("L1") cache wherein L1 cache is private memory that is dedicated to a particular SM 3614 and data from L2 cache 3704 is fetched and stored in each of L1 caches for processing in functional units of SMs 3614. In at least one embodiment, L2 cache 3704 is coupled to memory interface 3706 and XBar 3520.

ROP unit 3702 performs graphics raster operations related to pixel color, such as color compression, pixel blending, and more, in at least one embodiment. ROP unit 3702, in at least one embodiment, implements depth testing in conjunction with raster engine 3608, receiving a depth for a sample location associated with a pixel fragment from culling engine of raster engine 3608. In at least one embodiment, depth is tested against a corresponding depth in a depth buffer for a sample location associated with fragment. In at least one embodiment, if fragment passes depth test for sample location, then ROP unit 3702 updates depth buffer and transmits a result of depth test to raster engine 3608. It will be appreciated that number of partition units 3700 may be different than number of GPCs and, therefore, each ROP unit 3702 can, in at least one embodiment, be coupled to each of GPCs. In at least one embodiment, ROP unit 3702 tracks packets received from different GPCs and determines which that a result generated by ROP unit 3702 is routed to through XBar 3520.

Figure 38:
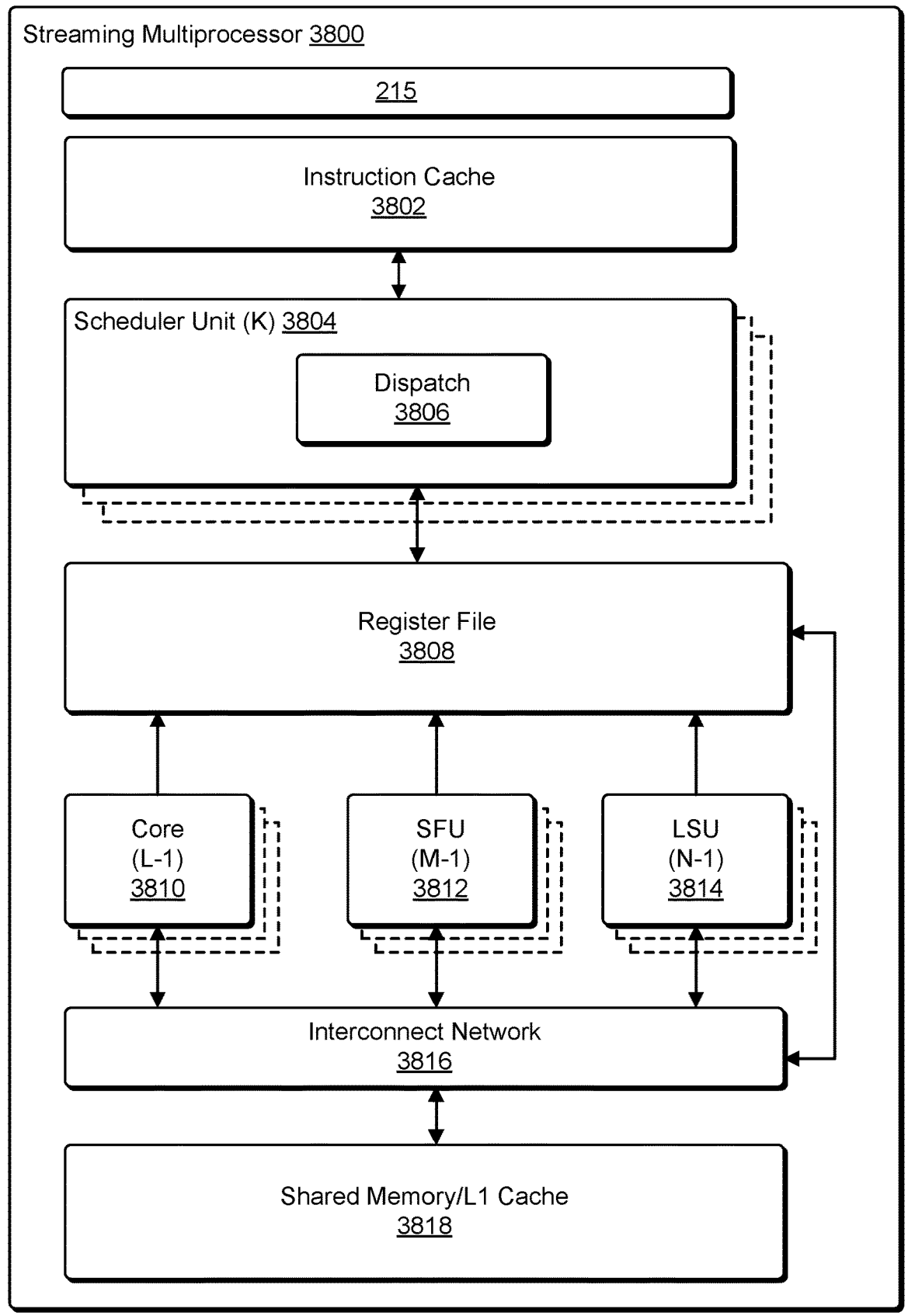
FIG. 38 illustrates a streaming multi-processor, in at least one embodiment.

FIG. 38 illustrates a streaming multi-processor ("SM") 3800, in at least one embodiment. In at least one embodiment, SM 3800 is SM of FIG. 36. In at least one embodiment, SM 3800 includes, without limitation, an instruction cache 3802; one or more scheduler units 3804; a register file 3808; one or more processing cores ("cores") 3810; one or more special function units ("SFUs") 3812; one or more load/store units ("LSUs") 3814; an interconnect network 3816; a shared memory/level one ("L1") cache 3818; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 3800. In at least one embodiment, scheduler unit 3804 receives tasks from work distribution unit and manages instruction scheduling for one or more thread blocks assigned to SM 3800. In at least one embodiment, scheduler unit 3804 schedules thread blocks for execution as warps of parallel threads, wherein each thread block is allocated at least one warp. In at least one embodiment, each warp executes threads. In at least one embodiment, scheduler unit 3804 manages a plurality of different thread blocks, allocating warps to different thread blocks and then dispatching instructions from plurality of different cooperative groups to various functional units (e.g., processing cores 3810, SFUs 3812, and LSUs 3814) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of other programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (e.g., as small as a single thread) and multi-block granularities, and to perform collective operations such as synchronization on threads in a cooperative group. Programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3806 is configured to transmit instructions to one or more of functional units and scheduler unit 3804 includes, without limitation, two dispatch units 3806 that enable two different instructions from same warp to be dispatched during each clock cycle. In at least one embodiment, each scheduler unit 3804 includes a single dispatch unit 3806 or additional dispatch units 3806.

In at least one embodiment, each SM 3800, in at least one embodiment, includes, without limitation, register file 3808 that provides a set of registers for functional units of SM 3800. In at least one embodiment, register file 3808 is divided between each of functional units such that each functional unit is allocated a dedicated portion of register file 3808. In at least one embodiment, register file 3808 is divided between different warps being executed by SM 3800 and register file 3808 provides temporary storage for operands connected to data paths of functional units. In at least one embodiment, each SM 3800 comprises, without limitation, a plurality of L processing cores 3810. In at least one embodiment, SM 3800 includes, without limitation, a large number (e.g., 128 or more) of distinct processing cores 3810. In at least one embodiment, each processing core 3810, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3810 include, without limitation, 64 single-precision (32-bit) floating point cores, 64 integer cores, 32 double-precision (64-bit) floating point cores, and 8 tensor cores.

Tensor cores are configured to perform matrix operations in at least one embodiment. In at least one embodiment, one or more tensor cores are included in processing cores 3810. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 3800 comprises, without limitation, M SFUs 3812 that perform special functions (e.g., attribute evaluation, reciprocal square root, and like). In at least one embodiment, SFUs 3812 include, without limitation, a tree traversal unit configured to traverse a hierarchical tree data structure. In at least one embodiment, SFUs 3812 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3800. In at least one embodiment, texture maps are stored in shared memory/L1 cache 3818. In at least one embodiment, texture units implement texture operations such as filtering operations using mip-maps (e.g., texture maps of varying levels of detail), in at least one embodiment. In at least one embodiment, each SM 3800 includes, without limitation, two texture units.

Each SM 3800 comprises, without limitation, N LSUs 3814 that implement load and store operations between shared memory/L1 cache 3818 and register file 3808, in at least one embodiment. Each SM 3800 includes, without limitation, interconnect network 3816 that connects each of functional units to register file 3808 and LSU 3814 to register file 3808 and shared memory/L1 cache 3818 in at least one embodiment. In at least one embodiment, interconnect network 3816 is a crossbar that can be configured to connect any of functional units to any of registers in register file 3808 and connect LSUs 3814 to register file 3808 and memory locations in shared memory/L1 cache 3818.

In at least one embodiment, shared memory/L1 cache 3818 is an array of on-chip memory that allows for data storage and communication between SM 3800 and primitive engine and between threads in SM 3800, in at least one embodiment. In at least one embodiment, shared memory/L1 cache 3818 comprises, without limitation, 128 KB of storage capacity and is in path from SM 3800 to partition unit. In at least one embodiment, shared memory/L1 cache 3818, in at least one embodiment, is used to cache reads and writes. In at least one embodiment, one or more of shared memory/L1 cache 3818, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 3818 enables shared memory/L1 cache 3818 to function as a high-throughput conduit for streaming data while simultaneously providing high-bandwidth and low-latency access to frequently reused data, in at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 3800 to execute program and perform calculations, shared memory/L1 cache 3818 to communicate between threads, and LSU 3814 to read and write global memory through shared memory/L1 cache 3818 and memory partition unit. In at least one embodiment, when configured for general purpose parallel computation, SM 3800 writes commands that scheduler unit 3804 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. Graphics card may be configured to interface with a PCIe slot on a motherboard of a desktop computer. In at least one embodiment, PPU may be an integrated graphics processing unit ("iGPU") included in chipset of motherboard.

Inference and/or training logic 215 are used to perform inferencing and/or training operations associated with one or more embodiments. Details regarding inference and/or training logic 215 are provided in conjunction with FIGS. 2A and/or 2B. In at least one embodiment, deep learning application processor is used to train a machine learning model, such as a neural network, to predict or infer information provided to SM 3800. In at least one embodiment, SM 3800 is used to infer or predict information based on a trained machine learning model (e.g., neural network) that has been trained by another processor or system or by SM 3800. In at least one embodiment, SM 3800 may be used to perform one or more neural network use cases described herein.

In at least one embodiment, one or more of client devices 502, aggregation server(s) 504, training nodes 102, training aggregator 104, parameter reviewer(s) 1102, and/or review aggregator(s) 1110 and/or methods described herein may be implemented at least partially on one or more SMU 3800.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1804 and/or secondary storage. Computer programs, if executed by one or more processors, enable system 1800 to perform various functions in at least one embodiment. Memory 1804, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1802; parallel processing system 1812; an integrated circuit capable of at least a portion of capabilities of both CPU 1802; parallel processing system 1812; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1800 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1812 includes, without limitation, a plurality of parallel processing units ("PPUs") 1814 and associated memories 1816. In at least one embodiment, PPUs 1814 are connected to a host processor or other peripheral devices via an interconnect 1818 and a switch 1820 or multiplexer. In at least one embodiment, parallel processing system 1812 distributes computational tasks across PPUs 1814 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1814, although such shared memory may incur performance penalties relative to use of local memory and registers resident to a PPU 1814. In at least one embodiment, operation of PPUs 1814 is synchronized through use of a command such as _syncthreads( ), wherein all threads in a block (e.g., executed across multiple PPUs 1814) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. A process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing claims.

What is claimed is:

1. A processor, comprising: one or more circuits to receive neural network weight information from a server, wherein the neural network weight information is at least partially based on comparing: (i) identification accuracy of one or more objects within one or more images by at least a first processor with (ii) identification accuracy of the one or more objects by at least a second processor, wherein the first and second processors are additional processors distinct from the processor.

2. The processor of claim 1, wherein the one or more circuits are further to update one or more parameters of a neural network at least partially based on the neural network weight information.

3. The processor of claim 1, wherein the comparing is performed by the processor or the server.

4. The processor of claim 1, wherein the neural network weight information is further at least partially based on scoring information of the identification accuracy of the one or more objects by the at least the second processor that is generated based on the comparing.

5. The processor of claim 1, wherein the neural network weight information received from the server is further at least partially based on second neural network weight information provided by the processor to the server.

6. The processor of claim 1, wherein the processor is of a first edge device and the second processor is of a second edge device.

7. The processor of claim 1, wherein the identification accuracy of the one or more objects within the one or more images by the at least the second processor is of a neural network trained at least partially by the at least the second processor.

8. A processor, comprising: one or more circuits to help train a neural network to identify one or more objects within one or more images based, at least in part, on comparing: (i) identification accuracy of the one or more objects by a first processor with (ii) identification accuracy of the one or more objects by a second processor, wherein the first and second processors are additional processors distinct from the processor.

9. The processor of claim 8, wherein the one or more circuits are to further help train the neural network to identify the one or more objects within the one or more images based, at least in part, on generating scoring information on one or more of the identification accuracy of the one or more objects by the first processor or the identification accuracy of the one or more objects by the second processor based on the comparing.

10. The processor of claim 8, wherein the one or more circuits are to further help train the neural network to identify the one or more objects within the one or more images based, at least in part, on receiving neural network weight information from a third processor, wherein the neural network weight information is at least partially based on the comparing.

11. The processor of claim 8, wherein the identification accuracy of the one or more objects by the first processor is learned from a first dataset and the identification accuracy of the one or more objects by the second processor is learned from a second dataset.

12. The processor of claim 8, wherein the one or more circuits are of a server, the first processor is of a first edge device and the second processor is of a second edge device.

13. The processor of claim 8, wherein the first processor is of a first edge device, the second processor is of a second edge device, and the one or more circuits are of a third edge device.

14. The processor of claim 8, wherein the identification accuracy corresponds to one or more of a number of the one or more objects that are identified within the one or more images, a number of the one or more objects that are unidentified within the one or more images, or a number of misidentified objects within the one or more images.

15. The processor of claim 1, wherein the one or more circuits receiving the neural network weight information is to synchronize a neural network included on the processor with a second neural network included on the second processor.

16. The processor of claim 15, wherein the processor and the second processor are separate from the server.

* * * * *

UNITED STATES PATENT AND TRADEMARK OFFICE
CERTIFICATE OF CORRECTION

PATENT NO. : 11,804,050 B1
APPLICATION NO. : 16/671001
DATED : October 31, 2023
INVENTOR(S) : Fausto Milletari et al.

It is certified that error appears in the above-identified patent and that said Letters Patent is hereby corrected as shown below:

In the Specification

Column 2, Line 4: "FIG. 16A is a block diagram illustrating a computer system, in at least one embodiment;"

Should read as: --FIG. 16 is a block diagram illustrating a computer system, in at least one embodiment;--

Column 54, Line 47: "FIG. 16A is a block diagram illustrating an exemplary computer system, which may be a system with interconnected devices and components, a system-on-a-chip (SOC) or some combination thereof 1600 formed with a processor that may include execution units to execute an instruction, in at least one embodiment."

Should read as: --FIG. 16 is a block diagram illustrating an exemplary computer system, which may be a system with interconnected devices and components, a system-on-a-chip (SOC) or some combination thereof 1600 formed with a processor that may include execution units to execute an instruction, in at least one embodiment.--

Column 55, Line 18: "In at least one embodiment, system 16A is a single processor desktop or server system, but in another embodiment system 16A may be a multiprocessor system."

Should read as: --In at least one embodiment, system 1600 is a single processor desktop or server system, but in another embodiment system 1600 may be a multiprocessor system.--

Column 56, Line 43: "In at least one embodiment, FIG. 16A illustrates a system, which includes interconnected hardware devices or "chips", whereas in other embodiments, FIG. 16A may illustrate an exemplary System on a Chip ("SoC"). In at least one embodiment, devices illustrated in FIG. cc may be interconnected with proprietary interconnects, standardized interconnects (e.g., PCIe) or some combination thereof."

Signed and Sealed this
Fifth Day of December, 2023

Katherine Kelly Vidal
*Director of the United States Patent and Trademark Office*

CERTIFICATE OF CORRECTION (continued)
U.S. Pat. No. 11,804,050 B1

Should read as: --In at least one embodiment, FIG. 16 illustrates a system, which includes interconnected hardware devices or "chips," whereas in other embodiments, FIG. 16 may illustrate an exemplary System on a Chip ("SoC"). In at least one embodiment, devices illustrated in FIG. 16 may be interconnected with proprietary interconnects, standardized interconnects (e.g., PCIe) or some combination thereof.--

Column 56, Line 57: "In at least one embodiment, inference and/or training logic 215 may be used in system FIG. 16A for inferencing or predicting operations based, at least in part, on weight parameters calculated using neural network training operations, neural network functions and/or architectures, or neural network use cases described herein."

Should read as: --In at least one embodiment, inference and/or training logic 215 may be used in system FIG. 16 for inferencing or predicting operations based, at least in part, on weight parameters calculated using neural network training operations, neural network functions and/or architectures, or neural network use cases described herein.--